US012585094B2

(12) United States Patent
Woodgate et al.

(10) Patent No.: US 12,585,094 B2
(45) Date of Patent: Mar. 24, 2026

(54) ANAMORPHIC DIRECTIONAL ILLUMINATION DEVICE

(71) Applicant: RealD Spark, LLC, Boulder, CO (US)

(72) Inventors: Graham J. Woodgate, Henley-on-Thames (GB); Michael G. Robinson, Boulder, CO (US); Jonathan Harrold, Leamington Spa (GB)

(73) Assignee: RealD Spark, LLC, Boulder, CO (US)

( * ) Notice: Subject to any disclaimer, the term of this patent is extended or adjusted under 35 U.S.C. 154(b) by 240 days.

(21) Appl. No.: 18/211,704

(22) Filed: Jun. 20, 2023

(65) Prior Publication Data

US 2023/0418034 A1    Dec. 28, 2023

Related U.S. Application Data

(60) Provisional application No. 63/454,836, filed on Mar. 27, 2023, provisional application No. 63/447,977, filed on Feb. 24, 2023, provisional application No. 63/441,722, filed on Jan. 27, 2023, provisional application No. 63/434,409, filed on Dec. 21, 2022, provisional application No. 63/430,974, filed on Dec. 7, 2022, provisional application No. 63/423,998, filed
(Continued)

(51) Int. Cl.
*G02B 13/08* (2006.01)
*G02B 27/01* (2006.01)

(52) U.S. Cl.
CPC ......... *G02B 13/08* (2013.01); *G02B 27/0172* (2013.01)

(58) Field of Classification Search
CPC ............................ G02B 13/08; G02B 27/0172
USPC .......................................................... 359/630
See application file for complete search history.

(56) References Cited

U.S. PATENT DOCUMENTS

| | | | |
|---|---|---|---|
| 1,128,979 A | 2/1915 | Hess | |
| 1,970,311 A | 8/1934 | Ives | |
| (Continued) | | | |

FOREIGN PATENT DOCUMENTS

| | | | |
|---|---|---|---|
| CN | 1142869 A | 2/1997 | |
| CN | 1377453 A | 10/2002 | |
| (Continued) | | | |

OTHER PUBLICATIONS

Kononenko et al., "Learning to Look Up: Realtime Monocular Gaze Correction Using Machine Learning", Computer Vision and Pattern Recognition, pp. 4667-4675, 2015.
(Continued)

*Primary Examiner* — Sharrief I Broome
(74) *Attorney, Agent, or Firm* — Foley & Lardner LLP

(57) ABSTRACT

An anamorphic near-eye display apparatus comprises a spatial light modulator with asymmetric pixels; an input transverse anamorphic lens; and an extraction waveguide that passes input light in a first direction to a lateral anamorphic reflector arranged to reflect the light back through the waveguide. Partially reflective extraction elements are arranged between the rear and front guide surfaces of the waveguide to extract the reflected light towards the pupil of an observer, maintaining the directionality of the fan of light rays from the spatial light modulator and anamorphic imaging system. A thin, transparent and efficient anamorphic display apparatus for Augmented Reality and Virtual Reality displays is provided.

75 Claims, 71 Drawing Sheets

Related U.S. Application Data on Nov. 9, 2022, provisional application No. 63/397,251, filed on Aug. 11, 2022, provisional application No. 63/392,683, filed on Jul. 27, 2022, provisional application No. 63/358,413, filed on Jul. 5, 2022, provisional application No. 63/354,676, filed on Jun. 22, 2022.

(56) References Cited

U.S. PATENT DOCUMENTS

| | | | |
|---|---|---|---|
| 2,133,121 A | 10/1938 | Stearns | |
| 2,247,969 A | 7/1941 | Stewart | |
| 2,480,178 A | 8/1949 | Zinberg | |
| 2,810,905 A | 10/1957 | Barlow | |
| 3,409,351 A | 11/1968 | Winnek | |
| 3,715,154 A | 2/1973 | Bestenreiner | |
| 4,057,323 A | 11/1977 | Ward | |
| 4,528,617 A | 7/1985 | Blackington | |
| 4,542,958 A | 9/1985 | Young | |
| 4,804,253 A | 2/1989 | Stewart | |
| 4,807,978 A | 2/1989 | Grinberg et al. | |
| 4,829,365 A | 5/1989 | Eichenlaub | |
| 4,914,553 A | 4/1990 | Hamada et al. | |
| 5,050,946 A | 9/1991 | Hathaway et al. | |
| 5,278,608 A | 1/1994 | Taylor et al. | |
| 5,347,644 A | 9/1994 | Sedlmayr | |
| 5,349,419 A | 9/1994 | Taguchi et al. | |
| 5,459,592 A | 10/1995 | Shibatani et al. | |
| 5,466,926 A | 11/1995 | Sasano et al. | |
| 5,510,831 A | 4/1996 | Mayhew | |
| 5,528,720 A | 6/1996 | Winston et al. | |
| 5,581,402 A | 12/1996 | Taylor | |
| 5,588,526 A | 12/1996 | Fantone et al. | |
| 5,688,035 A | 11/1997 | Kashima et al. | |
| 5,697,006 A | 12/1997 | Taguchi et al. | |
| 5,703,667 A | 12/1997 | Ochiai | |
| 5,727,107 A | 3/1998 | Umemoto et al. | |
| 5,771,066 A | 6/1998 | Barnea | |
| 5,796,451 A | 8/1998 | Kim | |
| 5,808,792 A | 9/1998 | Woodgate et al. | |
| 5,850,580 A | 12/1998 | Taguchi et al. | |
| 5,875,055 A | 2/1999 | Morishima et al. | |
| 5,896,225 A | 4/1999 | Chikazawa | |
| 5,903,388 A | 5/1999 | Sedlmayr | |
| 5,933,276 A | 8/1999 | Magee | |
| 5,956,001 A | 9/1999 | Sumida et al. | |
| 5,959,664 A | 9/1999 | Woodgate | |
| 5,959,702 A | 9/1999 | Goodman | |
| 5,969,850 A | 10/1999 | Harrold et al. | |
| 5,971,559 A | 10/1999 | Ishikawa et al. | |
| 6,008,484 A | 12/1999 | Woodgate et al. | |
| 6,014,164 A | 1/2000 | Woodgate et al. | |
| 6,023,315 A | 2/2000 | Harrold et al. | |
| 6,044,196 A | 3/2000 | Winston et al. | |
| 6,055,013 A | 4/2000 | Woodgate et al. | |
| 6,061,179 A | 5/2000 | Inoguchi et al. | |
| 6,061,489 A | 5/2000 | Ezra et al. | |
| 6,064,424 A | 5/2000 | Berkel et al. | |
| 6,075,557 A | 6/2000 | Holliman et al. | |
| 6,094,216 A | 7/2000 | Taniguchi et al. | |
| 6,108,059 A | 8/2000 | Yang | |
| 6,118,584 A | 9/2000 | Berkel et al. | |
| 6,128,054 A | 10/2000 | Schwarzenberger | |
| 6,144,118 A | 11/2000 | Cahill et al. | |
| 6,172,723 B1 | 1/2001 | Inoue et al. | |
| 6,199,995 B1 | 3/2001 | Umemoto et al. | |
| 6,219,113 B1 | 4/2001 | Takahara | |
| 6,224,214 B1 | 5/2001 | Martin et al. | |
| 6,232,592 B1 | 5/2001 | Sugiyama | |
| 6,256,447 B1 | 7/2001 | Laine | |
| 6,262,786 B1 | 7/2001 | Perlo et al. | |
| 6,295,109 B1 | 9/2001 | Kubo et al. | |
| 6,302,541 B1 | 10/2001 | Grossmann | |
| 6,305,813 B1 | 10/2001 | Lekson et al. | |
| 6,335,999 B1 | 1/2002 | Winston et al. | |
| 6,373,637 B1 | 4/2002 | Gulick et al. | |
| 6,377,295 B1 | 4/2002 | Woodgate et al. | |
| 6,422,713 B1 | 7/2002 | Fohl et al. | |
| 6,456,340 B1 | 9/2002 | Margulis | |
| 6,464,365 B1 | 10/2002 | Gunn et al. | |
| 6,476,850 B1 | 11/2002 | Erbey | |
| 6,481,849 B2 | 11/2002 | Martin et al. | |
| 6,654,156 B1 | 11/2003 | Crossland et al. | |
| 6,663,254 B2 | 12/2003 | Ohsumi | |
| 6,724,452 B1 | 4/2004 | Takeda et al. | |
| 6,731,355 B2 | 5/2004 | Miyashita | |
| 6,736,512 B2 | 5/2004 | Balogh | |
| 6,798,406 B1 | 9/2004 | Jones et al. | |
| 6,801,243 B1 | 10/2004 | Berkel | |
| 6,816,158 B1 | 11/2004 | Lemelson et al. | |
| 6,825,985 B2 | 11/2004 | Brown et al. | |
| 6,847,354 B2 | 1/2005 | Vranish | |
| 6,847,488 B2 | 1/2005 | Travis | |
| 6,859,240 B1 | 2/2005 | Brown et al. | |
| 6,867,828 B2 | 3/2005 | Taira et al. | |
| 6,870,671 B2 | 3/2005 | Travis | |
| 6,883,919 B2 | 4/2005 | Travis | |
| 7,052,168 B2 | 5/2006 | Epstein et al. | |
| 7,058,252 B2 | 6/2006 | Woodgate et al. | |
| 7,073,933 B2 | 7/2006 | Gotoh et al. | |
| 7,091,931 B2 | 8/2006 | Yoon | |
| 7,101,048 B2 | 9/2006 | Travis | |
| 7,136,031 B2 | 11/2006 | Lee et al. | |
| 7,215,391 B2 | 5/2007 | Kuan et al. | |
| 7,215,415 B2 | 5/2007 | Maehara et al. | |
| 7,215,475 B2 | 5/2007 | Woodgate et al. | |
| 7,227,567 B1 | 6/2007 | Beck et al. | |
| 7,239,293 B2 | 7/2007 | Perlin et al. | |
| 7,365,908 B2 | 4/2008 | Dolgoff | |
| 7,375,886 B2 | 5/2008 | Lipton et al. | |
| 7,410,286 B2 | 8/2008 | Travis | |
| 7,430,358 B2 | 9/2008 | Qi et al. | |
| 7,492,346 B2 | 2/2009 | Manabe et al. | |
| 7,528,893 B2 | 5/2009 | Schultz et al. | |
| 7,545,429 B2 | 6/2009 | Travis | |
| 7,587,117 B2 | 9/2009 | Winston et al. | |
| 7,614,777 B2 | 11/2009 | Koganezawa et al. | |
| 7,660,047 B1 * | 2/2010 | Travis | G06F 3/042 |
| | | | 359/726 |
| 7,750,981 B2 | 7/2010 | Shestak et al. | |
| 7,750,982 B2 | 7/2010 | Nelson et al. | |
| 7,771,102 B2 | 8/2010 | Iwasaki | |
| 7,798,699 B2 | 9/2010 | Laitinen et al. | |
| 7,944,428 B2 | 5/2011 | Travis | |
| 7,970,246 B2 | 6/2011 | Travis et al. | |
| 7,976,208 B2 | 7/2011 | Travis | |
| 8,016,475 B2 | 9/2011 | Travis | |
| 8,179,361 B2 | 5/2012 | Sugimoto et al. | |
| 8,216,405 B2 | 7/2012 | Emerton et al. | |
| 8,223,296 B2 | 7/2012 | Lee et al. | |
| 8,325,295 B2 | 12/2012 | Sugita et al. | |
| 8,354,806 B2 | 1/2013 | Travis et al. | |
| 8,477,261 B2 | 7/2013 | Travis et al. | |
| 8,502,253 B2 | 8/2013 | Min | |
| 8,534,901 B2 | 9/2013 | Panagotacos et al. | |
| 8,556,491 B2 | 10/2013 | Lee | |
| 8,651,725 B2 | 2/2014 | Ie et al. | |
| 8,684,588 B2 | 4/2014 | Ajichi et al. | |
| 8,714,804 B2 | 5/2014 | Kim et al. | |
| 8,736,967 B1 | 5/2014 | Browne et al. | |
| 8,752,995 B2 | 6/2014 | Park | |
| 8,760,762 B1 | 6/2014 | Kelly et al. | |
| 8,926,112 B2 | 1/2015 | Uchiike et al. | |
| 8,942,434 B1 | 1/2015 | Karakotsios et al. | |
| 8,985,810 B2 | 3/2015 | Woodgate et al. | |
| 9,188,731 B2 | 11/2015 | Woodgate et al. | |
| 9,197,884 B2 | 11/2015 | Lee et al. | |
| 9,350,980 B2 | 5/2016 | Robinson et al. | |
| 9,519,153 B2 | 12/2016 | Robinson et al. | |
| 10,054,732 B2 | 8/2018 | Robinson et al. | |
| 10,133,168 B1 | 11/2018 | Taylor et al. | |
| 10,191,196 B2 | 1/2019 | Morozov et al. | |
| 10,425,635 B2 | 9/2019 | Woodgate et al. | |
| 11,821,602 B2 | 11/2023 | Woodgate et al. | |

(56) References Cited

U.S. PATENT DOCUMENTS

| | | |
|---|---|---|
| 2001/0001566 A1 | 5/2001 | Moseley et al. |
| 2001/0050686 A1 | 12/2001 | Allen |
| 2002/0018299 A1 | 2/2002 | Daniell |
| 2002/0113246 A1 | 8/2002 | Nagai et al. |
| 2002/0113866 A1 | 8/2002 | Taniguchi et al. |
| 2003/0046839 A1 | 3/2003 | Oda et al. |
| 2003/0137738 A1 | 7/2003 | Ozawa et al. |
| 2003/0137821 A1 | 7/2003 | Gotoh et al. |
| 2004/0008877 A1 | 1/2004 | Leppard et al. |
| 2004/0015729 A1 | 1/2004 | Elms et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0105264 A1 | 6/2004 | Spero |
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1 | 9/2004 | Kim et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0073495 A1 | 4/2005 | Harbers et al. |
| 2005/0094295 A1 | 5/2005 | Yamashita et al. |
| 2005/0110980 A1 | 5/2005 | Maehara et al. |
| 2005/0135116 A1* | 6/2005 | Epstein ................ G02B 6/0061 |
| | | 362/615 |
| 2005/0174768 A1 | 8/2005 | Conner |
| 2005/0180167 A1 | 8/2005 | Hoelen et al. |
| 2005/0190180 A1 | 9/2005 | Jin et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0274956 A1 | 12/2005 | Bhat |
| 2005/0276071 A1 | 12/2005 | Sasagawa et al. |
| 2005/0280637 A1 | 12/2005 | Ikeda et al. |
| 2006/0002678 A1 | 1/2006 | Weber et al. |
| 2006/0012845 A1 | 1/2006 | Edwards |
| 2006/0056166 A1 | 3/2006 | Yeo et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0221642 A1 | 10/2006 | Daiku |
| 2006/0227087 A1 | 10/2006 | Hajjar et al. |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109400 A1 | 5/2007 | Woodgate et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0153160 A1 | 7/2007 | Lee et al. |
| 2007/0177275 A1 | 8/2007 | McGuire |
| 2007/0183466 A1 | 8/2007 | Son et al. |
| 2007/0188667 A1 | 8/2007 | Schwerdtner |
| 2007/0189701 A1 | 8/2007 | Chakmakjian et al. |
| 2007/0223251 A1 | 9/2007 | Liao |
| 2007/0223252 A1 | 9/2007 | Lee et al. |
| 2007/0279554 A1 | 12/2007 | Kowarz et al. |
| 2007/0279727 A1 | 12/2007 | Gandhi et al. |
| 2008/0079662 A1 | 4/2008 | Saishu et al. |
| 2008/0084519 A1 | 4/2008 | Brigham et al. |
| 2008/0086289 A1 | 4/2008 | Brott |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0259643 A1 | 10/2008 | Ijzerman et al. |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0109705 A1 | 4/2009 | Pakhchyan et al. |
| 2009/0128735 A1 | 5/2009 | Larson et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Minaño et al. |
| 2009/0168459 A1 | 7/2009 | Holman et al. |
| 2009/0174700 A1 | 7/2009 | Daiku |
| 2009/0174840 A1 | 7/2009 | Lee et al. |
| 2009/0190072 A1 | 7/2009 | Nagata et al. |
| 2009/0190079 A1 | 7/2009 | Saitoh |
| 2009/0207629 A1 | 8/2009 | Fujiyama et al. |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2009/0315915 A1 | 12/2009 | Dunn et al. |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0053938 A1 | 3/2010 | Kim et al. |
| 2010/0091254 A1 | 4/2010 | Travis et al. |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1* | 9/2010 | Sugita ............... G02F 1/133615 |
| | | 349/62 |
| 2010/0231498 A1 | 9/2010 | Large et al. |
| 2010/0271838 A1 | 10/2010 | Yamaguchi |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0302135 A1 | 12/2010 | Larson et al. |
| 2010/0309296 A1 | 12/2010 | Harrold et al. |
| 2010/0328438 A1 | 12/2010 | Ohyama et al. |
| 2010/0328561 A1 | 12/2010 | Schuck et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0043501 A1 | 2/2011 | Daniel |
| 2011/0044056 A1 | 2/2011 | Travis et al. |
| 2011/0044579 A1 | 2/2011 | Travis et al. |
| 2011/0051237 A1 | 3/2011 | Hasegawa et al. |
| 2011/0187293 A1 | 8/2011 | Travis |
| 2011/0187635 A1 | 8/2011 | Lee et al. |
| 2011/0188120 A1 | 8/2011 | Tabirian et al. |
| 2011/0199459 A1 | 8/2011 | Barenbrug et al. |
| 2011/0211142 A1 | 9/2011 | Kashiwagi et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0228562 A1 | 9/2011 | Travis et al. |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |

(56) References Cited

U.S. PATENT DOCUMENTS

| | | |
|---|---|---|
| 2011/0255303 A1 | 10/2011 | Nichol et al. |
| 2011/0267563 A1 | 11/2011 | Shimizu |
| 2011/0285927 A1 | 11/2011 | Schultz et al. |
| 2011/0292321 A1* | 12/2011 | Travis ................. G02B 6/0056 |
| | | 362/19 |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0056971 A1 | 3/2012 | Kumar et al. |
| 2012/0062991 A1 | 3/2012 | Krijn et al. |
| 2012/0075285 A1 | 3/2012 | Oyagi et al. |
| 2012/0081920 A1 | 4/2012 | Ie et al. |
| 2012/0086776 A1 | 4/2012 | Lo |
| 2012/0092435 A1 | 4/2012 | Wohlert |
| 2012/0106193 A1 | 5/2012 | Kim et al. |
| 2012/0127573 A1* | 5/2012 | Robinson ............... G02B 30/33 |
| | | 359/464 |
| 2012/0154450 A1 | 6/2012 | Aho et al. |
| 2012/0169838 A1 | 7/2012 | Sekine |
| 2012/0182482 A1 | 7/2012 | Byoun et al. |
| 2012/0206050 A1 | 8/2012 | Spero |
| 2012/0243204 A1 | 9/2012 | Robinson |
| 2012/0243261 A1 | 9/2012 | Yamamoto et al. |
| 2012/0268426 A1 | 10/2012 | Yi et al. |
| 2012/0293721 A1 | 11/2012 | Ueyama |
| 2012/0294579 A1 | 11/2012 | Chen |
| 2012/0299913 A1 | 11/2012 | Robinson et al. |
| 2012/0314145 A1 | 12/2012 | Robinson |
| 2012/0327172 A1 | 12/2012 | El-Saban et al. |
| 2013/0050452 A1 | 2/2013 | Ramsey et al. |
| 2013/0083303 A1 | 4/2013 | Hoover et al. |
| 2013/0101253 A1 | 4/2013 | Popovich et al. |
| 2013/0107340 A1 | 5/2013 | Wong et al. |
| 2013/0119237 A1 | 5/2013 | Raguin et al. |
| 2013/0127861 A1 | 5/2013 | Gollier |
| 2013/0135588 A1 | 5/2013 | Popovich et al. |
| 2013/0156265 A1 | 6/2013 | Hennessy |
| 2013/0169701 A1 | 7/2013 | Whitehead et al. |
| 2013/0170004 A1 | 7/2013 | Futterer |
| 2013/0222384 A1 | 8/2013 | Futterer et al. |
| 2013/0230136 A1 | 9/2013 | Sakaguchi et al. |
| 2013/0235561 A1 | 9/2013 | Etienne et al. |
| 2013/0278612 A1 | 10/2013 | Holman et al. |
| 2013/0307831 A1 | 11/2013 | Robinson et al. |
| 2013/0307946 A1 | 11/2013 | Robinson et al. |
| 2013/0308339 A1 | 11/2013 | Woodgate et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0016354 A1 | 1/2014 | Lee et al. |
| 2014/0022619 A1 | 1/2014 | Woodgate et al. |
| 2014/0028807 A1 | 1/2014 | Goulanian et al. |
| 2014/0036361 A1 | 2/2014 | Woodgate et al. |
| 2014/0041205 A1 | 2/2014 | Robinson et al. |
| 2014/0043323 A1 | 2/2014 | Sumi |
| 2014/0098558 A1 | 4/2014 | Vasylyev |
| 2014/0240344 A1 | 8/2014 | Tomono et al. |
| 2014/0240828 A1 | 8/2014 | Robinson et al. |
| 2014/0289835 A1 | 9/2014 | Varshavsky et al. |
| 2014/0340728 A1 | 11/2014 | Taheri |
| 2015/0029754 A1 | 1/2015 | Ouderkirk et al. |
| 2015/0070773 A1 | 3/2015 | Wang et al. |
| 2015/0085091 A1 | 3/2015 | Varekamp |
| 2015/0116212 A1 | 4/2015 | Freed et al. |
| 2015/0192265 A1 | 7/2015 | Yu et al. |
| 2015/0268479 A1 | 9/2015 | Woodgate et al. |
| 2015/0334365 A1 | 11/2015 | Tsubaki et al. |
| 2015/0339512 A1 | 11/2015 | Son et al. |
| 2016/0033710 A1 | 2/2016 | Kim et al. |
| 2018/0074265 A1 | 3/2018 | Waldern et al. |
| 2018/0113310 A1 | 4/2018 | Rolland et al. |
| 2018/0196275 A1 | 7/2018 | Robinson et al. |
| 2018/0284341 A1 | 10/2018 | Woodgate et al. |
| 2018/0313510 A1 | 11/2018 | Albou et al. |
| 2018/0373051 A1 | 12/2018 | Harrold et al. |
| 2019/0056086 A1 | 2/2019 | Nambara et al. |
| 2019/0227322 A1 | 7/2019 | Schaub et al. |
| 2019/0278076 A1 | 9/2019 | Chen et al. |
| 2020/0049995 A1 | 2/2020 | Urey et al. |
| 2020/0183152 A1 | 6/2020 | Pennell et al. |
| 2020/0278538 A1 | 9/2020 | Taylor et al. |
| 2021/0333570 A1 | 10/2021 | Fattal et al. |
| 2022/0120402 A1 | 4/2022 | Woodgate et al. |
| 2023/0408826 A1 | 12/2023 | Oh et al. |
| 2023/0418034 A1 | 12/2023 | Woodgate et al. |
| 2023/0418068 A1 | 12/2023 | Woodgate et al. |
| 2024/0061248 A1 | 2/2024 | Robinson et al. |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1588196 A | 3/2005 |
| CN | 1678943 A | 10/2005 |
| CN | 1696788 A | 11/2005 |
| CN | 1769971 A | 5/2006 |
| CN | 1823292 A | 8/2006 |
| CN | 1826553 A | 8/2006 |
| CN | 1866112 A | 11/2006 |
| CN | 1900785 A | 1/2007 |
| CN | 1908753 A | 2/2007 |
| CN | 2872404 | 2/2007 |
| CN | 1307481 | 3/2007 |
| CN | 101029975 A | 9/2007 |
| CN | 101049028 A | 10/2007 |
| CN | 200983052 | 11/2007 |
| CN | 101114080 A | 1/2008 |
| CN | 101142823 A | 3/2008 |
| CN | 101266338 A | 9/2008 |
| CN | 100449353 | 1/2009 |
| CN | 101364004 A | 2/2009 |
| CN | 101598863 B | 12/2009 |
| CN | 100591141 | 2/2010 |
| CN | 101660689 A | 3/2010 |
| CN | 102147079 A | 8/2011 |
| CN | 202486493 U | 10/2012 |
| EP | 0653891 A1 | 5/1995 |
| EP | 0721131 A2 | 7/1996 |
| EP | 0830984 A2 | 3/1998 |
| EP | 0833183 A1 | 4/1998 |
| EP | 0860729 A2 | 8/1998 |
| EP | 0939273 A1 | 9/1999 |
| EP | 0656555 B1 | 3/2003 |
| EP | 1394593 A1 | 3/2004 |
| EP | 1736702 A1 | 12/2006 |
| EP | 2003394 A2 | 12/2008 |
| EP | 2105655 A2 | 9/2009 |
| EP | 2219067 A1 | 8/2010 |
| EP | 2451180 A2 | 5/2012 |
| EP | 1634119 B1 | 8/2012 |
| EP | 2796771 B1 | 5/2020 |
| GB | 2405542 | 2/2005 |
| JP | H07270792 | 10/1995 |
| JP | H08211334 | 8/1996 |
| JP | H08237691 A | 9/1996 |
| JP | H08254617 | 10/1996 |
| JP | H08070475 | 12/1996 |
| JP | H08340556 | 12/1996 |
| JP | H1042315 A | 2/1998 |
| JP | H10142556 A | 5/1998 |
| JP | H11242908 A | 9/1999 |
| JP | 2000048618 A | 2/2000 |
| JP | 2000069504 A | 3/2000 |
| JP | 2000131683 A | 5/2000 |
| JP | 2000200049 A | 7/2000 |
| JP | 2001093321 A | 4/2001 |
| JP | 2002049004 A | 2/2002 |
| JP | 2003215349 A | 7/2003 |
| JP | 2003215705 A | 7/2003 |
| JP | 2004112814 A | 4/2004 |

(56) References Cited

FOREIGN PATENT DOCUMENTS

| | | | |
|---|---|---|---|
| JP | 2004127810 A | 4/2004 | |
| JP | 2004265813 A | 9/2004 | |
| JP | 2004319364 A | 11/2004 | |
| JP | 2005135844 A | 5/2005 | |
| JP | 2005181914 A | 7/2005 | |
| JP | 2005183030 A | 7/2005 | |
| JP | 2005203182 A | 7/2005 | |
| JP | 2005259361 A | 9/2005 | |
| JP | 2006004877 A | 1/2006 | |
| JP | 2006010935 A | 1/2006 | |
| JP | 2006031941 A | 2/2006 | |
| JP | 2006310269 A | 11/2006 | |
| JP | 2007094035 A | 4/2007 | |
| JP | 3968742 B2 | 8/2007 | |
| JP | 2007273288 A | 10/2007 | |
| JP | 2008204874 A | 9/2008 | |
| JP | 2010160527 A | 7/2010 | |
| JP | 2011192468 A | 9/2011 | |
| JP | 2012060607 A | 3/2012 | |
| JP | 2014022309 A | 2/2014 | |
| KR | 20030064258 | 7/2003 | |
| KR | 20090932304 | 12/2009 | |
| KR | 20110006773 A | 1/2011 | |
| KR | 20110017918 A | 2/2011 | |
| KR | 20110067534 A | 6/2011 | |
| KR | 20120048301 A | 5/2012 | |
| KR | 20120049890 A | 5/2012 | |
| KR | 20130002646 A | 1/2013 | |
| TW | 200528780 A | 9/2005 | |
| WO | 1998021620 A1 | 5/1998 | |
| WO | 1999011074 A1 | 3/1999 | |
| WO | 2001061241 A1 | 8/2001 | |
| WO | 2008038539 A1 | 4/2008 | |
| WO | 2008045681 A1 | 4/2008 | |
| WO | 2009098809 A1 | 8/2009 | |
| WO | 2010021926 A2 | 2/2010 | |
| WO | 2011020962 A1 | 2/2011 | |
| WO | 2011022342 A2 | 2/2011 | |
| WO | 2011068907 A1 | 6/2011 | |
| WO | 2011149739 A2 | 12/2011 | |
| WO | 2012158574 A1 | 11/2012 | |
| WO | 2013137161 A1 | 9/2013 | |
| WO | 2014130860 A1 | 8/2014 | |
| WO | 2022060673 A1 | 3/2022 | |

OTHER PUBLICATIONS

KR-20137015775 Office action (translated) dated Oct. 18, 2016.
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton: "Stereoscopic Composition Lenny Lipton", Feb. 15, 2009 (Feb. 15, 2009), XP055335930, Retrieved from the Internet: URL:https://lennylipton.wordpress.com/2009/02/15/stereoscopic-composition/ [retrieved on Jan. 17, 2017].
Lowe, "Distinctive Image Features from Scale-Invariant Keypoints", International Journal of Computer Vision 60 (2), pp. 91-110, 2004.
Lucio et al: "RGBD Camera Effects", Aug. 1, 2012 (Aug. 1, 2012), XP055335831, SIBGRAPI—Conference on Graphics, Patterns and Images Retrieved from the Internet: URL:https://www.researchgate.net/profile/Leandro Cruz/publication/233398182 RGBD Camera Effects/links/0912f50a2922010eb2000000.pdf [retrieved on Jan. 17, 2017].
Ozuysal et al., "Fast Keypoint recognition in Ten Lines of Code", Computer Vision and Pattern Recognition, pp. 1-8, 2007.
PCT/US2007/85475 International preliminary report on patentability dated May 26, 2009.
PCT/US2011/061511 International Preliminary Report on Patentability dated May 21, 2013.
PCT/US2011/061511 International search report and written opinion of international searching authority dated Jun. 29, 2012.

PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.
PCT/US2013/041192 International search report and written opinion of international searching authority mailed Aug. 28, 2013.
PCT/US2013/041228 International search report and written opinion of international searching authority mailed Aug. 23, 2013.
PCT/US2013/041235 International search report and written opinion of international searching authority Mailed Aug. 23, 2013.
PCT/US2013/041548 International search report and written opinion of international searching authority mailed Aug. 27, 2013.
PCT/US2013/041619 International search report and written opinion of international searching authority mailed Aug. 27, 2013.
PCT/US2013/041655 International search report and written opinion of international searching authority mailed Aug. 27, 2013.
PCT/US2013/041683 International search report and written opinion of international searching authority mailed Aug. 27, 2013.
PCT/US2013/041697 International search report and written opinion of international searching authority mailed Aug. 23, 2013.
PCT/US2013/041703 International search report and written opinion of international searching authority mailed Aug. 27, 2013.
PCT/US2013/063125 International search report and written opinion of international searching authority mailed Jan. 20, 2014.
PCT/US2013/063133 International search report and written opinion of international searching authority mailed Jan. 20, 2014.
PCT/US2013/077288 International search report and written opinion of international searching authority mailed Apr. 18, 2014.
PCT/US2014/017779 International search report and written opinion of international searching authority mailed May 28. 2014.
PCT/US2014/042721 International search report and written opinion of international searching authority mailed Oct. 10, 2014.
PCT/US2015/054523 International search report and written opinion of international searching authority dated Mar. 18, 2016.
PCT/US2016/034418 International search report and written opinion of the international searching authority dated Sep. 7, 2016.
PCT/US2016/056410 International search report and written opinion of the international searching authority dated Jan. 25, 2017.
PCT/US2016/058695 International search report and written opinion of international searching authority dated Feb. 28, 2017.
PCT/US2016/061428 International search report and written opinion of international searching authority mailed Jan. 20, 2017.
PCT/US2017/012203 International search report and written opinion of international searching authority mailed Apr. 18, 2017.
PCT/US2023/025706 International search report and written opinion of the international searching authority mailed Oct. 5, 2023.
PCT/US2023/025722 International search report and written opinion of the international searching authority mailed Oct. 6, 2023.
PCT/US2023/028359 International search report and written opinion of the international searching authority mailed Oct. 20, 2023.
PCT/US2023/029866 International search report and written opinion of the international searching authority mailed Nov. 27, 2023.
Robinson et al., U.S. Appl. No. 14/751,878 entitled "Directional privacy display", filed Jun. 26, 2015.
Robinson et al., U.S. Appl. No. 15/165,960 entitled "Wide Angle Imaging Directional Backlights", filed May 26, 2016.
Robinson et al., U.S. Appl. No. 15/290,543 entitled "Wide angle imaging directional backlights", filed Oct. 11, 2016.
Robinson, U.S. Appl. No. 13/300,293 entitled "Directional flat illuminators", filed Nov. 18, 2011.
RU-2013122560 First office action dated Jan. 22, 2014.
RU-2013122560 Second office action dated Apr. 10, 2015.
RU-201401264 Office action dated Jan. 18, 2017.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Travis, et al. "Collimated light from a waveguide for a display," Optics Express, vol. 17, No. 22, pp. 19714-19719 (2009).
Mola and Jones, "Rapid Object Detection using a Boosted Cascade of Simple Features", pp. 1-9 CVPR 2001.

(56) References Cited

OTHER PUBLICATIONS

Zach et al., "A Duality Based Approach for Realtime TV-L1 Optical Flow", Pattern Recognition (Proc. DAGM), 2007, pp. 214-223.
3M™ ePrivacy Filter software professional version; http://www.cdw.com/shop/products/3M-ePrivacy-Filter-software-professional-version/3239412.aspx?cm_mmc=ShoppingFeeds-_-ChannelIntel-ligence-_-Software-_-3239412_3MT%20ePrivacy%20Filter%20software%20professional%20version_3MF-EPFPRO&cpncode=37-7582919&srccode=cii_10191459#PO; Copyright 2007-2016.
AU-2014218711 Examination report No. 1 dated Mar. 20, 2017.
Beato: "Understanding Comfortable stereography", Dec. 31, 2011 (Dec. 31, 2011), XP055335952, Retrieved from the Internet: URL:http://64.17.134.112/Affonso Beato/Understanding Comfortable Stereography.html [retrieved-on Jan. 17, 2017].
Braverman: "The 3D Toolbox : News", Aug. 13, 2010 (Aug. 13, 2010), XP055336081, Retrieved from the Internet: URL:http://www.dashwood3d.com/blog/the-3d-toolbox/ [retrieved on Jan. 17, 2017].
CN-201180065590.0 Office fourth action dated Jan. 4, 2017.
CN-201380026045.X Chinese First Office Action of Chinese Patent Office dated Aug. 29, 2016.
CN-201380026046.4 Chinese 1st Office Action of the State Intellectual Property Office of P.R. China dated Oct. 24, 2016.
CN-201380026047.9 Chinese 1st Office Action of the State Intellectual Property Office of P.R. dated Dec. 18, 2015.
CN-201380026050.0 Chinese 2nd Office Action of the State Intellectual Property Office of P.R. dated Apr. 1, 2017.
CN-201380026058.7 Chinese 1st Office Action of the State Intellectual Property Office of P.R. China dated Nov. 2, 2016.
CN-201380026059.1 Chinese 2nd Office Action of the State Intellectual Property Office of P.R. dated Feb. 22, 2017.
CN-201380026059.1 Chinese 1st Office Action of the State Intellectual Property Office of P.R. dated Apr. 25, 2016.
CN-201380049451.8 Chinese Office Action of the State Intellectual Property Office of P.R. dated Apr. 5, 2016.
CN-201380063047.6 Chinese Office Action of the State Intellectual Property Office of P.R. China dated Oct. 9, 2016.
CN-201380063055.0 Chinese 1st Office Action of the State Intellectual Property Office of P.R. dated Jun. 23, 2016.
CN-201380073381.X Chinese Office Action of the State Intellectual Property Office of P.R. China dated Nov. 16, 2016.
CN-201480023023.2 Office second action dated May 11, 2017.
Cootes et al., "Active Appearance Models", IEEE Trans. Pattern Analysis and Machine Intelligence, 23(6):681-685, 2001.
Cootes et al., "Active Shape Models—Their Training and Application" Computer Vision and Image Understanding 61(1):38-59 Jan. 1995.
Dalal et al., "Histogram of Oriented Gradients for Human Detection", Computer Vision and Pattern Recognition, pp. 886-893, 2005.
Drucker et al., "Support Vector Regression Machines", Advances in Neural Information Processing Systems 9, pp. 155-161, NIPS 1996.
EP-11842021.5 Office Action dated Oct. 2, 2015.
EP-11842021.5 Office Action dated Sep. 2, 2016.
EP-13758536.0 European Extended Search Report of European Patent Office dated Feb. 4, 2016.
EP-13790013.0 European Extended Search Report of European Patent Office dated Jan. 26, 2016.
EP-13790141.9 European Extended Search Report of European Patent Office dated Feb. 11, 2016.
EP-13790775.4 European Extended Search Report of European Patent Office dated Oct. 9, 2015.
EP-13790775.4 Office Action dated Aug. 29, 2016.
EP-13790809.1 European Extended Search Report of European Patent Office dated Feb. 16, 2016.
EP-13790942.0 European Extended Search Report of European Patent Office dated May 23, 2016.

EP-13791332.3 European Extended Search Report of European Patent Office dated Feb. 1, 2016.
EP-13791437.0 European first office action dated Aug. 30, 2016.
EP-13822472.0 European Extended Search Report of European Patent Office dated Mar. 2, 2016.
EP-13843659.7 European Extended Search Report of European Patent Office dated May 10, 2016.
EP-13865893.5 European Extended Search Report of European Patent Office dated Oct. 6, 2016.
EP-14754859.8 European Extended Search Report of European Patent Office dated Oct. 14, 2016.
EP-14813739.1 European Extended Search Report of European Patent Office dated Jan. 25, 2017.
EP-14853532.1 European Extended Search Report of European Patent Office dated May 23, 2017.
Ho, "Random Decision Forests", Proceedings of the 3rd International Conference on Document Analysis and Recognition, Montreal, QC, pp. 278-282, Aug. 14-16, 1995.
Ian Sexton et al: "Stereoscopic and autostereoscopic display-systems",—IEEE Signal Processing Magazine, May 1, 1999 (May 1, 1999 ), pp. 85-99, XP055305471, Retrieved from the Internet: RL:http://ieeexplore.ieee.org/iel5/79/16655/00768575.pdf [retrieved on Sep. 26, 2016].
Jeong et al., Holographically customized optical combiner for eye-box extended near-eye display, Opt. Express 27, 38006-38018 (2019) Dec. 23, 2019.
JP-2013540083 Notice of reasons for rejection of Jun. 30, 2015.
JP-2015-512794 1st Office Action (translated) dated Feb. 14, 2017.
JP-2015-512809 1st Office Action dated Mar. 28, 2017.
JP-2015-512810 1st Office Action (translated) dated Feb. 7, 2017.
JP-2015-512879 1st Office Action (translated) dated Apr. 11, 2017.
JP-2015-512887 1st Office Action (translated) dated Feb. 7, 2017.
JP-2015-512896 1st Office Action (translated) dated May 9, 2017.
JP-2015-512901 1st Office Action dated Mar. 28, 2017.
JP-2015-512905 1st Office Action (translated) dated Feb. 7, 2017.
PCT/US2024/055840 International search report and written opinion of the international searching authority mailed Jan. 21, 2025.
KR1020207030206 Notice of Preliminary Rejection dated Jan. 4, 2024.
PCT/US2023/081677 International search report and written opinion of the international searching authority mailed Mar. 15, 2024.
PCT/US2023/081692 International search report and written opinion of the international searching authority mailed Mar. 12, 2024.
International Search Report and Written Opinion of the International Searching Authority dated Dec. 20, 2021 for Application No. PCT/US2021/050117.
PCT/US2024/032628 International search report and written opinion of the international searching authority mailed Sep. 20, 2024.
PCT/US2024/032630 International search report and written opinion of the international searching authority mailed Sep. 20, 2024.
PCT/US2024/032634 International search report and written opinion of the international searching authority mailed Sep. 19, 2024.
EP-23207269.4 European Extended Search Report of European Patent Office dated Dec. 22, 2023.
Cheng et al., "Design and manufacturing AR head-mounted displays: A review and outlook", Light: Advanced Manufacturing (2021)2:24, Official journal of the JHL 2689-9620, pp. 1-20.
EP-13790195.5 European Extended Search Report of European Patent Office dated Mar. 2, 2016.
International search report and written opinion of international searching authority for co-pending PCT application No. PCT/US2013/041619 mailed Aug. 27, 2013.
Kalantar, et al. "Backlight Unit With Double Surface Light Emission," J. Soc. Inf. Display, vol. 12, Issue 4, pp. 379-387 (Dec. 2004).
EP-21870034.2 European Extended Search Report of European Patent Office dated Jul. 30, 2024.

* cited by examiner

*Lateral field of view angle*

184, 185

186A
186B
186C
186D
186E

11B

187

1

6

170

193

199(44)

11A        37

904
460C

172

8

*l*

Reflectivity / %

40

30

20

10

0

812

810

400    450    500    550    600    650    700    750

Wavelength / nm

| Calculate ray 37 angle in waveguide for transverse row 221T | Calculate ray 37 reflectivity at stack 184 | Modify pixel output |

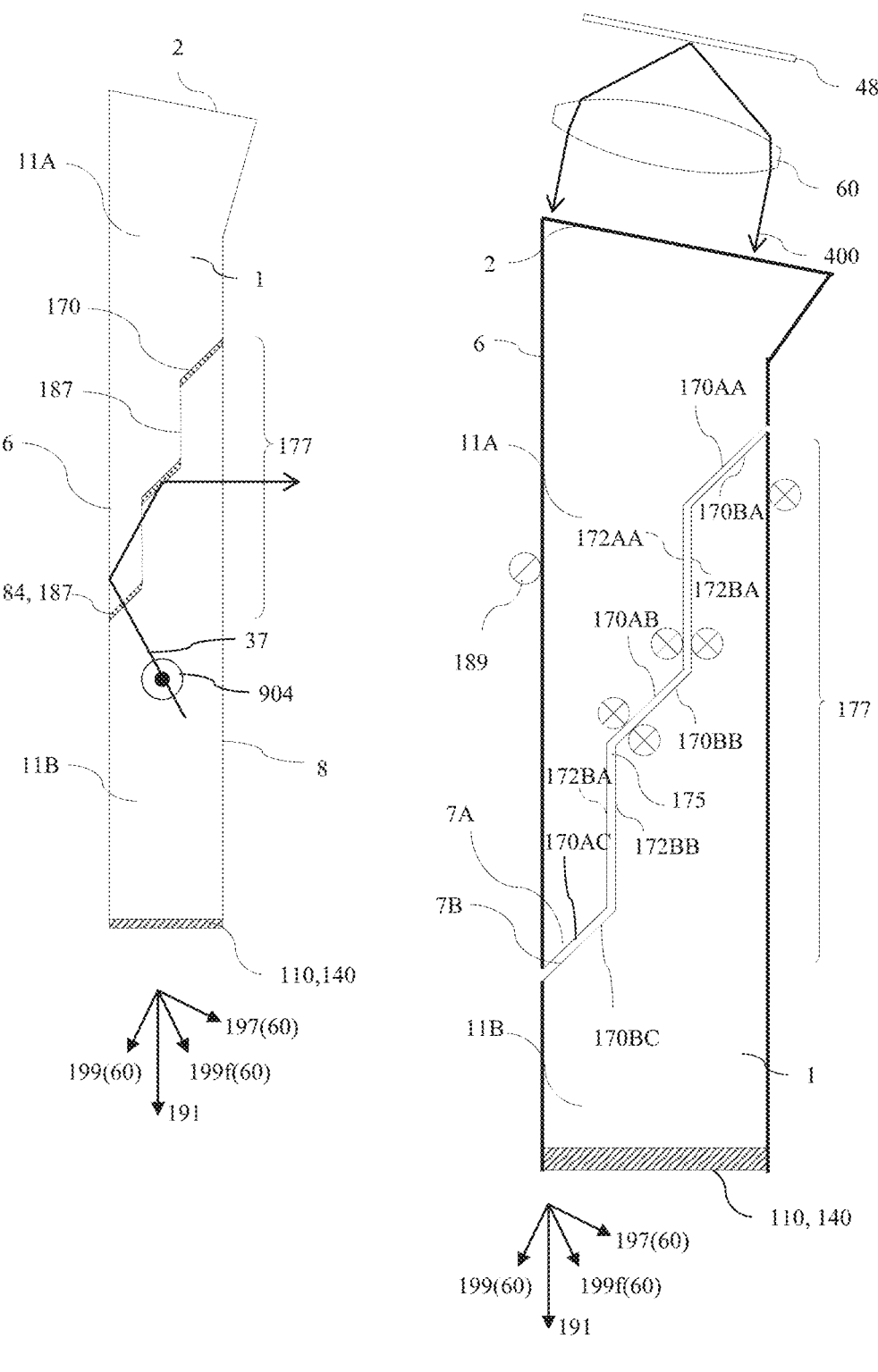
*FIG. 9E*                      *FIG. 10*

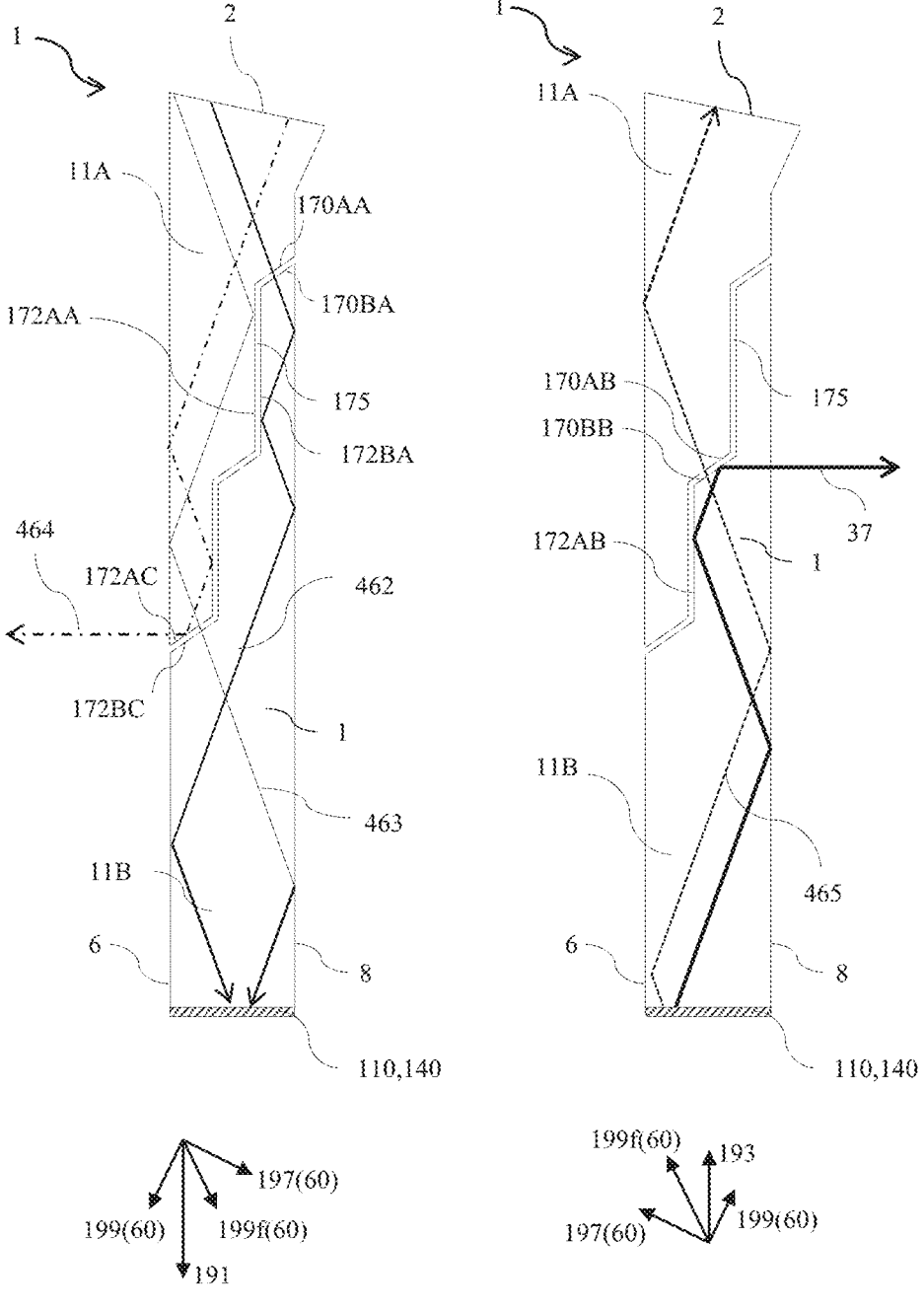
*FIG. 11A*          *FIG. 11B*

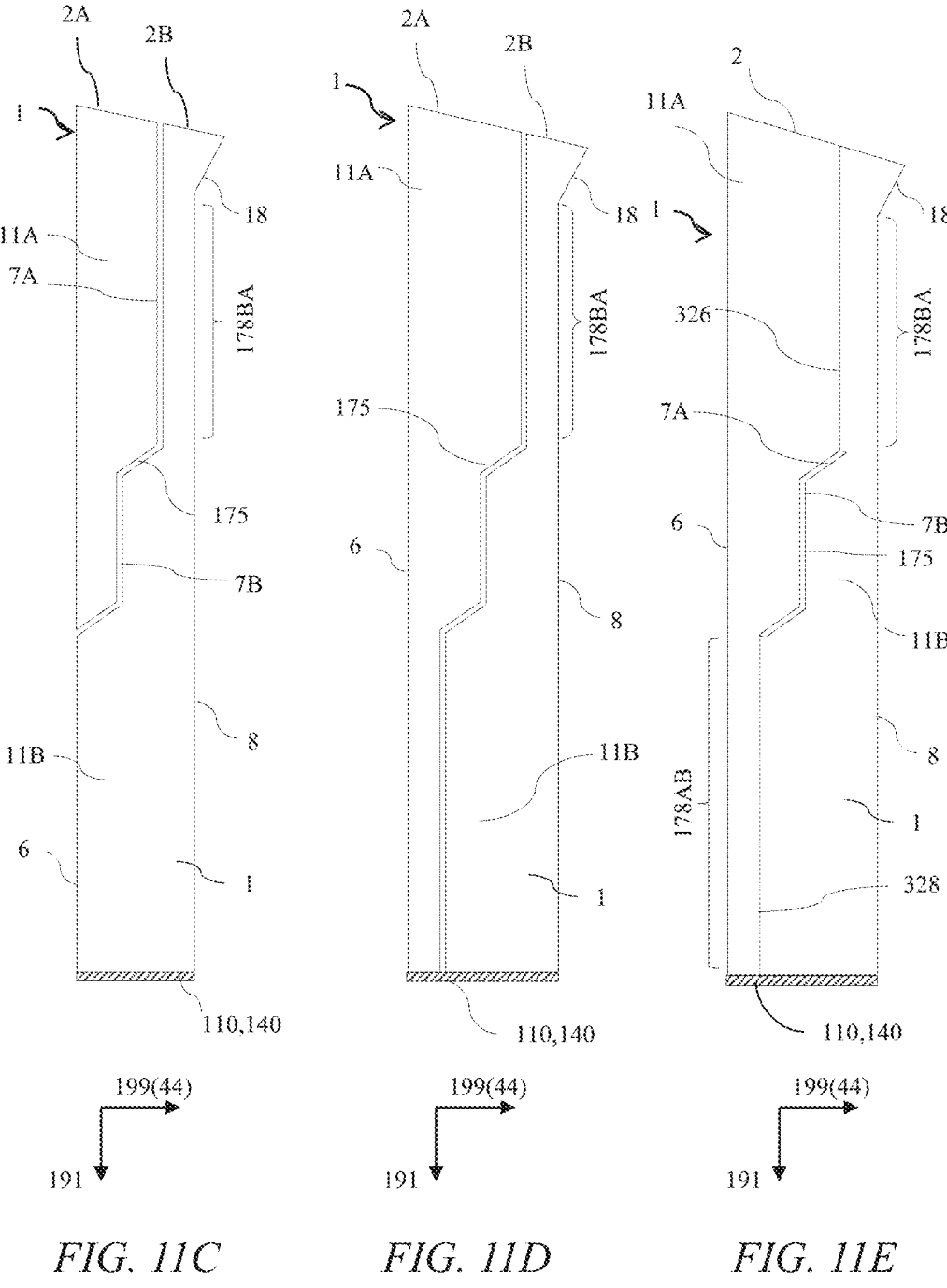
*FIG. 11C*        *FIG. 11D*        *FIG. 11E*

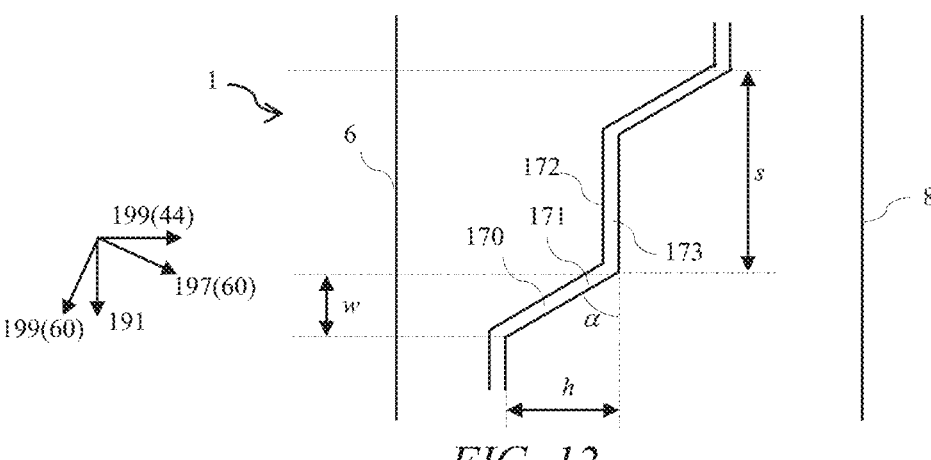
FIG. 12
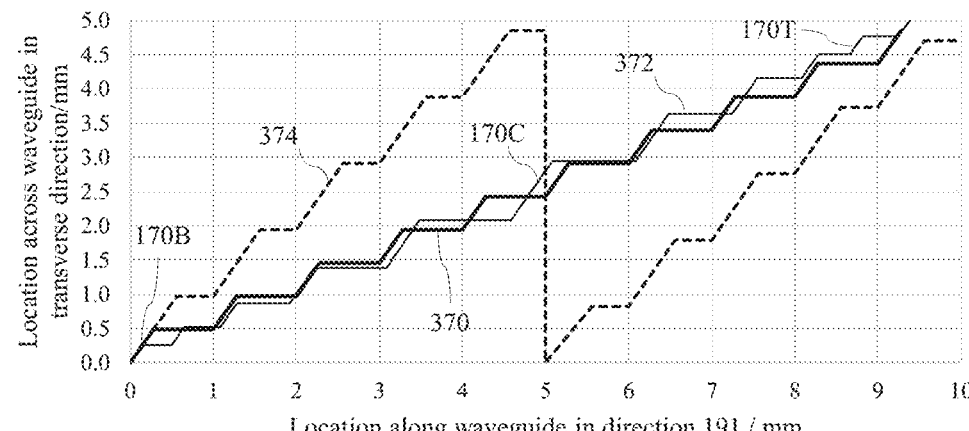
FIG. 13A
FIG. 13B

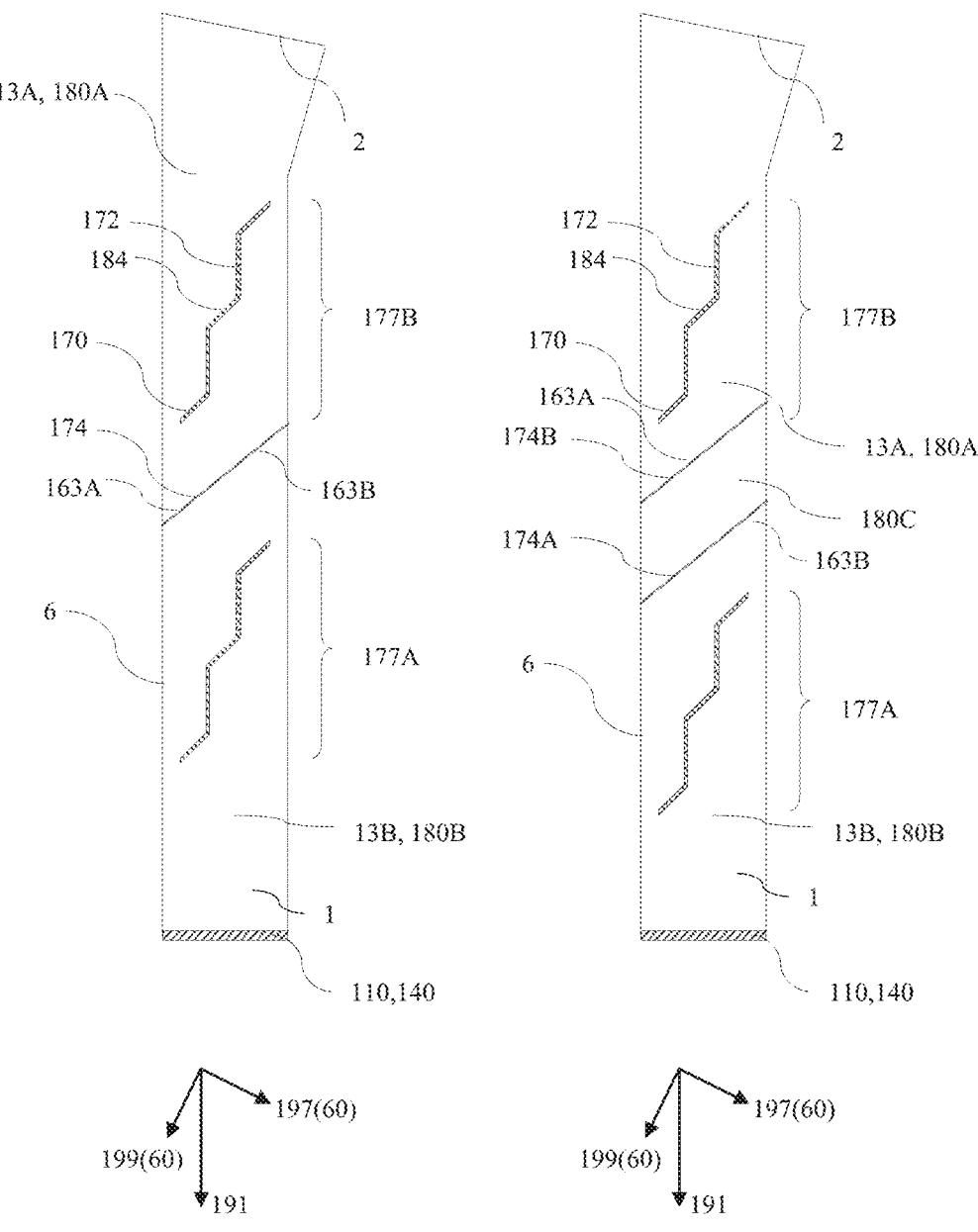
*FIG. 22C*          *FIG. 22D*

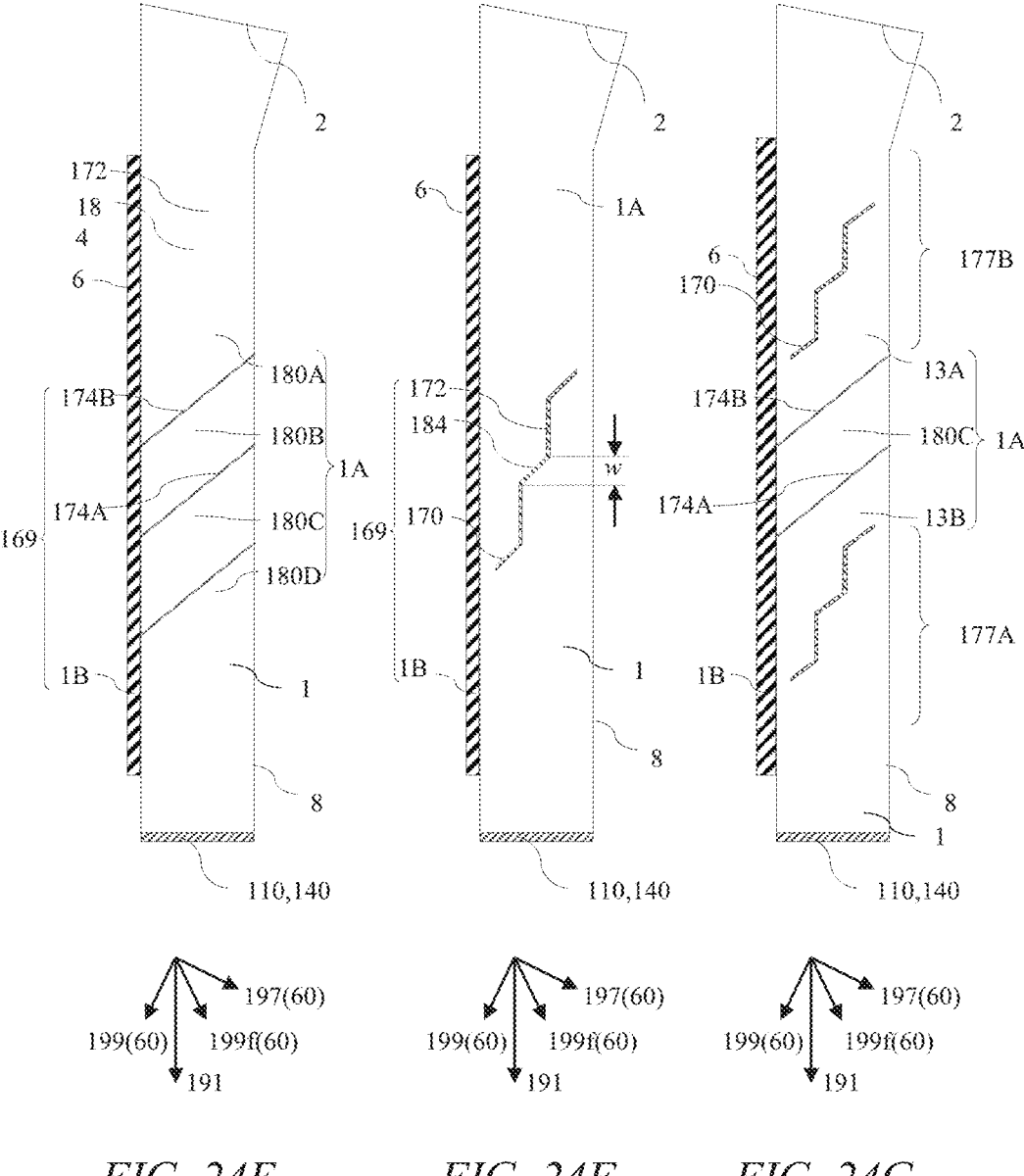
*FIG. 24E*          *FIG. 24F*          *FIG. 24G*

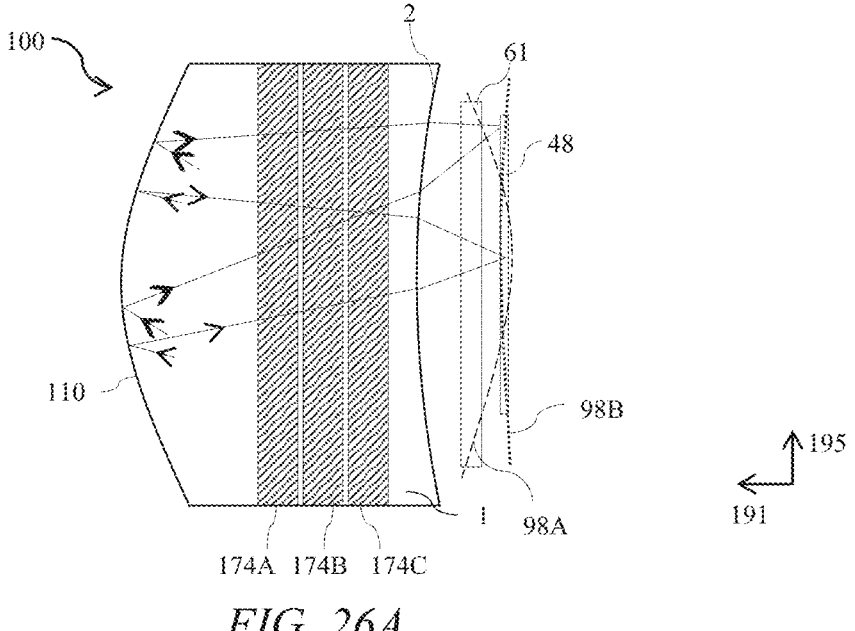
*FIG. 26A*
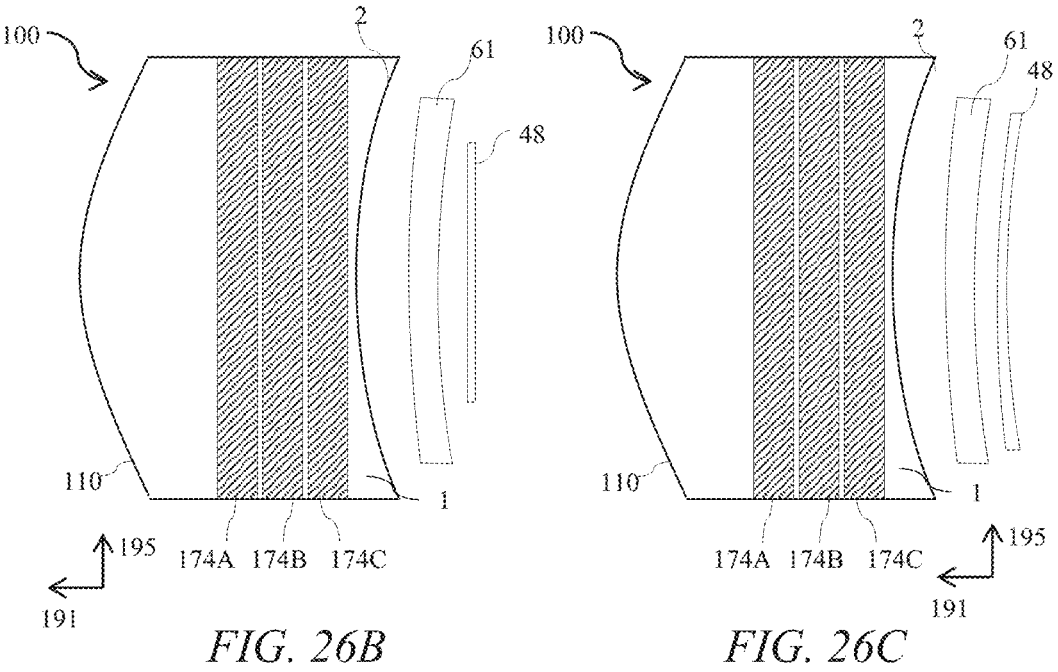
*FIG. 26B*              *FIG. 26C*

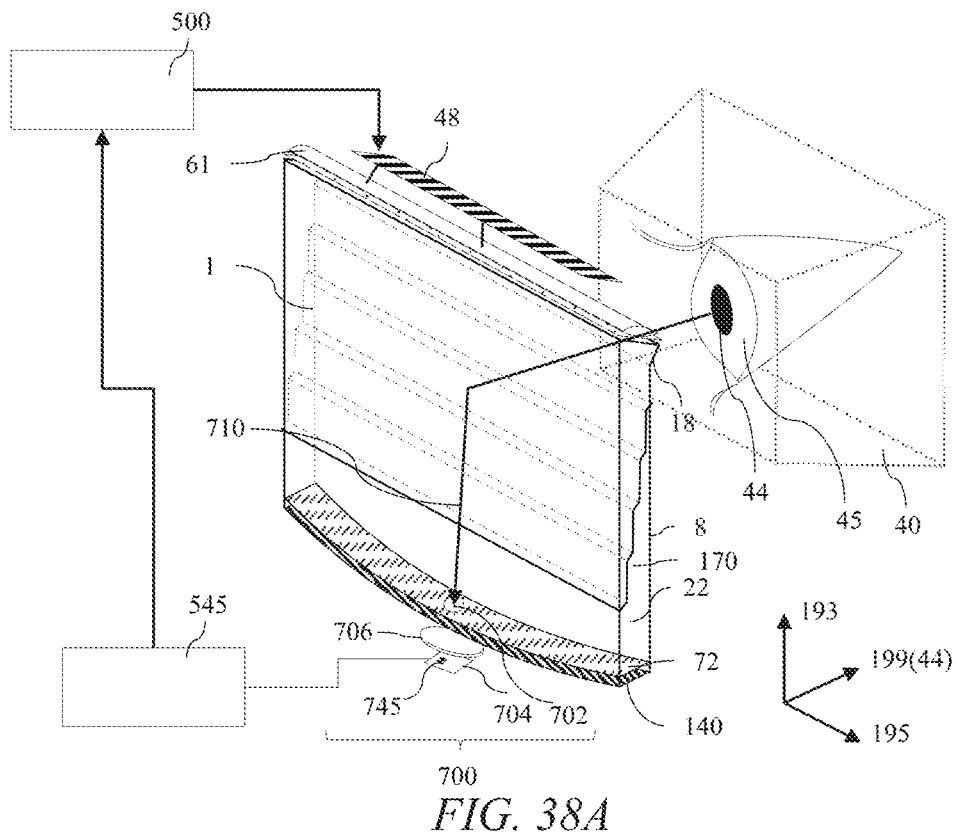
*FIG. 38A*
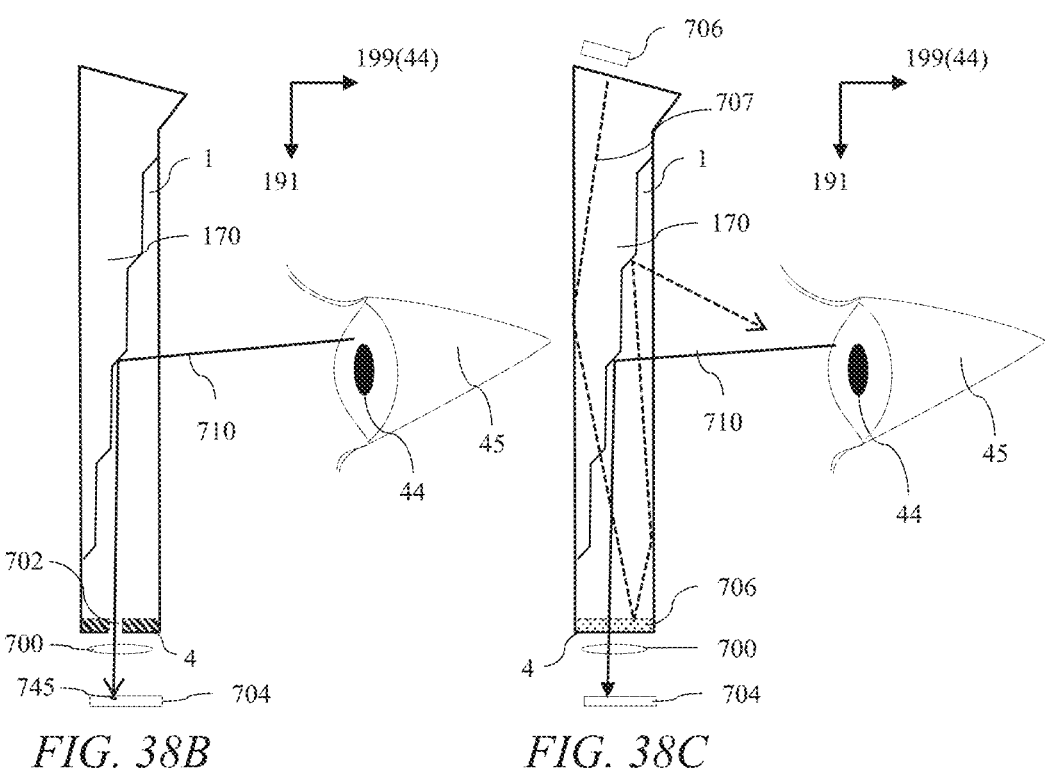
*FIG. 38B*              *FIG. 38C*

ANAMORPHIC DIRECTIONAL ILLUMINATION DEVICE

TECHNICAL FIELD

This disclosure generally relates to near-eye display apparatuses and illumination systems therefor.

BACKGROUND

Head-worn displays incorporating a near-eye display apparatus may be arranged to provide fully immersive imagery such as in virtual reality (VR) displays or augmented imagery overlayed over views of the real world such as in augmented reality (AR) displays. If the overlayed imagery is aligned or registered with the real-world image it may be termed Mixed Reality (MR). In VR displays, the near-eye display apparatus is typically opaque to the real world, whereas in AR displays the optical system is partially transmissive to light from the real world.

The near-eye display apparatuses of AR and VR displays aim to provide images to at least one eye of a user with full color, high resolution, high luminance and high contrast; and with wide fields of view (angular size of image), large eyebox sizes (the geometry over which the eye can move while having visibility of the full image field of view). Such displays are desirable in thin form factors, low weight and with low manufacturing cost and complexity.

Further, AR near-eye display apparatuses aim to have high transmission of real-world light rays without image distortions or degradations and reduced glare of stray light away from the display wearer. AR optics may broadly be categorised as reflective combiner type or waveguide type. Waveguide types typically achieve reduced form factor and weight due to the optical path folding within the waveguide. Known methods for injecting images into a waveguide may use a spatial light modulator and a projection lens arrangement with a prism or grating to couple light into the waveguide. Pixel locations in the spatial light modulator are converted to a fan of ray directions by the projection lens. In other arrangements a laser scanner may provide the fan of ray directions. The angular locations are propagated through the waveguide and output to the eye of the user. The eye's optical system collects the angular locations and provides spatial images at the retina.

BRIEF SUMMARY

According to a first aspect of the present disclosure, there is provided an anamorphic near-eye display apparatus comprising: an illumination system comprising a spatial light modulator, the illumination system arranged to output light; and an optical system arranged to direct light from the illumination system to a viewer's eye, wherein the optical system has an optical axis and has anamorphic properties in a lateral direction and a transverse direction that are perpendicular to each other and perpendicular to the optical axis, wherein the spatial light modulator comprises pixels distributed in the lateral direction, and the optical system comprises: a transverse anamorphic component having positive optical power in the transverse direction, wherein the transverse anamorphic component is arranged to receive light from the spatial light modulator and the illumination system is arranged so that light output from the transverse anamorphic component is directed in directions that are distributed in the transverse direction: an extraction waveguide arranged to receive light from the transverse anamorphic component: a lateral anamorphic component having positive optical power in the lateral direction, the extraction waveguide arranged to guide light from the transverse anamorphic component to the lateral anamorphic component along the extraction waveguide in a first direction; and a light reversing reflector that is arranged to reflect light that has been guided along the extraction waveguide in the first direction so that the reflected light is guided along the extraction waveguide in a second direction opposite to the first direction, wherein the extraction waveguide comprises an array of reflective extraction features disposed internally within the extraction waveguide, the reflective extraction features arranged to transmit light guided along the extraction waveguide in the first direction and to extract light guided along the extraction waveguide in the second direction towards an eye of a viewer, the array of reflective extraction features distributed along the extraction waveguide so as to provide exit pupil expansion.

The anamorphic near-eye display apparatus may provide images with wide field of view with high brightness and high efficiency. Compact physical size and low weight of the anamorphic near-eye display apparatus may be achieved to provide high comfort of use and extend viewing times. High transparency may be provided. In at least one axis, images may be provided with reduced color blur. A large size eyebox may be achieved for relaxing limitations of pupil positioning at desirable eye relief distances may achieve vignetting-free images over a wide range of observer pupil positions and for a wide field of view. The anamorphic near-eye display apparatus may be suitable for augmented reality and virtual reality applications.

The reflective extraction features may comprise extraction reflectors that extend across at least part of the extraction waveguide. Advantageously chromatic aberrations may be reduced and the size of the eyebox increased.

The array of reflectors may have reflectivities defined across their overall area that increase with increasing distance along the optical axis. Advantageously uniformity of output image with viewing angle may be improved.

The extraction reflectors may comprise extraction surfaces spaced apart by a partially reflective coating. Advantageously images may be provided without missing angular regions. Efficiency, brightness and contrast may be increased and the visibility of artifacts arising from stray light including double images and ghost images reduced.

The partially reflective coating may comprise at least one dielectric layer. Advantageously the cost of the fabrication may be reduced. The at least one dielectric layer may comprise a stack of dielectric layers. Advantageously brightness and uniformity may be increased. The partially reflective coating may be metallic. Advantageously cost of manufacture may be reduced.

The extraction reflectors may comprise extraction surfaces spaced apart by a gap. Advantageously the cost of manufacture may be reduced and image uniformity increased. The extraction surfaces may have an anti-reflection coating. Advantageously the visibility of stray light may be reduced. Efficiency, brightness and contrast may be increased and the visibility of stray light, double images and ghost images reduced.

The extraction reflectors may extend partially across the extraction waveguide between opposing rear and front guide surfaces of the extraction waveguide with successively shifted positions. Advantageously the cost of manufacture of the extraction waveguide may be reduced. High uniformity with viewing angle may be achieved for pupil locations across the headbox. The extraction reflectors may extend to opposing rear and front guide surfaces of the extraction waveguide. Advantageously extraction efficiency may be increased. The extraction reflectors may not extend to opposing rear and front guide surfaces of the extraction waveguide. Rear and front guide surfaces may be provided to advantageously reduce the visibility of stray light artifacts.

The anamorphic near-eye display apparatus may further comprise intermediate reflectors extending along the extraction waveguide between adjacent pairs of extraction reflectors. Advantageously manufacturing cost may be reduced.

The intermediate reflectors may comprise intermediate surfaces spaced apart by a partially reflective coating. Advantageously increased efficiency of operation may be achieved.

The partially reflective coating may comprise at least one dielectric layer or the at least one dielectric layer may comprise a stack of dielectric layers. The partially reflective coating may be metallic. The intermediate reflectors may comprise intermediate surfaces spaced apart by a gap. The intermediate surfaces may have an anti-reflection coating. The efficiency and brightness may be modified, and the visibility of stray light artifacts reduced. Cost may be reduced.

The extraction waveguide may comprise plural constituent parts having facing stepped surfaces attached together, the stepped surfaces shaped with alternating extraction surfaces extending in the transverse direction and intermediate surfaces extending along the extraction waveguide, wherein the extraction reflectors comprise the facing extraction surfaces. Advantageously cost and complexity may be reduced.

The intermediate surfaces may be optically coupled together. The efficiency of light propagation towards the light reversing reflector may be increased.

The extraction reflectors may comprise plural sets of extraction reflectors, wherein, within each set of extraction reflectors, in the transverse direction the extraction reflectors extend partially across the extraction waveguide with successively shifted positions, the extraction reflectors of different sets overlapping in extent in the transverse direction. The size of the eyebox may be increased. The size of the extraction reflectors may be increased and the image blur due to diffraction from the extraction reflectors may be reduced.

At least part of the extraction waveguide may comprise plural constituent plates optically coupled together, wherein the extraction reflectors may be formed between the constituent plates. The extraction reflectors may extend between opposing rear and front guide surfaces of the extraction waveguide. The extraction reflectors may have the same reflective area. The thickness of the extraction waveguide may be reduced. The visibility of diffraction blur from the extraction reflectors may be reduced.

The extraction reflectors may be patterned to have different reflective areas providing reflectivities defined across their overall area that increase with increasing distance along the optical axis. Advantageously the uniformity of the perceived image may be increased.

The extraction reflectors may have a surface normal direction that may be inclined with respect to the direction along the waveguide by an angle in the range 20 to 40 degrees, preferably by an angle in the range 25 to 35 degrees and most preferably by an angle in the range 27.5 degrees to 32.5 degrees. Advantageously stray light rays may be reduced and the visibility of double images reduced.

The optical system may further comprise: an input linear polarizer disposed between the transverse anamorphic component and the input end of the extraction waveguide; and a polarization conversion retarder disposed between the the transverse anamorphic component and the input linear polarizer, the polarization conversion retarder arranged to convert a polarization state of light passing therethrough between a linear polarization state and a circular polarization state. The polarization conversion retarder may have a retardance of a quarter wavelength at a wavelength of visible light, for example 550 nm. Reflection of stray light from the input end may be reduced. Advantageously image contrast and image uniformity may be increased.

The extraction waveguide may comprise a transmissive element and a diffractive optical element optically coupled together, wherein the reflective extraction features comprise portions of the diffractive optical element. Advantageously the complexity of the waveguide manufacture may be reduced.

The diffractive optical element may be a volume hologram. Advantageously efficiency of reflection may be increased.

The extraction waveguide may have opposing rear and front guide surfaces having an anti-reflection coating. Advantageously stray light may be reduced.

The extraction waveguide may have an input end extending in the lateral and transverse directions, the extraction waveguide arranged to receive light from the illumination system through the input end. The direction of the optical axis through the transverse anamorphic component may be inclined with respect to the first and second directions along the extraction waveguide. The input end may be inclined with respect to the first and second directions along the extraction waveguide. Light may be input into the waveguide at angles that may be extracted without double imaging. Image contrast may advantageously be improved.

The extraction waveguide may be arranged to receive light from the illumination system through an input area of one of the opposing surfaces of the extraction waveguide, the extraction waveguide further comprising a diffractive deflector element opposite the input area on the other of the opposing surfaces of the extraction waveguide, the diffractive deflector element arranged to deflect the light received through the input area along the extraction waveguide. Advantageously the size of the input optical elements may be reduced.

The light reversing reflector may be a reflective end of the extraction waveguide. The lateral anamorphic component may comprise the light reversing reflector. Advantageously the cost and complexity of manufacture may be reduced. Interfacial losses may be reduced.

The lateral anamorphic component may comprise: a reflective linear polarizer disposed between the light reversing reflector and the array of reflective extraction features; and a polarization conversion retarder disposed between the reflective polarizer and the light reversing reflector, the polarization conversion retarder arranged to convert a polarization state of light passing therethrough between a linear polarization state and a circular polarization state. The reflective linear polarizer may be curved in the lateral direction. The light reversing reflector may be curved in the lateral direction. Curvature of the light reversing reflector may be reduced for desirable optical power and aberrations may be controlled to achieve increased modulation transfer function and advantageously reduce image blur.

The light reversing reflector may be not curved in the lateral direction. Advantageously the length of the waveguide in the first direction may be reduced and smaller near-eye display apparatus achieved.

The polarization conversion retarder may be curved in the lateral direction. The complexity of assembly of the extraction waveguide may be reduced and advantageously cost may be reduced. Additional reduction of aberrations may be achieved.

The polarization conversion retarder may have a retardance of a quarter wavelength at a wavelength of visible light, for example 550 nm. Advantageously image contrast may be increased and efficiency improved.

The optical system may comprise an input linear polarizer disposed between the spatial light modulator and the array of extraction reflectors. The input linear polarizer and the reflective linear polarizer of the lateral anamorphic component may be arranged to pass a common polarization state. Stray light may be reduced and image contrast advantageously improved.

The lateral anamorphic component may further comprise: a polarization control retarder disposed between the reflective polarizer and the array of reflective extraction features, the polarization control retarder arranged to change a polarization state of light passing therethrough; and an absorbing linear polarizer disposed between the polarization control retarder and the reflective polarizer, wherein the absorbing linear polarizer and the linear polarizer may be arranged to pass a common linear polarization state that is a component of the polarization state output from the polarization control retarder in the direction along the waveguide. The polarization control retarder may have a retardance of a quarter wavelength or a half wavelength at a wavelength of visible light, for example 550 nm. The optical system may comprise an input linear polarizer disposed between the spatial light modulator and the array of extraction reflectors. Light output that passes in the first direction along the waveguide and is reflected from the extraction reflectors is reduced and light output that passes in the second direction along the waveguide and is reflected from the extraction reflectors is increased. Advantageously glare to external observers is reduced and image contrast increased.

The optical system may comprise an input linear polarizer disposed between the spatial light modulator and the array of extraction reflectors and a polarization conversion retarder disposed between the light reversing reflector and the array of reflective extraction features, the polarization conversion retarder arranged to convert a polarization state of light passing therethrough between a linear polarization state and a circular polarization state. The polarization conversion retarder may have a retardance of a quarter wavelength at a wavelength of visible light, for example 550 nm.

Polarization selective extraction reflectors may be provided and advantageously stray light may be reduced. Polarised light may propagate within the extraction waveguide with low extraction efficiency in a first direction along the extraction waveguide and higher extraction efficiency in the second direction opposite to the first direction. Light output that passes in the first direction along the waveguide and is reflected from the extraction reflectors is reduced and light output that passes in the second direction along the waveguide and is reflected from the extraction reflectors is increased. Advantageously glare to external observers is reduced and image contrast increased. Efficiency and brightness is increased and power consumption for a desirable brightness reduced.

The input linear polarizer may be arranged to pass light that is in a p-polarization state in the extraction waveguide. The p-polarization state may be preferentially transmitted by the light extraction features for light passing in the first direction along the waveguide. Advantageously efficiency and brightness are increased and power consumption for a desirable brightness reduced.

The lateral anamorphic component may comprise a lens. Advantageously improved aberrations may be achieved across the field of view and for a larger exit pupil.

The optical system may comprise an input section comprising an input reflector that is the transverse anamorphic component and may be arranged to reflect the light from the illumination system and direct it along the waveguide. Advantageously complexity, cost of fabrication and weight may be reduced.

The transverse anamorphic component may further comprise a lens. Advantageously aberrations may be reduced, image fidelity increased and headbox increased in size.

The input section may further comprise an input face disposed on a front or rear side of the waveguide and facing the input reflector, and the input section may be arranged to receive the light from the illumination system through the input face. The input face may extend at an acute angle to the front guide surface in the case that the input face is on the front side of the waveguide or to the rear guide surface in the case that the input face is on the rear side of the waveguide. The input face may extend parallel to the front guide surface in the case that the input face is on the front side of the waveguide or to the rear guide surface in the case that the input face is on the rear side of the waveguide. The input face may be coplanar with the front guide surface in the case that the input face is on the front side of the waveguide or with the rear guide surface in the case that the input face is on the rear side of the waveguide. The input face may be disposed outwardly of one of the front or rear guide surfaces. The input section may further comprise a separation face extending outwardly from the one of the front or rear guide surfaces to the input face. Advantageously improved mechanical arrangements of the illumination system and optical system may be achieved.

The input section may be integral with the waveguide. Advantageously complexity of manufacture may be reduced, and lower cost achieved.

The waveguide may have an end that is an input face through which the waveguide is arranged to receive light from the illumination system, and the input section may be a separate element from the waveguide that may further comprise an output face and is arranged to direct light reflected by the input reflector through the output face and into the waveguide through the input face of the waveguide. Advantageously improved aberrations may be achieved. Reflective surfaces may be protected.

The lens of the lateral anamorphic component may comprise an air gap and a surface facing the air gap. Control of aberrations may be increased and advantageously the modulation transfer function for off-axis directions may be increased and the image blur reduced.

The air gap may have edges, and the anamorphic near-eye display apparatus may comprise reflectors extending across the edges of the air gap. Advantageously light losses may be reduced and image uniformity increased.

The lens of the lateral anamorphic component may be a Pancharatnam-Berry lens. Advantageously the size of the lateral anamorphic component may be reduced.

The transverse anamorphic component may comprise a lens. The lens of the transverse anamorphic component may be a compound lens. Advantageously aberrations in the transverse direction may be reduced.

The pixels of the spatial light modulator may also be distributed in the transverse direction so that the light output from the transverse anamorphic component may be directed in the directions that are distributed in the transverse direction. Advantageously, image rows may be provided simultaneously. Image break-up artifacts may be reduced.

The illumination system further may comprise a deflector element arranged to deflect light output from the transverse anamorphic component by a selectable amount, the deflector element selectively operable to direct the light output from the transverse anamorphic component in the directions that are distributed in the transverse direction. Advantageously the complexity of the illumination system may be reduced.

The extraction waveguide may have opposing rear and front guide surfaces that are planar and parallel. Advantageously the visibility of double images, ghost and other stray light artifacts may be reduced. Image contrast may be improved.

The reflective extraction features may be inclined with respect to the first and second directions along the optical axis. Light rays may be extracted near to normal to the extraction waveguide. The eyebox may be arranged at desirable distances from the output surface of the extraction waveguide.

The reflective extraction features may be inclined at the same angle. Advantageously the appearance of ghost and double images may be reduced.

The reflective extraction features may have a varying pitch along the extraction waveguide. The reflective extraction features may have a varying extent between opposing rear and front guide surfaces of the extraction waveguide. Reduced diffraction blur may be achieved in most common viewing directions and image quality improved. The eyebox may be extended while achieving reduced waveguide thickness.

The spatial light modulator may comprise pixels having pitches in the lateral and transverse directions with a ratio that may be the same as the inverse of the ratio of optical powers of the lateral and transverse anamorphic optical elements. Advantageously the observer may perceive square pixels. Image fidelity may be increased.

The anamorphic near-eye display apparatus may further comprise a control system arranged to operate the illumination system to provide light input in accordance with image data representing an image. Advantageously image data may be perceived to provide an augmented reality or virtual reality image.

The reflective extraction arrangement may comprise two separated regions, each region arranged to extract light guided along the extraction waveguide towards a respective eye of the viewer. Advantageously the weight, cost and complexity of head-wear may be reduced.

At least one of an input end of the extraction waveguide, the transverse anamorphic component and the spatial light modulator may have a curvature in the lateral direction that compensates for Petzval field curvature of the lateral anamorphic component. Advantageously the modulation transfer function for off-axis directions may be increased and the image blur reduced.

According to a second aspect of the present disclosure there is provided a head-worn display apparatus comprising an anamorphic near-eye display apparatus according to the first aspect arranged to mount the anamorphic near-eye display apparatus on a head of a wearer with the anamorphic near-eye display apparatus extending across at least one eye of the wearer. Virtual reality and augmented reality images may be conveniently provided to moving observers.

The head-worn display apparatus may further comprise lenses having optical power, the anamorphic near-eye display apparatus overlying one or each lens. The nominal viewing distance of the virtual image may be adjusted to achieve reduced discrepancy between accommodation and convergence depth cues in a stereoscopic display apparatus. Correction for visual characteristics of the observer's eyes may be provided.

The head-worn display apparatus may comprise a pair of spectacles. Advantageously a low weight transparent head-worn display apparatus suitable for augmented reality applications may be achieved.

The anamorphic near-eye display apparatus may be a first anamorphic near-eye display apparatus and the head-worn display apparatus may further comprise a second anamorphic near-eye display apparatus, wherein the second anamorphic near-eye display apparatus is arranged in series with the first anamorphic near-eye display apparatus. Increased image resolution, increased brightness, increased exit pupil size; reduced image diffraction; and increased field of view may be provided.

A virtual image distance for light from the second anamorphic near-eye display apparatus may be different to a virtual image distance for light from the first anamorphic near-eye display apparatus. Discrepancy between stereoscopic and accommodation depth cues may be reduced and advantageously user comfort increased.

The head-worn display apparatus may further comprise a non-anamorphic near-eye display apparatus, wherein the non-anamorphic near-eye display apparatus may comprise a non-anamorphic spatial light modulator and a non-anamorphic magnifying optical system; and wherein the non-anamorphic near-eye display apparatus is arranged in series with the anamorphic near-eye display apparatus. Increased image resolution, increased brightness, increased exit pupil size; reduced image diffraction; and increased field of view may be provided.

A virtual image distance for light from the non-anamorphic near-eye display apparatus may be different to a virtual image distance for light from the anamorphic near-eye display apparatus. Discrepancy between stereoscopic and accommodation depth cues may be reduced and advantageously user comfort increased.

According to a third aspect of the present disclosure there is provided an anamorphic directional illumination device comprising: an illumination system comprising a light source array, the illumination system arranged to output light; and an optical system arranged to direct light from the illumination system to a viewer's eye, wherein the optical system has an optical axis and has anamorphic properties in a lateral direction and a transverse direction that are perpendicular to each other and perpendicular to the optical axis, wherein the spatial light modulator comprises pixels distributed in the lateral direction, and the optical system comprises: a transverse anamorphic component having positive optical power in the transverse direction, wherein the transverse anamorphic component is arranged to receive light from the spatial light modulator and the illumination system is arranged so that light output from the transverse anamorphic component is directed in directions that are distributed in the transverse direction: an extraction waveguide arranged to receive light from the transverse anamorphic component: a lateral anamorphic component having positive optical power in the lateral direction, the extraction waveguide arranged to guide light from the transverse anamorphic component to the lateral anamorphic component along the extraction waveguide in a first direction; and a light reversing reflector that is arranged to reflect light that has been guided along the extraction waveguide in the first direction so that the reflected light is guided along the extraction waveguide in a second direction opposite to the first direction, wherein the extraction waveguide comprises at least one reflective extraction feature disposed internally within the extraction waveguide, the reflective extraction feature arranged to transmit light guided along the extraction waveguide in the first direction and to extract light guided along the extraction waveguide in the second direction. An anamorphic directional illumination device may be provided in a compact arrangement with low cost. High resolution output light beams may be provided that may be controllable.

According to a fourth aspect of the present disclosure there is provided a vehicle external light apparatus comprising: an anamorphic directional illumination device according to the third aspect. The height of the emitting aperture may be reduced to advantageously achieve desirable aesthetic appearance. High illuminance of illuminated scenes may be achieved with high resolution imaging of addressable light cones in one or two dimensions. High image contrast may be achieved for adjustable beam shaping. Image glare to oncoming viewers of the illumination device may be reduced while improved visibility of scenes around the oncoming viewers may be achieved.

Any of the aspects of the present disclosure may be applied in any combination.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments and automotive environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 9A, FIG. 9B, FIG. 9C, FIG. 9D, and FIG. 9E are schematic diagrams illustrating side views of alternative arrangements of extraction waveguides comprising partially reflective coatings:

FIG. 10 is a schematic diagram illustrating a side view of an extraction waveguide comprising a gap:

FIG. 11A, FIG. 11B, FIG. 11C, FIG. 11D, and FIG. 11E are schematic diagrams illustrating side views of alternative arrangements of extraction waveguides comprising a gap:

FIG. 12 is a schematic diagram illustrating a side view near an extraction reflector comprising partially reflective material and adjacent intermediate surfaces comprising intermediate surface material:

FIG. 13A is a schematic graph of the variation of stepped surface height with position along the waveguide for various illustrative arrangements of steps for a stepped surface:

FIG. 13B is a schematic graph of alternative variations of facet width w with position along an extraction waveguide:

FIG. 22C and FIG. 22D are schematic diagrams illustrating side views of alternative arrangements of extraction waveguides comprising two types of partially reflective extraction reflectors:

FIG. 24E, FIG. 24F, and FIG. 24G are schematic diagrams illustrating side views of alternative arrangements of extraction waveguides comprising combinations of reflective extraction features:

FIG. 26A is a schematic diagram illustrating in front view an anamorphic near-eye display apparatus wherein an input end of the extraction waveguide has curvature in the lateral direction:

FIG. 26B is a schematic diagram illustrating in front view an anamorphic near-eye display apparatus wherein an input end of the extraction waveguide has curvature in the lateral direction and a transverse anamorphic component has curvature in the lateral direction:

FIG. 26C is a schematic diagram illustrating in front view an anamorphic near-eye display apparatus wherein an input end of the extraction waveguide has curvature in the lateral direction, a transverse anamorphic component has curvature in the lateral direction, and a spatial light modulator has curvature in the lateral direction:

FIG. 27I is a schematic diagram illustrating optical axis alignment directions through the polarization control components of FIG. 27H:

FIG. 35B is a schematic diagram illustrating a side view of the anamorphic near-eye display apparatus of FIG. 35A:

FIG. 35C is a schematic diagram illustrating a front view of the anamorphic near-eye display apparatus of FIG. 35A:

FIG. 35D is a schematic diagram illustrating a side view of an alternative anamorphic near-eye display apparatus comprising an input reflector:

FIG. 35E is a schematic diagram illustrating a side view of an anamorphic near-eye display apparatus comprising an alternative input reflector:

FIG. 35F is a schematic diagram illustrating a side view of an anamorphic near-eye display apparatus comprising an alternative input reflector:

FIG. 35G is a schematic diagram illustrating a side view of an anamorphic near-eye display apparatus comprising an alternative input reflector:

FIG. 36A is a schematic diagram illustrating in perspective front view an alternative arrangement of an input focusing lens:

FIG. 36B is a schematic diagram illustrating in side view a spatial light modulator arrangement for use in the anamorphic near-eye display apparatus of FIG. 1 comprising a spatial light modulator comprising a laser scanner and light diffusing screen:

FIG. 37A is a schematic diagram illustrating in side view input to the extraction waveguide comprising a laser sources and scanning arrangement:

FIG. 37B is a schematic diagram illustrating in front view a spatial light modulator arrangement comprising an array of laser light sources for use in the arrangement of FIG. 37A:

FIG. 37C is a schematic diagram illustrating in side view a spatial light modulator arrangement comprising an array of laser light sources, a beam expander and a scanning mirror:

FIG. 38A is a schematic diagram illustrating in perspective front view an anamorphic near-eye display apparatus comprising a stepped extraction interface and an eye tracking arrangement:

Figure 39A:
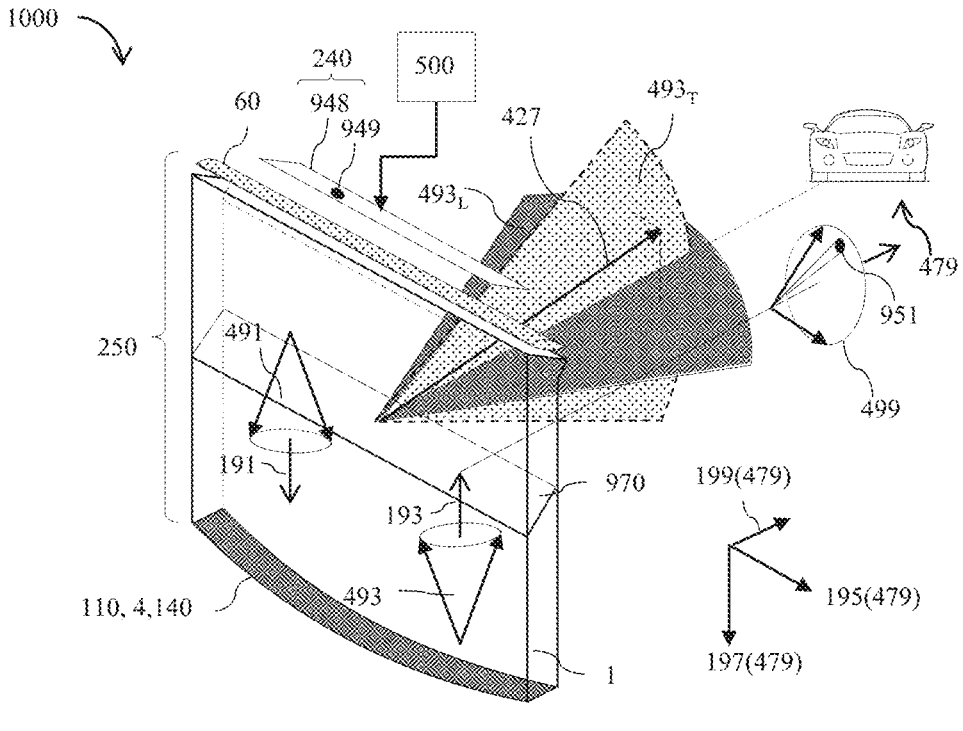
Figure 39B:
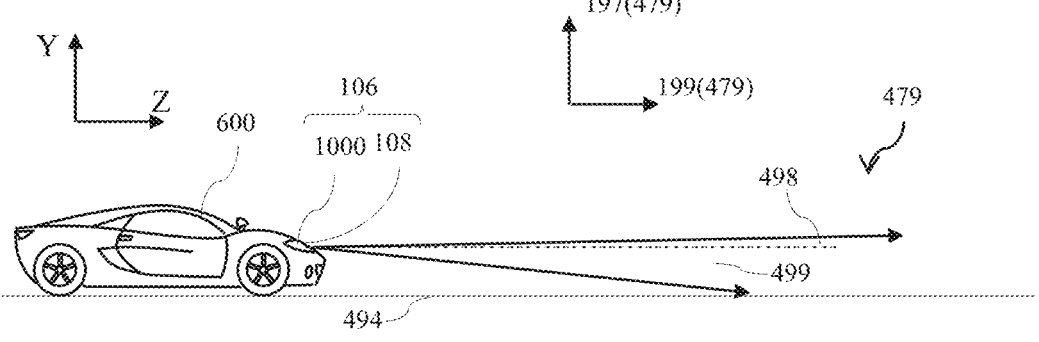

FIG. 38B is a schematic diagram illustrating in side view an anamorphic near-eye display apparatus comprising an eye tracking arrangement with a transmissive hole arranged at the reflective end:

FIG. 38C is a schematic diagram illustrating in side view an anamorphic near-eye display apparatus comprising an eye tracking arrangement with a partially transmissive mirror arranged at the reflective end:

FIG. 39A is a schematic diagram illustrating a front perspective view of an anamorphic directional illumination device; and FIG. 39B is a schematic diagram illustrating a front perspective view of a vehicle comprising a vehicle external light apparatus comprising the anamorphic directional illumination device of FIG. 39A.

DETAILED DESCRIPTION

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, I, that it imparts on the two polarization components: which is related to the birefringence An and the thickness d of the retarder with retardance $\Delta n \cdot d$ by:

$$\Gamma = 2 \cdot \pi \cdot \Delta n \cdot d / \lambda_0 \qquad \text{eqn. 1}$$

In eqn. 1, An is defined as the difference between the extraordinary and the ordinary index of refraction, i.e.

$$\Delta n = n_e - n_o \qquad \text{eqn. 2}$$

For a half-wave retarder, the relationship between d, An, and $\lambda_0$ is chosen so that the phase shift between polarization components is $\Gamma = \pi$. For a quarter-wave retarder, the relationship between d, An, and $\lambda_0$ is chosen so that the phase shift between polarization components is $\Gamma = \pi/2$.

Some aspects of the propagation of light rays through a transparent retarder between a pair of polarizers will now be described.

The state of polarization (SOP) of a light ray is described by the relative amplitude and phase shift between any two orthogonal polarization components. Transparent retarders do not alter the relative amplitudes of these orthogonal polarization components but act only on their relative phase. Providing a net phase shift between the orthogonal polarization components alters the SOP whereas maintaining net relative phase preserves the SOP. In the current description, the SOP may be termed the polarization state.

A linear SOP has a polarization component with a non-zero amplitude and an orthogonal polarization component which has zero amplitude. A p-polarization state is a linear polarization state that lies within the plane of incidence of a ray comprising the p-polarization state and a s-polarization state is a linear polarization state that lies orthogonal to the plane of incidence of a ray comprising the p-polarization state. For a linearly polarised SOP incident onto a retarder, the relative phase Γ is determined by the angle between the optical axis of the retarder and the direction of the polarization component.

A linear polarizer transmits a unique linear SOP that has a linear polarization component parallel to the electric vector transmission direction of the linear polarizer and attenuates light with a different SOP. The term "electric vector transmission direction" refers to a non-directional axis of the polarizer parallel to which the electric vector of incident light is transmitted, even though the transmitted "electric vector" always has an instantaneous direction. The term "direction" is commonly used to describe this axis.

Absorbing polarizers are polarizers that absorb one polarization component of incident light and transmit a second orthogonal polarization component. Examples of absorbing linear polarizers are dichroic polarizers.

Reflective polarizers are polarizers that reflect one polarization component of incident light and transmit a second orthogonal polarization component. Examples of reflective polarizers that are linear polarizers are multilayer polymeric film stacks such as DBEF™ or APF™ from 3M Corporation, or wire grid polarizers such as ProFlux™ from Moxtek. Reflective linear polarizers may further comprise cholesteric reflective materials and a quarter wave retarder arranged in series.

A retarder arranged between a linear polarizer and a parallel linear analysing polarizer that introduces no relative net phase shift provides full transmission of the light other than residual absorption within the linear polarizer.

A retarder that provides a relative net phase shift between orthogonal polarization components changes the SOP and provides attenuation at the analysing polarizer.

Achromatic retarders may be provided wherein the material of the retarder is provided with a retardance $\Delta n \cdot d$ that varies with wavelength $\lambda$ as $$\Delta n \cdot d / \lambda = \kappa \qquad \text{eqn. 3}$$

where $\kappa$ is substantially a constant.

Examples of suitable materials include modified polycarbonates from Teijin Films. Achromatic retarders may be provided in the present embodiments to advantageously minimise color changes between polar angular viewing directions which have low luminance reduction and polar angular viewing directions which have increased luminance reductions as will be described below.

In the present disclosure an 'A-plate' refers to an optical retarder utilizing a layer of birefringent material with its optical axis parallel to the plane of the layer. The optical axis direction of the optical retarder is arranged to provide retardance in correspondence to the SOP of the incident light ray, for example to convert linearly polarised light to circularly polarised light, or to convert circularly polarised light to linearly polarised light.

The structure and operation of various anamorphic near-eye display apparatuses will now be described. In this description, common elements have common reference numerals. It is noted that the disclosure relating to any element applies mutatis mutandi to each device in which the same or corresponding element is provided. Accordingly, for brevity such disclosure is not repeated. Similarly, the various features of any of the following examples may be combined together in any combination.

It would be desirable to provide an anamorphic near-eye display apparatus 100 with a thin form factor, large freedom of movement, high resolution, high brightness and wide field of view. An anamorphic near-eye display apparatus 100 will now be described.

Figure 1A:
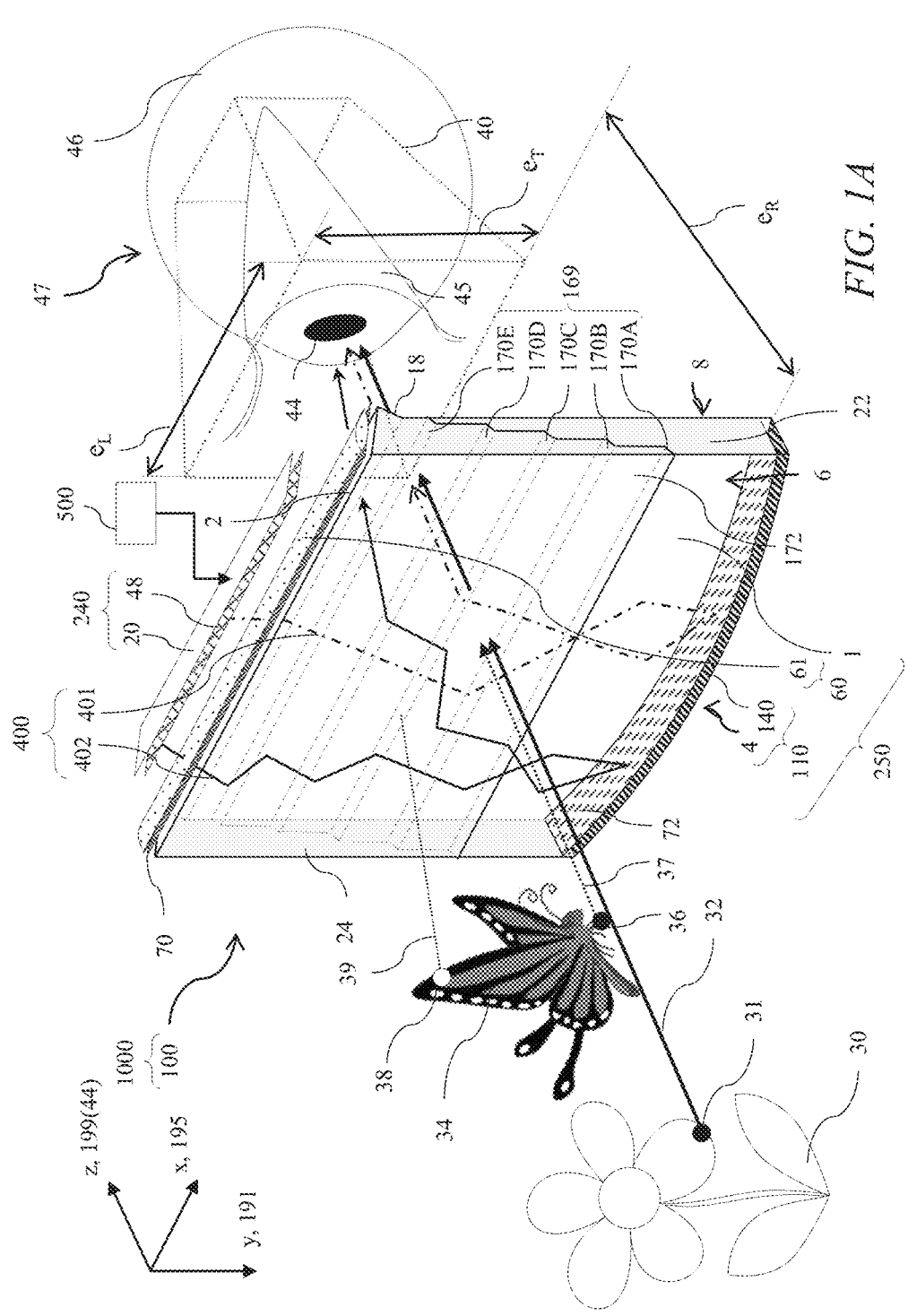
FIG. 1A is a schematic diagram illustrating a front perspective view of an anamorphic near-eye display apparatus.
Figure 1B:
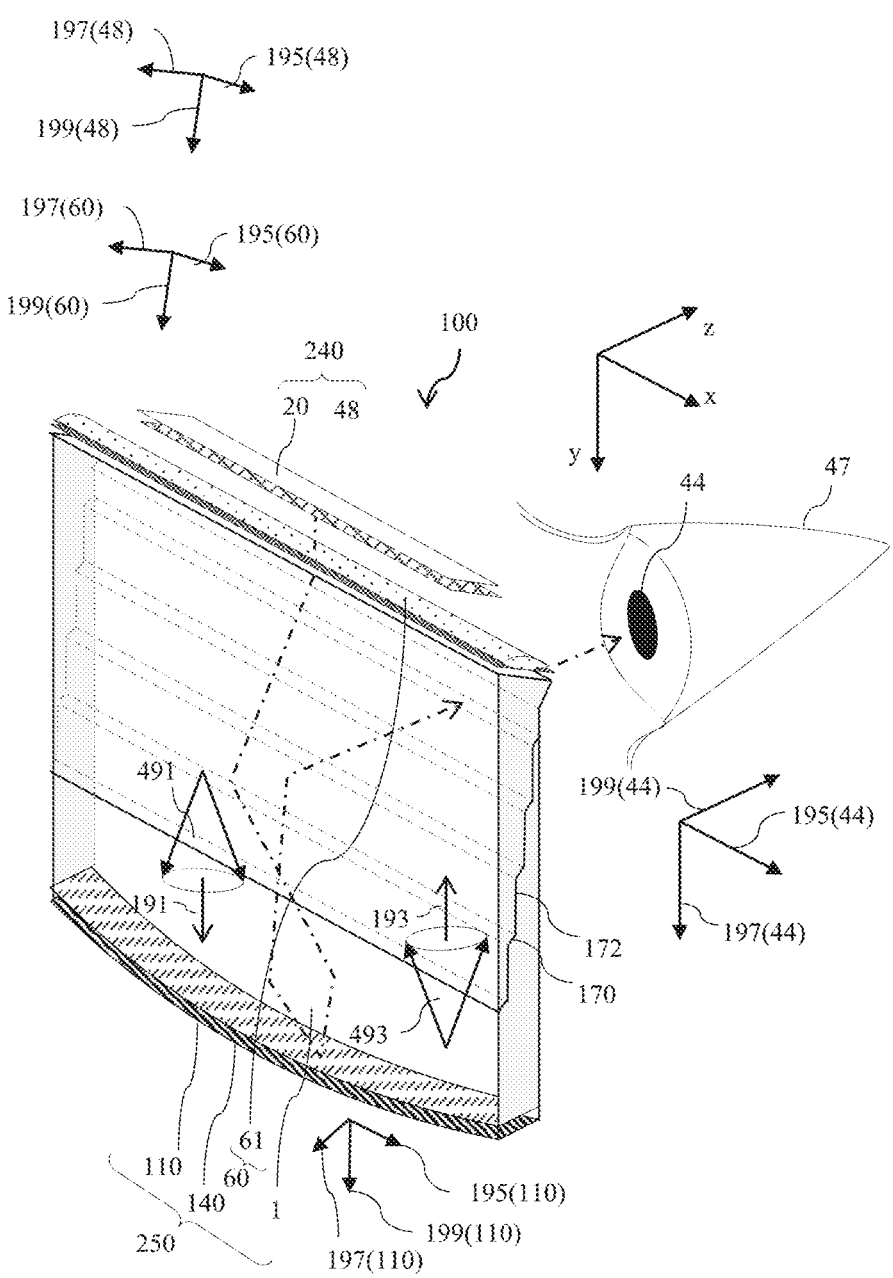
FIG. 1B is a schematic diagram illustrating a front perspective view of the coordinate system arrangements for the anamorphic near-eye display apparatus of FIG. 1A.

FIG. 1A is a schematic diagram illustrating a front perspective view of an anamorphic near-eye display apparatus 100; and FIG. 1B is a schematic diagram illustrating a front perspective view of the coordinate system arrangements for the anamorphic near-eye display apparatus 100 of FIG. 1A.

FIG. 1A illustrates an anamorphic directional illumination device 1000 which is an anamorphic near-eye display apparatus 100. In the present description, an anamorphic near-eye display apparatus 100 is provided near to an eye 45, to provide light to the pupil 44 of the eye 45 of an observer 47. In an illustrative embodiment, the eye 45 may be arranged at a nominal viewing distance $e_R$ of between 5 mm and 100 mm and preferably between 8 mm and 20 mm from the output surface of the anamorphic near-eye display apparatus 100. Such displays are distinct from direct view displays wherein the viewing distance is typically greater than 100 mm. The nominal viewing distance $e_R$ may be referred to as the eye relief.

The anamorphic near-eye display apparatus 100 comprises an illumination system 240 arranged to provide output light comprising illumination from a spatial light modulator 48 and an optical system 250 arranged to direct light from the illumination system 240 to the eye 45 of an observer 47. The illumination system 240 is arranged to output light rays 400 including illustrative light rays 401, 402 that are input into the optical system 250.

In operation, it is desirable that the spatial pixel data provided on the spatial light modulator 48 is directed to the pupil 44 of the eye 45 as angular pixel data. The lens of the observer's eye 45 relays the angular spatial data to spatial pixel data at the retina 46 of the eye 45 such that an image is provided by the anamorphic near-eye display apparatus 100 to the observer 47.

The pupil 44 is located in a spatial volume near to the anamorphic near-eye display apparatus 100 commonly referred to as the exit pupil 40, or eyebox. When the pupil 44 is located within the exit pupil 40, the observer 47 is provided with a full image without missing parts of the image, that is the image does not appear to be vignetted at the observer's retina 46. The shape of the exit pupil 40 is determined at least by the anamorphic imaging properties of the anamorphic near-eye display apparatus and the respective aberrations of the anamorphic optical system. The exit pupil 40 at a nominal eye relief distance $e_R$ may have dimension $e_L$ in the lateral direction 195 and dimension $e_T$ in the transverse direction 197. The maximum eye relief distance $e_{Rmax}$ refers to the maximum distance of the pupil 44 from the anamorphic near-eye display apparatus 100 wherein $n_o$ image vignetting is present. In the present embodiment, increasing the size of the exit pupil 40 refers to increasing the dimensions $e_L$, $e_T$. Increased exit pupil 40 achieves an increased viewer freedom and an increase in $e_{Rmax}$ as will be described further hereinbelow.

The spatial light modulator 48 comprises pixels 222 distributed at least in the lateral direction 195 as will be described further hereinbelow, for example in FIGS. 2A-D and FIG. 37A. In the illustrative embodiment of FIG. 1A, the illumination system 240 comprises a transmissive spatial light modulator 48 comprising an array of spatially separated pixels 222 distributed in a lateral direction 195(48) and transverse direction 197(48). In the embodiment of FIG. 1A, the spatial light modulator 48 is a TFT-LCD and illumination system 240 further comprises a backlight 20 arranged to illuminate the spatial light modulator 48.

The anamorphic near-eye display apparatus 100 further comprises a control system 500 arranged to operate the illumination system 240 to provide light that is spatially modulated in accordance with image data representing an image.

The optical system 250 comprises a transverse lens 61 that forms a transverse anamorphic component 60 in the embodiment of FIG. 1A, as discussed below. The transverse lens 61 comprises a cylindrical lens in this example.

In the present disclosure, the term lens most generally refers to a single lens element or most commonly a compound lens (group of lens elements) as will be described hereinbelow in FIG. 36A for example; and is arranged to provide optical power. A lens may comprise a single refractive surface, multiple refractive surfaces, or reflective surfaces such that the lens may comprise a catadioptric lens element that combines refractive and reflective surfaces. A lens may further or alternatively comprise diffractive optical elements. A transverse lens is a lens that provides optical power in the transverse direction and may provide substantially no optical power in the lateral direction. A transverse lens may be termed a cylindrical lens, although the profile in cross section of the surface or surfaces providing optical power may be different to a segment of a circle, for example paraboloidal, elliptical or aspheric.

The transverse lens 61 in the embodiment of FIG. 1A is extended in a lateral direction 195(60) parallel to the lateral direction 195(48) of the spatial light modulator 48. The transverse anamorphic component 60 has positive optical power in a transverse direction 197(60) that is parallel to the direction 197(48) and orthogonal to the lateral direction 195(60); and no optical power in the lateral direction 195 (60). The transverse anamorphic component 60 is arranged to receive light rays 400 from the spatial light modulator 48. The optical system 250 is arranged so that light output from the transverse anamorphic component 60 is directed in directions that are distributed in the transverse direction 197(60).

Mathematically expressed, for any location within the anamorphic near-eye display apparatus 100, the optical axis direction 199 may be referred to as the O unit vector, the transverse direction 197 may be referred to as the T unit vector and the lateral direction 195 may be referred to as the L unit vector wherein the optical axis direction 199 is the crossed product of the transverse direction 197 and the lateral direction 195:

$$O = T \times L \qquad \text{eqn. 4}$$

Various surfaces of the anamorphic near-eye display apparatus 100 transform or replicate the optical axis direction 199; however, for any given ray the expression of eqn. 4 may be applied.

The optical system 250 further comprises an extraction waveguide 1 arranged to guide light rays 400 in cone 491 from the transverse anamorphic component 60 to a lateral anamorphic component 110 along the extraction waveguide 1 in a first direction 191. The extraction waveguide 1 has opposing rear and front guide surfaces 6, 8 that are planar and parallel. The extraction waveguide I further has an input end 2 extending in the lateral and transverse directions 195(60), 197(60), the extraction waveguide 1 being arranged to receive light 400 from the illumination system 240 through the input end 2. The input end 2 extends in the lateral direction 195 between edges 22, 24 of the extraction waveguide 1, and extends in the transverse direction between opposing rear and front guide surfaces 6, 8 of the extraction waveguide 1.

The optical system 250 further comprises a light reversing reflector 140 arranged to reflect the light rays 400 in light cones 491 that have been guided along the extraction waveguide I so that the reflected light rays 400 in light cone 493 is guided along the extraction waveguide 1 in a second direction 193 opposite to the first direction 191 and so that reflected cone 493 is guided back through the extraction waveguide 1.

In the embodiment of FIG. 1A, the light reversing reflector 140 is a reflective end 4 of the extraction waveguide 1. Furthermore, the light reversing reflector 140 forms the lateral anamorphic component 110. In particular, the reflective end 4 of the extraction waveguide 1 has a curved shape in the lateral direction 195 that provides positive optical power, affecting the light rays in cone 491 in the lateral direction 195(110), and no power in the transverse direction 197(110). The optical system 250 is thus arranged so that light output from the lateral anamorphic component 110 is directed in directions that are distributed in the transverse direction 197(110) and the lateral direction 195(110). The curved shape of the reflective end 4 may be a shape that is the cross section of a sphere, ellipse, parabola or other aspheric shape to achieve desirable imaging of light rays from the spatial light modulator 48 to the pupil 44 of the eye 45 as will be described further hereinbelow.

The extraction waveguide 1 comprises an array of extraction reflectors 170 disposed internally within the extraction waveguide 1, the extraction reflectors 170 being arranged to transmit light guided 400 along the extraction waveguide I in the first direction 191 and to extract light guided along the extraction waveguide 1 in the second direction 193 towards an eye 45 of a viewer. The array of extraction reflectors 170 are distributed along the extraction waveguide 1 so as to provide exit pupil expansion.

The extraction reflectors 170A-E are an example of reflective extraction features 169 and each comprises a set of layers that are reflective layers as will be described further hereinbelow. In other embodiments, such as described in FIGS. 23A-D, the function of the extraction reflectors 170 may be performed by reflective extraction features 169 that are diffractive features, comprising phase gratings for example.

The extraction waveguide 1 is further arranged to receive light cone 493 from the transverse anamorphic component 60 and the lateral anamorphic component 110; and comprises an array of extraction reflectors 170A-E disposed internally within the extraction waveguide 1. The extraction reflectors 170 are inclined with respect to the first and second directions 191, 193 along the optical axis 199 of the extraction waveguide 1. The extraction reflectors 170 extend partially across the extraction waveguide 1 between the opposing rear and front guide surfaces 6, 8.

The extraction waveguide 1 comprises intermediate surfaces 172 extending along the extraction waveguide between adjacent pairs of extraction reflectors 170. In the embodiment of FIG. 1A, intermediate surfaces 172 are arranged between pairs of extraction reflectors 170A-B, 170B-C, 170C-D and 170D-E.

The extraction reflectors 170 are arranged to transmit at least some of light cone 491 guided along the extraction waveguide 1 in the first direction 191 and to extract at least some of light cone 493 guided back along the extraction waveguide 1 in the second direction 193 towards an eye 45 of a viewer 47 as will be described further hereinbelow.

The coordinate system and principle of operation of the anamorphic near-eye display apparatus 100 will now be further described. The optical system 250 has an optical axis 199 and has anamorphic properties in a lateral direction 195 and in a transverse direction 197 that are perpendicular to each other and perpendicular to the optical axis 199.

FIG. 1B illustrates the variation of optical axis 199 direction, lateral direction 195 and transverse direction 197 as light rays propagate through the optical system 250. In the present description, the lateral and transverse directions 195, 197 are defined relative to the optical axis 199 direction in any part of the illumination system 240 or optical system 250, and are not in constant directions in space. In the embodiment of FIG. 1B, the transverse direction 197(60) illustrates the transverse direction 197 at the transverse anamorphic component 60 formed by the transverse lens 61: the transverse direction 197(110) illustrates the transverse direction 197 at the lateral anamorphic component 110; and the transverse direction 197(44) illustrates the transverse direction 197 at the eye 45 of the observer 47. The transverse anamorphic component 60 has lateral direction 195(60) that is the same as the lateral direction 195(110) of the lateral anamorphic component 110 and the lateral direction 195(44) at the pupil 44 of the eye 45. The Euclidian coordinate system illustrated by x, y, z directions is invariant, whereas the transverse direction 197, lateral direction 195 and optical axis direction 199 may be transformed at various optical components, in particular by reflection from optical components, of the anamorphic near-eye display apparatus 100.

Further features of the arrangement of FIG. 1A will now be described.

The optical system 250 may comprise an input linear polarizer 70 disposed between the spatial light modulator 48 and the extraction reflectors 170 of the extraction waveguide 1. In FIG. 1A, the input linear polarizer 70 is arranged between the transverse anamorphic component 60 and the extraction waveguide 1. The input linear polarizer 70 is an absorbing polarizer such as a dichroic iodine polarizer arranged to transmit a linear polarization state and absorb the orthogonal polarization state.

Further the optical system 250 may comprise a polarization conversion retarder 72 disposed between the light reversing reflector 140 and the array of extraction reflectors 170. Polarization conversion retarder 72 may be an A-plate with an optical axis direction arranged to convert linearly polarised light to circularly polarised light and circularly polarised light to linearly polarised light.

The operation of the input linear polarizer 70 and polarization conversion retarder 72 will be described further with respect to at least FIGS. 6A-F hereinbelow.

In operation extraction waveguide 1 is arranged to guide light rays 400 between the opposing rear and front guide surfaces 6, 8 as illustrated by the zig-zag paths of guided rays 401, 402.

In the first direction 191, at least some of the light rays 400 propagate through the extraction reflectors 170. Waveguide 1 further comprises a reflective end 4 arranged to receive the guided light rays 401, 402 from the input end 2. The lateral anamorphic component 110 comprises the reflective end 4 of the extraction waveguide I with a reflective material provided on the reflective end 4. The reflective material may be a reflective film such as ESR™ from 3M or may be an evaporated or sputtered metal material. In the embodiment of FIG. 1A, the lateral anamorphic component 110 is thus a curved mirror with positive optical power in the lateral direction 195 and no optical power in the transverse direction 197.

For light cone 493 propagating in the second direction 193, the extraction reflectors 170 are oriented to extract light guided back along the extraction waveguide I through the second light guiding surface 8 and towards the pupil 44 of eye 45 arranged in eyebox 40.

The operation of the near-eye display device 100 as an augmented reality display will now be further described.

The extraction waveguide 1 is transmissive to light that passes through the intermediate surfaces 172 such that on-axis real image point 31 on a real-world object 30 is directly viewed through the extraction waveguide 1 by light ray 32. Similarly virtual image 34 with aligned on-axis virtual pixel 36 is desirably viewed with virtual ray 37. Such virtual ray 37 is provided by on-axis light ray 401 after reflection from extraction reflector 170C to the pupil 44 of eye 45. Similarly off-axis virtual ray 39 for viewing of virtual pixel 38 is provided by off-axis ray 402 after reflection from the extraction reflector 170D. An augmented reality display with advantageously high transmission of external light rays 32 may be provided.

The imaging properties of the anamorphic near-eye display apparatus 100 will now be further described using an unfolded schematic representation wherein said transformations of coordinates are removed for purposes of explanation.

Figure 1C:
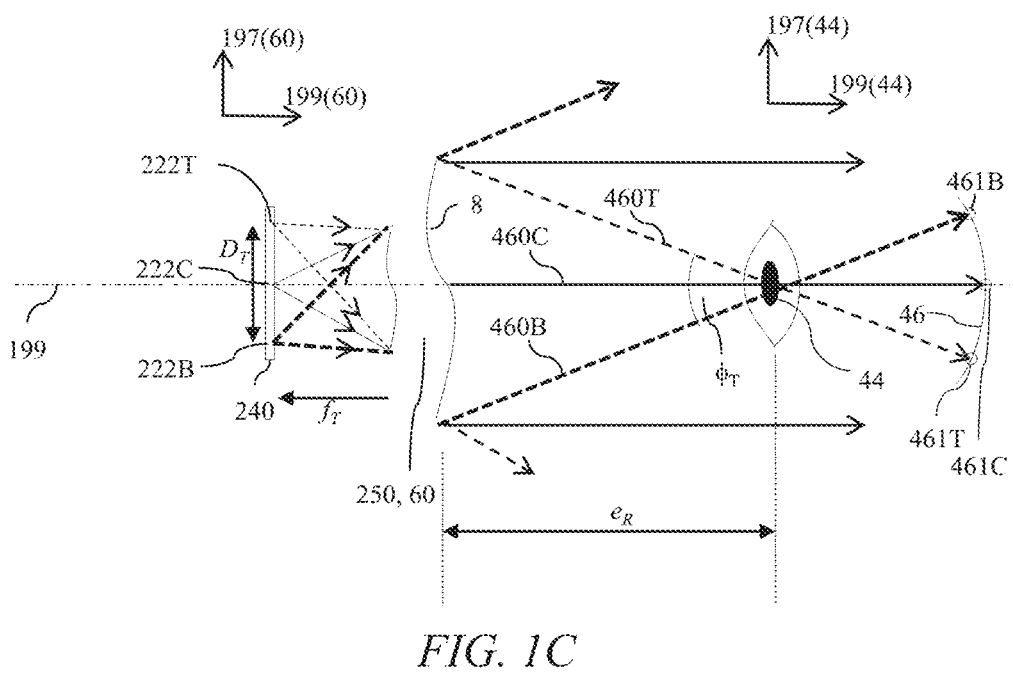
FIG. 1C is a schematic diagram illustrating in side view the operation of a near-eye display in a transverse plane.
Figure 1D:
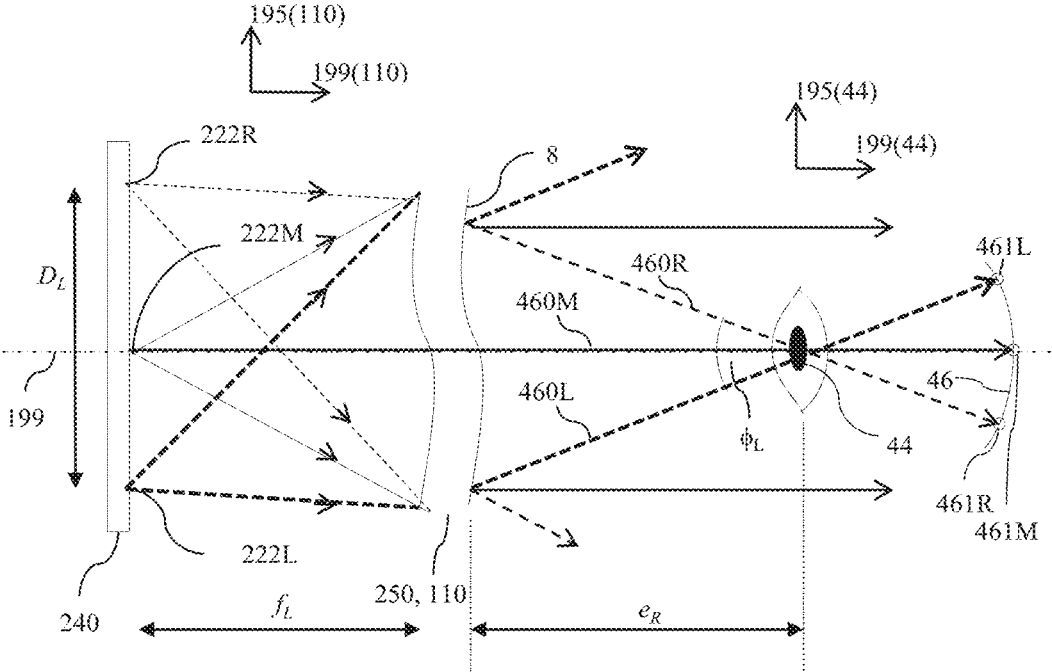
FIG. 1D is a schematic diagram illustrating in side view the operation of a near-eye display in a lateral plane orthogonal to the transverse plane.
Figure 1E:
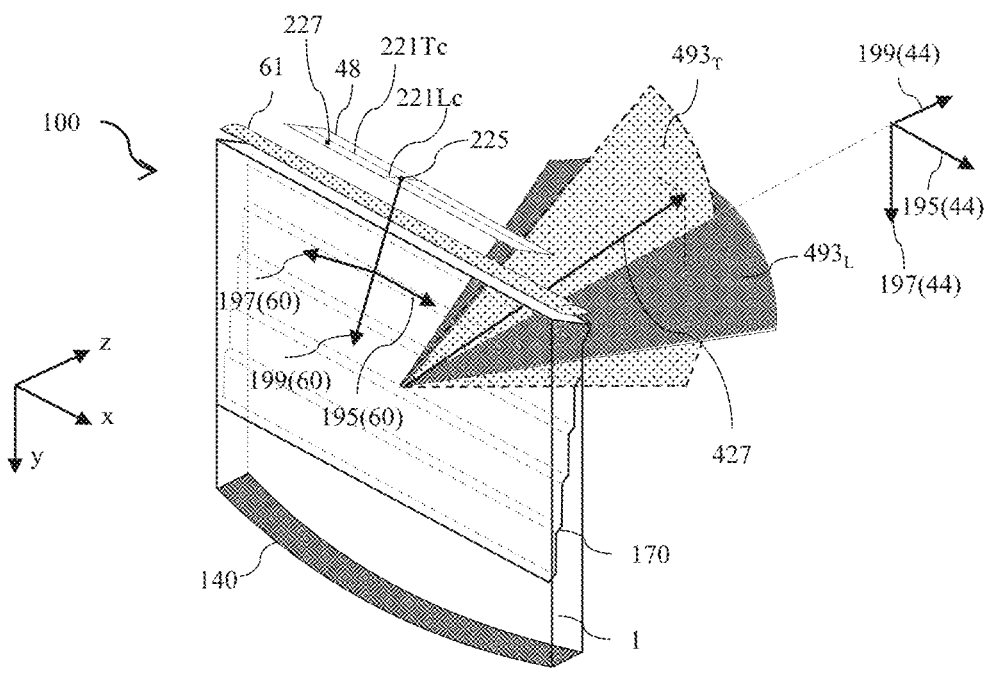
FIG. 1E is a schematic diagram illustrating a front perspective view of a coordinate system mapping for the anamorphic near-eye display apparatus of FIG. 1A.

FIG. 1C is a schematic diagram illustrating in side view the operation of an anamorphic near-eye display apparatus 100 in a transverse plane; and FIG. 1D is a schematic diagram illustrating in side view the operation of an anamorphic near-eye display apparatus 100 in a lateral plane orthogonal to the transverse plane; and FIG. 1E is a schematic diagram illustrating a front perspective view of the mapping of the coordinate system for the anamorphic near-eye display apparatus 100 of FIG. 1A. Features of the embodiment of FIGS. 1C-E not discussed in further detail may be assumed to correspond to the features with equivalent reference numerals as discussed above, including any potential variations in the features.

For illustrative purposes, in FIGS. 1C-D, the variation of optical axis direction 199 as illustrated in FIGS. 1A-B is omitted. FIGS. 1C-D illustrate the principle of operation of the anamorphic near-eye display apparatus 100 of FIG. 1A in unfolded illustrative arrangements to achieve a near-eye image with lateral and transverse fields of view $\phi_T$ and $\phi_L$ that are the same to the observer 47, that is for illustrative purposes a square image is provided to the retina 46. The pupil 44 is shown as at the common viewing distance $e_R$ from the output light guiding surface 8 of the optical system 250.

FIG. 1C illustrates the transverse imaging property of the anamorphic near-eye display apparatus 100. Illumination system 240 is provided with top, center and bottom illuminated pixels 222T. 222C, 222B across the transverse direction 197 with light rays output into the transverse anamorphic component 60 with optical power only in the transverse direction that collimates the output from each pixel 222L, 222C, 222R and directs towards the eye 45. Light rays 460T pass through the pupil 44 of the eye 45 onto the retina 46 of the eye 45 and create an off-axis image point 461T. Light rays 460C pass onto the retina 46 and create center image point 461C and light rays 460B pass onto the retina 46 and create off-axis image point 461B.

FIG. 1D illustrates the lateral imaging property of the anamorphic near-eye display apparatus 100. Illumination system 240 is provided with right, middle and left illuminated pixels 222L, 222M, 222R across the lateral direction 195 with light rays output into the lateral anamorphic component 110 with optical power only in the lateral direction that collimates the output from each pixel 222L, 222M, 222R and directs towards the pupil 44 of the eye 45. Light rays 460L pass through the pupil 44 of the eye 45 onto the retina 46 of the eye 45 and create an off-axis image point 461L. Light rays 460M pass onto the retina 46 and create image point 461M and light rays 460R pass onto the retina 46 and create an image point 461R.

The observer perceives a magnified virtual image with the optical system 250 arranged between the virtual image 34 and the eye 45, with the same field of view $\phi$ in each of lateral and transverse directions 195, 197.

In the anamorphic near-eye display apparatus 100 of the present embodiments, the distance $f_T$ between the first principal plane of the transverse anamorphic component 60 of the optical system 250 is different to the distance $f_L$ between the first principal plane of the lateral anamorphic component 110 of the optical system 250. Similarly, for a square output field of view ($\phi_T$ is the same as $\phi_L$), the separation $D_T$ of pixels 222T, 222B in the transverse direction is different to the separation $D_L$ of pixels 222R, 222L in the lateral direction 195.

In the present description, the lateral angular magnification $M_L$ provided by the lateral anamorphic component 110 of the optical system 250 may be given as $$M_L = \phi p_L / P_L \qquad \text{eqn. 5}$$

and the transverse angular magnification $M_T$ provided by the transverse anamorphic component 60 of the optical system 250 may be given as:

$$M_T = \phi p_T / P_T \qquad \text{eqn. 6}$$

where $\phi p_L$ is the angular size of a virtual pixel 36 seen by the eye in the lateral direction 195, $P_L$ is the pixel pitch in the lateral direction 195, $\phi p_T$ is the angular size of a virtual pixel 36 seen by the eye in the transverse direction 197, and $P_T$ is the pixel pitch in the transverse direction 197. In the case that the angular virtual pixels 36 are square, then $\phi p_L$ and $\phi p_T$ are equal and the angular magnification provided by the lateral anamorphic component 110 may be given as:

$$M_L = M_T * P_T / P_L \qquad \text{eqn. 7}$$

The angular magnification $M_L$, $M_T$ of the lateral and transverse anamorphic optical elements 110, 60 is proportional to the respective optical power $K_L$, $K_T$ of said elements 60, 110. The spatial light modulator 48 may comprise pixels 222 having pitches $P_L$, $P_T$ in the lateral and transverse directions 195, 197 with a ratio $P_L/P_T$ that is the same as $K_T/K_L$, being the inverse of the ratio of optical powers of the lateral and transverse anamorphic optical elements 110, 60.

The output coordinate system is illustrated in FIG. 1E wherein output light from a central pixel 225 is directed along optical axis 199(60) through the transverse anamorphic component 60 and into the extraction waveguide 1, from which it is visible along the optical axis 199(44) at the pupil 44.

The row 221Tc of pixels 222 through the central pixel 225 that is extended in the lateral direction 195 is output as fan 493$_L$ of rays, each ray representing the angle at which a virtual pixel 38 is provided to the pupil 44 across the lateral direction 195.

The column 221Lc of pixels 222 through the central pixel 225 that is extended in the transverse direction 197 is output as fan 493$_T$ of rays, each ray representing the angle at which a virtual pixel 38 is provided to the eye 45 across the transverse direction 197.

For a pixel 227 arranged in a quadrant of the spatial light modulator 48 an output ray 427 is provided to the pupil 44 that is imaged first by the transverse anamorphic component 60 and then by the lateral anamorphic component 110.

Illustrative imaging properties of the anamorphic near-eye display apparatus 100 of FIG. 1A will now be described.

Figure 1F:
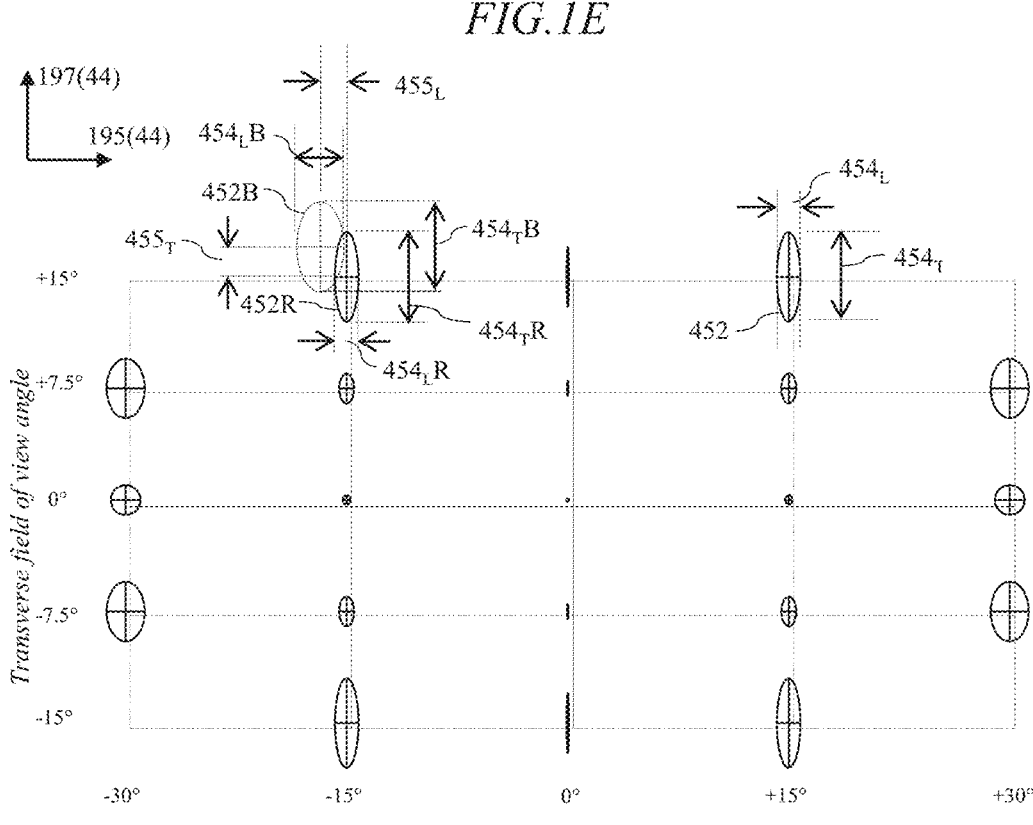
FIG. 1F is a schematic diagram illustrating a field-of-view plot of the output of the anamorphic near-eye display apparatus of FIG. 1A for polychromatic illumination.

FIG. 1F is a schematic diagram illustrating a field-of-view plot of the output of the anamorphic near-eye display apparatus 100 of FIG. 1A for polychromatic illumination.

FIG. 1F is a graph of the transverse viewing angle against the lateral viewing angle. The lateral field of view $\phi_L$ is 60 degrees and the transverse field of view or is 60 degrees.

Points with 0 degrees lateral field of view lie in the transverse light cone 493$_L$ while points with 0 degrees transverse field of view lie in the transverse light cone 493$_T$. The relative aberrations at various image points are illustrated by blur point spread functions 452.

The lateral size 454$_L$ and transverse size 454$_T$ of the blur PSF 452 is determined by aberrations of the optical system 250. The elliptical blur PSF 452 is an illustrative profile of the relative blurring from a point at a pixel 227 on the spatial light modulator 48 when output as an angular cone to the eye 45 and thus represents the relative PSF size and location at the retina 46 of the eye 45 in the lateral and transverse directions 195, 197.

For illustrative purposes the blur point spread function (PSF) 452 is illustrated in FIG. 1F as an ellipse with lateral and transverse sizes 454$_L$, 454$_T$. More generally the shape of the blur PSF may be circular, elliptical, comatic, astigmatic or other profile, which may include scatter artifacts. The blur elliptical PSF 452 profile as illustrated may be used to describe the weighted blur PSF 452 in the lateral and transverse directions 195, 197. For illustrative reasons, the sizes 454$_T$, 454$_L$ of the blur PSF 452 are illustrated as magnified on the scale of the plot of FIG. 1F, and do not represent the actual angular size of the blurring of each angular pixel at the pupil 44.

The sizes 454$_T$R, 454$_L$R of the blur PSF 452R for red pixels 222R may be different to the sizes 454$_T$B, 454$_L$B for the blur PSF 452B for blue pixels 222B. Further the center of gravity of the blur PSF 452B may be displaced in lateral and transverse directions 195, 197 by color blur 455$_L$, 455$_T$ respectively.

Illustrative arrangements of pixels 222 of the spatially multiplexed spatial light modulator 48 will now be described.

Figures 2A, 2B, 2C, 2D:
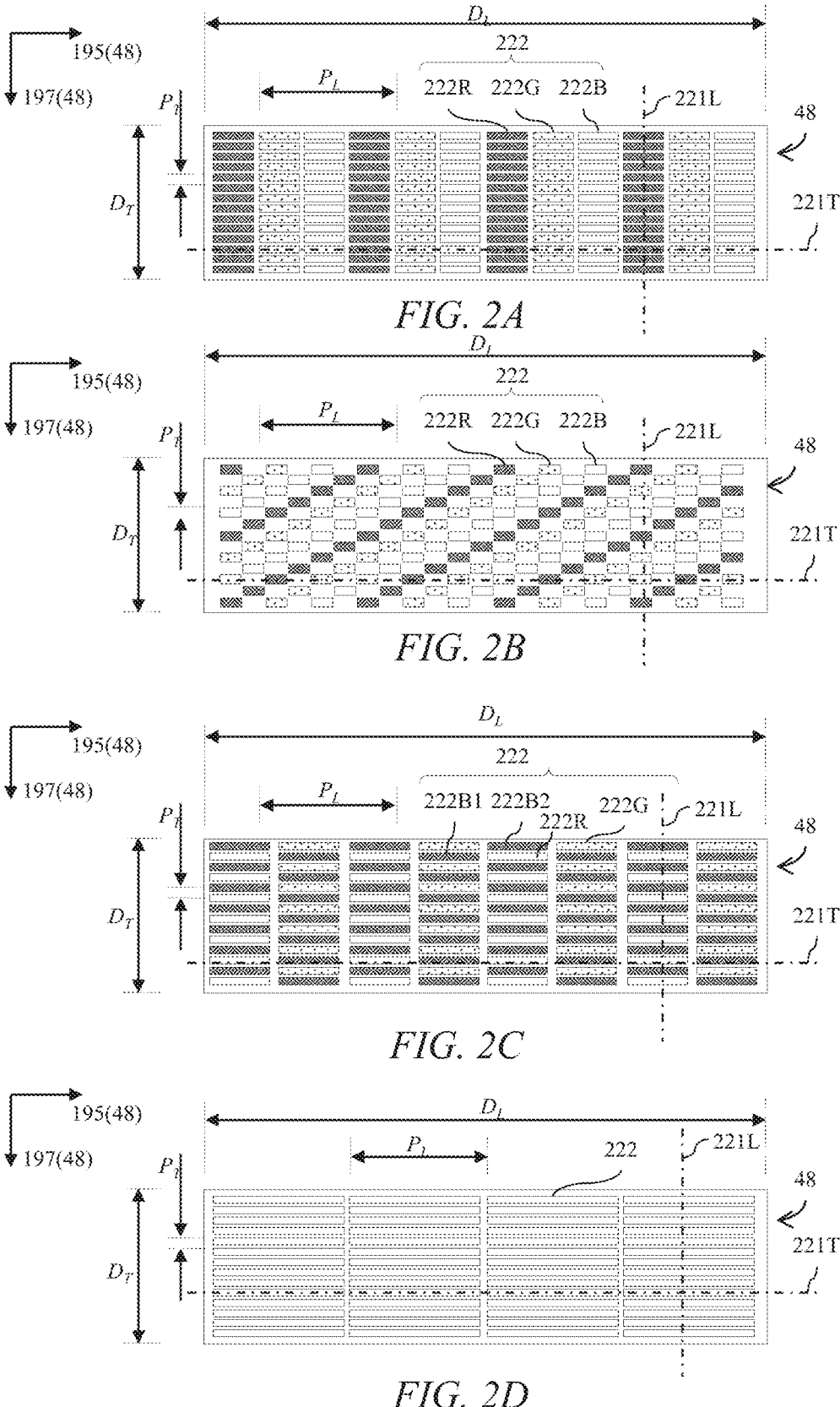
FIG. 2A, FIG. 2B, and FIG. 2C are schematic diagrams illustrating in front view arrangements of a spatial light modulator for use in the anamorphic near-eye display apparatus of FIG. 1A comprising spatially multiplexed red, green and blue sub-pixels.
FIG. 2D is a schematic diagram illustrating in front view a spatial light modulator for use in the anamorphic near-eye display apparatus of FIG. 1A for use with temporally multiplexed spectral illumination.

FIGS. 2A-C are schematic diagrams illustrating in front view a spatial light modulator 48 for use in the anamorphic near-eye display apparatus 100 of FIG. 1A comprising spatially multiplexed red, green and blue sub-pixels 222R. 222G. 222B. Features of the embodiments of FIGS. 2A-C not discussed in further detail may be assumed to correspond to the features with equivalent reference numerals as discussed above, including any potential variations in the features.

The spatial light modulator 48 may be a transmissive spatial light modulator 48 such as an LCD as illustrated in FIG. 1A. Alternatively the spatial light modulator 48 may be a reflective spatial light modulator 48 such as Liquid Crystal on Silicon (LCOS) or a Microoptoelectromechanical (MO-EMS) array of micro-mirrors such as the DMD from Texas Instruments. Alternatively the spatial light modulator 48 may be an emissive spatial light modulator 48 using material systems such as OLED or inorganic micro-LED. A silicon backplane may be provided to achieve high speed addressing of high resolution arrays of pixels 222.

In FIGS. 2A-C, the pixels 222 of the spatial light modulator 48 are distributed in the lateral direction 195(48) and also distributed in the transverse direction 197(48) so that the light output from the transverse anamorphic component 60 is directed in the directions that are distributed in the transverse direction 197 and the light output from the lateral anamorphic component 110 is directed in the directions that are distributed in the lateral direction 195 when output towards the pupil 44 of the eye 45.

White pixels 222 comprising red, green and blue sub-pixels 222R, 222G, 222B are provided spatially separated in the lateral direction 195 and the sub-pixels 222R, 222G, 222B are elongate with a pitch $P_L$ in the lateral direction that is greater than the pitch $P_T$ in the transverse direction 197.

Considering FIGURES IC-D and the embodiments of FIGS. 2A-D, it may be desirable to provide square white pixels in the final perceived virtual image 34. The pitch $P_L$ is magnified by the lateral anamorphic component to an angular size $\phi_L$ (with spatial pitch $\delta_L$ at the retina 46) and the pitch $P_T$ is magnified by the transverse anamorphic component to an angular size or (with spatial pitch $\delta_T$ at the retina 46). The pitches $P_L$, $P_T$ may be determined by said different angular magnifications to advantageously achieve square angular pixels from the anamorphic near-eye display apparatus 100.

The pixels 222 are arranged as columns 221L, wherein the columns 221L are distributed in the lateral direction 195, and the pixels along the columns 221L are distributed in the transverse direction 197; and the pixels 222 are further arranged as rows 221T, wherein the rows 221T are distributed in the transverse direction 197, and the pixels along the rows 221T are distributed in the lateral direction 195.

In FIG. 2A, the sub-pixels 222R, 222G, 222B are distributed in columns of red, green, and blue pixels. Advantageously vertical and horizontal image lines may be provided with high fidelity.

In the alternative embodiment of FIG. 2B, the sub-pixels 222R, 222G, 222B are distributed along diagonal lines. Advantageously reproduction of natural imagery may be improved in comparison to the embodiment of FIG. 2A.

The sub-pixels 222R, 222G, 222B may be provided by white light emission and patterned color filters, or may be provided by direct emission of respective colored light. The present embodiments comprise sub-pixel 222 pitch $P_L$ that is larger than other known arrangements comprising a symmetric input lens for thin waveguides.

In the alternative embodiment of FIG. 2C, multiple blue pixels 222B1 and 222B2 may be provided. The blue pixels 222B1, 222B2 may be driven with reduced current for a desirable output luminance. Advantageously the lifetime of the pixels may be improved, for example when the spatial light modulator 48 is provided by an OLED microdisplay. In other embodiments, additional or alternative white pixels (for example with no color filters) or a fourth color such as yellow may be provided. Color gamut and/or brightness and efficiency may advantageously be achieved.

FIG. 2D is a schematic diagram illustrating in front view a spatial light modulator 48 for use in the anamorphic near-eye display apparatus 100 of FIG. 1A with pixels 222 for use with temporally multiplexed spectral illumination. Features of the embodiment of FIG. 2D not discussed in further detail may be assumed to correspond to the features with equivalent reference numerals as discussed above, including any potential variations in the features.

The spatial light modulator 48 may be used for monochromatic illumination. In alternative embodiments wide color gamut imagery may be provided by time sequential illumination, for example by red, green and blue illumination in synchronisation with red, green and blue image data provided on the spatial light modulator 48. Advantageously image resolution may be increased.

In comparison to non-anamorphic image projectors in which equal angular magnification is provided between the lateral direction 195 and transverse direction 197, the present embodiments provide pixel pitch $P_L$ that is substantially increased in size for a given angular image size and magnification in the transverse direction 197. Such increased size may advantageously achieve increased brightness, increased efficiency and reduced alignment tolerances for the spatial light modulator 48 and illumination system 240.

In color filter type spatial light modulators 48, the size of color filters may be increased. Advantageously cost and complexity of color filters may be reduced. The aperture ratio of the pixels 222 may be increased. In direct emission displays the size of the emitting region may be increased. Advantageously cost and complexity of fabricating the pixels may be reduced and brightness increased. In inorganic micro-LED spatial light modulators 48, efficiency loss due to recombination losses at the edges of pixels may be reduced and system efficiency and brightness advantageously increased.

Input of light into the anamorphic near-eye display apparatus 100 of FIG. 1A will now be further described.

Figure 3A:
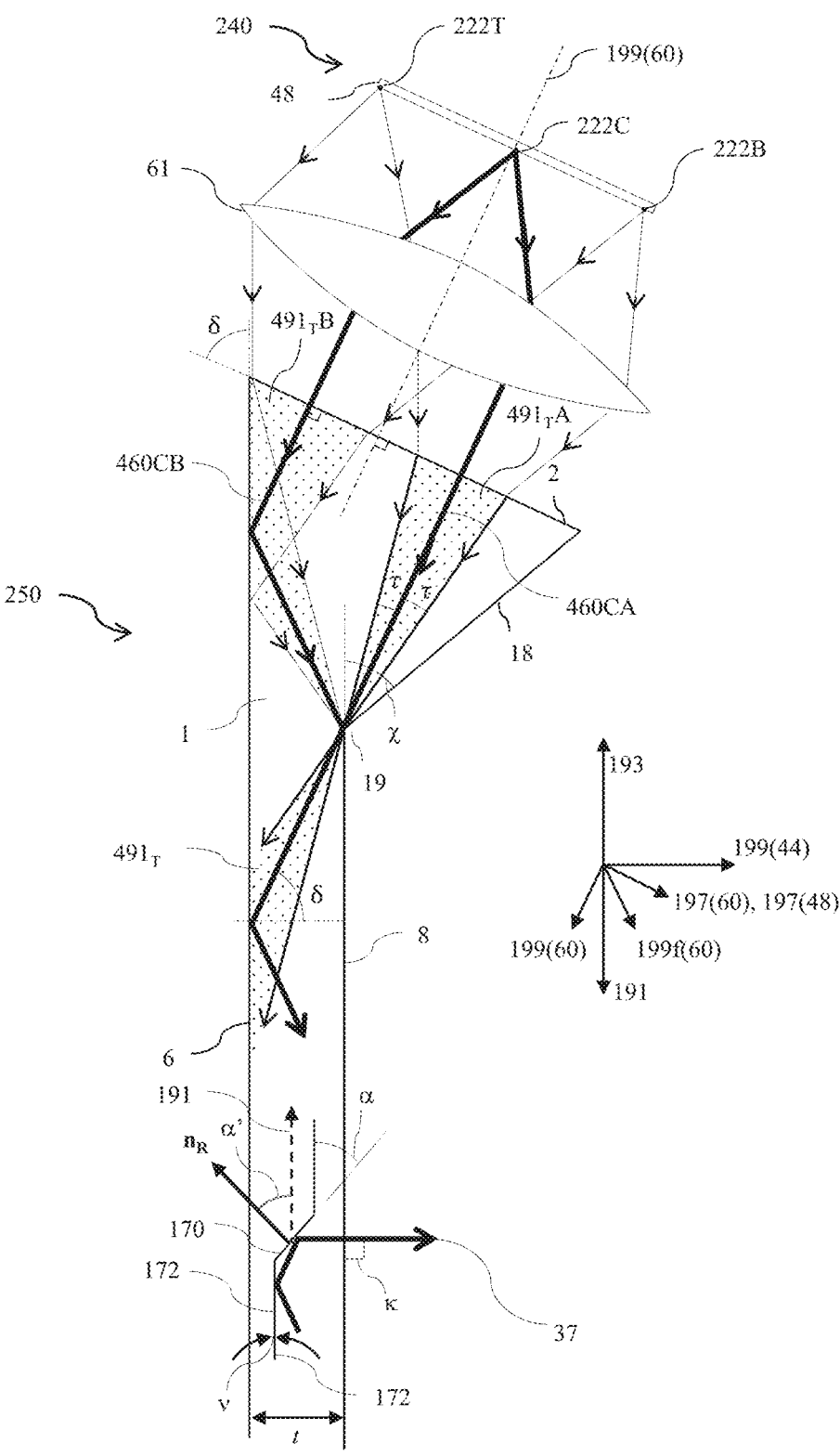
FIG. 3A is a schematic diagram illustrating a side view of light input into an extraction waveguide.
Figures 3B, 3C:
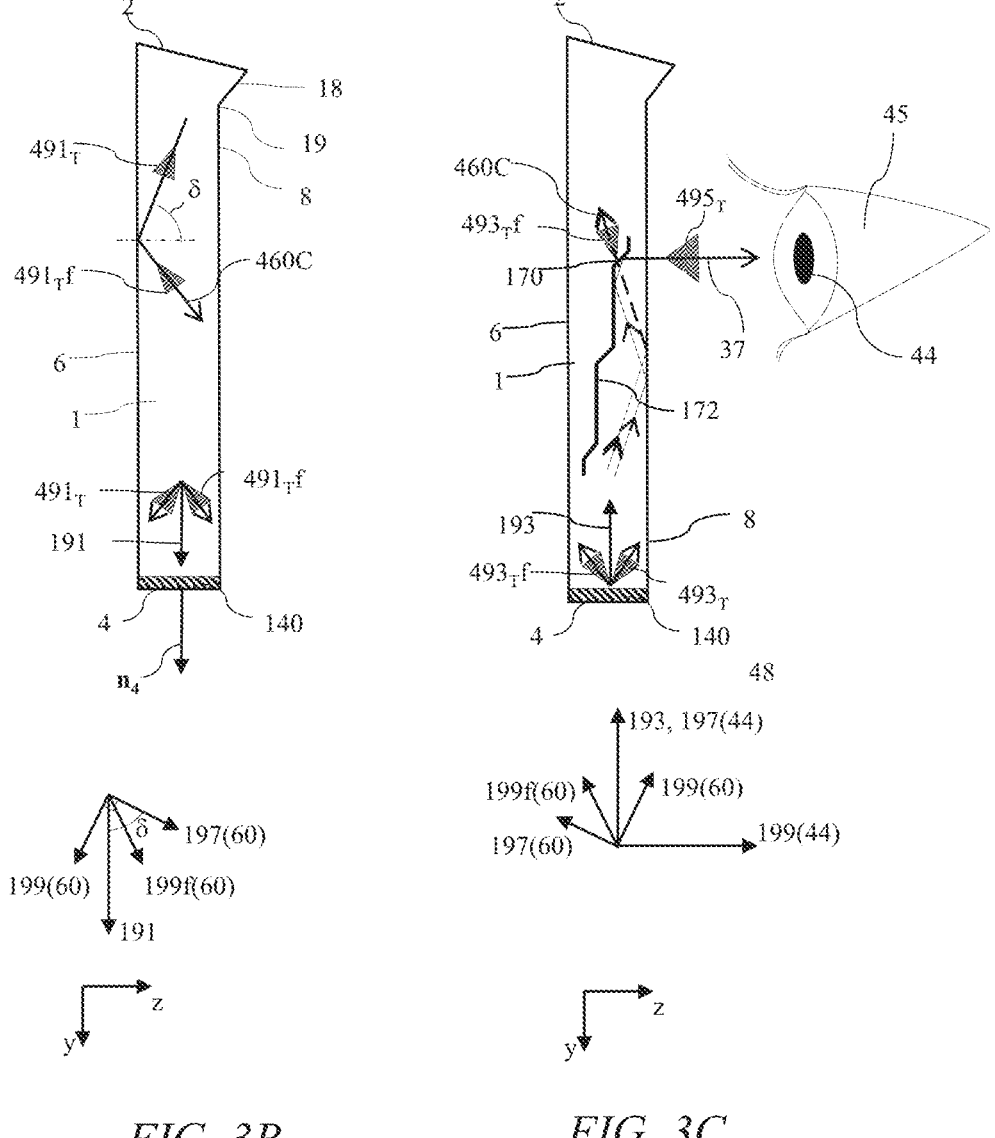
FIG. 3B is a schematic diagram illustrating a side view of light propagation along a first direction in an extraction waveguide.
FIG. 3C is a schematic diagram illustrating a side view of light extraction from the anamorphic near-eye display apparatus of FIG. 1A.

FIG. 3A is a schematic diagram illustrating a side view of light input into the extraction waveguide 1; FIG. 3B is a schematic diagram illustrating a side view of light propagation along the first direction 191 in the extraction waveguide 1; and FIG. 3C is a schematic diagram illustrating a side view of light extraction from the extraction waveguide 1. Features of the embodiments of FIGS. 3A-C not discussed in further detail may be assumed to correspond to the features with equivalent reference numerals as discussed above, including any potential variations in the features.

The input of transverse light cones $491_T$ into the extraction waveguide 1 will now be described with reference to FIG. 3A.

In the illustrative embodiment of FIG. 3A, the input end 2 of the extraction waveguide 1 is inclined, in particular having a surface normal that is inclined at angle δ with respect to the surface normal to the rear and front guide surfaces 6, 8, that is the input end 2 is inclined at angle δ with respect to the first and second directions 191, 193 along the extraction waveguide 1.

Spatial light modulator 48 and transverse anamorphic component 60 formed by the transverse lens 61 are inclined at the angle δ with respect to the normal to the rear and front guide surfaces 6, 8. The direction of the optical axis 199(60)

through the transverse anamorphic component 60 is thus inclined with respect to the first and second directions 191, 193 along the extraction waveguide 1. The optical axis 199(60) direction is typically parallel to the surface normal of the input end 2, such that the optical axis direction 199(60) is inclined at the angle 90-δ with respect to the first and second direction 191, 193. Referring to FIG. 1F, advantageously improved aberrations may be achieved and the height 454 of the pixel blur ellipse 452 may be reduced in at least the transverse direction 197.

The optical system 250 further comprises a tapered surface 18 that is a surface inclined at angle x provided near the input end 2 to direct light bundles in the transverse direction 197 from the transverse anamorphic component 60 into the extraction waveguide 1 at desirable angles of propagation. The tapered surface 18 is arranged between the input end 2 and the light guiding surface 8, with surface normal direction inclined at an angle χ with respect to the surface normal to the light guiding surface 8. In alternative embodiments, the tapered surface 18 may be arranged on the first light guiding surface 6.

TABLE 1 shows an illustrative embodiment of the geometry of the arrangement of FIG. 3A for an extraction waveguide 1 refractive index of 1.5.

TABLE 1

| Angle compared to direction 191 along the waveguide | Illustrative embodiment |
|---|---|
| Input side 2 inclination δ | 60° |
| Tapered surface 18 inclination χ | 44° |
| Cone $491_T$ half angle in the material of the waveguide, τ | 10° |
| Extraction reflector 170 tilt angle α | 60° |
| Intermediate surface 172 tilt angle ν | 0° |
| Angle of incidence of central output ray 460 C. at output surface, 8 κ | 90° |

Central pixel 222C provides illumination to the transverse anamorphic component 60 with illustrative light rays 460CA, 460CB. Light ray 460CA is input through the input end 2 without deflection and is directed to just miss the interface 19 of the tapered surface 18 and the second light guiding surface 8, and is thus undeflected. Light ray 460CB is however incident on the region of the first light guiding surface 6 opposite the tapered surface 18 and is reflected by total internal reflection to the same interface 19, at which it is just totally internally reflected, such that the rays 460CA, 460CB overlap and are guided in the first direction 191 along the extraction waveguide 1.

The extraction reflectors 170 desirably have a surface normal direction $n_R$ that is inclined with respect to the direction 191 along the waveguide by an angle α' (which in FIG. 3A is 90-α) in the range 20 to 40 degrees, preferably by an angle in the range 25 to 35 degrees and most preferably by an angle in the range 27.5 degrees to 32.5 degrees. Advantageously such an arrangement reduces stray light rays.

In alternative embodiments, the extraction reflectors may have an angle α' that is in the range 50 to 70 degrees, preferably an angle in the range 55 to 65 degrees and most preferably an angle in the range 57.5 degrees to 62.5 degrees. Such arrangement directs light ray 460C through the light guiding surface 8 when the ray has not reflected from the intermediate surface 172 after reflection from the light guiding surface 8.

The embodiment of TABLE 1 illustrates a design for refractive index of 1.5. The refractive index of the extraction waveguide 1 may be increased, for example to a refractive index of 1.7 or greater. Advantageously the size of the light cone #r may be increased and a larger angular image seen in the transverse direction.

The outer pixels 222T, 222B in the lateral direction 195(48) define the outer limit of light cones 491$_T$A, 491$_T$B that propagate at angles $\tau$ either side of rays 460CA, 460CB. The tapered surface 18 is provided such that the whole of the light cone 491$_T$A is not deflected near to the input end 2, advantageously achieving reduced cross-talk and high efficiency. After the light cones 491$_T$A, 491$_T$B pass the interface 19, then they recombine to propagate along the extraction waveguide 1.

The propagation of transverse light cones 491$_T$ along the extraction waveguide 1 in the first direction 191 will now be described with reference to FIG. 3B for which the extraction reflectors 170 are omitted for clarity of explanation.

Considering FIG. 3B, the propagation of light rays in cone 491 that are distributed in the transverse direction 197 are illustrated. On-axis light ray 37 from a central pixel 222 of the spatial light modulator 48 is directed through the transverse anamorphic component 60 into the extraction waveguide 1.

The direction of the optical axis 199(60) through the transverse anamorphic component 60 is inclined at angle $\delta$ that is inclined at angle 90-$\delta$ to the first direction 191 along the extraction waveguide 1.

After the interface 19, the light cone 491$_T$ is incident on the first light guiding surface 6 with an angle of incidence 6 and is reflected by total internal reflection such that a replicated light cone 491$_T$f is provided propagating along the extraction waveguide 1 in the direction 191.

FIG. 3C illustrates the propagation of corresponding reflected light cones 493$_T$, 493$_T$f after reflection at the light reversing component 140. In the transverse direction, the lateral anamorphic component 110 has no optical power and has a surface normal direction n$_4$ that is desirably parallel to the first directions 191, 193. The visibility of artifacts arising from stray light including double images and ghost images may be reduced.

The reflected light cones 493$_T$, 493$_T$f propagate along the second direction 193 with angle i about optical axes 199(60) and 199f(60). Corresponding transverse directions 197(60), 197f(60) are also indicated.

Both cones 493$_T$, 493$_T$f comprise image data that between the cones 493$_T$, 493$_T$f is flipped about the direction 191 and thus provides degeneracy of ray directions for a given pixel 222 on the spatial light modulator 48. It is desirable to remove such degeneracy so that only one of the cones 493$_T$, 493$_T$f is extracted and a secondary image is not directed to the pupil 44 of the eye 45.

Central output light ray 37 propagates by total internal reflection of opposing surfaces 6, 8 until it is incident on an intermediate surface 172 at which at least some light is reflected, and then at extraction reflector 170 at which at least some light is further reflected as will be described further hereinbelow such that light cone 493$_T$ is preferentially directed towards the second light guiding surface 8. After refraction at the light guiding surface 8, light in the cone 495$_T$ is extracted towards the eye 45, with a cone angle that has increased size compared to the cone 493$_T$.

The extraction reflectors 170A-E are inclined at the same angle, a such that for each of the light extraction reflectors 170A-E of FIG. 1A, the light cones 493$_1$ are parallel and image blur for light extracted to the pupil 44 from different extraction reflectors 170 across the waveguide is advantageously reduced.

By way of comparison, the light cone 493$_T$f around central light rays 460C which are incident on the surface 8 and then are directly incident on extraction reflector 170 without first reflecting from the intermediate surface 72 have an angle of incidence that is different to the angle of incidence 6. The difference in angle of incidence provides for preferential transmission through the extraction reflector 170, and light cone 493$_T$f is not directed towards the eye 45. Degeneracy is reduced or removed and image cross-talk advantageously reduced.

The inclined input end 2 and inclined transverse anamorphic component 60 thus provide cones 493$_T$, 493$_T$f that are not overlapping with one of said cones preferentially extracted towards the eye 45 and the other cone preferentially retained within the extraction waveguide. The tilted input end 2 and tilted transverse anamorphic component 60 thus advantageously achieve a single image visible to the eye 45 and double images are minimised. In some of the illustrative embodiments hereinbelow, the surface normal of the input end 2 is not inclined to the first and second directions 191, 193, however that is to simplify the illustrations hereinbelow rather than a typical arrangement.

In alternative embodiments (not shown), the central output ray 37 may be inclined to the surface normal to the light guiding surface 8, for example to adjust the angular location of the center of the field of view of the extracted light cone 495$_T$.

Pupil expansion in the transverse direction will now be described.

Figures 4A, 4B:
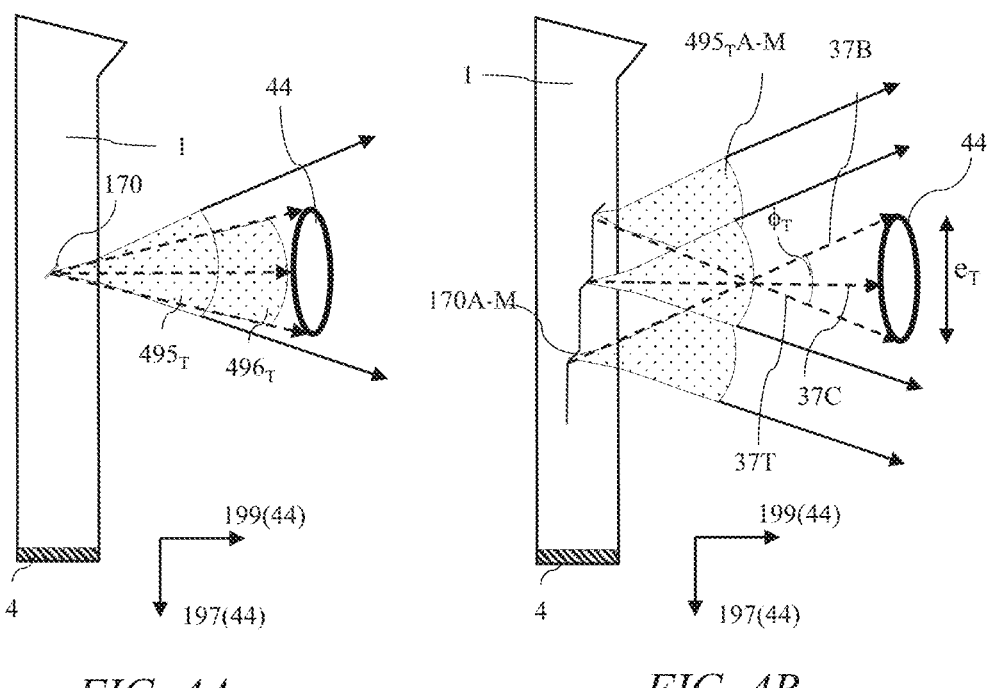
FIG. 4A is a schematic diagram illustrating a side view of light output from an anamorphic near-eye display apparatus for a single extraction reflector.
FIG. 4B is a schematic diagram illustrating a side view of light output from an anamorphic near-eye display apparatus for multiple extraction reflectors to achieve a full ray cone input in the transverse direction into an observer's pupil.
Figure 4C:
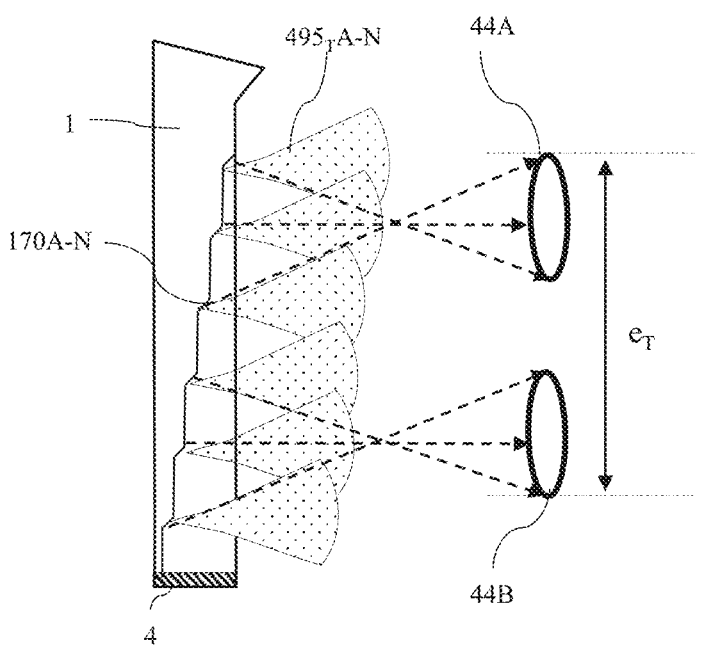
FIG. 4C is a schematic diagram illustrating a front view of light output from an anamorphic near-eye display apparatus for multiple locations for a moving observer in the transverse direction.

FIG. 4A is a schematic diagram illustrating a side view of light output from the anamorphic near-eye display apparatus 100 for a single extraction reflector 170; FIG. 4B is a schematic diagram illustrating a side view of light output from the anamorphic near-eye display apparatus 100 for multiple extraction reflectors 170A-N to achieve a full ray cone input in the transverse direction 197(44) into the observer's pupil 44; FIG. 4C is a schematic diagram illustrating a side view of light output from the anamorphic near-eye display apparatus 100 for multiple locations for a moving observer 47 in the transverse direction 197(44). Features of the embodiments of FIGS. 4A-C not discussed in further detail may be assumed to correspond to the features with equivalent reference numerals as discussed above, including any potential variations in the features.

The array of extraction reflectors 170 are distributed along the extraction waveguide 1 so as to provide exit pupil 40 expansion that is increasing the size e$_T$ of the eyebox 40 in the transverse direction 197 as will now be described.

The extraction reflectors 170 extend partially across the extraction waveguide 1 between opposing rear and front guide surfaces 6, 8 of the extraction waveguide 1 with successively shifted positions. The successively shifted positions are arranged along the waveguide in the direction 191. In other words, in the transverse direction 197 the extraction reflectors 170 extend partially across the extraction waveguide 1 with successively shifted positions.

Considering FIG. 4A, a single extraction reflector 170 is arranged to output light cone 495$_1$ towards the pupil 44. However, the limited size of the pupil 44 determines that only those light rays within the partial light cone 496$_T$ are received by the eye 45 and the field of view of the image observed on the retina in the transverse direction 197(44) is smaller than that input into the extraction waveguide 1. It would be desirable to increase the field of view of observation.

Considering FIG. 4B, multiple extraction reflectors 170A-M are provided sufficient to provide light rays 37C, 37T, 37B from the full cone $495_T$. The pupil 44 has a height greater than the pitch of the extraction reflectors 170. For example the pitch of the extraction reflectors 170 may be 1 mm and the nominal diameter of the pupil 44 may be 3 mm to 6 mm. The pupil receives light from multiple extraction reflectors 170A-M, and the field of view $\phi_T$ observed is the same as that input into the extraction waveguide 1 at the input end. The exit pupil 40 has a size $e_T$ that is the same as the pupil 44 height in this limiting case.

Considering FIG. 4C, further extraction reflectors 170A-N are provided sufficient to provide movement of the pupil 44 between pupil 44A location and pupil 44B location. In this manner $e_T$ is increased and exit pupil expansion in the transverse direction is achieved. A transverse field of view $\phi_T$ is provided over an extended pupil 44 location advantageously achieving increased comfort of use and full image visibility.

As will be described in FIGS. 5A-E hereinbelow, the lateral anamorphic component 110 further provides exit pupil 40 expansion in the lateral direction 195, that is increasing the size $e_L$ of the eyebox 40 in the lateral direction 195.

The imaging properties of the anamorphic near-eye display apparatus 100 in the lateral direction 195 will now be considered further.

Figures 5A, 5B:
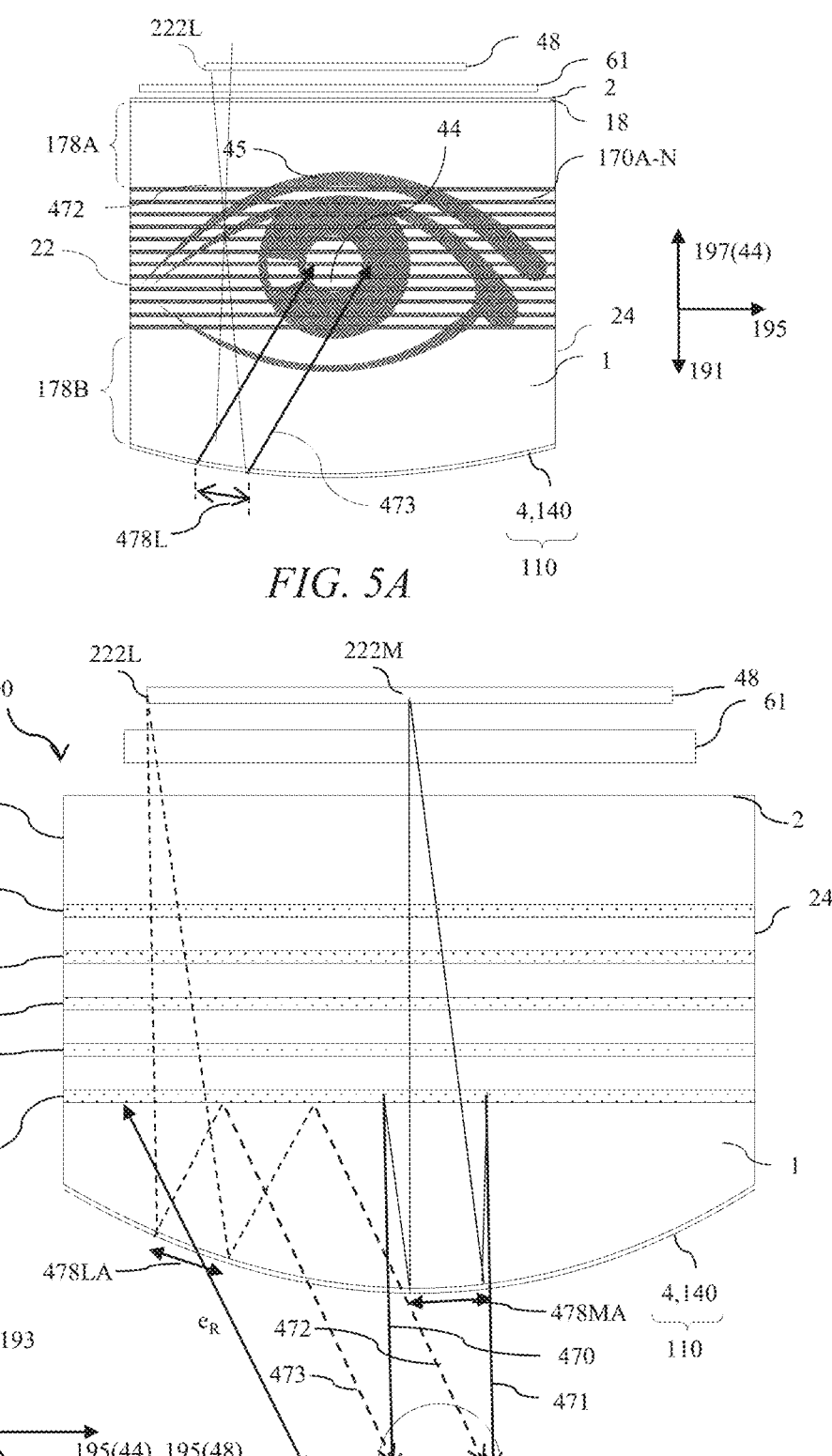
FIG. 5A is a schematic diagram illustrating a front view of light output from the anamorphic near-eye display apparatus of FIG. 1A.
FIG. 5B is a schematic diagram illustrating a front view of the anamorphic near-eye display apparatus of FIG. 1A for a single pupil position.
Figure 5C:
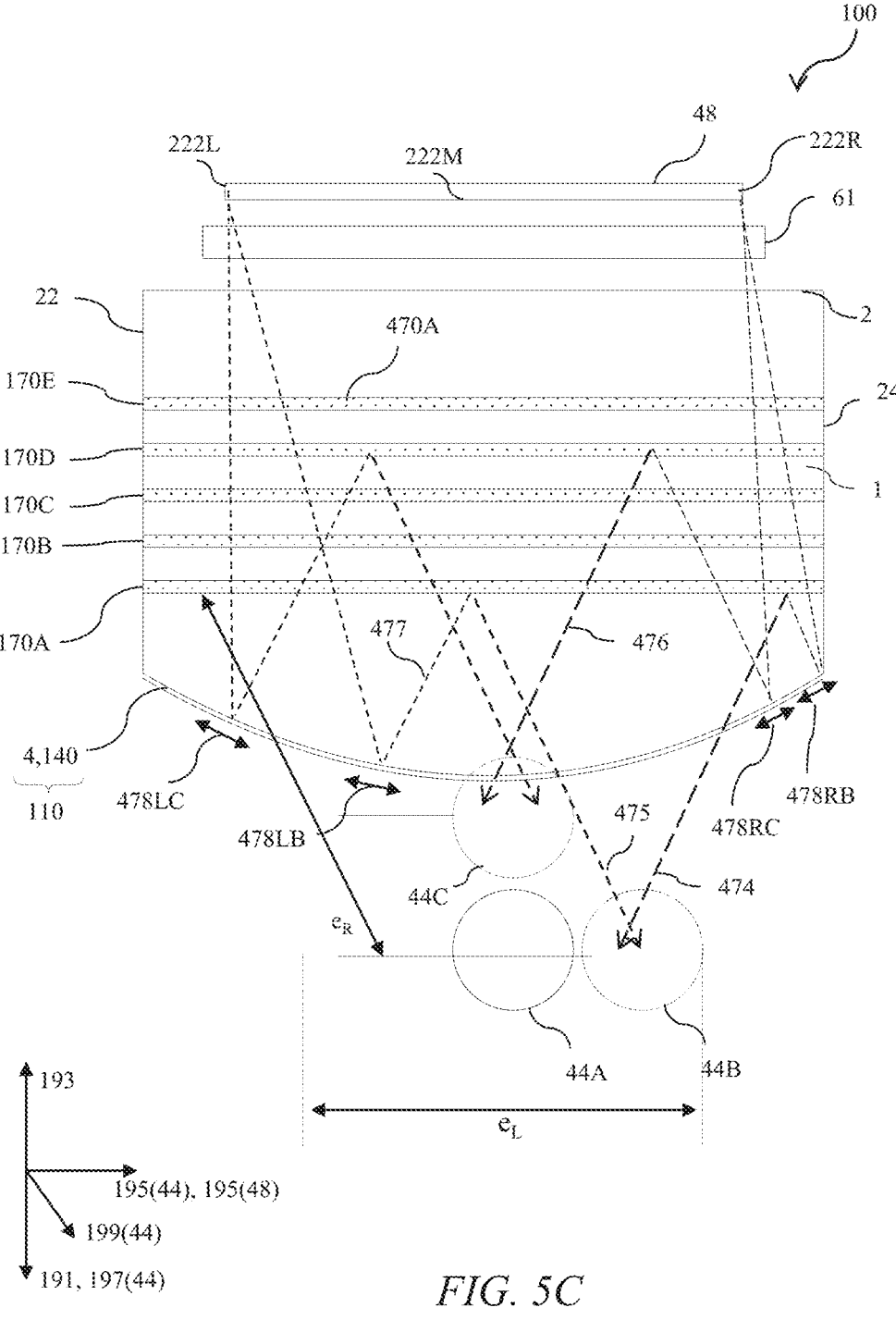
FIG. 5C is a schematic diagram illustrating a front view of the anamorphic near-eye display apparatus of FIG. 1A for multiple pupil positions.

FIGS. 5A-C are schematic diagrams illustrating front views of light output from the anamorphic near-eye display apparatus of FIG. 1A. Features of the embodiments of FIGS. 5A-C not discussed in further detail may be assumed to correspond to the features with equivalent reference numerals as discussed above, including any potential variations in the features.

FIG. 5A illustrates that a non-extracting light guiding region 178A is arranged between the tapered surface 18 and the first extraction reflector 170 of the array of extraction reflectors 170A-N; and a non-extracting light guiding region 178B is arranged between the array of extraction reflectors 170A-N and the lateral anamorphic component 110. Non-extracting guiding sections 178A, 178B may provide increased height of the extraction waveguide 1 in the first direction 191 without extraction reflectors 170. Efficiency of extraction is advantageously improved, and aberrational performance of the lateral anamorphic component 110 is further improved.

In the embodiment of FIG. 5A, the eye 45 is aligned in plan view and out-of-plane rays are not shown, however such a description provides an insight into the operation of the anamorphic near-eye display apparatus 100 in the lateral direction 195. More than one extraction reflector 170 overlays the pupil 44 of the eye 45. For example, the pitch of the extraction reflector 170 is 1 mm and three to six extraction reflectors 170 are provided across the pupil 44 of the eye 45 depending on the dilation of the pupil 44 of the eye 45. Advantageously luminance variation with eye position 45 may be reduced.

The pupil 44 sees the off-axis rays from pixel 222L at the edge of the spatial light modulator 48 after reflection from a region 478L of the lateral anamorphic component 110, which is the reflective end 4 of the extraction waveguide 1. While the lateral anamorphic component 110 in its entirety is a relatively fast optical element and thus prone to aberrations, particularly from its edges, the region 478 of the lateral anamorphic component 110 that is directing light into the pupil 44 for any one eye 45 location is small, and thus aberrations from the lateral anamorphic component 110 are correspondingly reduced. Considering FIG. 1F, desirably small width 455 of the blur ellipse 452 may be achieved.

In the embodiment of FIG. 5B, the eye 45 is aligned with out-of-plane rays to illustrate exit pupil 40 expansion in the lateral direction 195.

Light rays 470, 471 are directed from a central pixel 222M across the lateral direction 195 of the spatial light modulator 48 and transmitted through the transverse anamorphic component 60 formed by the transverse lens 61 without optical power in the lateral direction 195 and into the extraction waveguide 1. Said light rays 470, 471 propagate in the first direction 191 of the extraction waveguide 1 to the light reversing reflector 140 which provides positive optical power in the lateral direction 195 by means of the reflective end 4 which provides the lateral anamorphic component 110.

Such light rays 470, 471 are reflected in the extraction waveguide 1 in the second direction 193 from the region 478MA of the lateral anamorphic component 110 and at the extraction reflector 170A is reflected away from the plane of the extraction waveguide 1 to the pupil 44 of the eye 45A at the viewing distance $e_R$. The eye 45 collects the rays 470, 471 and directs them to the same point on the retina 46 to provide a virtual pixel location as described elsewhere herein.

Similarly for off-axis pixel 222L offset in the lateral direction 195(48), at the edge of the spatial light modulator 48 provides rays 472, 473 that are directed into the extraction waveguide 1, reflected at region 478LA of the lateral anamorphic component 110 and reflected by extraction reflector 170A to the eye 45A to provide an off-axis image point in the lateral direction 195(44) on the retina 46.

The lateral anamorphic component 110 has a positive optical power that provides collimated optical rays from each image point 222L, 222M in the lateral direction 195. In this manner the lateral distribution of field points are provided across the retina 46 by means of the optical power of the lateral anamorphic component 110, while the transverse anamorphic component 60 has optical power to provide the transverse distribution of field points across the retina 46. At diagonal field angles, such as illustrated in FIG. 1E with regards to the imaging of pixel 227, the field points are provided by a combination of the lateral and transverse optical powers of the lateral anamorphic component 110 and transverse anamorphic component 60 respectively.

FIG. 5C illustrates exit pupil expansion in the lateral direction 195 and in the transverse direction 197. Rays 474, 475 for pixels 222R, 222L are directed to pupil 44B by reflection from regions 478RB, 478LB respectively of the lateral anamorphic component 110. Pupil 44B is offset from the pupil 44A in the lateral direction 195, wherein the rays 474, 475 are reflected at least by the extraction reflector 170A. The width $e_L$ of the exit pupil 40 is thus increased by the relatively large width of the lateral anamorphic component 110 allowing the regions 478 to be arranged over a desirable width. The viewing freedom of the eye 45 in the exit pupil 40 is increased, advantageously increasing viewing comfort for the eye 45 while achieving full field of view in the lateral direction.

FIG. 5C further illustrates the pupil expansion in the transverse direction 197. Light that is reflected from extraction reflectors 170D is directed to pupil 44C that has a different height to the pupil 44A, as discussed hereinbefore with respect to FIG. 4C.

Exit pupil 40 expansion will now be further illustrated.

Figures 5D, 5E, 5F:
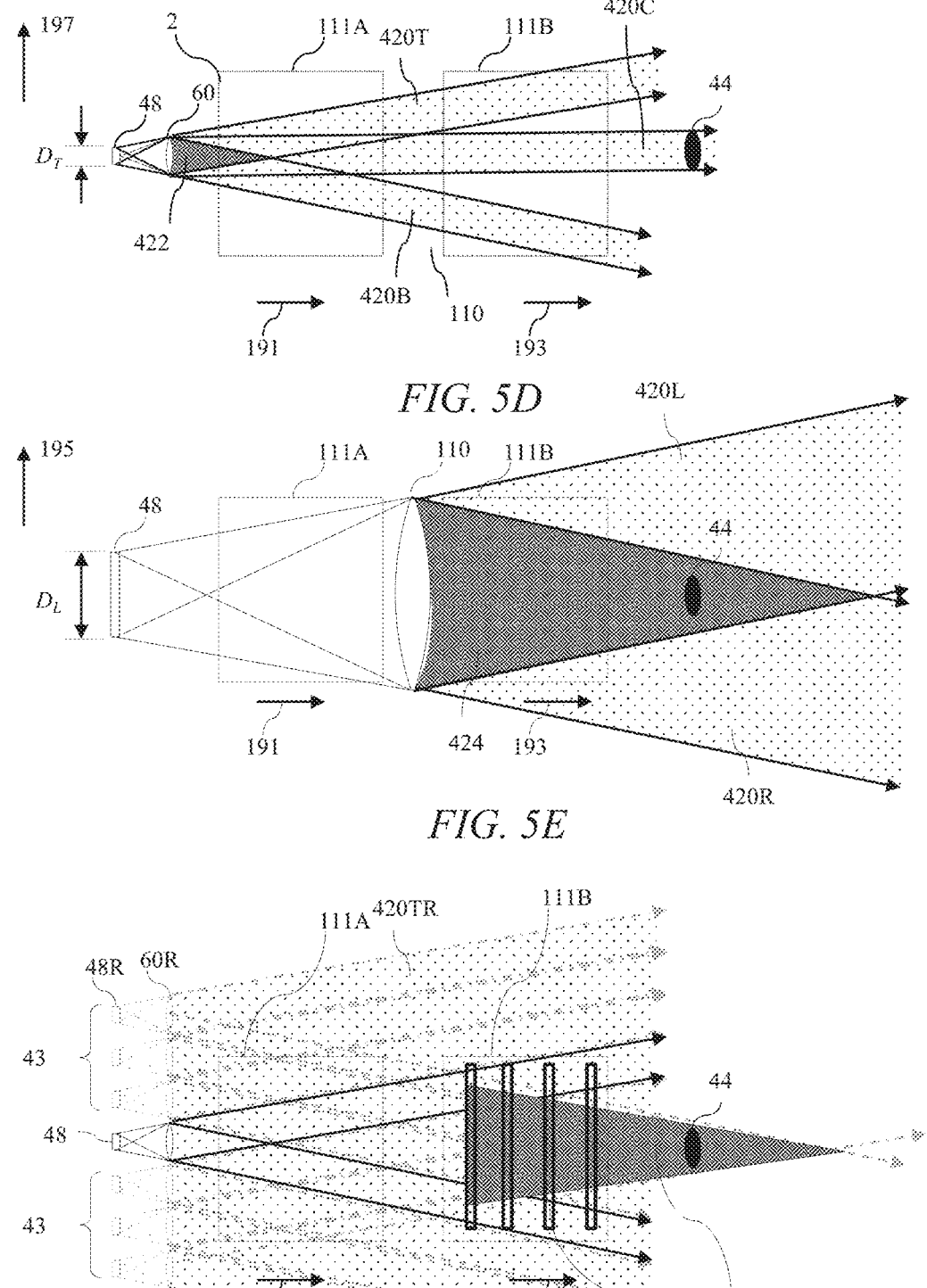
FIG. 5D is a schematic diagram illustrating a side view of an unfolded imaging system arranged to image in the transverse direction wherein no reflective extraction features are provided.
FIG. 5E is a schematic diagram illustrating a schematic top view of an unfolded imaging system arranged to image in the lateral direction.
FIG. 5F is a schematic diagram illustrating a side view of an unfolded imaging system arranged to image in the transverse direction wherein an array of extraction reflectors is provided as the reflective extractions features.

FIG. 5D is a schematic diagram illustrating a side view of an unfolded imaging system arranged to image in the transverse direction 197 wherein reflective extraction features 169 (for example extraction reflectors 170) are provided; FIG. 5E is a schematic diagram illustrating a schematic top view of an unfolded imaging system arranged to image in the lateral direction; FIG. 5F is a schematic diagram illustrating a side view of an unfolded imaging system arranged to image in the transverse direction wherein an array of extraction reflectors 170 is provided, although the description is similarly applicable to other reflective extraction features. Features of FIGS. 5D-F not discussed in further detail may be assumed to correspond to the features with equivalent reference numerals as discussed above, including any potential variations in the features.

FIGS. 5D-F are unfolded representations of the anamorphic near-eye display apparatus 100 of FIG. 1A and are provided for illustrative purposes only.

Considering FIG. 5D, light from spatial light modulator 40 illuminates transverse anamorphic component 60 and inputs light rays into unfolded waveguide member 111A in direction 191. Light passes through the lateral anamorphic component 110 without modification and into unfolded waveguide member 111B in direction 193. Ray bundles 420T, 420C, 420B are provided across the transverse direction for pixels 222T, 222C, 222B respectively on the spatial light modulator 48. The pupil 44 of the eye 45 only observes the full ray cone if located in the cone 422 which is close to the lens and thus not accessible to the eye 45. This is analogous to the illustrative embodiment of FIG. 4A.

Considering FIG. 5E, light from spatial light modulator 40 illuminates lateral anamorphic component 110 and inputs light rays into unfolded waveguide member 111A in direction 191. The light cone in the lateral direction from the pixels 222L, 222M, 222R is collimated by the lateral anamorphic component 110 and passes into the unfolded waveguide member 111B in direction 193. Ray bundles 420L, 420M, 420R are provided across the transverse direction. The pupil 44 of the eye 45 observes the full ray cone if located in the cone 424 which is accessible to the eye outside the unfolded waveguide member 111B because of the much larger width of the lateral anamorphic component 110 compared to the transverse anamorphic component 60. This is analogous to the illustrative embodiment of FIG. 5B.

The effect of the extraction reflectors 170 on pupil expansion in the transverse direction 197 will now be further illustrated.

In comparison to FIG. 5D, FIG. 5F illustrates the array of extraction reflectors 170 being distributed along the extraction waveguide 1 so as to provide exit pupil 40 expansion. Each of the extraction reflectors 170A-N effectively provides replicated images 48R, 60R of the spatial light modulator 48 and transverse anamorphic component 60 respectively. Such replicated images 48R, 60R further provide replicated light cones 420 of FIG. 5D, expanding the effective width of the final light cones 420TR, 420BR. Such replication provides replicated cone 426, from within which the pupil 44 receives light for the full field angles.

The cones 422, 424, 426 represent schematically the exit pupil 40 of the anamorphic near-eye display apparatus in the lateral direction 195 or transverse direction 197. Thus in comparison to the exit pupil 40 represented by cone 422 that by way of comparison would be provided for a conventional micro-projector without pupil expansion, exit pupil 40 expansion is achieved by the lateral anamorphic component 110 and by the array of extraction reflectors 170A-N that form reflective extraction features 169.

Polarised light propagation in the illustrative embodiment of FIG. 1A will now be described.

Figure 6A:
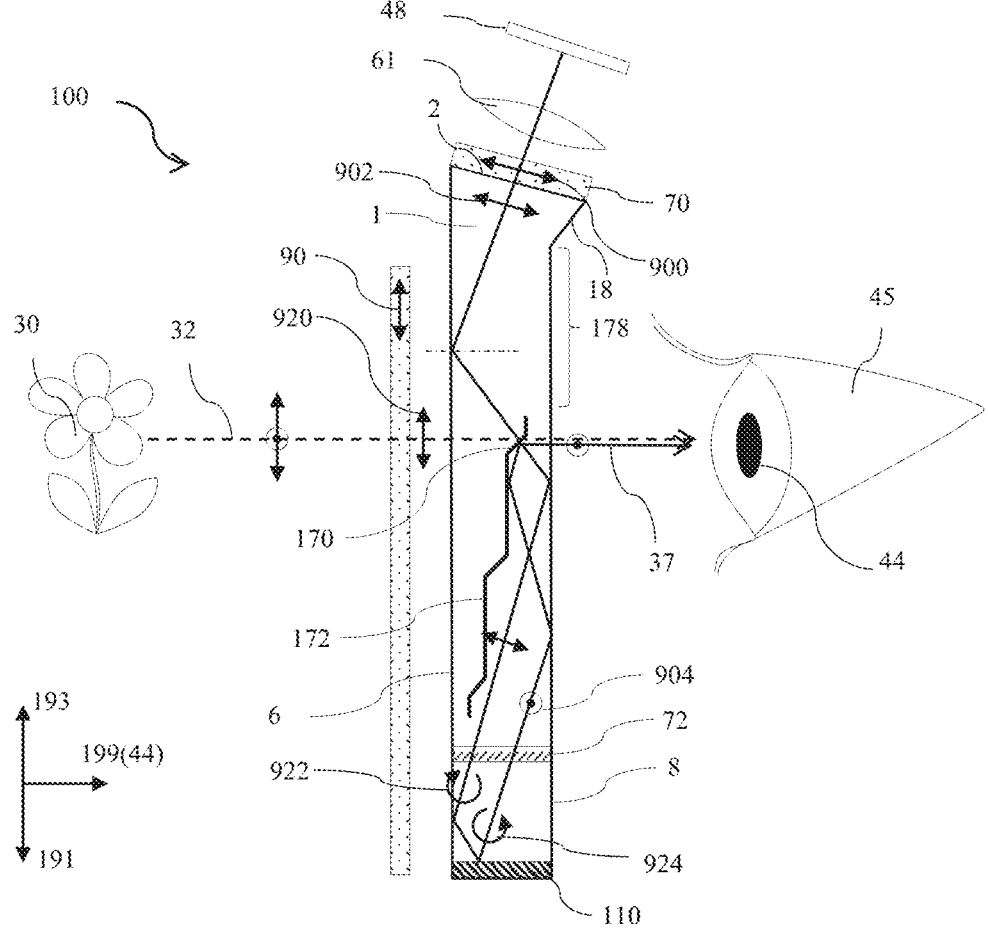
FIG. 6A is a schematic diagram illustrating a side view of polarised light propagation in the anamorphic near-eye display apparatus of FIG. 1A.
Figure 6B:
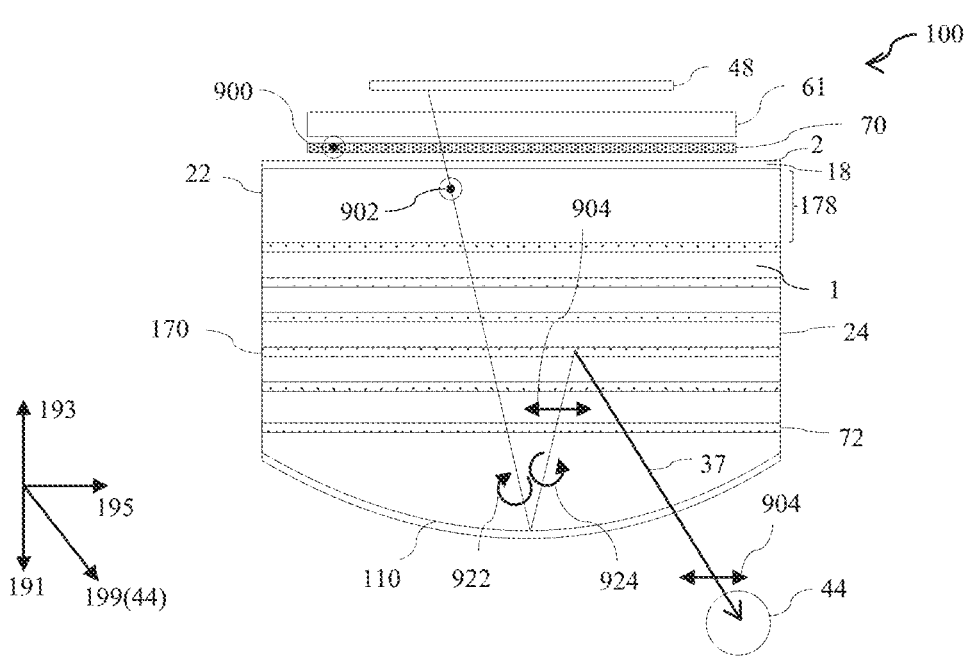
FIG. 6B is a schematic diagram illustrating a front view of polarised light propagation in the anamorphic near-eye display apparatus of FIG. 1A.
Figure 6C:
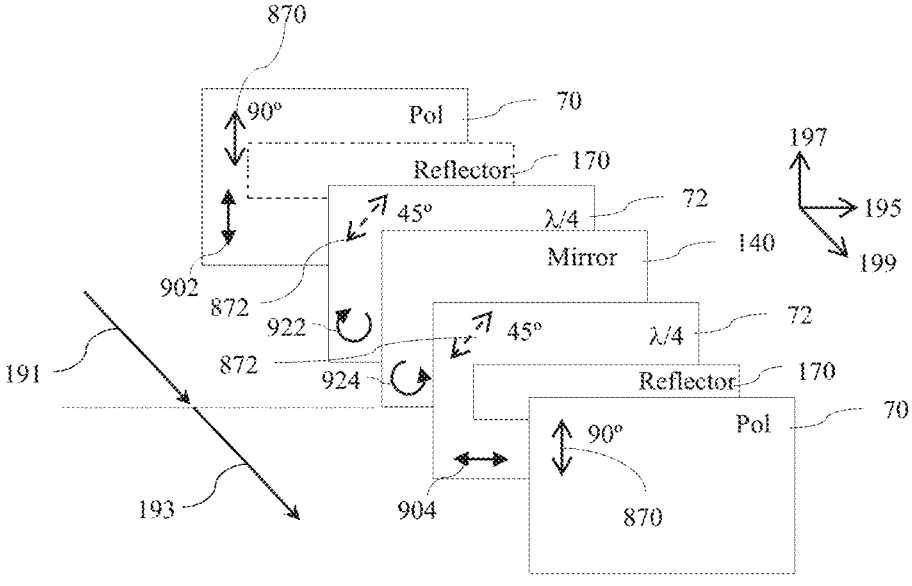
FIG. 6C is a schematic diagram illustrating optical axis alignment directions through the polarization control components of FIGS. 6A-B.

FIG. 6A is a schematic diagram illustrating a side view of polarised light propagation in the anamorphic near-eye display apparatus 100 of FIG. 1A; FIG. 6B is a schematic diagram illustrating a front view of polarised light propagation in the anamorphic near-eye display apparatus 100 of FIG. 1A; and FIG. 6C is a schematic diagram illustrating optical axis alignment directions and polarization states for light propagating through the unfolded polarization control components of FIGS. 6A-B. Features of the embodiments of FIGS. 6A-C not discussed in further detail may be assumed to correspond to the features with equivalent reference numerals as discussed above, including any potential variations in the features.

As described above with respect to FIG. 1A, the optical system comprises an input linear polarizer 70 disposed between the spatial light modulator 48 and the array of extraction reflectors 170. A polarization conversion retarder 72 is disposed between the light reversing reflector 140 and the array of extraction reflectors 170.

In the alternative embodiment of FIGS. 6A-C, the optical system 250 comprises an input linear polarizer 70 disposed between the spatial light modulator 48 and the array of extraction reflectors 170 and a polarization conversion retarder 72 disposed between the light reversing reflector 140 and the array of extraction reflectors 170, the polarization conversion retarder 72 being arranged to convert a polarization state of light passing therethrough between a linear polarization state 902, 904 and a circular polarization state 922, 924 respectively. The polarization conversion retarder 72 has a retardance of a quarter wavelength at a wavelength of visible light, for example 550 nm; that is the polarization conversion retarder 72 may be a quarter wave retardation at a visible wavelength such as 550 nm and may comprise a stack of composite retarders arranged to achieve the operation of a quarter wave retarder over an increased spectral band, for example comprising a Pancharatnam stack.

FIG. 6C further illustrates the arrangement of optical axis direction 872 of polarization conversion retarder 72; and the linear polarization state electric vector transmission axes 870 of the input linear polarizer 70. For illustrative purposes, the geometry is unfolded after reflection at the light reversing reflector 140. Further, in the optical axis alignment diagrams of the present description, the aspect ratio of the elements 70, 72, 140 is reduced for illustrative purposes; in an illustrative embodiment, said elements may have a transverse direction 197 length of 5 mm and a lateral direction 195 length of 40 mm.

FIG. 6C illustrates the propagation of polarization states and the alignment of various optical components. Polarizer 70 has electric vector transmission direction 870 at 90 degrees, such that linear polarization state 902 is transmitted and passes through reflector 170 to polarization conversion retarder 72 with optical axis direction 872 to output circular polarization state 922. Circular polarization state 924 is reflected from the mirror (shown as an illustrative unfolded geometry) that provides a π phase shift and then linear polarization state 904 is output onto reflector 170. Linear polarizer 70 is arranged to absorb the back reflected light with polarization state 904.

FIGS. 6A-C illustrate that input linear polarizer 70 is arranged to pass light that is in a p-polarization state in the extraction waveguide; that is a polarization state 902 has an electric vector transmission direction 900 that provides a p-polarised linear polarization state 902 that is in the plane of the cross section of the extraction waveguide 1 and out of the plane of the rear and front guide surfaces 6, 8, that is in the plane in which the output light rays 37 are distributed in the transverse direction 197.

Output light ray 37 is guided in the first direction 191 by total internal reflection at opposing rear and front guide surfaces 6, 8 towards the lateral anamorphic component 110 comprising light reversing reflector 140, which in the embodiment of FIG. 1A and FIG. 6A comprises the end 4 of the extraction waveguide 1 and a reflective coating.

As will be described further hereinbelow, the p-polarised state 902 is at least in part and preferably preferentially transmitted through the extraction reflectors 170 and intermediate surfaces 172.

The polarization conversion retarder 72 is provided between the extraction reflectors 170A-E and the light reversing reflector 140. Polarised light ray 37 is converted to a left-hand circular polarization state 922 and a $\pi$ phase shift occurring on reflection at the light reversing reflector 140 provides a reflected right-hand circular polarization state 924. The polarization conversion retarder 72 outputs s-polarised polarization state 904 that propagates along light ray 37 back up the extraction waveguide 1 in the second direction 193.

The polarization conversion retarder 72 most generally serves to provide the polarization modification to provide conversion from polarization state 902 to polarization state 904 for light ray 37. The polarization conversion retarder 72 may have a retardance of a quarter wavelength at a wavelength of 550 nm or may be tuned for another visible wavelength for example to match the peak luminance of a monochrome display. The retardance of the polarization conversion retarder 72 may be different to a quarter wavelength, but selected to provide the same effect. For example, the polarization conversion retarder 72 may have a retardance of three quarter wavelengths or five quarter wavelengths, for example. The polarization conversion retarder 72 may comprise a stack of retarders to provide desirable phase modification over an increased spectral range, for example with a Pancharatnam retarder stack (which is different to the Pancharatnam-Berry lens described hereinbelow). Advantageously color uniformity may be increased. The polarization conversion retarder 72 may be provided with additional retarder layers to increase the field of view of the quarter wave retarder function, to achieve increased uniformity across the field of view of observation.

In FIG. 1A, the polarization conversion retarder 72 is arranged between the extraction waveguide 1 and the lateral anamorphic component 110 that is the light reversing reflector 140. The polarization conversion retarder 72 may be attached to the curved reflective end 4 of the waveguide. Advantageously cost and complexity of assembly may be reduced. In the alternative embodiment of FIG. 6B, the polarization conversion retarder 72 is arranged across a chord of the lateral anamorphic component 110. Such an arrangement may be suitable for an extraction waveguide 1 wherein the light reversing reflector is assembled as a separate component to the extraction region of the waveguide comprising extraction reflectors 170.

As will be described further herein below, the s-polarised state 904 is preferentially reflected by the extraction reflectors 170 and intermediate surfaces 172 and output towards the pupil 44 of the eye 45.

Unpolarised light from real-world objects 30 is directed through the extraction waveguide 1. Optional polarizer 90 with p-polarised electric vector transmission direction 90 may be provided that transmits the linear polarization state 920 and may be arranged so that the extraction waveguide 1 is arranged between the object 30 and the eye 45. Polarizer 90 may provide a sunglasses function and reduce background object luminance in comparison to the luminance of the anamorphic near-eye display apparatus 100. Further light rays 32 may be preferentially transmitted through the extraction reflectors 170 rather than reflected at the extraction reflectors 170. Advantageously image contrast of overlayed virtual images may be increased and double imaging reduced.

As illustrated in FIG. 3C, some light may return to the input side 2. It would be desirable to minimise cross-talk and increase contrast of the anamorphic near-eye display apparatus 100.

Figures 6D, 6E:
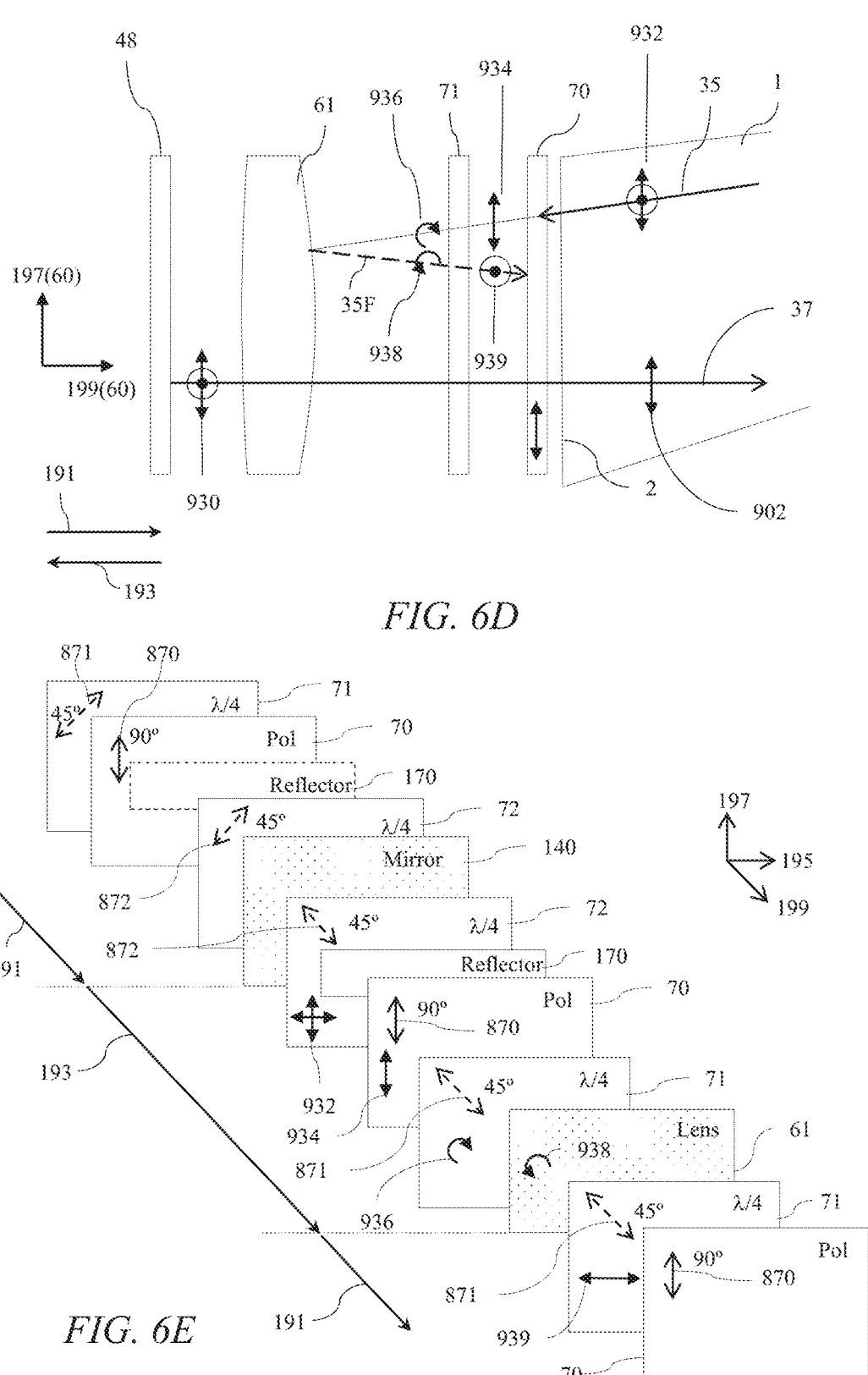
FIG. 6D is a schematic diagram illustrating a side view of optical isolation for an anamorphic near-eye display apparatus comprising an emissive spatial light modulator.
FIG. 6E is a schematic diagram illustrating optical axis alignment directions through the polarization control components of FIG. 6D.

FIG. 6D is a schematic diagram illustrating a side view of optical isolation near the input end 2 an anamorphic near-eye display apparatus 100 comprising an emissive spatial light modulator 48; and FIG. 6E is a schematic diagram illustrating optical axis alignment directions and polarization states through the unfolded polarization control components of FIG. 6D. Features of the embodiment of FIGS. 6D-E not discussed in further detail may be assumed to correspond to the features with equivalent reference numerals as discussed above, including any potential variations in the features.

In the alternative embodiment of FIGS. 6D-E, the optical system 250 further comprises: an input linear polarizer 70 disposed between the transverse anamorphic component 60 and the input end 2 of the extraction waveguide 1; and a polarization conversion retarder 71 with orientation of optical axis 871 disposed between the the the transverse anamorphic component 60 and the input linear polarizer 70, the polarization conversion retarder 71 being arranged to convert a polarization state of light passing therethrough between a linear polarization state 934, 939 and a circular polarization state 936, 938 respectively. The polarization conversion retarder 71 has a retardance of a quarter wavelength at a wavelength of visible light, for example 550 nm and may be a Pancharatnam stack of retarders for example. The retardance of the polarization conversion retarder 71 may be different to a quarter wavelength, but selected to provide the same effect. For example, the polarization conversion retarder 71 may have a retardance of three quarter wavelengths or five quarter wavelengths, for example.

In operation, light ray 37 from the spatial light modulator 48 is output with unpolarised light state 930 and then polarised by input linear polarizer 70 to provide linear polarization state 902 in the extraction waveguide 1. Some light rays 35 as described elsewhere herein may return towards the input end 2 and are transmitted through the input linear polarizer 70.

The light ray 35 which is returning in the second direction 193 along the extraction waveguide 1 towards the input end 2 may have been partially depolarised within the extraction waveguide 1 and has incident polarization state 932 that can be considered a superposition of p-polarised and s-polarised polarization states. Linear polarization state 934 which is p-polarised is transmitted by the input linear polarizer 70 while the orthogonal (s-polarised) polarization state is absorbed. Light ray 35 with p-polarization state 934 is converted to circular polarization state 936 by the polarization conversion retarder 71 and is incident on surfaces of transverse lens 61 and spatial light modulator 48. Fresnel reflections of rays 35F at said surfaces are reflected back towards the additional polarization conversion retarder 71 with a $\pi$ phase shift so that the orthogonal polarization state 938 is reflected. Polarization conversion retarder 71 provides s-polarised polarization state 939 which is absorbed by the input linear polarizer 70. Back reflections from the spatial light modulator 48 and transverse lens 61 are advantageously reduced. Additional polarization conversion retarder 71 thus provides optical isolation of such returning light rays 35 such that light rays 35F that are reflected from surfaces of the transverse lens 61 back into the extraction waveguide 1 are reduced. Advantageously image contrast is increased.

Input linear polarizer 70 and an additional polarization conversion retarder 71 may be bonded to the input end 2. Advantageously improved reduction of reflections from the input end may be achieved.

Figure 6F:
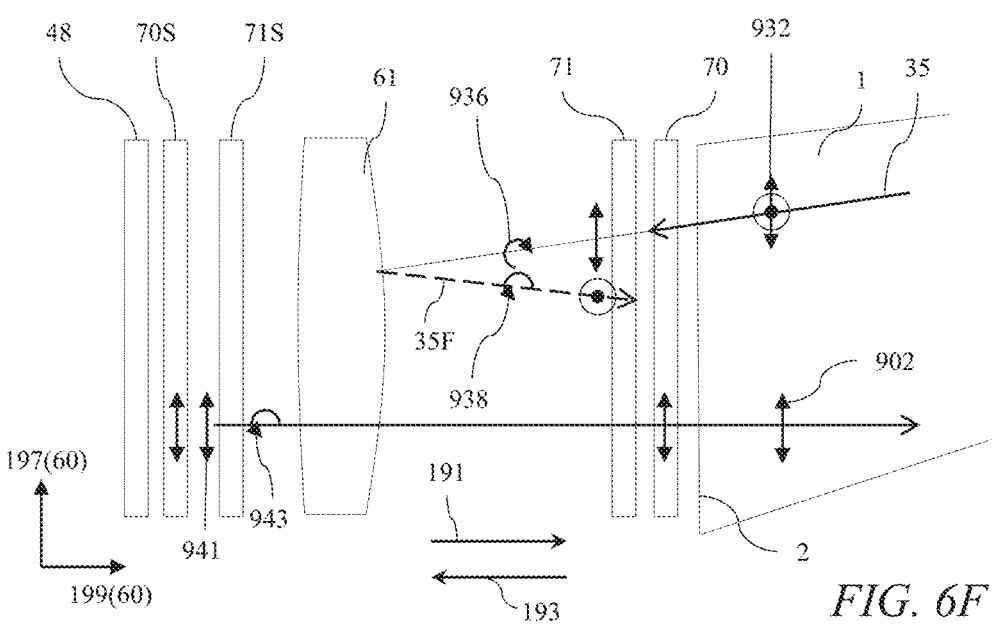
FIG. 6F is a schematic diagram illustrating a side view of optical isolation for an anamorphic near-eye display apparatus comprising a transmissive or reflective spatial light modulator.
Figure 6G:
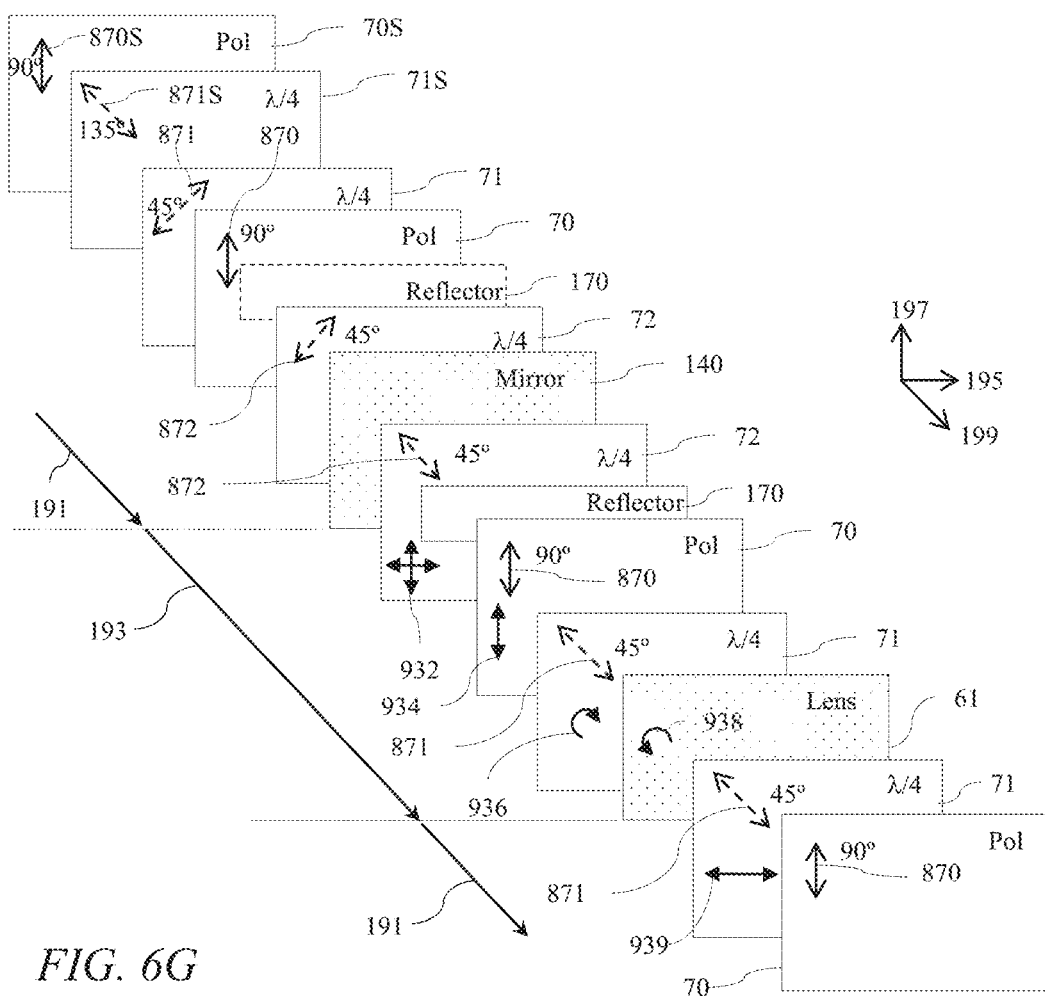
FIG. 6G is a schematic diagram illustrating optical axis alignment directions through the polarization control components of FIG. 6F.

FIG. 6F is a schematic diagram illustrating a side view of optical isolation for an anamorphic near-eye display apparatus 100 comprising a transmissive or reflective spatial light modulator 48; and FIG. 6G is a schematic diagram illustrating optical axis alignment directions through the polarization control components of FIG. 6F. Features of the embodiment of FIGS. 6F-G not discussed in further detail may be assumed to correspond to the features with equivalent reference numerals as discussed above, including any potential variations in the features.

In comparison to FIG. 6D, in the alternative embodiment of FIG. 6F the spatial light modulator 48 comprises an output linear polarizer 70S and a further polarization conversion retarder 71S with optical axis direction 871S. In operation, the input linear polarizer 70 and polarization conversion retarder 71 operate as for FIG. 6D. Output linear polarizer 70S provides a linear polarization state 941 that is transmitted through the further polarization conversion retarder 71S to provide a circular polarization state 943. Said polarization state 943 is converted back to a linear polarization state 902 by the polarization conversion retarder 71 and transmitted through the input linear polarizer 70. Advantageously brightness and contrast may be improved in spatial light modulators 48 comprising a polarised output such as LCD and LCOS.

The operation of the extraction reflectors 170 will now be further described.

Figure 7A:
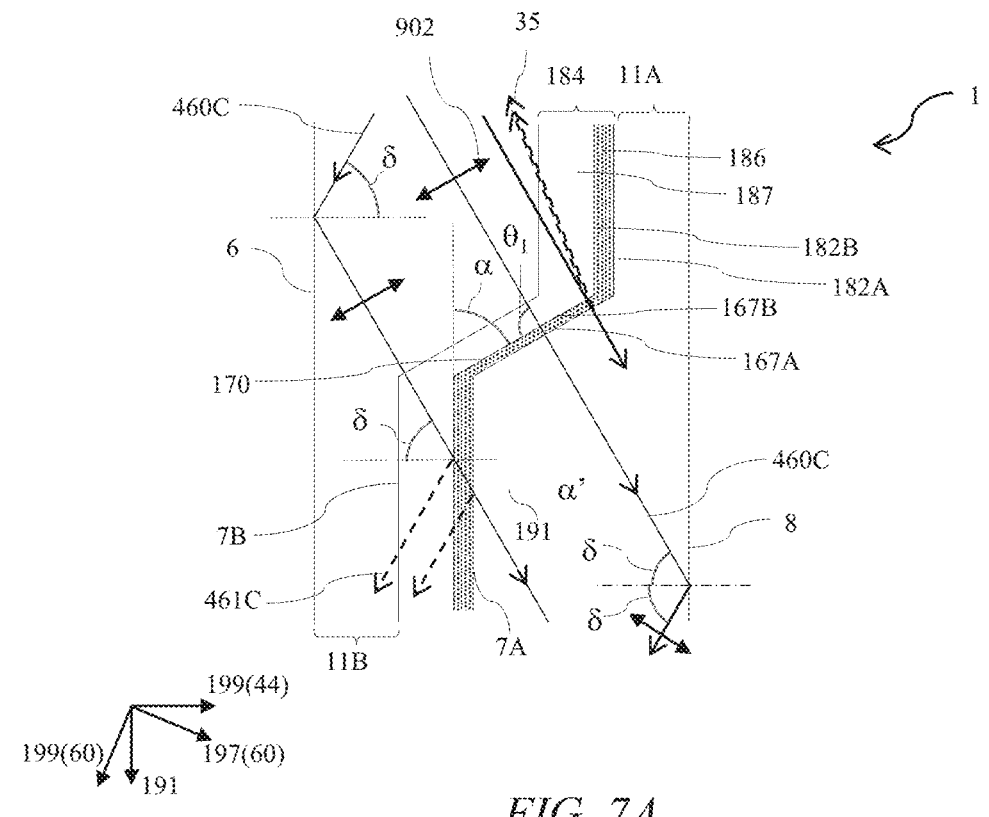
FIG. 7A is a schematic diagram illustrating a side view of propagation of polarised input light around an extraction reflector.
Figure 7B:
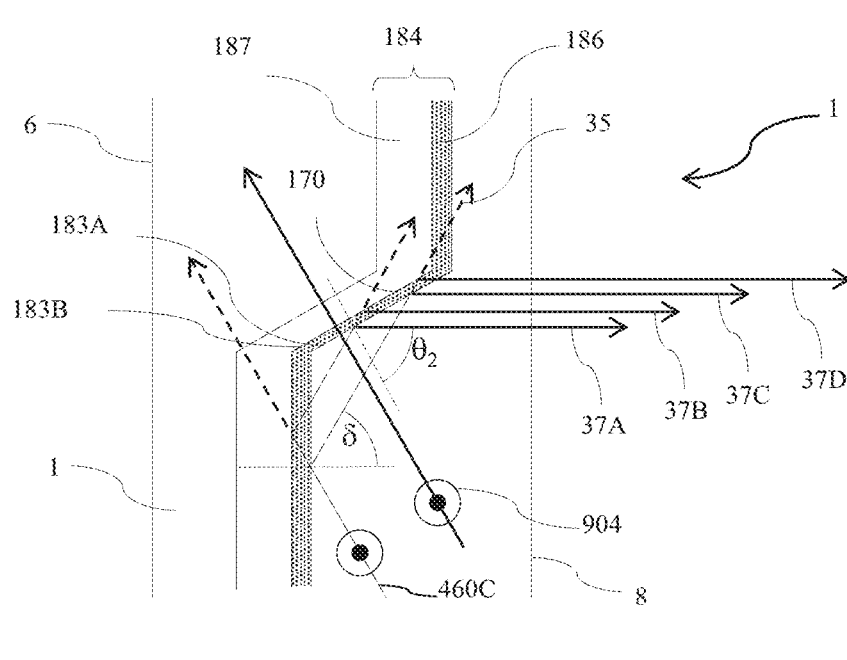
FIG. 7B is a schematic diagram illustrating a side view of propagation of polarised light after reflection from the reflective end around an extraction reflector comprising a single dielectric layer.
Figures 7C, 8A, 8B:
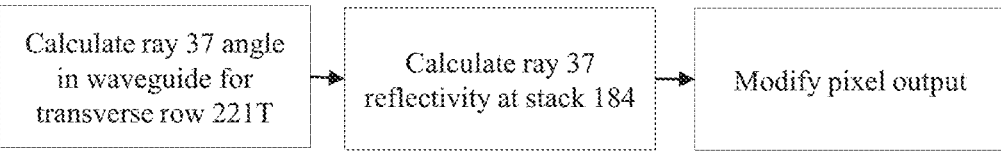
FIG. 7C is a schematic diagram illustrating a side view of propagation of polarised light after reflection from the reflective end around an extraction reflector comprising a stack of dielectric layers.
FIG. 8A is a schematic graph illustrating the variation of reflectivity against wavelength for light rays propagating through an extraction reflector comprising dielectric layers set out in TABLE 2.
FIG. 8B is a flowchart illustrating compensation of pixel data for pixel location in the transverse direction.

FIG. 7A is a schematic diagram illustrating a side view of propagation of polarised input light ray 460C around an extraction reflector 170 in the first direction 191; FIG. 7B is a schematic diagram illustrating a side view of propagation of polarised light after reflection from the light reversing reflector 140 around an extraction reflector 170 comprising a single dielectric partially reflective layer 184; and FIG. 7C is a schematic diagram illustrating a side view of propagation of polarised light after reflection from the light reversing reflector 140 around a light reflecting feature comprising a stack of dielectric layers. Features of the embodiment of FIGS. 7A-B not discussed in further detail may be assumed to correspond to the features with equivalent reference numerals as discussed above, including any potential variations in the features.

In the alternative embodiment of FIG. 7A, the extraction waveguide 1 comprises plural constituent parts 11A, 11B having facing stepped surfaces 7A, 7B attached together, the stepped surfaces of the constituent parts 11A, 11B being shaped with alternating extraction surfaces 170 extending in the transverse direction 197(60) and intermediate surfaces 172 extending along the extraction waveguide 1, wherein the extraction reflectors 170 comprise the facing extraction surfaces 7A, 7B.

In an illustrative method of fabrication, the extraction waveguide 1 may comprise a first plural constituent part 11A comprising light guiding surface 8 and stepped surface 7A and has the dielectric coating 184A formed on the stepped surface 7A. A second plural constituent part 11B comprising light guiding surface 6 and stepped surface 7B is aligned to the first plural constituent part 11A and an adhesive layer 184B is provided to attach the two stepped waveguides such that the extraction reflectors 170 are disposed internally within the extraction waveguide 1.

In the embodiment of FIGS. 7A-C the extraction reflectors 170 comprise extraction surfaces 167A, 167B spaced apart by a partially reflective coating 184. Further the intermediate reflectors 172 comprise intermediate surfaces 182A, 182B spaced apart by the partially reflective coating 184.

The partially reflective coating 184 comprises at least one dielectric layer 186 and in the embodiment of FIGS. 7A-B comprises a primary dielectric layer 186 and an adhesive layer 187. In the illustrative embodiment of FIGS. 7A-C the adhesive layer 187 is an index-matched layer matched to the refractive index of the stepped waveguides 1A, 1B and does not contribute to the reflectivity of the partially reflective coating 184.

In the present embodiments, the extraction reflectors 170 comprise a partially reflective coating 184 comprising a set of layers comprising items 11A, 186, 187, 11B.

In alternative embodiments, the adhesive layer 187 may comprise a dielectric material with a different refractive index to the plural constituent parts 11A, 11B to modify the reflectivity of the partially reflective coating 184. The set of layers may thus alternatively comprise adhesive layer 187 arranged between the constituent parts 11A, 11B wherein the refractive index of the adhesive layer 187 is different to the refractive index of the constituent parts 11A, 11B and further dielectric layers are omitted. In other words, the dielectric layer 186 may comprise an adhesive layer 187.

In FIG. 7A and as referring to FIG. 3A hereinabove, the light ray 460C propagating along the extraction waveguide 1 in the first direction 191 has an angle of incidence δ at the opposed rear and front guide surfaces 6, 8. Ray 460C is then incident onto the extraction reflector 170 at an angle of incidence $\theta_1$ that for the embodiment of TABLE 1 is 90 degrees. Some light is reflected along rays 35 back towards the input end 2 by Fresnel reflectivity at the extraction surfaces 167A, 167B. Light ray 460C is also transmitted to continue guiding along the extraction waveguide 1.

For the case of $\theta_1$ being normal to the surfaces 167A, 167B transmission of p-polarised state 902 is the same as the transmission of the s-polarised state. Light rays 461C illustrate reflection from the intermediate surfaces 172 that are inclined at angle δ and thus have lower reflectivity for p-polarised light state 192 compared to s-polarised light as will be described further hereinbelow. Light ray 460C with p-polarised state 192 is thus preferentially transmitted through the intermediate surfaces. Advantageously light is not trapped in the plural constituent part 11B or in the plural constituent part 11A and efficiency is increased.

In other words, the extraction waveguide 1 comprises at least two constituent parts 11A, 11B having corresponding stepped surfaces 7A, 7B shaped as alternating risers and treads, the stepped surfaces 7A, 7B being optically coupled together so that the risers are optically coupled and the treads are optically coupled, wherein the extraction reflectors 170 are formed between the optically coupled risers 167 of the stepped surfaces 7A, 7B of the constituent parts 11A, 11B.

In FIG. 7B, a proportion of the light ray 460C is extracted as light rays 37A-D. The light ray 37A propagating along the extraction waveguide 1 in the second direction 193 has an angle of incidence δ at the intermediate surface 172 and is reflected by the Fresnel reflectivity of the interface between the dielectric layer 186 and plural constituent part 11A material. The light then reflects from the extraction surface 167A of the extraction reflector 170 to be output through the second light guiding surface 8. In the embodiment of TABLE 2, the angle $\theta_2$ is the same as the angle $\alpha$ and the ray 37A is output along the normal to the surface 8. The s-polarization state 904 is preferentially reflected at the extraction reflector 170 in comparison to the p-polarization state 902 of FIG. 7A, as will be illustrated hereinbelow with regards to FIG. 8A. Further reflected output light 37B-D is provided from respective reflections at the rear surfaces 167B.

The extraction waveguide 1 thus preferentially outputs light after reflection from the light reversing reflector 140. Advantageously efficiency is increased and glare of light that is output from the waveguide away from the eye 45 is reduced.

The partially reflective extraction reflectors 170 achieve improved uniformity by reducing or eliminating dark bands across the transverse direction 197 as will now be described. Byway of comparison with the present embodiments, if for example the extraction reflectors 170 were arranged to be entirely opaque for light from the input end 2 propagating in the direction 191 then they may block some angles of the input light cone measured by a detector placed at the lateral anamorphic component 110, and thus create 'holes' in the angular distribution of light across the transverse direction 197. The reflected light distribution from the light reversing reflector 140 also contains the holes and is directed towards the pupil 44 location within the exit pupil 40. If such holes were to be present then they would be visible as dark bands in the image across the transverse direction 197. Such partially reflective extraction reflectors 170 provide light onto the lateral anamorphic component 110 that provides some luminous intensity across the full cone of input angles that are directed from the transverse lens 61 through the input end. Thus a reduction of the visibility of holes in the output distribution of light to the pupil 44 and improved image uniformity for angles across the lateral direction 197 is achieved.

It may be desirable to further increase the efficiency of reflection from the extraction reflectors 170.

In an alternative embodiment, the partially reflective coating 184 may be metallic. The thickness of the metal layer may be adjusted during fabrication to optimize the reflectivity of the extraction reflector 170 and intermediate surface 172.

In the alternative embodiment of FIG. 7C, the partially reflective coating 184 comprises a stack 185 of dielectric layers 186A-E with alternating high and low refractive indices. An illustrative embodiment is provided in TABLE 2. The stack 185 of dielectric layers 186A-E may be formed on one or both of the plural constituent parts 11A, 11B by evaporation or sputtering for example and the extraction waveguide 1 assembled by alignment of the plural constituent parts 11A, 11B.

TABLE 2

| Item | Illustrative material | Refractive index | Thickness (nm) |
|---|---|---|---|
| Plural constituent part 11A | PMMA | 1.50 | — |
| Dielectric layer 186A | $TiO_2$ | 2.6 | 7 |
| Dielectric layer 186B | $SiO_2$ | 1.5 | 79 |
| Dielectric layer 186C | $TiO_2$ | 2.6 | 21 |
| Dielectric layer 186D | $SiO_2$ | 1.5 | 30 |
| Dielectric layer 186E | $TiO_2$ | 2.6 | 45 |
| Adhesive layer 187 | Acrylate | 1.56 | — |
| Plural constituent part 11B | PMMA | 1.49 | — |

Such a stack advantageously increases the reflectivity at each extraction surface 183 by increasing the number of Fresnel reflections and further the reflections may be arranged to interfere at desirable angles for extracted light rays 37.

Considering the material of the plural constituent parts 11A, 11B, a material with higher refractive index such as polycarbonate or high index glasses may be used. Advantageously increased field of view, $\phi_T$ may be provided in the transverse direction.

Polarization selectivity of reflections at the extraction surfaces 180 will now be considered further.

FIG. 8A is a schematic graph illustrating the variation of reflectivity against wavelength for the illustrative embodiment of TABLE 2.

Profile 810 illustrates the total p-polarization state 902 reflectivity for a single reflection from the dielectric stack 185 while profile 812 illustrates the total s-polarization state 904 reflectivity for a single reflection from the dielectric stack 185 wherein the thicknesses of TABLE 2 are arranged to provide approximately 25% reflectivity for each reflection. Adjustment of the thicknesses and/or increased number of layers may be used to adjust the reflectivity to achieve desirable reflectivity of the s-polarization state 904 light ray 37.

Referring to FIG. 3A, there may be some variation of reflectivity with transverse ray angle within the cone $491_T$. It would be desirable to provide a uniform luminance with viewing angle to the pupil 44.

FIG. 8B is a flowchart illustrating compensation of pixel data for pixel location in the transverse direction. For each transverse pixel angle (for example for each row 221T of FIG. 2A), the angle of incidence $\theta_2$ onto the surfaces dielectric stack 185 varies and subsequently the reflectivity. The total output reflectivity for each row 221T may be adjusted to compensate for the variation in reflectivity.

Alternative arrangements of extraction waveguides 1 will now be further described.

FIGS. 9A-E are schematic diagrams illustrating side views of alternative arrangements of extraction waveguides 1. Features of the embodiments of FIGS. 9A-E not discussed in further detail may be assumed to correspond to the features with equivalent reference numerals as discussed above, including any potential variations in the features.

Figures 9A, 9B:
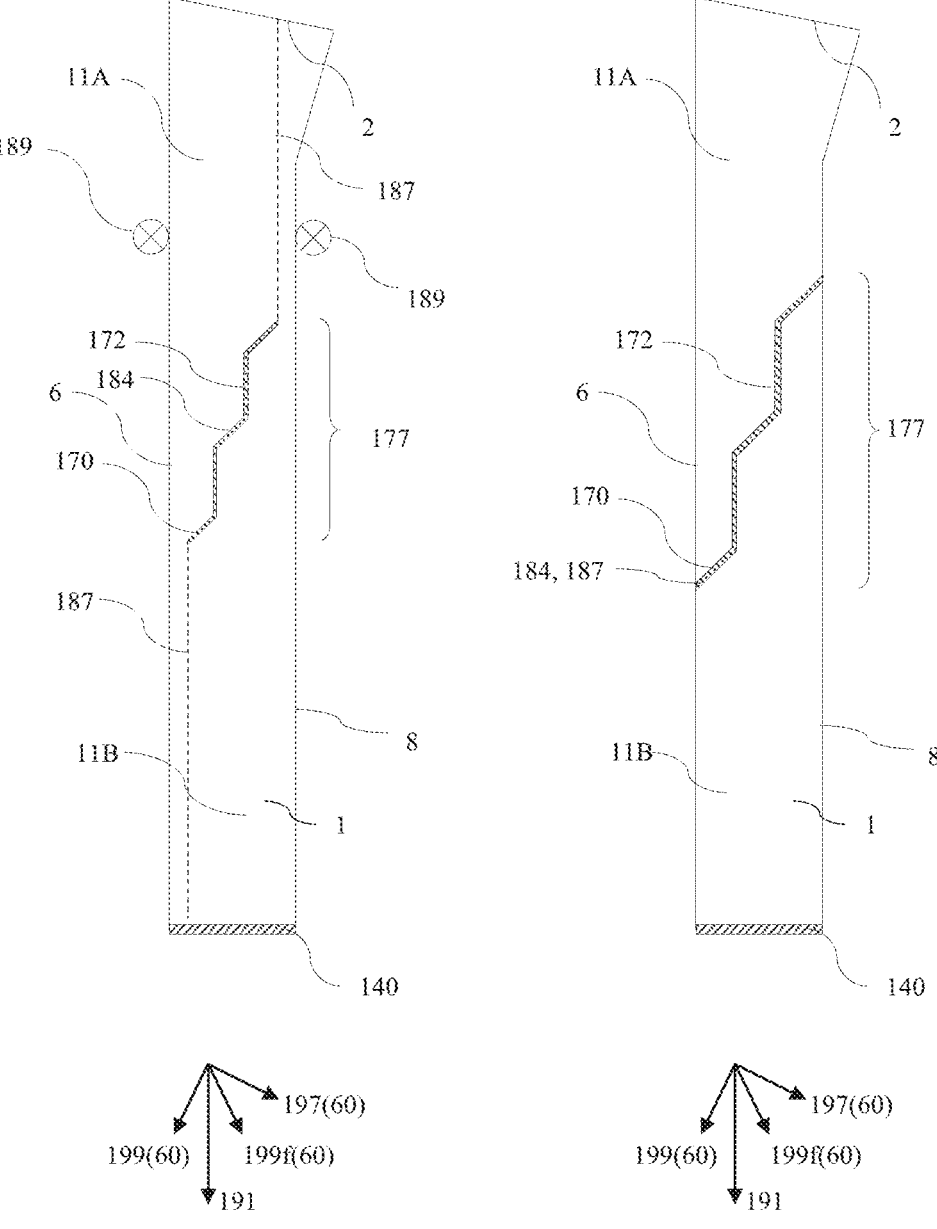

In the alternative embodiments of FIG. 6A and FIG. 9A, the extraction reflectors 170 do not extend to opposing rear and front guide surfaces 6, 8 of the extraction waveguide 1.

In comparison to the embodiment of FIG. 6A, the extraction waveguide 1 of FIG. 9A has opposing rear and front guide surfaces 6, 8 having an anti-reflection coating 189. Such anti-reflection coatings 189 do not modify the total internal reflection of guided light rays within the waveguide. However, light rays 37 and other light rays that are extracted from the extraction waveguide 1 may provide double imaging from Fresnel reflections at the surfaces 6, 8. The anti-reflection coatings 189 advantageously achieve reduced double imaging and increased image contrast.

Further the embodiment of FIG. 9A illustrates adhesive layer 187 location. The plural constituent parts 11A, 11B may be fabricated separately by molding for example. Partially reflective coatings 184 may be provided over at least part 320 of at least one of the plural constituent parts 11A, 11B. After coating the stepped waveguides may be attached in alignment with adhesive layer 187. The rear and front guide surfaces 6, 8 may be formed during molding of plural constituent parts 11A, 11B, advantageously to achieve high optical quality for light guiding.

In comparison to the embodiment of FIG. 6A, in the alternative embodiment of FIG. 9B, the extraction reflectors 170 extend to opposing rear and front guide surfaces 6, 8 of the extraction waveguide 1. During an assembly step, the coated plural constituent parts 11A, 11B may be aligned with adhesive layer. After bonding, the rear and front guide surfaces 6, 8 may further be polished to provide desirable optical quality for light guiding. Efficiency of light extraction may advantageously be increased and stray light directed back towards the input end advantageously reduced.

In alternative embodiments, not shown, one of the rear and front guide surfaces 6, 8 may be formed during moulding of one of the plural constituent parts 11A, 11B and the other of the rear and front guide surfaces 6, 8 may be formed by polishing the respective other light guiding surface 6, 8 after assembly.

It may be desirable to increase the size of the extraction reflectors 170 and the size of the exit pupil $e_T$ in the transverse direction.

Figures 9C, 9D:
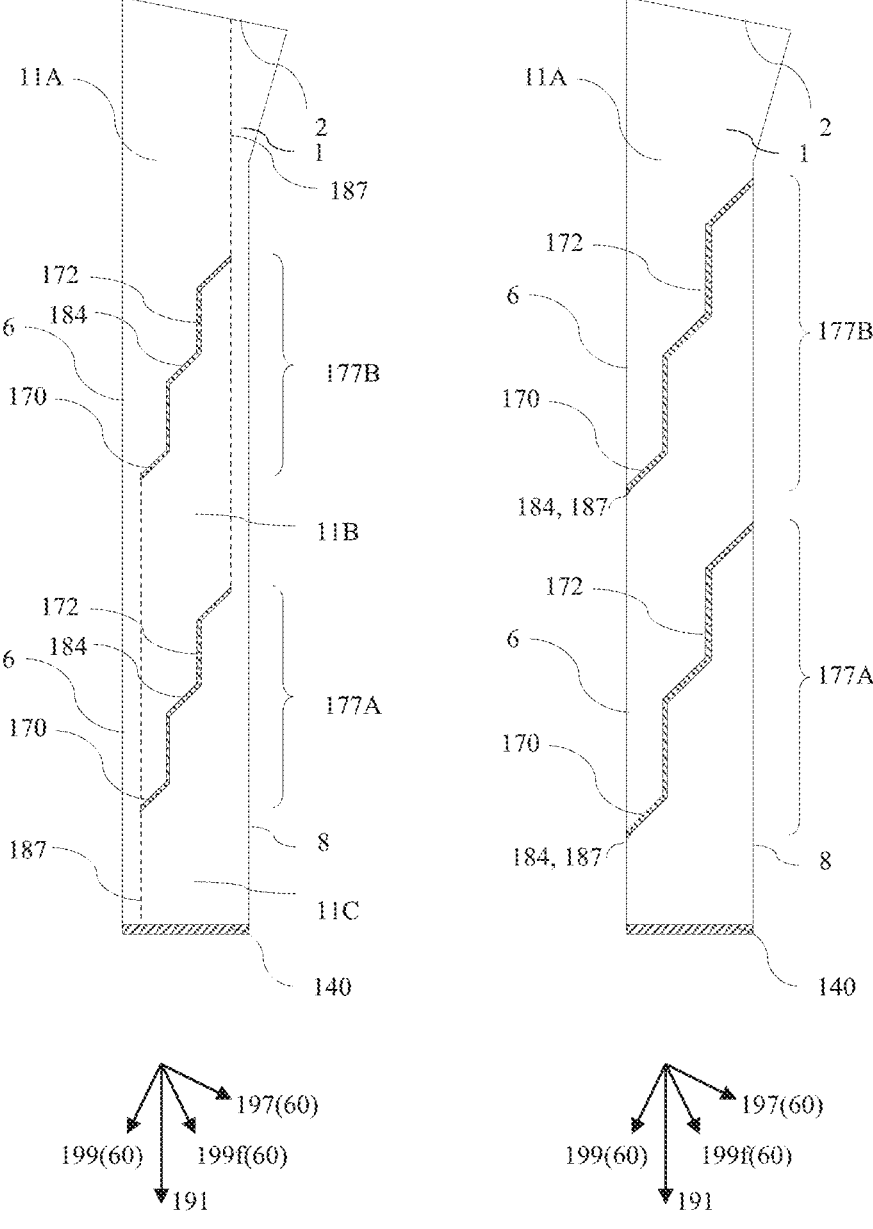

In comparison to the embodiment of FIG. 6A, in the alternative embodiment of FIG. 9C, the extraction reflectors 170 comprise plural sets 177A, 177B of extraction reflectors 170, wherein, within each set 177A, 177B of extraction reflectors 170, in the transverse direction 197(60) the extraction reflectors 170 extend partially across the extraction waveguide 1 with successively shifted positions, the extraction reflectors 170 of different sets 177A, 177B overlapping in extent in the transverse direction 197.

In comparison to the embodiment of FIG. 6A, in the alternative embodiment of FIG. 9D, the extraction reflectors 170 comprise plural sets 177A, 177B of extraction reflectors 170, wherein, within each set 177A, 177B of extraction reflectors 170, in the transverse direction 197(60) the extraction reflectors 170 extend to opposed rear and front guide surfaces across the extraction waveguide 1 with successively shifted positions, the extraction reflectors 170 of different sets 177A, 177B overlapping in extent in the transverse direction 197.

During fabrication, the arrangements of FIGS. 9C-D may be provided comprising plural constituent parts 11A, 11B, 11C in a similar manner to that described with respect to FIGS. 9A-B.

The embodiments of FIGS. 9C-D achieve increased region over which the light is extracted to the eye. The size of the exit pupil $e_T$ in the transverse direction is advantageously increased. Further, the size resolved in the direction 191 of the extraction reflectors 170 is increased for a given pitch of extraction reflectors 170 and extraction waveguide 1 thickness t. Considering FIG. 1F, the height 454 of the pixel blur ellipse 452 due to diffraction of light reflected from the extraction reflectors 170 in the transverse direction is advantageously reduced.

In the alternative embodiment of FIG. 9E, the intermediate surfaces 172 are optically coupled together. Adhesive layer 187 may be arranged between the extraction reflectors 170 that may be a layer with a similar refractive index to the plural constituent parts 11A, 11B. During fabrication, intermediate regions between the extraction reflectors may be masked so that no partial reflector 184 is provided. During the alignment of the plural constituent parts 11A, 11B, intermediate regions are optically removed. Advantageously trapping of light may be reduced and extraction efficiency increased.

The arrangements of FIGS. 9A-E may be used in alternative combinations to those illustrated. For example, the optically coupled intermediate surfaces 172 of FIG. 9E may be used in the arrangements of FIGS. 9A-D.

It may be desirable to reduce the fabrication cost of the optical coatings of FIGS. 9A-E.

FIG. 10 is a schematic diagram illustrating a side view of an extraction waveguide 1 comprising a gap 175. Features of the embodiment of FIG. 10 not discussed in further detail may be assumed to correspond to the features with equivalent reference numerals as discussed above, including any potential variations in the features.

In the alternative embodiment of FIG. 10, the extraction waveguide 1 comprises plural constituent parts 11A, 11B having facing stepped surfaces 7A, 7B that are spaced apart by a gap 175, the stepped surfaces 11 being shaped with alternating extraction surfaces 170 extending in the transverse direction 197(60) and intermediate surfaces 172 extending along the extraction waveguide 1, wherein the extraction reflectors 170 comprise the facing extraction surfaces 7A, 7B.

In other words, the extraction reflectors 170 thus comprise extraction surfaces 170AA and 170BA, 170AB and 170BB, and 170AC and 170BC spaced apart by a gap 175 and the intermediate reflectors 172 comprise intermediate surfaces 172AA and 172BA, 172AB and 172BB, and 172AC and 172BC spaced apart by a gap 181.

The gap may typically comprise air or may comprise another material such as an inert gas. The gap achieves total internal reflection for most, or all of the input rays from the input end 2 as will be described further with respect to FIGS. 11A-E hereinbelow.

In comparison to the embodiment of FIG. 9B, the embodiment of FIG. 10 has advantageously reduced complexity. Further the reflections from the extraction reflectors 170 and intermediate surfaces 172 are provided by total internal reflection rather than Fresnel reflections and so have reduced variation or reflectivity with wavelength and with field angle. Image uniformity to the eye 45 is improved.

The extraction surfaces 170, intermediate surfaces 172 and opposing rear and front guide surfaces 6, 8 further comprise an optional anti-reflection coating 189. Advantageously stray light and double images from light that is not guiding within the extraction waveguide 1 may be reduced.

FIGS. 11A-E are schematic diagrams illustrating side views of alternative arrangements of extraction waveguides 1 comprising a gap. Features of the embodiment of FIGS. 11A-E not discussed in further detail may be assumed to correspond to the features with equivalent reference numerals as discussed above, including any potential variations in the features.

The operation of the alternative embodiment of FIG. 10 will now be illustrated in FIGS. 11A-B.

FIG. 11A illustrates light input into the extraction waveguide 1 from input end 2. Light ray 462 is transmitted through extraction surfaces 170AA, 170BA and is then guided by surfaces 172BA, 8 by total internal reflection; and light ray 463 is guided by surfaces 172AA, 6 by total internal reflection and transmitted through extraction surfaces 170AC, 170BC. By comparison, light ray 464 is guided in the waveguide constituent part 11A until it undergoes total internal reflection at a surface 172A and then a surface 170A at which it is output away from the eye 45.

In comparison to the embodiment of FIG. 1A, the input linear polarizer 70 and polarization conversion retarder 72 are omitted because the selectivity of the extraction reflectors 170 is primarily determined by whether total internal reflection at the gap 175 is present or not, and as such is independent of polarization state of incident light. Advantageously cost is reduced.

FIG. 11B illustrates ray paths for light after reflection from the light reversing reflector 140. For extracted light ray 37, light is guided between surfaces 6, 8 and 172AB and then output by means of total internal reflection at surface 170BB. By comparison, some light rays 465 are directed back towards the input end 2 and are lost.

In comparison to the embodiment of FIG. 10A, in the embodiment of FIG. 11C, the waveguide constituent part 11A comprises a first input end 2A and waveguide constituent part 11B comprises input end 2B that is co-planar with input end 2A, tapered surface 18 and non-extracting light guiding region 178BA. Such an arrangement provides light guiding surface 8 that is planar. Mechanical robustness of alignment of the extraction waveguide 1 may be improved, achieving increased image contrast and reduced double imaging.

In comparison to the embodiment of FIG. 11C, in the embodiment of FIG. 11D, the waveguide constituent part 11A comprises a further non-extracting light guiding region 178AB input guiding section. Such an arrangement provides rear and front guide surfaces 6, 8 that are planar. Mechanical robustness of alignment of the extraction waveguide 1 may be further improved, achieving increased image contrast and reduced double imaging.

In comparison to the embodiment of FIG. 11D, in the embodiment of FIG. 11E, the waveguide constituent part 11A is attached to the waveguide constituent part 11B by means of bond regions 326, 328 in the non-extracting light guiding region 178BA, 178AB respectively. In manufacture, the arrangement of FIG. 11D may be provided in alignment and adhesive material such as optically clear adhesive, pressure sensitive adhesives or UV cured adhesives may be provided in the regions 178AB, 178BA. After curing, bond regions 326, 328 may have similar refractive index to the material of the waveguide constituent parts 11A, 11B. Such an arrangement maintains light guiding between the parts 11A, 11B and improves mechanical robustness of the alignment of the extraction waveguide 1, achieving increased image contrast and reduced double imaging. Further a single input end 2 is provided, increasing efficiency and reducing stray light that may degrade image contrast.

Alternative arrangements for extraction reflector 170 and intermediate surface will now be described.

FIG. 12 is a schematic diagram illustrating a side view near an extraction reflector 170 comprising partially reflective material 171 and adjacent intermediate surfaces 172 comprising intermediate surface material 173. Features of the embodiment of FIG. 12 not discussed in further detail may be assumed to correspond to the features with equivalent reference numerals as discussed above, including any potential variations in the features.

As described hereinabove, the surface reflectivity from the extraction reflector 170 may be provided by (i) a single dielectric layer, (ii) a dielectric stack, (iii) a metal material, (iv) a gap such as an air gap; and the surface reflectivity from the intermediate reflector 172 may be provided by (i) a single dielectric layer, (ii) a dielectric stack, (iii) a metal material, (iv) a gap such as an air gap, (v) optical coupling. The extraction reflectors 170 and intermediate surfaces 172 may be provided with various combinations of surface reflectivities to achieve different desirable properties optically and mechanically as discussed above and as illustrated in TABLE 3.

TABLE 3

| Material 171 at extraction reflector 170 | Material 173 at intermediate surface 172 |
|---|---|
| Dielectric layer | Dielectric layer |
| | Dielectric stack |
| | Metal |
| | Gap |
| | Optically coupled |
| Dielectric stack | Dielectric layer |
| | Dielectric stack |
| | Metal |
| | Gap |
| | Optically coupled |
| Metal | Dielectric layer |
| | Dielectric stack |
| | Metal |
| | Gap |
| | Optically coupled |
| Gap | Dielectric layer |
| | Dielectric stack |
| | Metal |
| | Gap |
| | Optically coupled |

Further to TABLE 3, the material and composition of the material at each extraction reflector 170 and each intermediate surface 172 may vary along the direction 191 of the extraction waveguide 1 as will be described further hereinbelow with respect to FIG. 18C for example.

FIG. 12 further illustrates the extraction reflectors 170 with tilt angle $\alpha$ and with height h across the extraction waveguide 1 in the direction 199(44); extent w along the extraction waveguide 1 in the direction 191; pitch s along the extraction waveguide 1 in the direction 191.

Illustrative arrangements of the stepped surfaces 7 comprising extraction reflectors 170 and intermediate surfaces 172 will now be described.

Figure 13C:
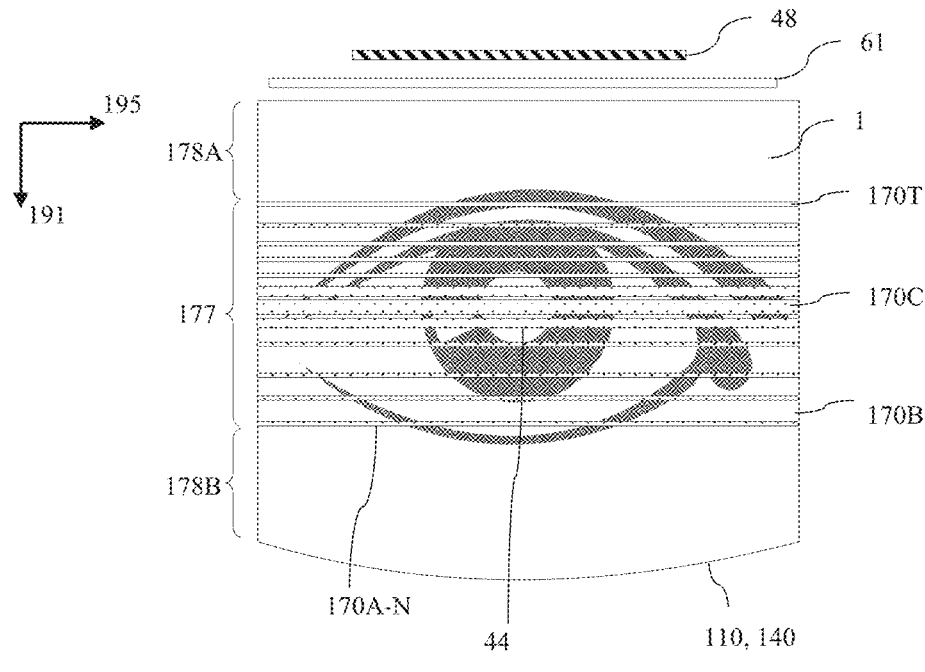
FIG. 13C is a schematic diagram illustrating in front view an arrangement of chirped extraction reflectors for a monocular near-eye anamorphic display apparatus.

FIG. 13A is a schematic graph of the variation of stepped surface 7 profiles with position in the direction 191 along the extraction waveguide 1 for various illustrative arrangements of stepped extraction waveguide surfaces 7; FIG. 13B is a schematic graph of the variations 371, 373 of facet width w with position along an extraction waveguide 1A in the first direction 191; and FIG. 13C is a schematic diagram illustrating in front view an arrangement of chirped extraction reflectors for a monocular near-eye anamorphic display apparatus. Features of the embodiments of FIGS. 13A-C not discussed in further detail may be assumed to correspond to the features with equivalent reference numerals as discussed above, including any potential variations in the features.

Profile 370 of FIG. 13A illustrates a stepped surface 7 comprising 60 degrees tilt extraction reflectors 170 arranged on a uniform 1 mm pitch, with approximately 0.49 mm step height h, and uniform 0.28 mm step extent w, as illustrated by profile 371 in FIG. 13B. The step extent, w provides a diffracting aperture for the light rays 37 directed towards the pupil 44 of the eye and so a diffractive blur is added to the image data in the transverse direction 197. It would be desirable to increase the extent w and thus reduce diffractive blur in the transverse direction, to minimise the blur ellipse height 454 in the transverse direction 197 of FIG. 1F.

Profile 372 of FIG. 13A, profile 373 of FIG. 13B and FIG. 13C illustrate an alternative embodiment wherein the extraction reflectors 170 have a varying pitch, s along the extraction waveguide 1 in the direction 191. Further, the extraction reflectors 170 have a varying extent w along the extraction waveguide 1 in the direction 191. Thus considering the central extraction reflector 170C, the extent w is 0.5 mm whereas the top extraction reflector 170T has an extent of 0.15 mm. Diffractive blur is reduced for light from the center of the extraction waveguide 1 which may be a preferred viewing location for the pupil 44. Thus high image quality may be achieved for the preferred viewing location, whereas off-axis imagery from the top and bottom extraction reflectors 170T, 170B is somewhat degraded. The best image quality is provided in the preferred viewing direction, advantageously achieving high image performance for the most commonly used image data.

Profile 374 of FIG. 13A illustrates an alternative embodiment wherein two sets of extraction reflectors 170 are provided, for example as further illustrated in the alternative embodiment of FIG. 9D. The extent w is increased for each step while maintaining a constant 1 mm pitch. Advantageously diffractive blur is reduced in comparison to the embodiment of the profile 370. Further, for a given extent w, the total thickness t of the extraction waveguide 1 may advantageously be reduced while achieving a desirable pitch p so that multiple extraction reflectors 170 overlap the pupil 44.

It would be desirable to further reduce the appearance of image blur due to diffraction in the lateral direction 197 from the extent w of the extraction reflectors 170.

Figure 13D:
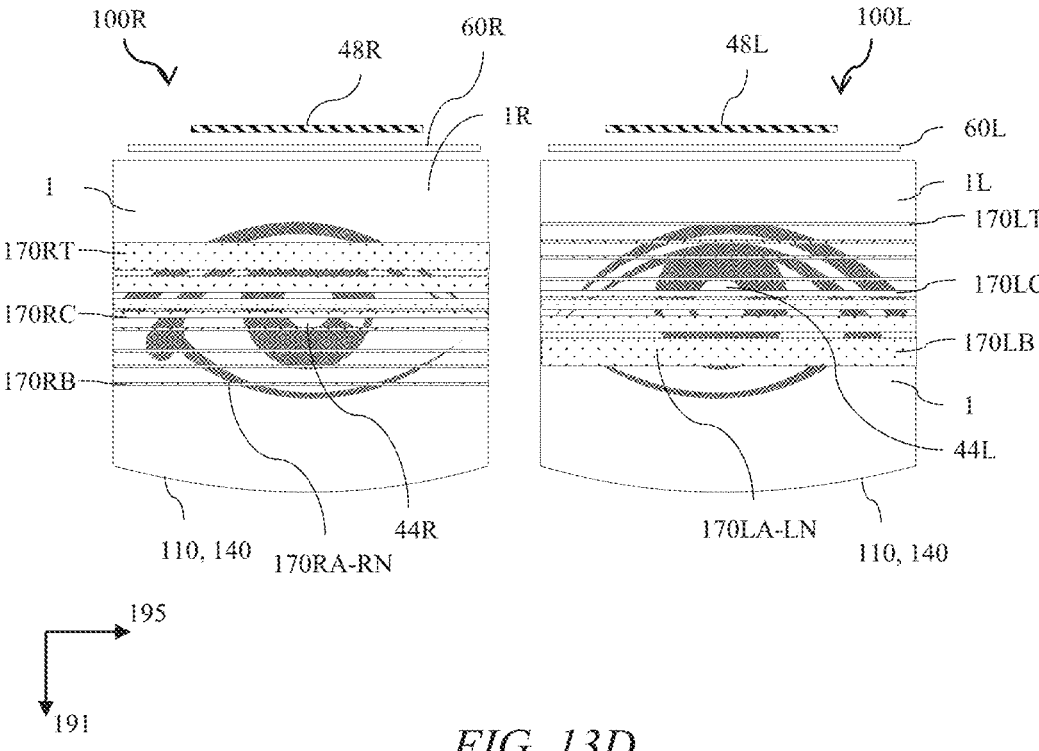
FIG. 13D is a schematic diagram illustrating in front view an arrangement of chirped extraction reflectors for a binocular near-eye anamorphic display apparatus.

FIG. 13D is a schematic diagram illustrating in front view an arrangement of chirped extraction reflectors 170 for a binocular near-eye anamorphic display apparatus 1. Features of the embodiment of FIG. 13D not discussed in further detail may be assumed to correspond to the features with equivalent reference numerals as discussed above, including any potential variations in the features.

In the alternative embodiment of FIG. 13D the extraction reflectors 170RA-RN for the pupil 44R of the right eye 45R have a first profile of pitch s and extent w in the first direction 191 along the extraction waveguide 1. Further the extraction reflectors 170LA-LN have a second profile of pitch s and extent w that is different to the first profile.

In the illustrative embodiment of FIG. 13D, the top extraction reflector 170RT for directing light towards the right pupil 44R has a large pitch and thus low diffraction blur while the bottom extraction reflector 170RB for directing light towards the right pupil 44R has a small pitch and thus increased diffraction blur. Further the top extraction reflector 170LT for directing light towards the left pupil 44L has a small pitch and thus higher diffraction blur while the bottom extraction reflector 170LB for directing light towards the left pupil 44L has a larger pitch and thus reduced diffraction blur. In operation, the human visual system may combine the two different blurs of the left-eye and right-eye images. Such combination may achieve perceived blur that is improved in comparison to arrangements in which the first and second profiles of pitch s and extent w are the same. Advantageously improved image quality may be perceived.

Head-wear 600 comprising the anamorphic near-eye display apparatus 100 will now be described.

Figures 14A, 14B, 14C:
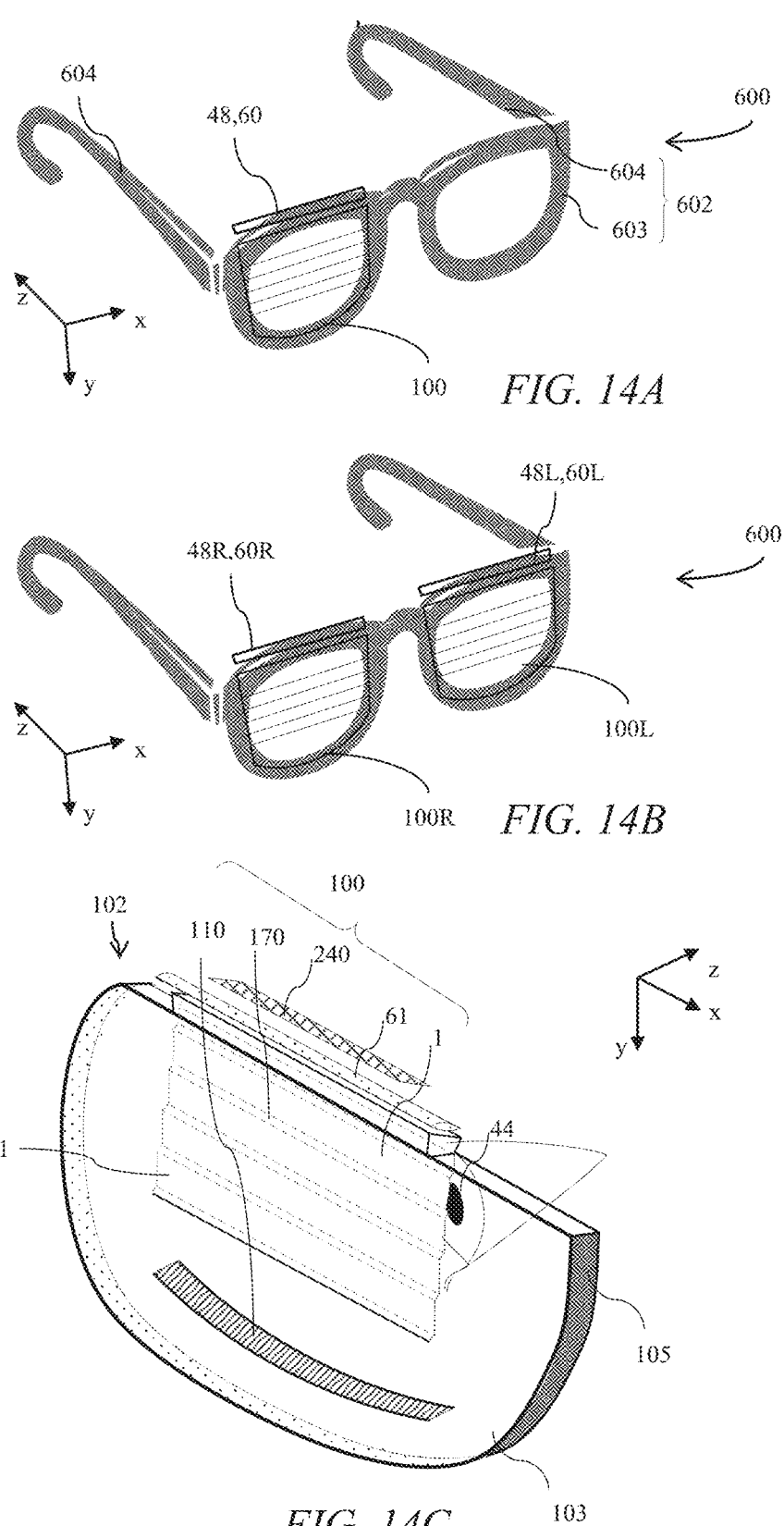
FIG. 14A is a schematic diagram illustrating in perspective front view an augmented reality head-worn display apparatus comprising a right-eye anamorphic display apparatus arranged with spatial light modulator in brow position.
FIG. 14B is a schematic diagram illustrating in perspective front view an augmented reality head-worn display apparatus comprising left-eye and right-eye anamorphic display apparatuses arranged with spatial light modulator in brow position.
FIG. 14C is a schematic diagram illustrating in perspective front view an eyepiece arrangement for an augmented reality head-worn display apparatus.

FIG. 14A is a schematic diagram illustrating in perspective front view augmented reality head-worn display apparatus 600 comprising a monocular anamorphic display apparatus arranged with spatial light modulator 48 and transverse anamorphic component 60 formed by the transverse lens 61 in brow position; and FIG. 14B is a schematic diagram illustrating in perspective front view augmented reality head-worn display apparatus 600 comprising binocular anamorphic display apparatuses 100L, 100R arranged with spatial light modulators 48R, 48L and transverse anamorphic components 60R, 60L in brow position. Features of the embodiments of FIGS. 14A-B not discussed in further detail may be assumed to correspond to the features with equivalent reference numerals as discussed above, including any potential variations in the features.

The head-worn display apparatus 600 may comprise a pair of spectacles 600 comprising the anamorphic near-eye display apparatus 100 described elsewhere herein that is arranged to extend across at least one eye 45 of a viewer 47 when the head-worn display apparatus 600 is worn. The head-worn display apparatus 600 may comprise a pair of spectacles comprising spectacle frames 602 with rims 603 and arms 604, which serve as a head-mounting arrangement arranged to mount the anamorphic near-eye display apparatus 100 on a head of a wearer with the anamorphic near-eye display apparatus 100 extending across at least one eye of the wearer. In general, any other head-mounting arrangement may alternatively be provided. The rims 603 and/or arms 604 may comprise electrical systems for at least power, sensing and control of the illumination system 240. The anamorphic near-eye display apparatus 100 of the present embodiments may be provided with low weight and may be transparent. The head-worn display apparatus 600 may be tethered by wires to remote control system or may be untethered for wireless control. Advantageously comfortable viewing of augmented reality content may be provided.

It may be desirable to provide improved aesthetic appearance of the anamorphic near-eye display apparatus 100.

FIG. 14C is a schematic diagram illustrating in perspective front view an eyepiece arrangement 102 for an augmented reality head-worn display apparatus 600 comprising an embedded display apparatus 100. Features of the embodiment of FIG. 14C not discussed in further detail may be assumed to correspond to the features with equivalent reference numerals as discussed above, including any potential variations in the features.

The eyepiece arrangement 102 may be arranged within the head-worn display apparatus 600 and may comprise the anamorphic near-eye display apparatus 100. The extraction waveguide 1 may be embedded with a substrate 103 that extends around the components 170, 110 of the anamorphic near-eye display apparatus 100. The shape of the substrate 103 may be profiled to fit various shaped head-worn display apparatus, for example spectacles. Advantageously aesthetic appearance may be improved.

The edge 105 of the substrate 103 may be provided with a light absorbing surface that absorbs incident light from the anamorphic near-eye display apparatus 100. The light absorbing surface may be a structured anti-reflection surface that is coated with an absorbing material. Advantageously image contrast is improved.

It may be desirable to change the illumination system 240 positioning in the head-worn display apparatus 600.

The eye-piece arrangement 102 comprising substrate 103 may further be provided for others of the embodiments of the present disclosure.

Figures 15A, 15B, 15C:
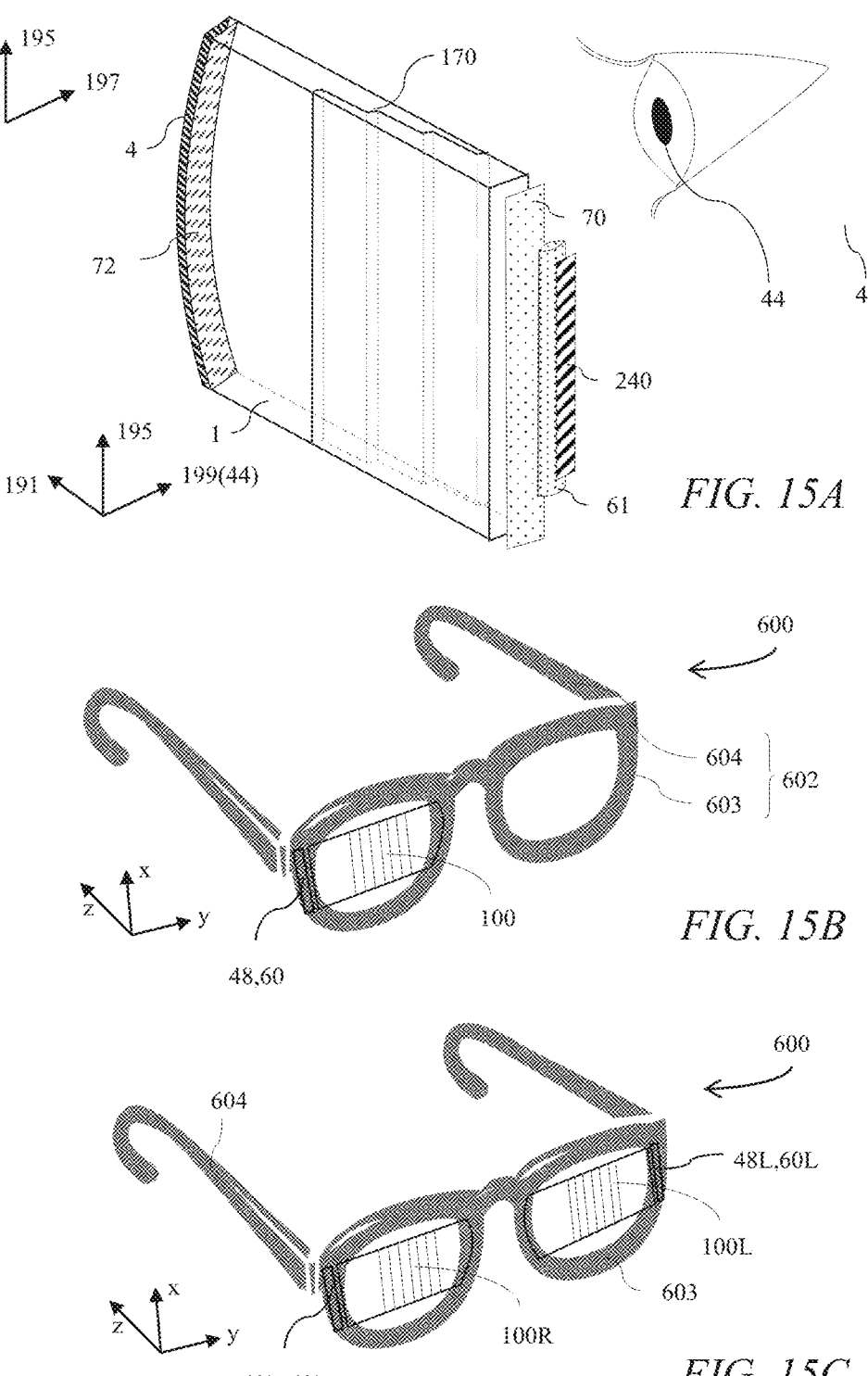
FIG. 15A is a schematic diagram illustrating in perspective front view an anamorphic near-eye display apparatus with spatial light modulator in temple position.
FIG. 15B is a schematic diagram illustrating in perspective front view an augmented reality head-worn display apparatus comprising a left-eye anamorphic display apparatus arranged with spatial light modulator in temple position.
FIG. 15C is a schematic diagram illustrating in perspective front view an augmented reality head-worn display apparatus comprising left-eye and right-eye anamorphic display apparatuses arranged with spatial light modulator in temple position.

FIG. 15A is a schematic diagram illustrating in perspective front view an anamorphic near-eye display apparatus 100 with spatial light modulator 48 in temple position; FIG. 15B is a schematic diagram illustrating in perspective front view augmented reality head-worn display apparatus 600 comprising a left-eye anamorphic display apparatus arranged with spatial light modulator in temple position; and FIG. 15C is a schematic diagram illustrating in perspective front view augmented reality head-worn display apparatus 600 comprising left-eye and right-eye anamorphic display apparatuses arranged with spatial light modulator in temple position. Features of the embodiments of FIGS. 15A-C not discussed in further detail may be assumed to correspond to the features with equivalent reference numerals as discussed above, including any potential variations in the features.

In comparison to the arrangement of FIG. 1A, the illumination system 240 is arranged on the side of the extraction waveguide 1 and the direction 191 in which the extraction waveguide 1 extends in the horizontal direction for the eyes 45 of the user. Thus the lateral direction 195 for the pupil 44 is vertical and the transverse direction 197 is horizontal. The anamorphic near-eye display apparatus 100 may be arranged within the arms of the head-wear 600, reducing the bulk of the rims 603 of the head-worn display apparatus 600. Advantageously the aesthetic appearance of the head-worn display apparatus 600 may be improved. Further the connectivity between the illumination system 240 and control electronics arranged in the arms 604 may be provided with reduced complexity, reducing cost.

It would be desirable to provide a virtual reality head-worn display apparatus 600 in which the head-worn display apparatus is not transparent to external images.

Figure 16A:
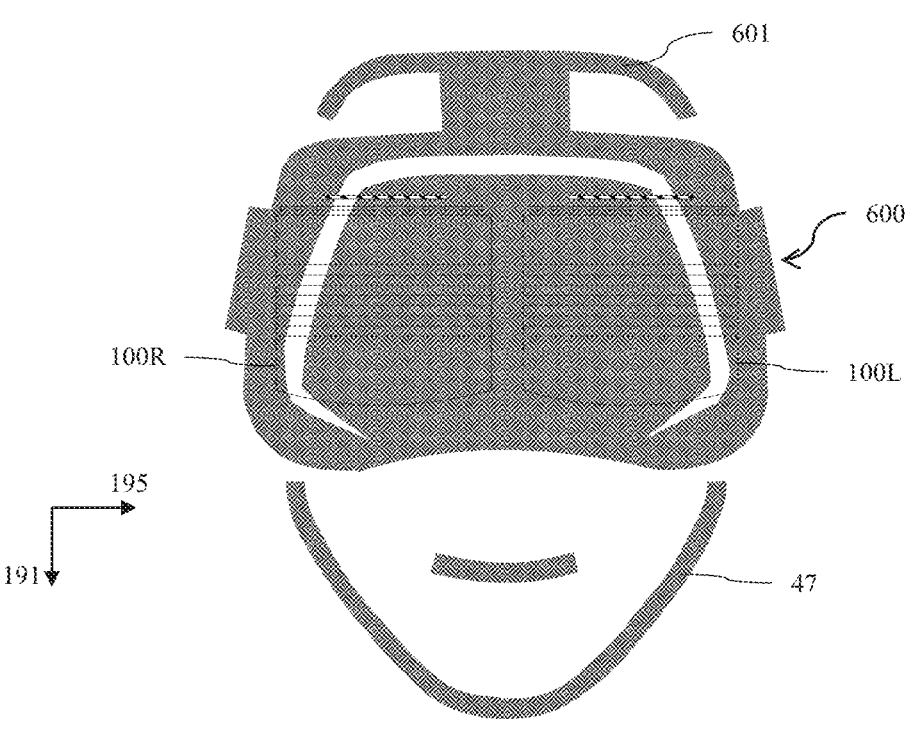
FIG. 16A is a schematic diagram illustrating in front view a virtual reality head-worn display apparatus comprising left-eye and right-eye anamorphic display apparatuses.
Figure 16B:
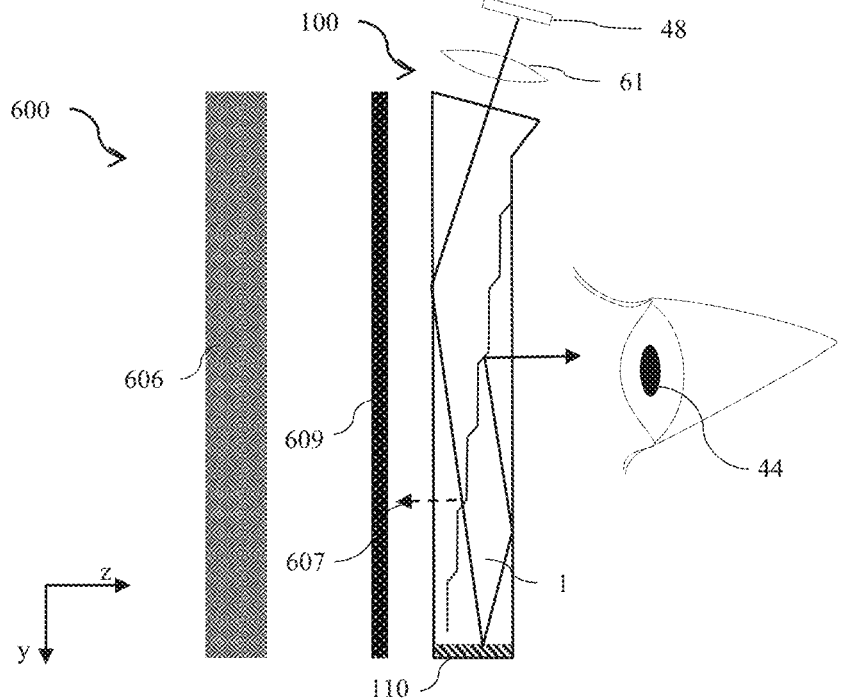
FIG. 16B is a schematic diagram illustrating in side view a virtual reality head-worn display apparatus comprising an anamorphic near-eye display apparatus.

FIG. 16A is a schematic diagram illustrating in front view virtual reality head-worn display apparatus 600 comprising left-eye and right-eye anamorphic display apparatuses 100R, 100L; and FIG. 16B is a schematic diagram illustrating in side view a virtual reality head-worn display apparatus 600 comprising an anamorphic near-eye display apparatus 100. Features of the embodiment of FIGS. 16A-B not discussed in further detail may be assumed to correspond to the features with equivalent reference numerals as discussed above, including any potential variations in the features.

The alternative embodiment of head-worn display apparatus 600 of FIG. 16A may comprise display apparatuses 100R, 100L mounted in head gear 601 that have larger size than desirable for spectacle head-worn display apparatus 600 of FIG. 14B. Referring to FIG. 1F aberrations may be reduced for a given field angle, field of view increased for a given ellipse blur 452 limit. Further image brightness may be increased.

FIG. 16B illustrates an alternative arrangement wherein a light trap layer 609 is provided between the head-worn display apparatus 600 casing 606 and extraction waveguide 1 to receive stray light rays 607 output from the extraction waveguide 1. Advantageously image contrast is improved.

It may be desirable to reduce the number of illumination systems in a binocular near-eye display.

Figures 16C, 16D, 16E:
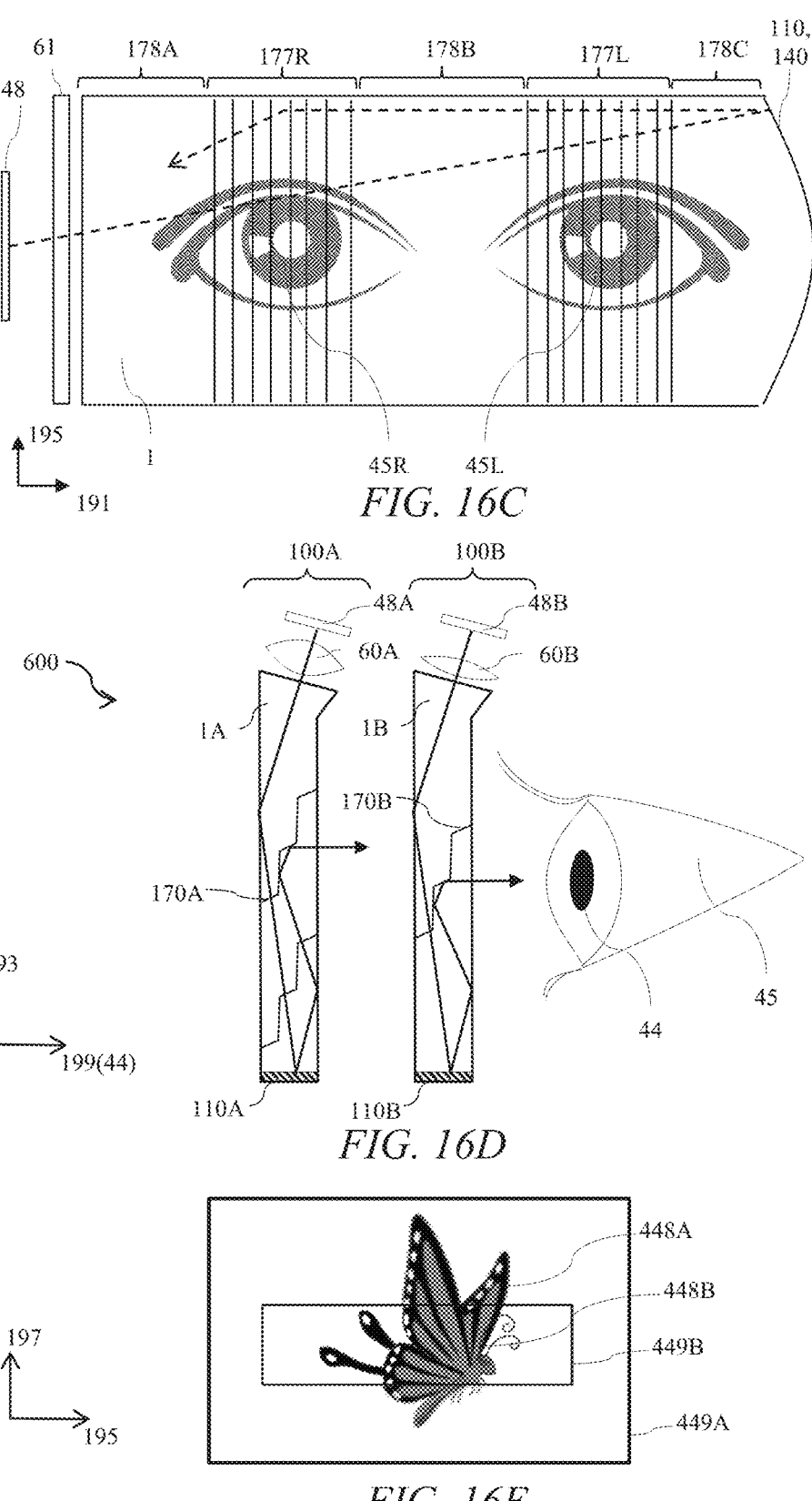
FIG. 16C is a schematic diagram illustrating in front view an anamorphic near-eye display apparatus comprising a single waveguide suitable for use by both eyes of a display user.
FIG. 16D is a schematic diagram illustrating in side view a head-worn display apparatus comprising two anamorphic near-eye display apparatuses.
FIG. 16E is a schematic diagram illustrating a composite image.

FIG. 16C is a schematic diagram illustrating in front view an anamorphic near-eye display apparatus 100 comprising a single waveguide 1 suitable for use by both eyes of a display user. Features of the embodiment of FIG. 16C not discussed in further detail may be assumed to correspond to the features with equivalent reference numerals as discussed above, including any potential variations in the features.

The array of extraction reflectors 170 comprises two separated regions 177L, 177R, each region 177L, 177R being arranged to extract light guided along the extraction waveguide 1 towards a respective eye 45L, 45R of the viewer 47. Non-extracting regions 178A-C are arranged in the extraction waveguide 1 outside of the separated regions 177L, 177R.

Thus a single illumination system 240 comprising spatial light modulator 48 may be arranged to provide illumination to both eyes 45R, 45L. Advantageously cost and complexity is reduced.

It may be desirable to increase the performance and functionality of the head-worn display apparatus 600.

FIG. 16D is a schematic diagram illustrating in side view an anamorphic near-eye display apparatus comprising two anamorphic display apparatuses; and FIG. 16E is a schematic diagram illustrating a composite image provided by the head-worn display apparatus 600 of FIG. 16D to the eye 45. Features of the embodiments of FIGS. 16D-E not discussed in further detail may be assumed to correspond to the features with equivalent reference numerals as discussed above, including any potential variations in the features.

In the alternative embodiment of FIG. 16D, the anamorphic near-eye display apparatus 100A is a first near-eye display apparatus and the head-worn display apparatus 600 further comprises a second near-eye display apparatus 100B, wherein the second near-eye display apparatus 100B is arranged in series with and to receive light from the first near-eye display apparatus 100A.

Near-eye anamorphic display apparatus 100A comprises spatial light modulator 48A with a first size and pixel 222 density; transverse anamorphic component 60A with a first transverse optical power; and extraction waveguide 1A comprising a lateral anamorphic component 110A with a first lateral optical power. Near-eye anamorphic display apparatus 100B comprises spatial light modulator 48B that may have size and pixel 222 density that is the same or different to the spatial light modulator 48A; transverse anamorphic component 60B with a second transverse optical power that may be the same or different to the first transverse optical power; and extraction waveguide 1A comprising a lateral anamorphic component 110A with a second lateral optical power that may be the same or different to the first lateral optical power.

The spatial light modulators 48A, 48B, transverse anamorphic components 60A, 60B; lateral anamorphic components 110A, 110B and the extraction reflectors 170 may be arranged to provide desirably increased optical performance including at least one of (i) increased image resolution; (ii) increased brightness; (iii) increased exit pupil 40 size; (iv) reduced image diffraction; (v) increased field of view; and (vi) multiple focal planes.

In the illustrative embodiment of FIG. 16D, the spatial light modulators 48A, 48B are the same but the transverse anamorphic components 60A, 60B and lateral anamorphic components 110A, 110B are different so that the magnification provided by the respective anamorphic display apparatuses 100A, 100B are different. FIG. 16E illustrates that an outer image region 448A with border 449A is provided by the anamorphic near-eye display apparatus 100A and the central image region 448B with border 449B is provided by the anamorphic near-eye display apparatus 100B. Advantageously a high resolution image may be provided in the central region 448A, overlaid on a lower resolution image in the outer region 448B. Such an arrangement may advantageously achieve increased image fidelity for the most common viewing directions while providing large field of view.

FIG. 16D also illustrates that the extraction reflectors 170 may be provided with different alignments to achieve increased exit pupil 40 size and to reduce diffraction blur.

It may be desirable to increase the performance of virtual reality display systems.

Figures 16F, 16G:
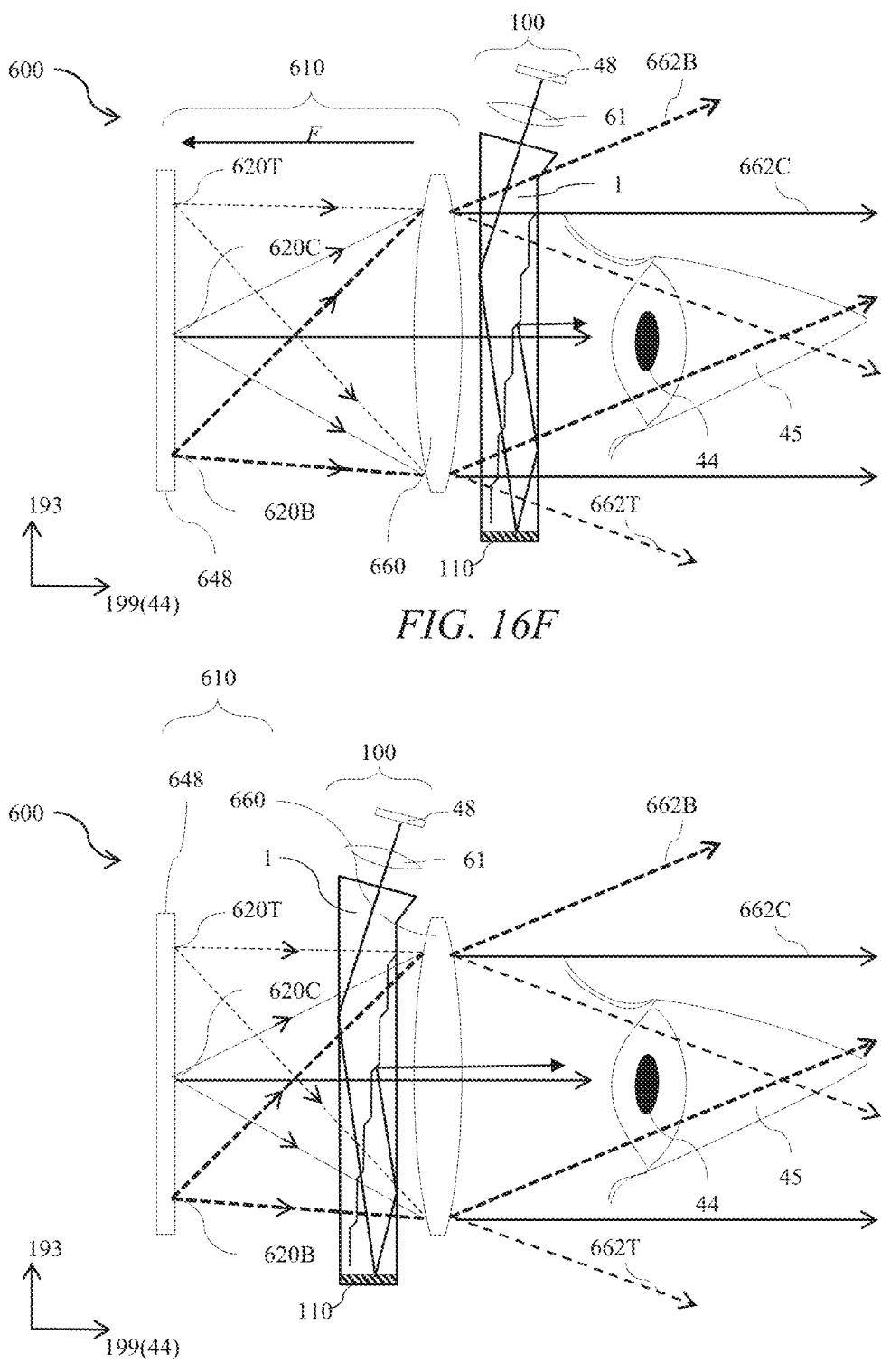
FIG. 16F is a schematic diagram illustrating in side view a virtual reality head-worn display apparatus comprising an anamorphic near-eye display apparatus arranged to receive light from a magnifying lens and additional spatial light modulator.
FIG. 16G is a schematic diagram illustrating in side view a virtual reality head-worn display apparatus comprising an anamorphic near-eye display apparatus arranged between the anamorphic spatial light modulator and magnifying lens of a non-anamorphic near-eye display apparatus.

FIG. 16F is a schematic diagram illustrating in side view a virtual reality head-worn display apparatus 600 comprising an anamorphic near-eye display apparatus 100 arranged to receive light from a magnifying lens 610; and FIG. 16G is a schematic diagram illustrating in side view a virtual reality head-worn display apparatus comprising an anamorphic near-eye display apparatus arranged between the anamorphic spatial light modulator and magnifying lens of a non-anamorphic display apparatus. Features of the embodiments of FIGS. 16F-G not discussed in further detail may be assumed to correspond to the features with equivalent reference numerals as discussed above, including any potential variations in the features.

In the alternative embodiment of FIG. 16F, the anamorphic near-eye display apparatus 100 is a first near-eye display apparatus and head-worn display apparatus 600 further comprises a non-anamorphic near-eye display apparatus 610, wherein the non-anamorphic near-eye display apparatus 610 comprises a non-anamorphic spatial light modulator 648 and a non-anamorphic magnifying optical system 660; and wherein the at least one near-eye display apparatus 100 is arranged in series with and to receive light from the non-anamorphic near-eye display apparatus 610.

In the alternative embodiment of FIG. 16G, the anamorphic near-eye display apparatus 100 may be arranged in series with the non-anamorphic spatial light modulator 648, being arranged between the non-anamorphic spatial light modulator 648 and the non-anamorphic near-eye display apparatus 610. The anamorphic near-eye display apparatus may be arranged substantially at the pupil of the magnifying optical system 660 to provide no optical power to light from the non-anamorphic near-eye display apparatus 100. Alternatively some small optical power for light from the anamorphic near-eye display apparatus 100, may be provided modifying the virtual image distance. The total thickness of the optical system may be reduced, advantageously achieving reduced bulk.

In the embodiments of FIGS. 16F-G, the non-anamorphic magnifying optical system 660 may comprise a lens such as a Fresnel lens, a pancake lens or other known non-anamorphic magnifying lenses and is arranged to provide the eye 45 with a virtual image of the spatial light modulator 648. In comparison to the anamorphic near-eye display apparatus 100, the non-anamorphic near-eye display apparatus 610 provides magnification of pixels 622 on the non-anamorphic spatial light modulator 648 that is equal in the lateral and transverse directions 195, 197. The non-anamorphic magnifying optical system 660 is typically circularly symmetric.

In operation, top pixel 620T of the non-anamorphic spatial light modulator 648 provides light rays 662T, central pixel 620C provides light rays 662C and bottom pixel 620B provides light rays 662B. The eye of the observer 45 collects the light rays 460T, 460C, 460B and produces an image on the retina of the eye such that an image is perceived with angular size that is magnified in comparison to the angular size of the spatial light modulator 48.

The spatial light modulators 48, 648, non-anamorphic magnifying optical system 660, transverse anamorphic component 60; lateral anamorphic component 110 and the extraction reflectors 170 may be arranged to provide desirably increased optical performance including at least one of (i) increased image resolution; (ii) increased brightness; (iii) increased exit pupil 40 size; (iv) reduced image diffraction; (v) increased field of view; and (vi) multiple focal planes.

Figure 16H:
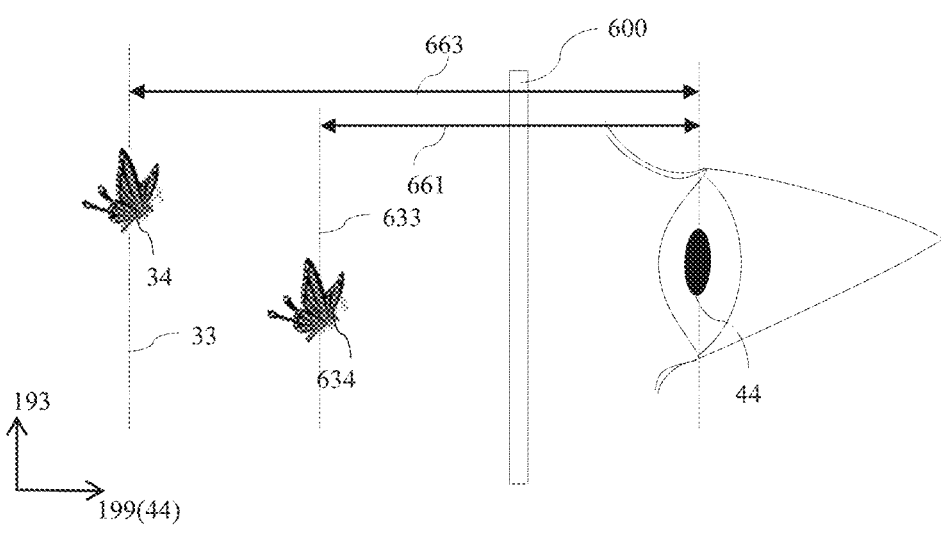
FIG. 16H is a schematic diagram illustrating in side view an arrangement of virtual image distances for a virtual reality display apparatus.

FIG. 16H is a schematic diagram illustrating in side view an arrangement of virtual image distances for a virtual reality display apparatus. Features of the embodiment of FIG. 16H not discussed in further detail may be assumed to correspond to the features with equivalent reference numerals as discussed above, including any potential variations in the features.

Considering the embodiment of FIG. 16H, the virtual image distance 61 from the eye 44 to the virtual image 34 provided by the anamorphic near-eye display apparatus 100 may be at an infinite conjugate plane 33 distance 663, whereas by control of the back working distance, F of the spatial light modulator 648 to the non-anamorphic magnifying system 660 the virtual image 634 provided by the non-anamorphic near-eye display apparatus 610 may be at a finite conjugate plane 633 distance 661.

More generally a virtual image distance for light from the first near-eye display apparatus 100A, 100 may be different from a virtual image distance for light from the second near-eye display apparatus 100B or non-anamorphic near-eye display apparatus 610 respectively.

Advantageously comfort of display use may be increased.

Figure 16I:
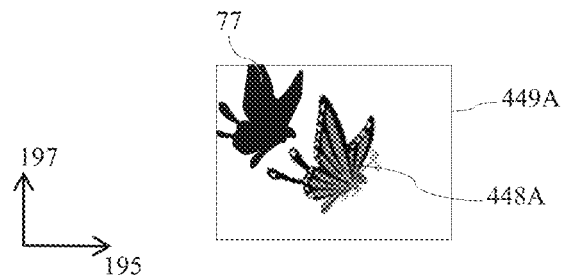
FIG. 16I and FIG. 16J are schematic diagrams illustrating displayed images for the arrangement of FIG. 16H.
Figure 16J:
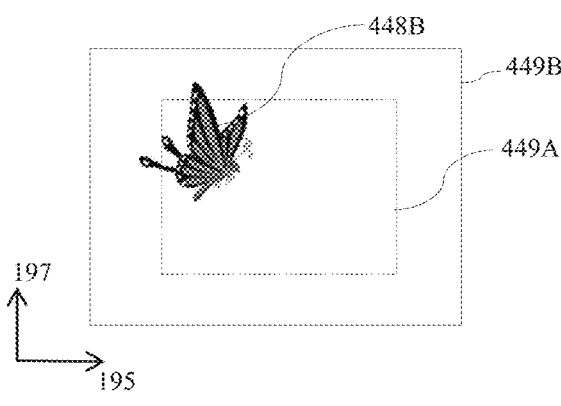

FIGS. 16I-J are schematic diagrams illustrating displayed virtual images for the arrangement of FIG. 16H. Features of the embodiments of FIGS. 16I-J not discussed in further detail may be assumed to correspond to the features with equivalent reference numerals as discussed above, including any potential variations in the features.

FIG. 16I illustrates the image 448A with border 449A provided by the anamorphic near-eye display apparatus 100 whereas FIG. 16J illustrates the image 448B with border 449B provided by the non-anamorphic near-eye display apparatus 610.

The background image 448A and foreground images 448B are provided so that the image 448A may further comprise an occlusion image 77 that is aligned in operation to the foreground images 448B that overlay the background image. Opaque foreground images may advantageously be achieved.

Embodiments including alternative forms of reflective extraction features 169 will now be described.

Figure 17A:
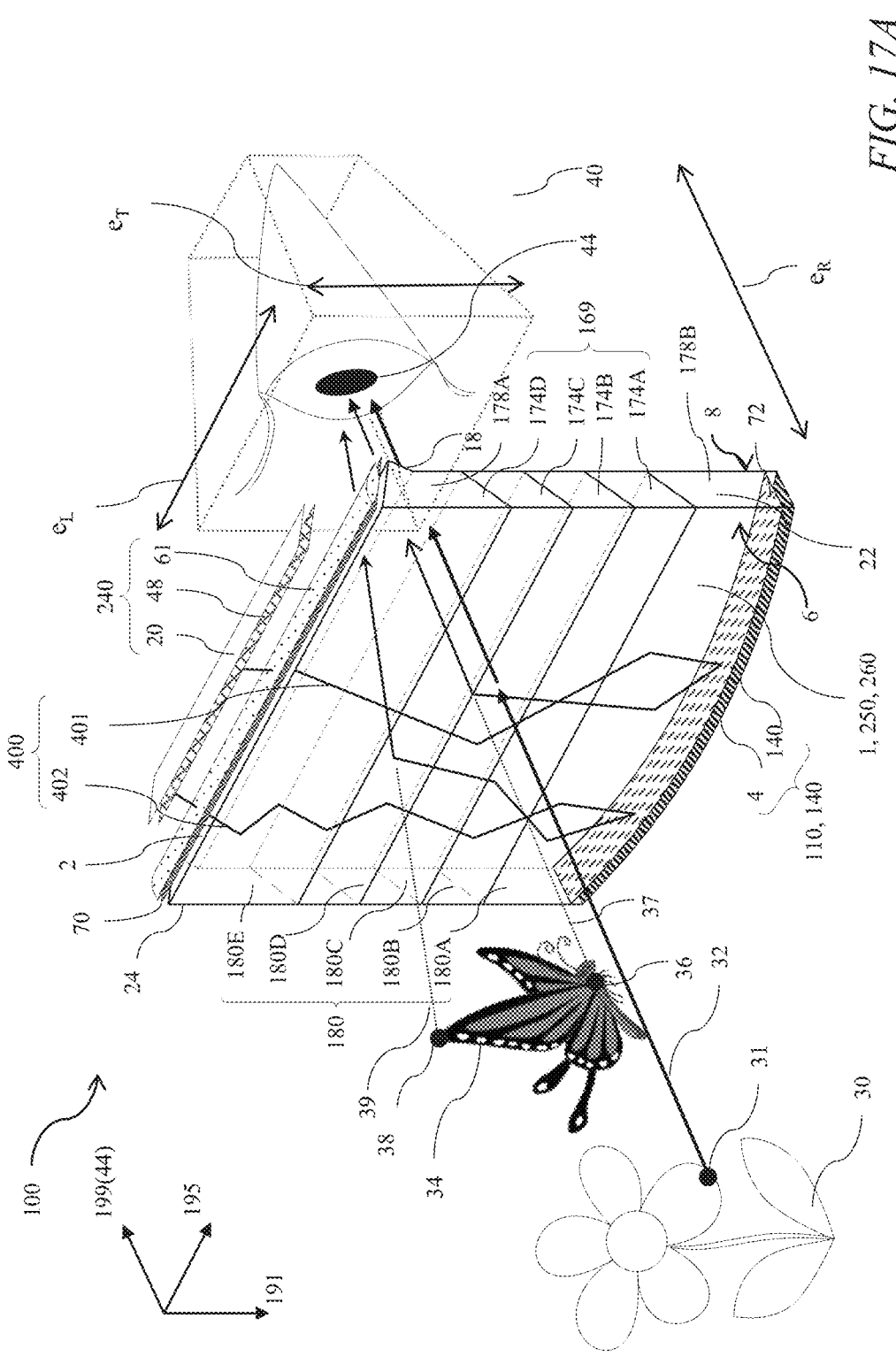
FIG. 17A is a schematic diagram illustrating in perspective front view an alternative arrangement of the anamorphic near-eye display apparatus wherein the extraction reflectors comprises plural constituent plates.

FIG. 17A is a schematic diagram illustrating in perspective front view an alternative arrangement of the anamorphic near-eye display apparatus 100 wherein the reflective extraction features comprise extraction reflectors 174A-D comprises plural constituent plates 180A-E. Features of the embodiment of FIG. 17A not discussed in further detail may be assumed to correspond to the features with equivalent reference numerals as discussed above, including any potential variations in the features.

In comparison to FIG. 1A, in the alternative embodiment of FIG. 17A, the extraction waveguide 1 comprises plural constituent plates 180A-E optically coupled together, wherein the extraction reflectors 174A-D are formed between the constituent plates 180A-E. The extraction reflectors 174A-D extend between the opposing rear and front guide surfaces 6, 8 of the extraction waveguide 1. In other words, the extraction reflectors 174A-E extend across the entirety of the extraction waveguide 1 between the opposing rear and front guide surfaces 6, 8, however typically some regions 178A, 178B along the extraction waveguide 1 may be provided without extraction reflectors 174 as discussed hereinabove.

In the alternative embodiment of FIG. 17A, the extraction reflectors 174 have the same reflective area. Advantageously luminance variations with viewing angle may be reduced.

Figures 17B, 17C:
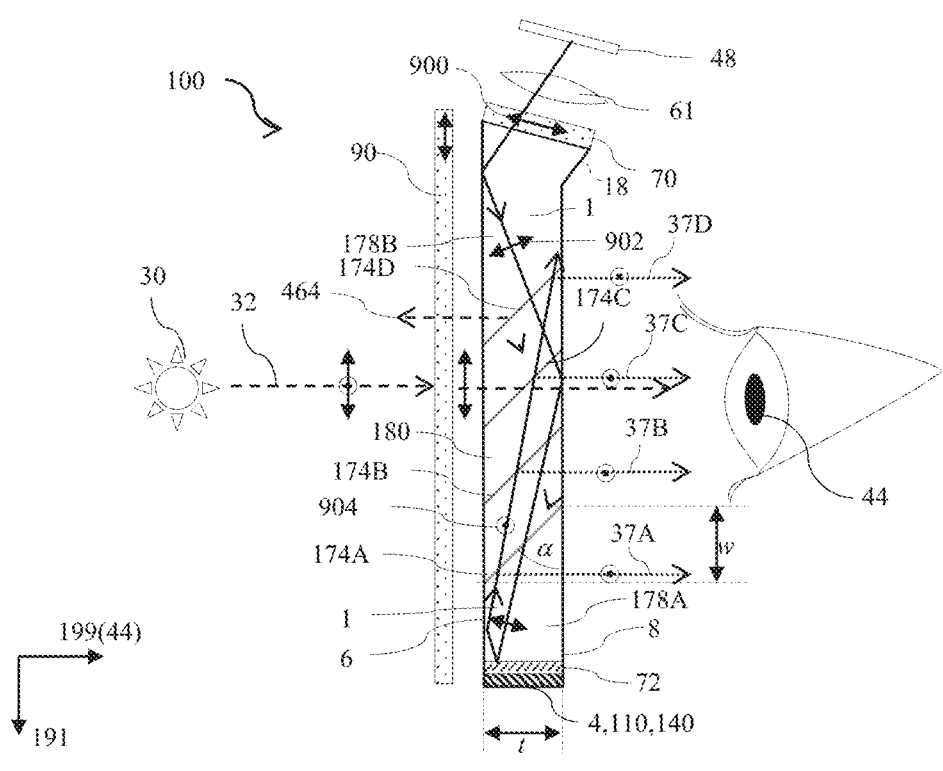
FIG. 17B is a schematic diagram illustrating a side view of light input into the anamorphic near-eye display apparatus of FIG. 17A.
FIG. 17C is a schematic diagram illustrating a front view of the anamorphic near-eye display apparatus of FIG. 17A.

FIG. 17B is a schematic diagram illustrating a side view of light input into the anamorphic near-eye display apparatus of FIG. 17A; and FIG. 17C is a schematic diagram illustrating a front view of the anamorphic near-eye display apparatus 100 of FIG. 17A. Features of the embodiment of FIGS. 17B-C not discussed in further detail may be assumed to correspond to the features with equivalent reference numerals as discussed above, including any potential variations in the features.

In manufacture, plural constituent plates 180 are coated and bonded as a stack of plates 180A-N. The stack of plates 180A-N may then be diced and polished at angle α to provide the inclined plates 180A-N.

The outer interfaces shown in FIG. 17B as extraction reflectors 174A, 174D may alternatively be provided by bonding to non-extracting waveguide regions 178A, 178B so that no extraction is provided. Advantageously the complexity of the non-extracting waveguide constituent parts 178A, 178B is reduced and cost reduced.

In comparison to FIG. 6A, the plural constituent plates 180 of FIGS. 17B-C provide extraction reflectors 174A-D that each extend between the opposing rear and front guide surfaces 6, 8. The extraction reflectors 174A-D may be arranged at tilt angle α and have width w that is determined by the waveguide thickness, t and the angle α. The extent w in the direction 191 along the extraction waveguide 1 is increased and advantageously diffractive blur in the transverse direction is reduced.

In operation, light rays 37 that are extracted are incident onto light guiding surface 6 before incidence at the partially extraction reflectors 174A-D to provide corresponding output rays 37A-D. Advantageously the size of the headbox is increased.

Figure 17D:
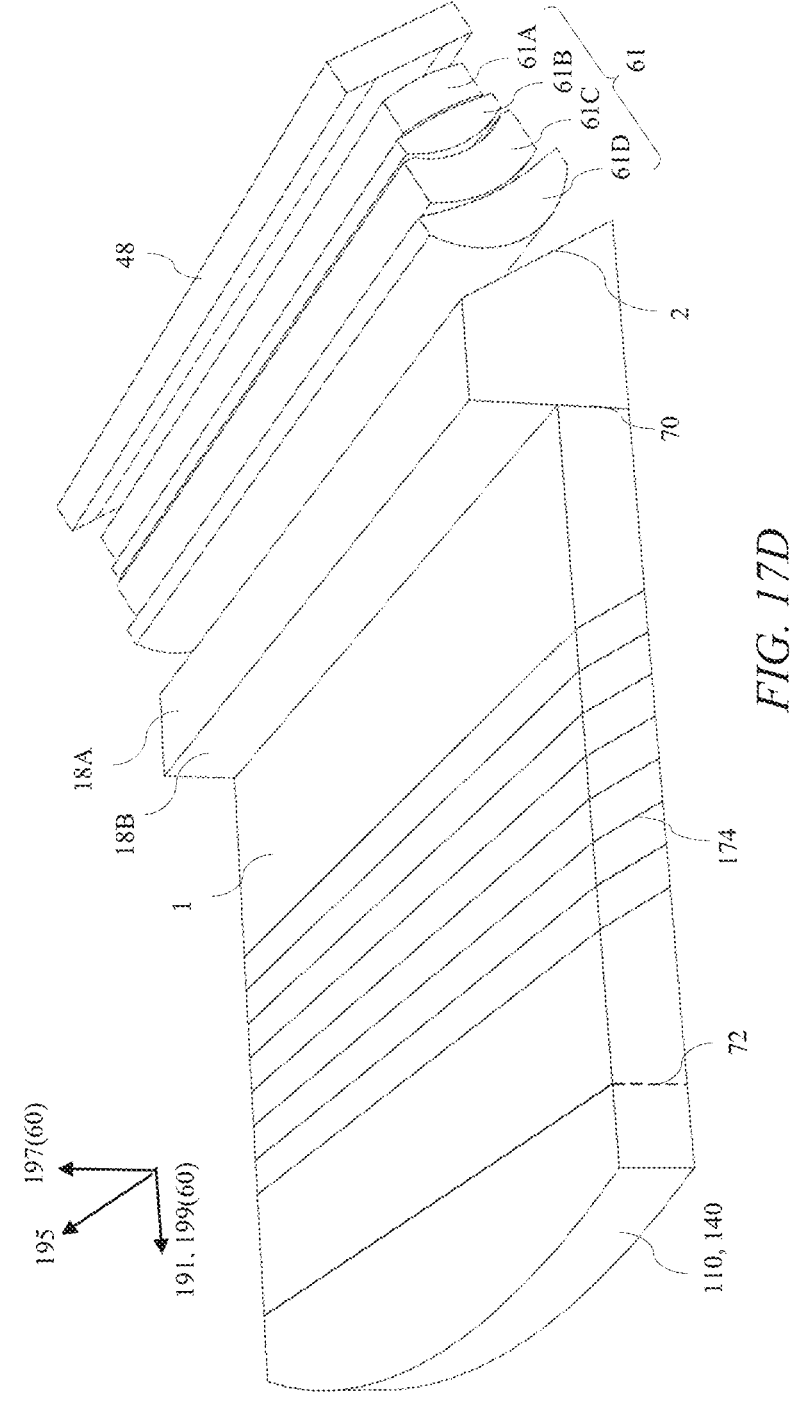
FIG. 17D is a schematic diagram illustrating a schematic perspective view of an optical design for a near-eye anamorphic display apparatus.

FIG. 17D is a schematic diagram illustrating a schematic perspective view of an optical design for a near-eye anamorphic display apparatus 100. Features of the embodiment of FIG. 17D not discussed in further detail may be assumed to correspond to the features with equivalent reference numerals as discussed above, including any potential variations in the features.

In the alternative embodiment of FIG. 17D, the tapered surface 18 is provided by two surfaces 18A, 18B. Such surfaces 18A, 18B may be arranged to transmit or absorb light that is incident thereon. Advantageously the visibility of stray light rays that are incident onto the surfaces 18A, 18B may be reduced. Image contrast may be improved. FIG. 17D further illustrates compound lens 61 comprising component lenses 61A-D and has surface profiles that are representative of the optical design used for FIGS. 12A-E described hereinbelow.

The propagation of polarised light is similar to that of FIGS. 7A-C, although no intermediate surfaces 172 are provided and will now be further described.

Figures 18A, 18B, 18C:
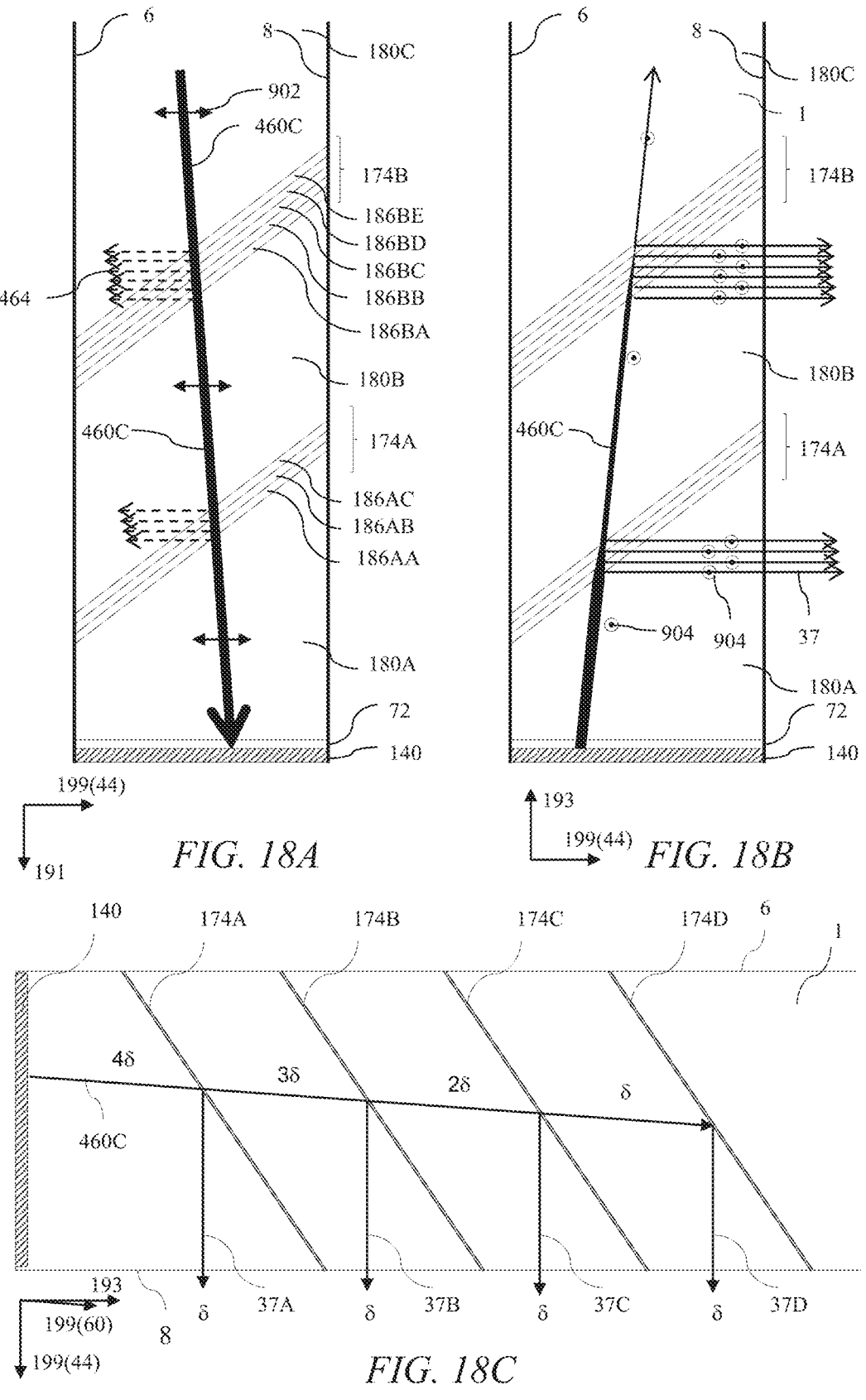
FIG. 18A is a schematic diagram illustrating a side view of polarised input light propagation in the anamorphic near-eye display apparatus of FIG. 17A.
FIG. 18B is a schematic diagram illustrating a side view of polarised light propagation after reflection from the reflective end in the anamorphic near-eye display apparatus of FIG. 17A.
FIG. 18C is a schematic diagram illustrating the variation of reflectivity of polarising beam splitters along the waveguide of FIG. 17A.

FIG. 18A is a schematic diagram illustrating a side view of polarised input light propagation in the anamorphic near-eye display apparatus 100 of FIG. 17A; and FIG. 18B is a schematic diagram illustrating a side view of polarised light propagation after reflection from the reflective end 4 in the anamorphic near-eye display apparatus 100 of FIG. 17A. Features of the embodiment of FIGS. 18A-B not discussed in further detail may be assumed to correspond to the features with equivalent reference numerals as discussed above, including any potential variations in the features.

Extraction reflector 174A comprises dielectric stack comprising dielectric layers 186AA-186AC and extraction reflector 174B comprises dielectric stack comprising dielectric layers 186BA-186AE, that may for example comprise different dielectric stack than extraction reflector 174A and may provide different reflectivity.

The dielectric stacks 186A-N may be formed on one or both surfaces of the adjacent plates 180. In other embodiments, the dielectric stacks may be replaced by single dielectric layers, metal, or a gap.

In operation, some p-polarised light 464 is reflected for light rays 460C propagating in the first direction 191 along the extraction waveguide 1; however as illustrated in FIG. 8A, said p-polarised reflectivity may be minimised by appropriate design of the respective dielectric stack 186A-N.

In the present embodiments, light rays 464 are output through the light guiding surface while propagating in the direction 191 along the extraction waveguide 1 before reflection from the light reversing reflector. Such rays have not been imaged by the lateral anamorphic component 110 and so do not comprise angular pixel data in the lateral direction 195. Consequently external viewers do not perceive image data from the rays 464 and advantageously user 45 privacy of information is increased.

After reflection at the light reversing reflector 140, the polarization conversion retarder 72 provides s-polarised state 908 that is reflected by the dielectric stacks 186AA-AC and 186BA-186BE towards the pupil 44.

FIG. 18C is a schematic diagram illustrating the variation of reflectivity of extraction reflectors 174 in the direction 191 along the extraction waveguide 1 of FIG. 17A and with illustrative embodiment of TABLE 4 in the case the extraction waveguide comprises four extraction reflectors 174A-D. Features of the embodiment of FIG. 18C not discussed in further detail may be assumed to correspond to the features with equivalent reference numerals as discussed above, including any potential variations in the features.

TABLE 4

| Reflector | Stack reflectivity | Input power to reflector | Output power to ray 37 |
|---|---|---|---|
| 174A | 25% | 4δ | δ |
| 174B | 33% | 3δ | δ |
| 174C | 50% | 3δ | δ |
| 174D | 100% | δ | δ |

In the alternative embodiment of FIG. 18C, the extraction reflectors 174 extend across the extraction waveguide 1 and the extraction reflectors have the same reflective areas. The reflectivities of the extraction reflectors 174 are defined across their overall area and increase with increasing distance along the optical axis 199(60) for light that is reflected from the light reversing reflector 140. In other words, the reflectivities of the extraction reflectors 174 are defined across their overall area and increase with increasing distance in the direction 193 along the extraction waveguide 1 from the light reversing reflector 140.

The stack reflectivity profile of TABLE 4 achieves uniform power 6 of output to rays 37A-D, so that advantageously a uniform image luminance is seen for different pupil 44 positions across the exit pupil 40. Such reflectivity profile may be achieved by adjusting the dielectric stack 186A-N to be different at each extraction reflector 174A-N. Such differences may be achieved by adjustment of number, thickness and material of dielectric layers 186.

The illustrative embodiment of TABLE 4 provides desirable output properties for polarised illumination of FIGS. 18A-B, because the extraction reflectors 174 are substantially transparent to light rays 460C with the p-polarised state 902. Thus the reflectors 174D are substantially blocking to transmitted s-polarization state 904 but are transmitting to p-polarization state 902 and are thus partially transmitting in a general sense.

Alternative arrangements of extraction reflectors 174 will now be described.

Figure 19A:
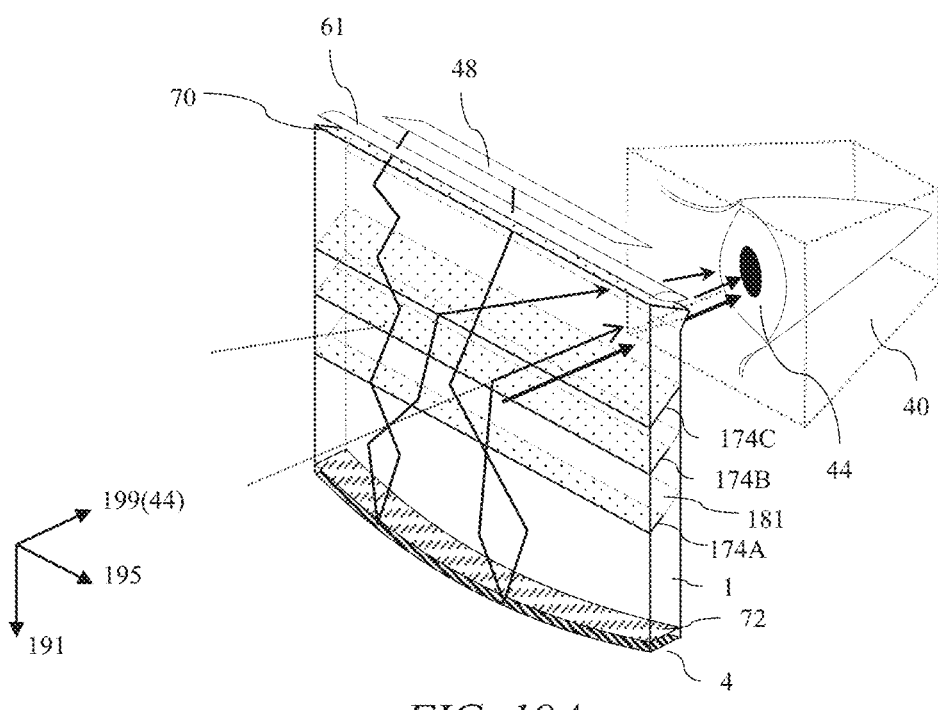
FIG. 19A is a schematic diagram illustrating in perspective front view an alternative arrangement of the anamorphic near-eye display apparatus of FIG. 17A wherein some of the polarising beam splitters do not extend the entirety of the thickness of the waveguide.
Figure 19B:
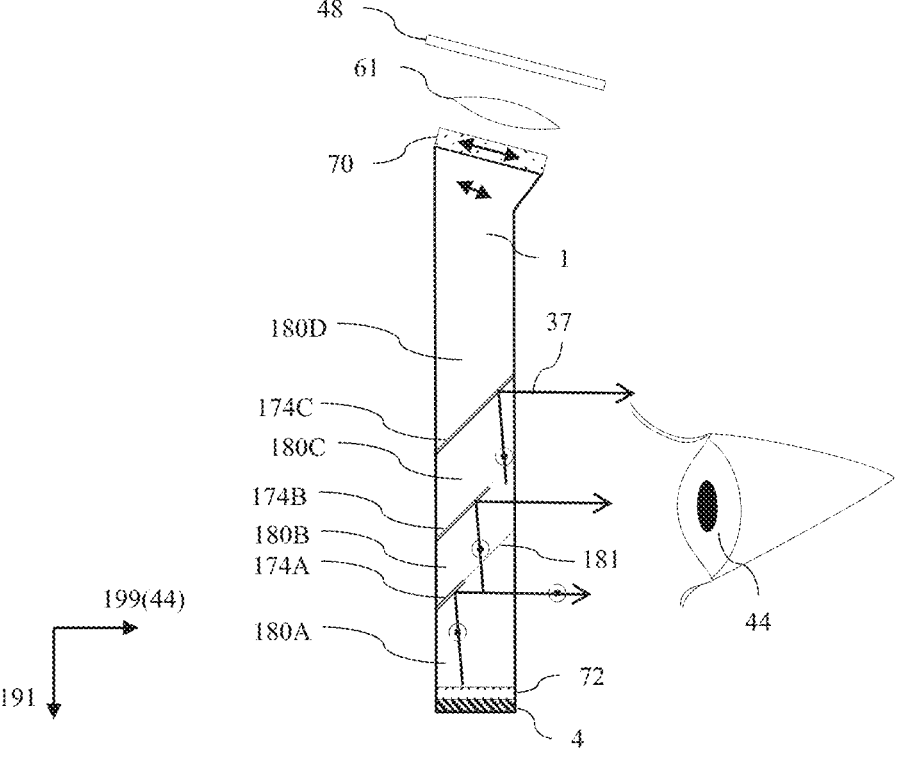
FIG. 19B is a schematic diagram illustrating in side view the operation of the anamorphic near-eye display apparatus of FIG. 19A.

FIG. 19A is a schematic diagram illustrating in perspective front view an alternative arrangement of the anamorphic near-eye display apparatus 100 of FIG. 17A wherein some of the polarising beam splitters 200 do not extend the entirety of the thickness of the extraction waveguide 1; and FIG. 19B is a schematic diagram illustrating in side view the operation of the anamorphic near-eye display apparatus 100 of FIG. 19A. Features of the embodiment of FIGS. 19A-B not discussed in further detail may be assumed to correspond to the features with equivalent reference numerals as discussed above, including any potential variations in the features.

In the alternative embodiment of FIGS. 19A-B, the extraction reflectors 174 extend across part of the extraction waveguide 1, the array of extraction reflectors 174 having reflectivities defined across their overall area that increase with increasing distance along the optical axis 199 along the waveguide in the direction 193. In other words, the extraction reflectors 174 are patterned to have different reflective areas providing reflectivities defined across their overall area that increase with increasing distance along the optical axis 199(60).

Such extraction reflectors 174 may be manufactured by masking of the plates 180 during the formation of the dielectric layers 186A-N, for example by deposition. Some regions 181 of the surfaces of the plates may thus have no dielectric stack. As illustrated in TABLE 4, the total power 6 extracted at each facet may be constant across the array of extraction reflectors 174A-D. In comparison to FIG. 18B, the dielectric stack composition may be the same for each of the extraction reflectors 174A-D. Advantageously cost and complexity of deposition onto the plates 180 may be reduced.

Figure 20A:
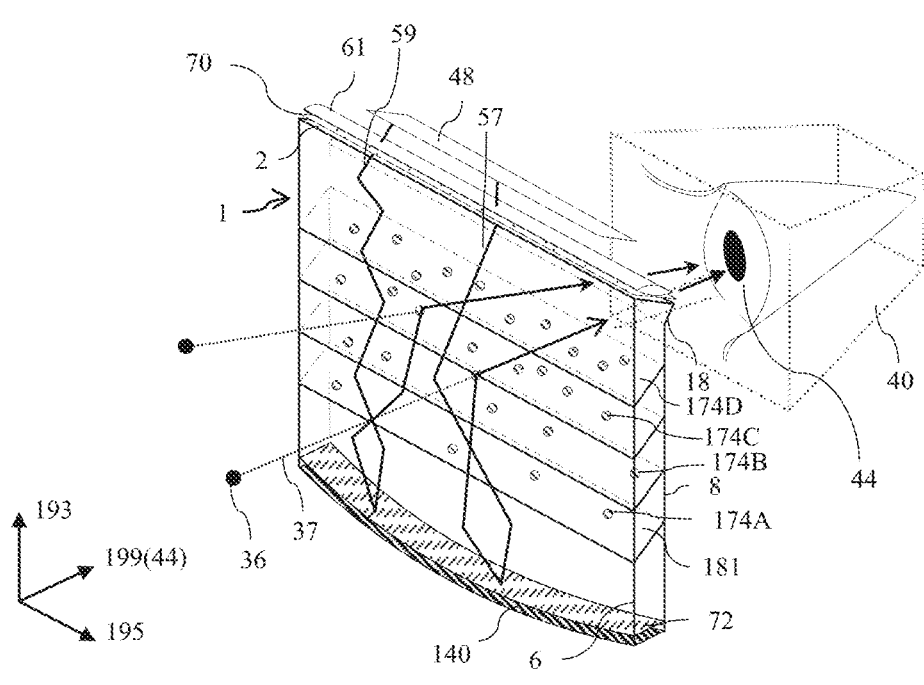
FIG. 20A is a schematic diagram illustrating in perspective front view an alternative arrangement of the anamorphic near-eye display apparatus of FIG. 17A wherein the polarising beam splitters are patterned.
Figure 20B:
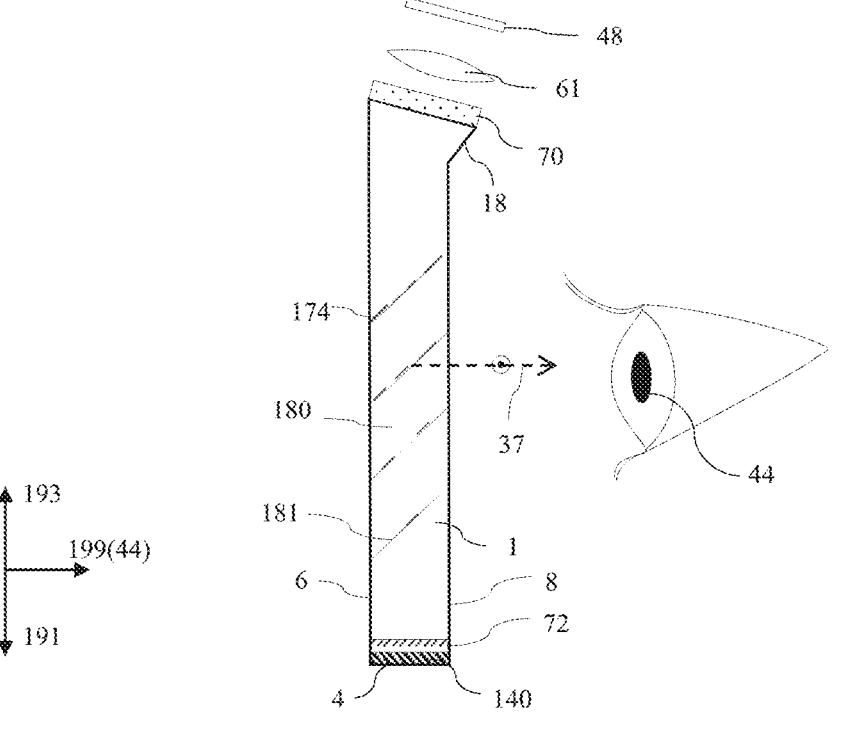
FIG. 20B is a schematic diagram illustrating in side view the operation of the anamorphic near-eye display apparatus of FIG. 20A.

FIG. 20A is a schematic diagram illustrating in perspective front view an alternative arrangement of the anamorphic near-eye display apparatus 100 of FIG. 17A, wherein the polarising beam splitters 200 comprise patterned reflectors; and FIG. 20B is a schematic diagram illustrating in side view the operation of the anamorphic near-eye display apparatus 100 of FIG. 20A. Features of the embodiment of FIGS. 20A-B not discussed in further detail may be assumed to correspond to the features with equivalent reference numerals as discussed above, including any potential variations in the features.

In the alternative embodiment of FIGS. 20A-B, the extraction reflectors 174 have a density by area of patterning that increases with distance along the extraction waveguide 1 in the direction 193 away from the light reversing reflector 140 to achieve the desirable reflectivity profile, for example as illustrated in TABLE 4.

The patterning of the extraction reflectors 174 may achieve reduced complexity of fabrication of the plates 180.

Further, the extraction reflectors 174 may comprise high reflectivity metal compared to the dielectric stacks discussed elsewhere herein. In such a case, the input linear polarizer 70 and polarization conversion retarder 72 may be omitted. Advantageously cost may be reduced.

Figure 21A:
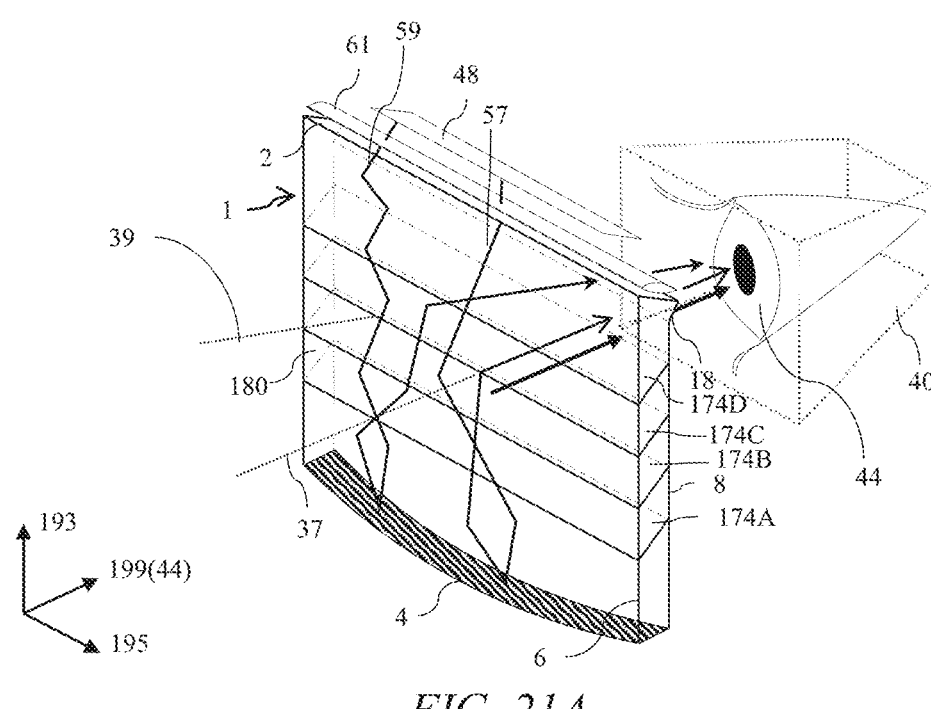
FIG. 21A is a schematic diagram illustrating in perspective front view an alternative arrangement of the anamorphic near-eye display apparatus of FIG. 17A comprising a plurality of partially reflective metal interfaces.
Figure 21B:
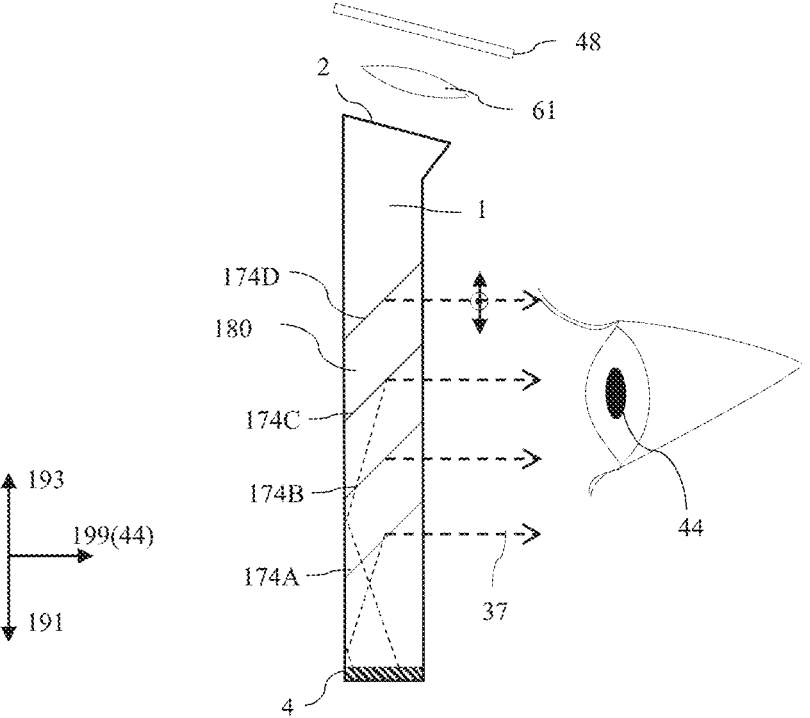
FIG. 21B is a schematic diagram illustrating in side view the operation of the anamorphic near-eye display apparatus of FIG. 21A.

FIG. 21A is a schematic diagram illustrating in perspective front view an alternative arrangement of the anamorphic near-eye display apparatus of FIG. 17A comprising a plurality of partially reflective metal extraction reflectors 174; and FIG. 21B is a schematic diagram illustrating in side view the operation of the anamorphic near-eye display apparatus 100 of FIG. 21A. Features of the embodiment of FIGS. 21A-B not discussed in further detail may be assumed to correspond to the features with equivalent reference numerals as discussed above, including any potential variations in the features.

In the alternative embodiment of FIGS. 21A-B, the extraction reflectors 174A-D are partially reflecting mirrors that may comprise a metallic coating arranged on the plates 180. The metal coatings are adjusted with different reflectivities during manufacture to achieve desirable reflectivity. In comparison to TABLE 4, the maximum reflectivity for the extraction reflector 174D may be 50% or less so that input light 460C is transmitted to the light reversing reflector 140 in the first direction 191 along the extraction waveguide 1.

The input linear polarizer 70 and polarization conversion retarder 72 is omitted and advantageously cost and complexity is reduced.

Figure 22A:
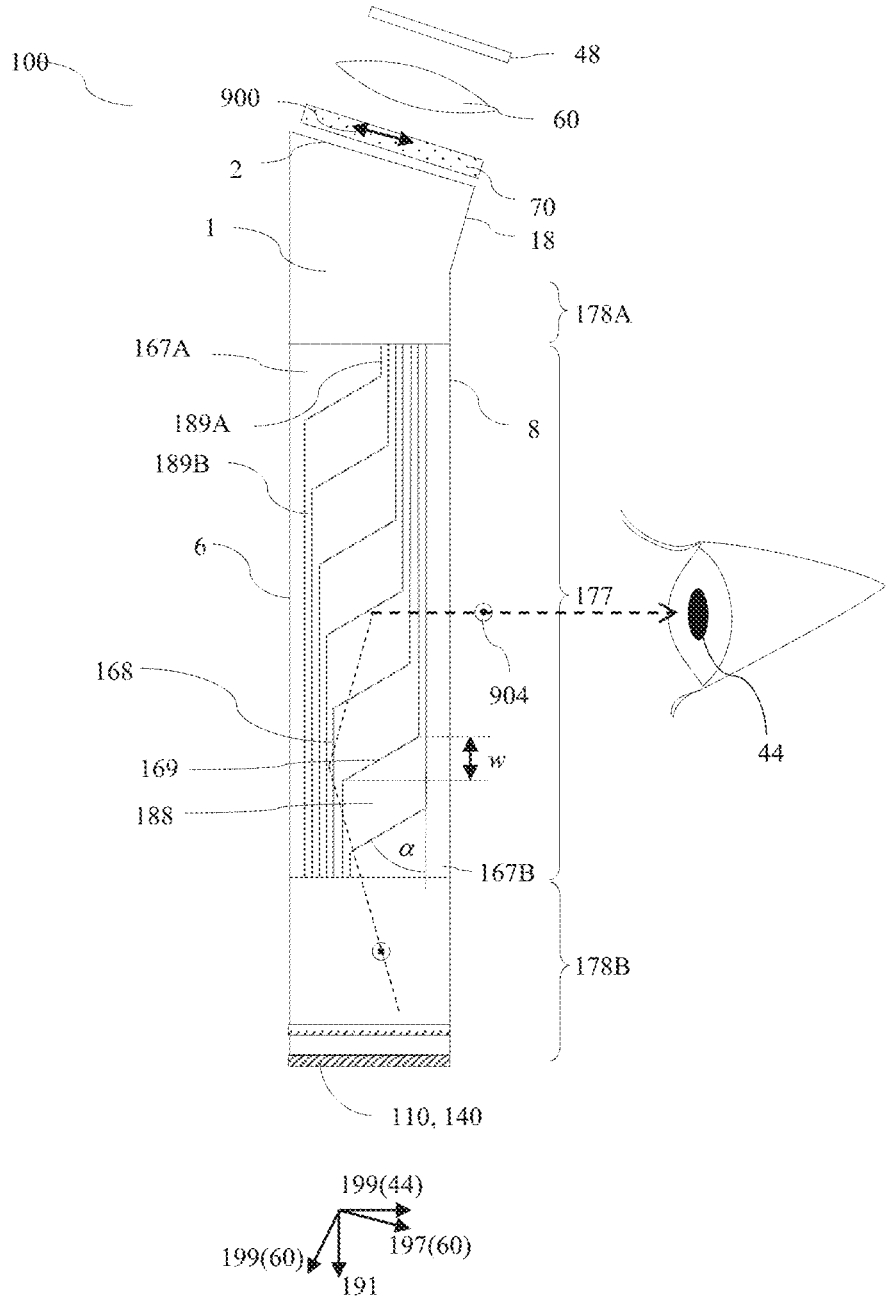
FIG. 22A is a schematic diagram illustrating a side view of an extraction waveguide comprising a plurality of stepped interface layers.

FIG. 22A is a schematic diagram illustrating a side view of an anamorphic near-eye display apparatus 100 comprising a plurality of stepped constituent plates 188. Features of the embodiment of FIG. 22A not discussed in further detail may be assumed to correspond to the features with equivalent reference numerals as discussed above, including any potential variations in the features.

In the alternative embodiment of FIG. 22A, the extraction region 177 comprises plural constituent plates 188, wherein the extraction reflectors 169 are formed between the constituent plates 188. The stepped constituent plates 188 further comprise support members 189A, 189B that extend in the first direction 191 along the extraction waveguide 1. Outer support members 167A, 167B are provided to form rear and front guide surfaces 6, 8.

In comparison to the embodiment of FIG. 17B, the extraction reflectors extend partly between the rear and front guide surfaces 6, 8, and the steps overlap in the direction 199(44) and in the transverse direction 197(60). The extent w of the extraction reflector 169 is larger than for the stepped surfaces 7A, 7B of FIG. 13A for example. Advantageously blur in the transverse direction 197 is reduced.

Figure 22B:
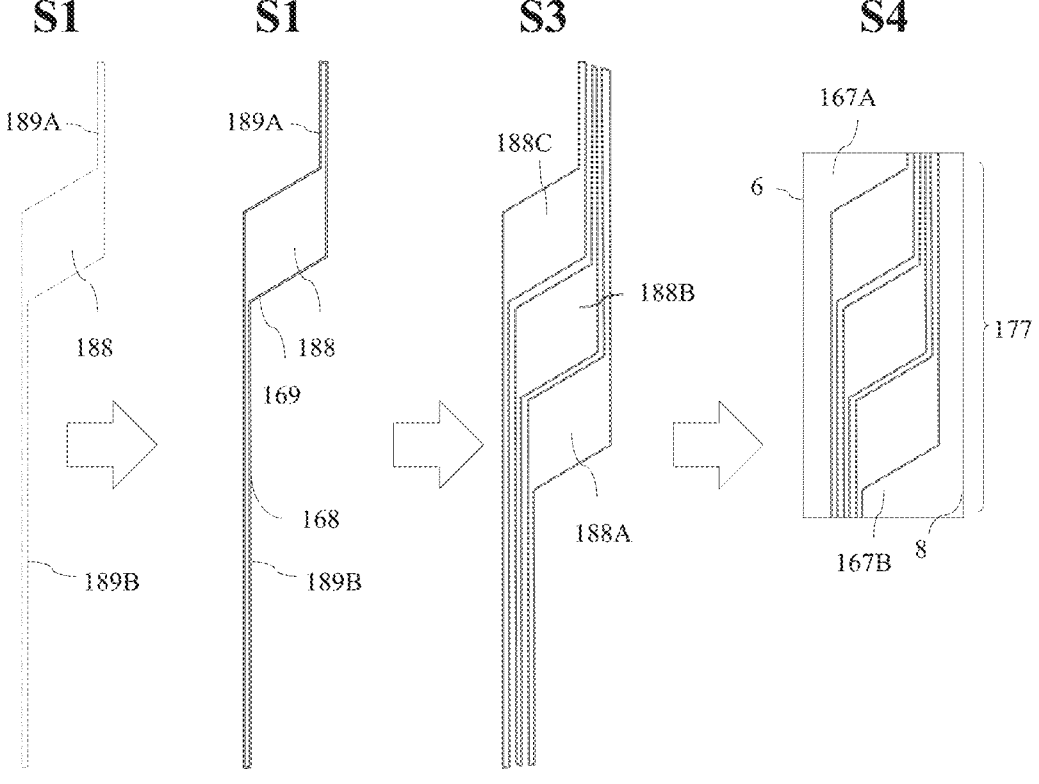
FIG. 22B is a schematic diagram illustrating a method to manufacture the extraction region of the extraction waveguide of FIG. 22A.

FIG. 22B is a schematic diagram illustrating a method to manufacture the extraction region 177 of the extraction waveguide of FIG. 22A. Features of the embodiment of FIG. 22B not discussed in further detail may be assumed to correspond to the features with equivalent reference numerals as discussed above, including any potential variations in the features.

In a first step S1, stepped constituent plate 188 comprising support members 189A, 189B is fabricated by injection moulding for example.

In step S2, the surfaces of the stepped constituent plate 188 are coated with coating 168 such as dielectric layers as described elsewhere herein.

In step S3, a stack of stepped constituent plates 188A-C is attached in alignment, such that the extraction reflectors formed therebetween have a common tilt, a with respect to the direction 191 along the extraction waveguide 1.

In step S4 outer support members 167A, 167B are added to provide waveguide 1 extraction region 177 part. In a final step (not shown) the non-extracting waveguide parts 178 are added. The outer surfaces 6, 8 may be polished to achieve desirable flatness and parallelism.

The method of FIG. 22B does not use the expensive plate construction method as may be used for the arrangements of FIG. 17A for example. Advantageously cost may be reduced.

It may be desirable to provide further expansion of exit pupil 40 while reducing diffraction blur and manufacturing cost.

FIGS. 22C-D are schematic diagrams illustrating side views of alternative arrangements of extraction waveguides 1 comprising two types of partially reflecting extraction reflectors 170, 174. Features of the embodiments of FIGS. 22C-D not discussed in further detail may be assumed to correspond to the features with equivalent reference numerals as discussed above, including any potential variations in the features.

The extraction waveguides 1 of FIGS. 22C-D comprise first and second extraction parts 13A, 13B. The extraction parts 13A, 13B comprise extraction reflectors 170 and intermediate surfaces 172 of the same type as FIG. 9C. The extraction reflectors 170 and intermediate surfaces 172 may alternatively be of the types illustrated in TABLE 3 or in at least FIGS. 9A-11E disclosed hereinabove.

In the alternative embodiment of FIG. 22C, a further extraction reflector 174 is arranged between the extraction part 13A comprising constituent plate 180A and extraction part comprising constituent plate 180B. The extraction reflector 174 may be at least of the type illustrated in any of the embodiments of FIG. 17A to FIG. 22A disclosed hereinabove.

In operation, the extraction reflectors 170 with stepped shape provide extraction for the region towards the edge of the exit pupil 40, whereas the extraction reflector 174 provides extraction for the central region of the exit pupil 40. Advantageously diffraction blur in the central region is reduced, with improved image quality for the most common viewing direction. Further, the cost of manufacture of the plural constituent plates 180A, 180B is reduced.

In the alternative embodiment of FIG. 22D, further extraction reflectors 174A, 174B and further constituent plate 180C are arranged between the extraction part 13A comprising constituent plate 180A and extraction part comprising constituent plate 180B. In comparison to FIG. 22D, the region of the exit pupil 40 over which the diffraction blur is reduced is advantageously increased.

In an exemplary manufacturing method, the embodiments of FIGS. 22C-D may be formed by fabrication of the extraction parts 13A, 13B as described elsewhere herein, coating of the ends 163A, 163B of the extraction parts 13A, 13B and attaching the ends 163A, 163B, for example by means of an adhesive. Optionally, the surfaces 6, 8 may be subsequently polished to provide desirable light guiding properties.

It may be desirable to reduce the cost and complexity of the extraction waveguide 1.

Figure 23A:
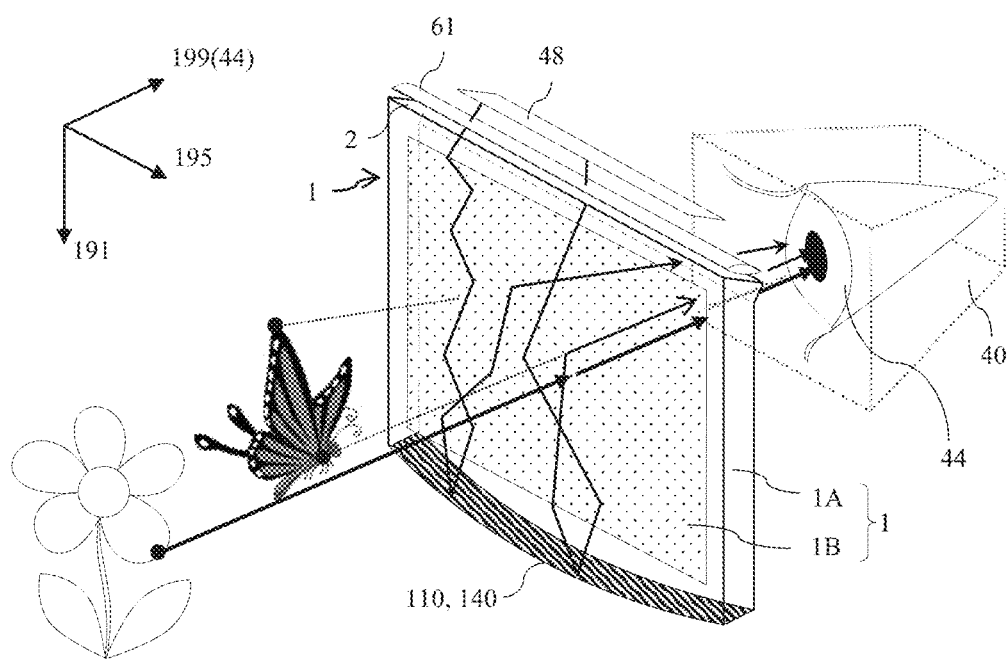
FIG. 23A is a schematic diagram illustrating in perspective front view an alternative arrangement of an anamorphic near-eye display apparatus comprising a diffractive optical element.
Figure 23B:
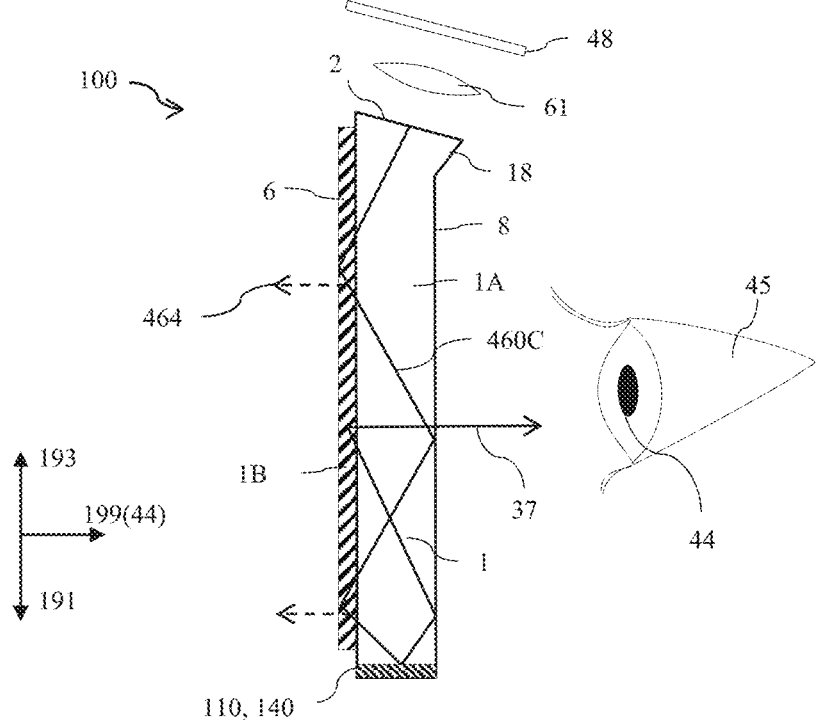
FIG. 23B is a schematic diagram illustrating in side view the operation of the anamorphic near-eye display apparatus of FIG. 23A.
Figure 23C:
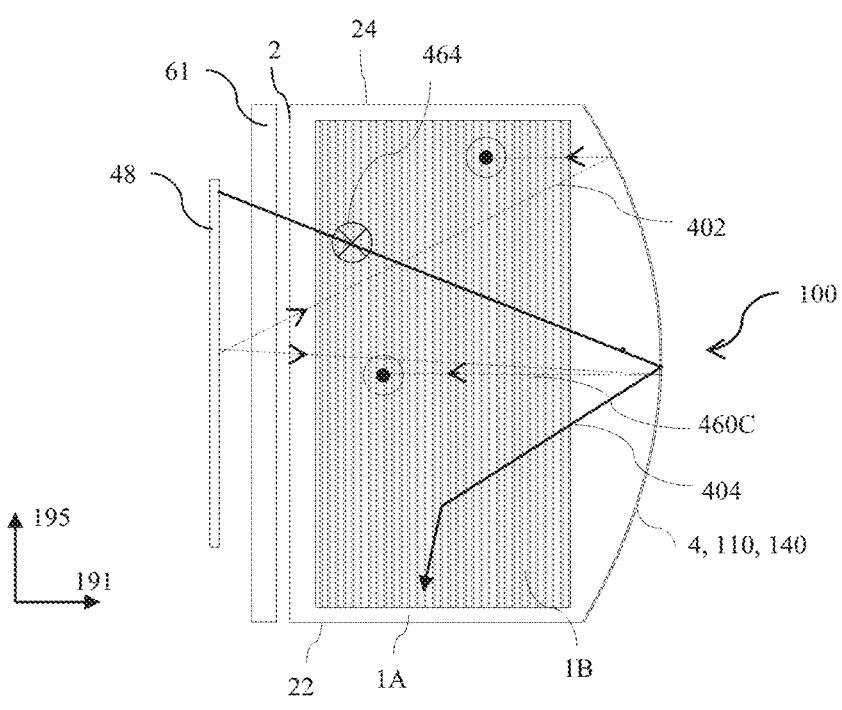
FIG. 23C is a schematic diagram illustrating in front view the operation of the anamorphic near-eye display apparatus of FIG. 23A.

FIG. 23A is a schematic diagram illustrating in perspective front view an alternative arrangement of the anamorphic near-eye display apparatus 100 wherein the extraction waveguide 1 comprises a diffractive optical element 1B; FIG. 23B is a schematic diagram illustrating in side view the operation of the anamorphic near-eye display apparatus 100 of FIG. 23A; and FIG. 23C is a schematic diagram illustrating in front view the operation of the anamorphic near-eye display apparatus 100 of FIG. 23A. Features of the embodiment of FIGS. 23A-C not discussed in further detail may be assumed to correspond to the features with equivalent reference numerals as discussed above, including any potential variations in the features.

Considering the alternative embodiment of FIG. 23A, the extraction waveguide 1 comprises a transmissive element 1A and a diffractive optical element 1B optically coupled to the transmissive element 1A. The operation of the transverse anamorphic component 60 and lateral anamorphic component 110 are as described elsewhere herein.

Considering FIGS. 23B-C, the diffractive optical element 1B is arranged to provide extraction of some of the light guided in the extraction waveguide 1 between the opposing rear and front guide surfaces 6, 8, wherein the diffractive optical element 1B is arranged between the opposing rear and front guide surfaces 6, 8. Central ray 460C on the optical axis 199(60) along the first direction 191 of the extraction waveguide 1 is partially reflected by the diffractive optical element 1B to output light 464 away from the eye 45. After reflection at the light reversing reflector, light is further reflected.

Figure 23D:
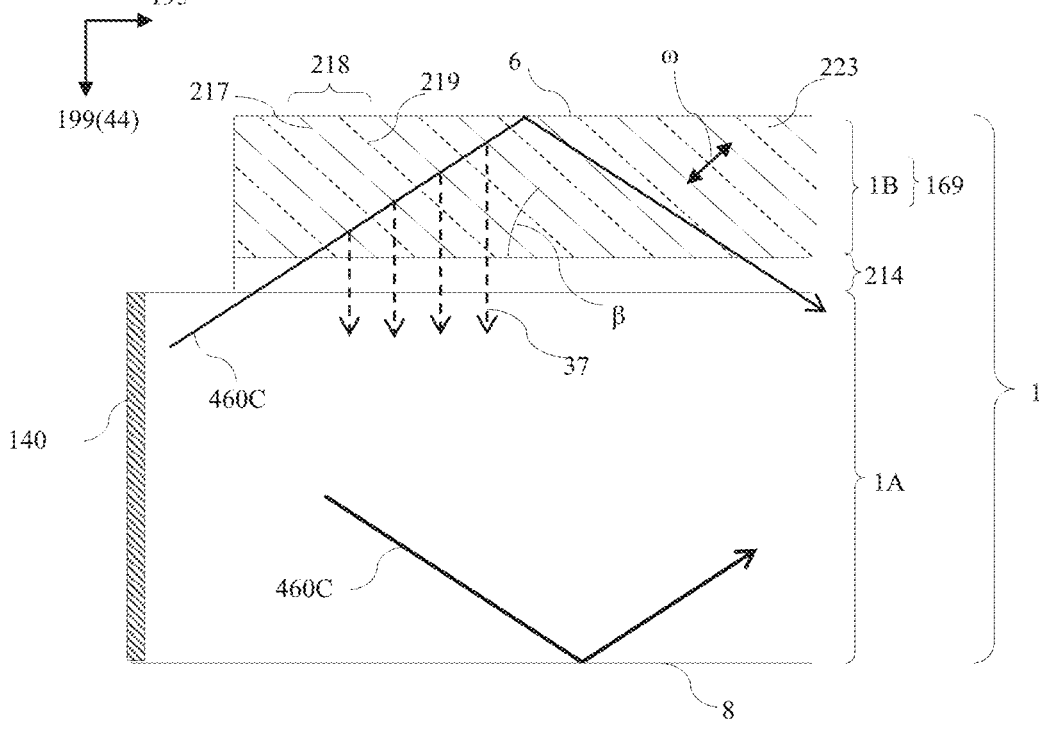
FIG. 23D is a schematic diagram illustrating in side view operation of a waveguide comprising a diffractive optical element.

FIG. 23D is a schematic diagram illustrating in side view operation of a waveguide comprising a diffractive output beam deflector element 216. Features of the embodiment of FIG. 23D not discussed in further detail may be assumed to correspond to the features with equivalent reference numerals as discussed above, including any potential variations in the features.

The extraction waveguide 1 comprises a transmissive element 1A and a diffractive optical element 1B optically coupled together, wherein the reflective extraction features 169 comprise portions 218 of the diffractive optical element 1B. The diffractive optical element 1B is an example of an extraction reflection feature and comprises a combination of iso-index layers 217, 219 provided in a continuum of material 223 with which are the features that extract light.

In other words, the extraction waveguide 1 comprises an array of portions 218 disposed internally within the extraction waveguide 1, the portions 218 being arranged to transmit light guided 400 along the extraction waveguide 1 in the first direction 191 and to extract light guided along the extraction waveguide 1 in the second direction 193 towards an eye 45 of a viewer. The array of portions 218 are distributed along the extraction waveguide 1 so as to provide exit pupil expansion.

FIG. 23D illustrates that the extraction waveguide 1 comprises the transmissive element 1A and a diffractive optical element 1B optically coupled to the transmissive element 1A by means of adhesive layer 214, wherein the diffractive optical element 1B comprises an array of portions 218. Light rays 460C are guided in the extraction waveguide 1 by means of total internal reflection at opposing rear and front guide surfaces 6, 8 of the extraction waveguide 1. Thus at least some light rays 460C are transmitted through the portions 218 of the diffractive optical element 1B. The proportion of light that is reflected by the portions 218 may be controlled by means of control of the modulation depth of the portion 218 along the extraction waveguide 1 in the direction 193.

The diffractive optical element 216 is a volume hologram wherein the portions 218 comprise iso-index planes 217 with increased refractive index and iso-index planes 217 with reduced refractive index. The index modulation between the iso-index plane 217, 219, the inclination p and pitch o of the iso-index planes 217, 219 provide the portions 218 with desirable extraction of light rays 37 from the diffractive optical element 1B.

It may be desirable to provide a more compact optical input arrangement.

Figure 24A:
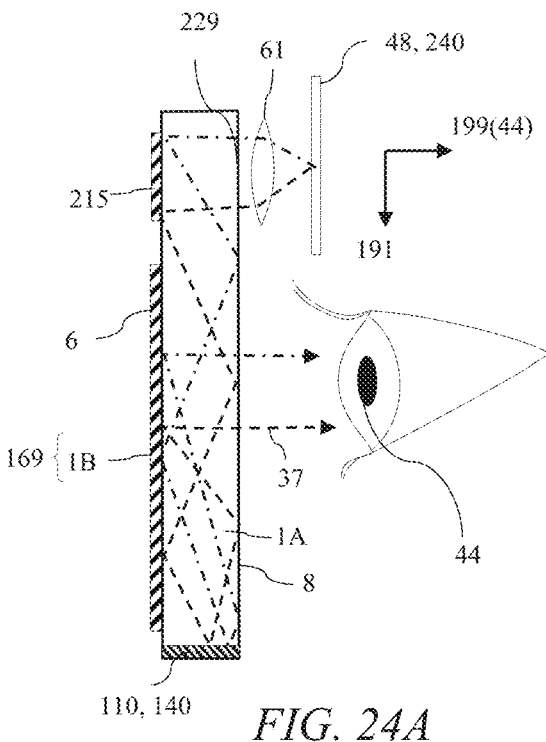
FIG. 24A is a schematic diagram illustrating in perspective front view an alternative arrangement of the anamorphic near-eye display apparatus of FIG. 23A further comprising a diffractive input deflector element.

FIG. 24A is a schematic diagram illustrating in perspective front view an alternative arrangement of the anamorphic near-eye display apparatus 100 further comprising a diffractive deflector element 215. Features of the embodiment of FIG. 24A not discussed in further detail may be assumed to correspond to the features with equivalent reference numerals as discussed above, including any potential variations in the features.

The extraction waveguide 1 is arranged to receive light from the illumination system 240 through an input area 229 of the light guide surface 8 of the extraction waveguide 1. The extraction waveguide 1 further comprises the diffractive deflector element 215 opposite the input area 239 on the opposing rear and front guide surfaces 6 of the extraction waveguide 1. The diffractive deflector element 215 is arranged to deflect the light received through the input area 219 along the extraction waveguide 1.

In the embodiment of FIG. 24A, a transverse anamorphic component 60 formed by the transverse lens 61 is arranged to direct light from the illumination system 240 into the extraction waveguide 1.

The inclination of the input end 2 and the tapered surface 18 may be omitted and advantageously cost and complexity reduced.

Figure 24B:
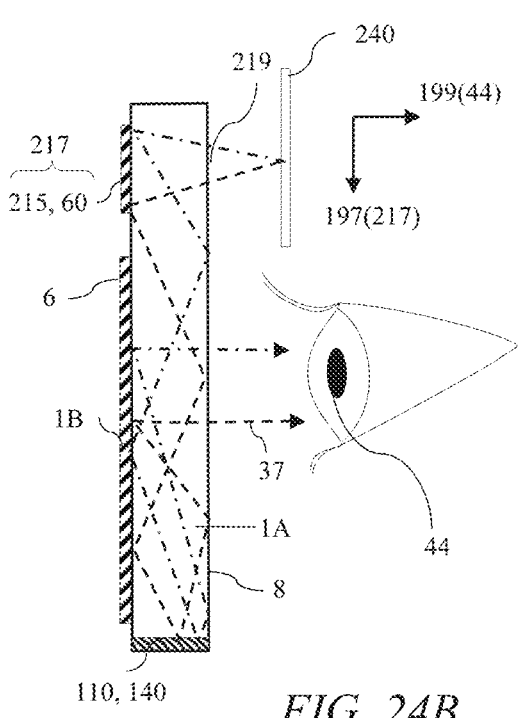
FIG. 24B is a schematic diagram illustrating in perspective front view an alternative arrangement of the anamorphic near-eye display apparatus of FIG. 23A further comprising a diffractive input deflector element wherein the diffractive input beam deflector has optical power in the lateral direction.

FIG. 24B is a schematic diagram illustrating in perspective front view an alternative arrangement of the anamorphic near-eye display apparatus 100 further comprising a diffractive deflector element 217 wherein the diffractive deflector element has optical power in the transverse direction 197. Features of the embodiment of FIG. 24B not discussed in further detail may be assumed to correspond to the features with equivalent reference numerals as discussed above, including any potential variations in the features.

FIG. 24B illustrates that the transverse lens 61 is omitted, and the optical function of the transverse anamorphic component 60 is provided in the iso-index profile of the diffractive deflector element 215 together with the optical function of the deflector 215. Advantageously the size of the input optics may be reduced.

The diffractive optical elements 1B, 215, 217 described hereinabove exhibit limited bandwidth and efficiency and so are well-suited to monochrome display.

It may further be desirable to provide a full color display apparatus comprising diffractive optical elements.

Figures 24C, 24D:
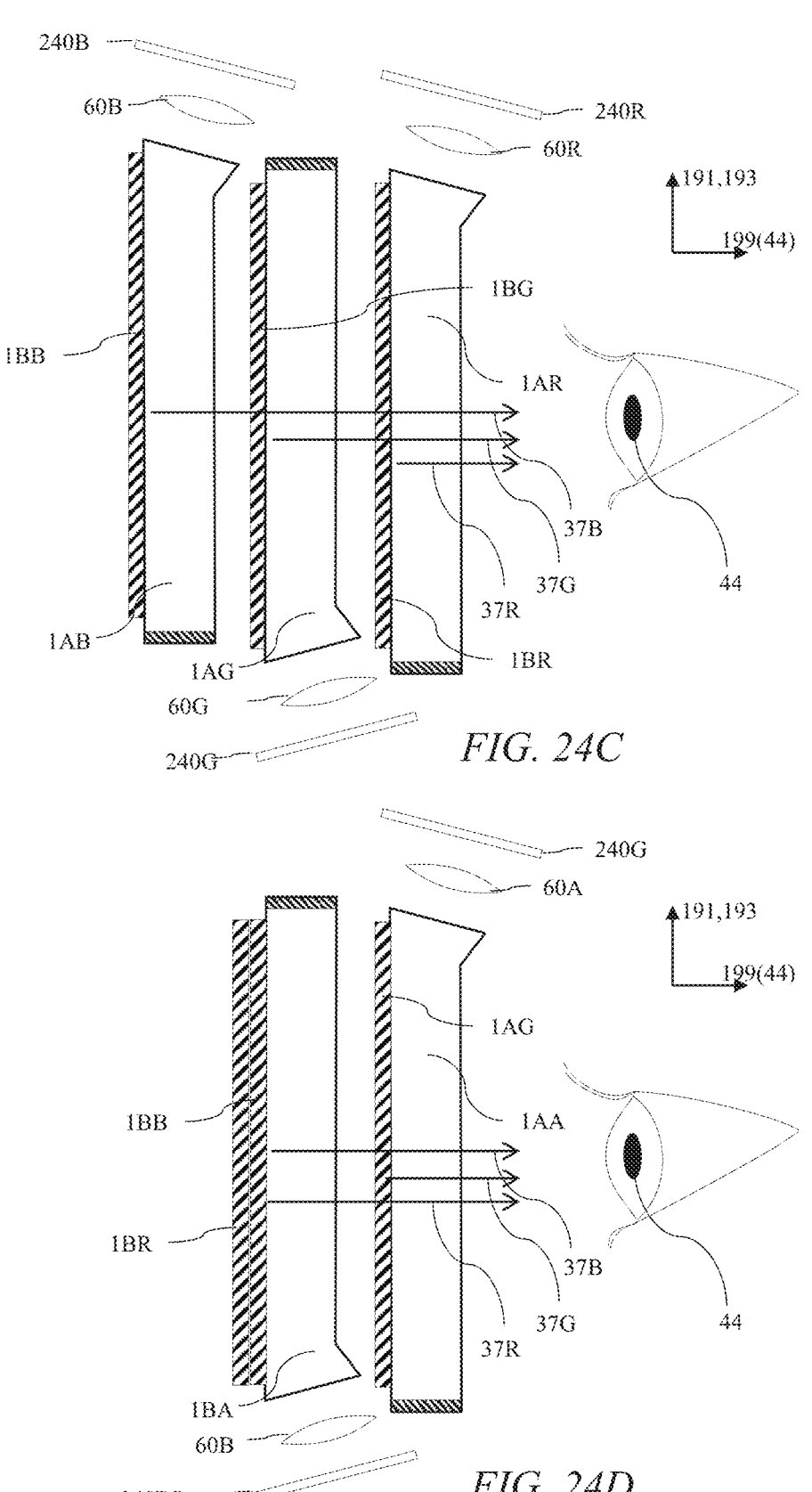
FIG. 24C is a schematic diagram illustrating in side view a full color anamorphic display apparatus comprising a stack of three extraction waveguides comprising diffractive optical elements.
FIG. 24D is a schematic diagram illustrating in side view a full color anamorphic display apparatus comprising a stack of two extraction waveguides comprising diffractive optical elements.

FIG. 24C is a schematic diagram illustrating in side view a full color anamorphic display apparatus 100 comprising three waveguides 1R, 1G, 1B comprising respective diffractive optical elements; and FIG. 24D is a schematic diagram illustrating in side view a full color anamorphic display apparatus 100 comprising two waveguides 1RB, 1G comprising respective diffractive optical elements. Features of the embodiment of FIG. 24C not discussed in further detail may be assumed to correspond to the features with equivalent reference numerals as discussed above, including any potential variations in the features.

The anamorphic near-eye display apparatus 100 comprises separate red display apparatus 100R, green display apparatus 100G and blue display apparatus 100B, each respectively comprising red, green and blue illumination systems 240R, 240G, 240B, transverse anamorphic components 60R, 60B, 60G and diffractive optical elements 1BR, 1BG, 1BB arranged on transmissive elements 1AR, 1AG, 1AB. Output light rays 37B, 37G, are transmitted through the extraction waveguide 1R. Color images may be advantageously provided.

In the alternative embodiment of FIG. 24D, a first extraction waveguide may be provided with a green diffractive optical element 1AG and transmissive element 1AA and a second extraction waveguide may be provided with red and blue diffractive optical elements 1BR, 1BB and transmissive element 1BA. The second waveguide is illuminated with red and blue light from illumination system 240RB while the illumination system 240G provides green illumination to the first extraction waveguide. Thickness may be reduced in comparison to a stack (not shown) comprising red, green and blue diffractive optical elements, cross-talk between the red and blue diffractive optical elements may be reduced. Color reproduction may be improved.

It may be desirable to provide further expansion of exit pupil 40 while reducing diffraction blur and manufacturing cost.

FIGS. 24E-G are schematic diagrams illustrating side views of alternative arrangements of extraction waveguides comprising combinations of reflective extraction features 169 of different forms. Features of the embodiments of FIGS. 24E-G not discussed in further detail may be assumed to correspond to the features with equivalent reference numerals as discussed above, including any potential variations in the features.

The extraction waveguides 1 of FIGS. 24E-G comprise transmissive elements 1A that comprise reflective extraction features 169 that are extraction reflectors that are a diffractive optical element 1B.

FIG. 24E illustrates an alternative embodiment wherein the extraction reflectors comprise plural constituent plates 180A-D and extraction reflectors 174 as described hereinabove. The central region of the exit pupil 40 in the transverse direction 197 may be provided by the extraction reflectors 174 with advantageously low diffraction blur. The number of constituent plates 180 may be reduced for a desirable exit pupil size $e_T$ in the transverse direction 197 and cost advantageously reduced.

The outer regions of the exit pupil 40 in the transverse direction 197 may be provided by the diffractive optical element 1B. The exit pupil 40 may advantageously have an increased size.

In the alternative embodiment of FIG. 24F, extraction reflectors 170 with stepped shape provide extraction for the region towards the center of the exit pupil 40, whereas the diffraction optical element 1B provides extraction for the outer region of the exit pupil 40. Advantageously high efficiency is provided in the central region. The size w of the extraction reflectors 170 may be increased and diffractive blur advantageously reduced. Further, the cost of manufacture may be reduced.

In the alternative embodiment of FIG. 24G, in comparison to the arrangement of FIG. 22D further reflective extraction features 169 comprising portions of a diffractive optical element 1B are provided. The size of the exit pupil 40 is advantageously increased and manufacturing cost reduced.

The alternative embodiments of FIGS. 24E-G illustrate non-limiting arrangements comprising different types of reflective extraction features 169. The various embodiments described elsewhere herein for reflective extraction features 169 may be arranged together in further arrangements to achieve optimization of manufacturing cost, exit pupil 40 size, image blur, stray light and other desirable display characteristics of the near-eye anamorphic display 100 of the present disclosure.

It may be desirable to provide reduced aberrations from the lateral anamorphic component 110. Some approaches for reducing aberrations are implemented in the following examples. In the following examples, specific examples of the refractive extraction features 169 are shown (for example being extraction reflectors 170 in FIG. 25A and extraction reflectors 174 in FIGS. 25B-D and so on), but this is not limitative and in general any of the refractive extraction features 169 disclosed herein may alternatively be applied in the following examples. Similarly, the various features of the following examples may be combined together in any combination.

Figure 25A:
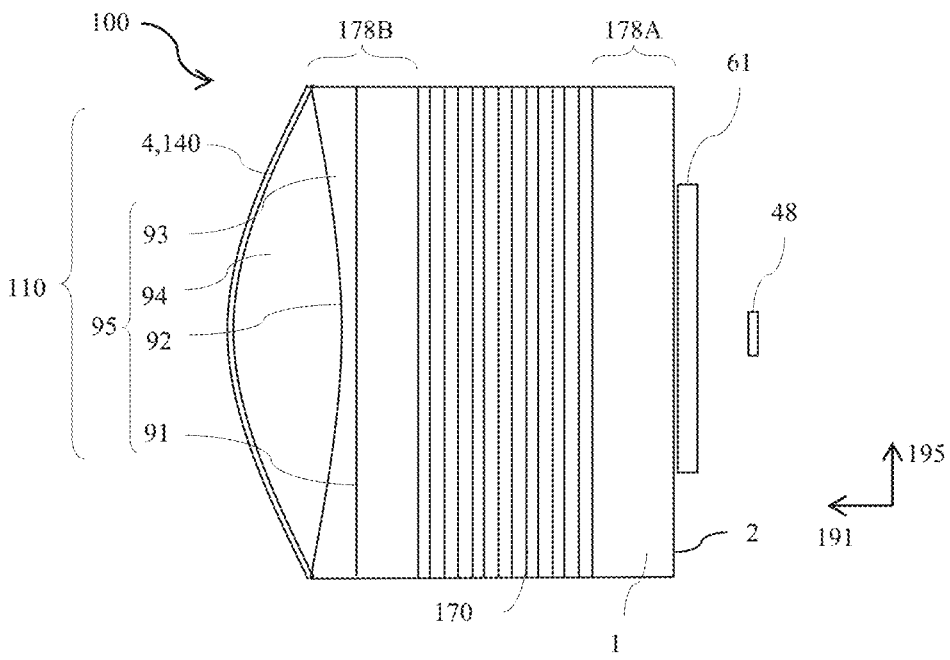
FIG. 25A is a schematic diagram illustrating in front view an anamorphic near-eye display apparatus comprising a lateral anamorphic component that is refractive and reflective.

FIG. 25A is a schematic diagram illustrating in front view an anamorphic near-eye display apparatus 100 wherein the lateral anamorphic component 110 comprises a curved reflective end 4 and further refractive components, in particular surfaces 91, 92 and intermediate materials 93, 94, that form part of the extraction waveguide 1 and are disposed between the reflective end 4 and the reflective extraction features 169. Features of the embodiment of FIG. 25A not discussed in further detail may be assumed to correspond to the features with equivalent reference numerals as discussed above, including any potential variations in the features.

FIG. 25A illustrates that the lateral anamorphic component 110 may further comprises a lens 95 comprising in this example surfaces 91, 92 and intermediate materials 93, 94. The lens 95 may be arranged with rear and front guide surfaces 6, 8 that are co-planar with the opposing light guide surfaces 6, 8 of the extraction waveguide 1. Advantageously high efficiency may be achieved.

In operation, the lens 95 may be arranged to provide improved aberrations in the lateral direction 195 over a wider exit aperture e$_L$. Thus the image blur 455 as illustrated in FIG. 1F may advantageously be reduced.

Figure 25B:
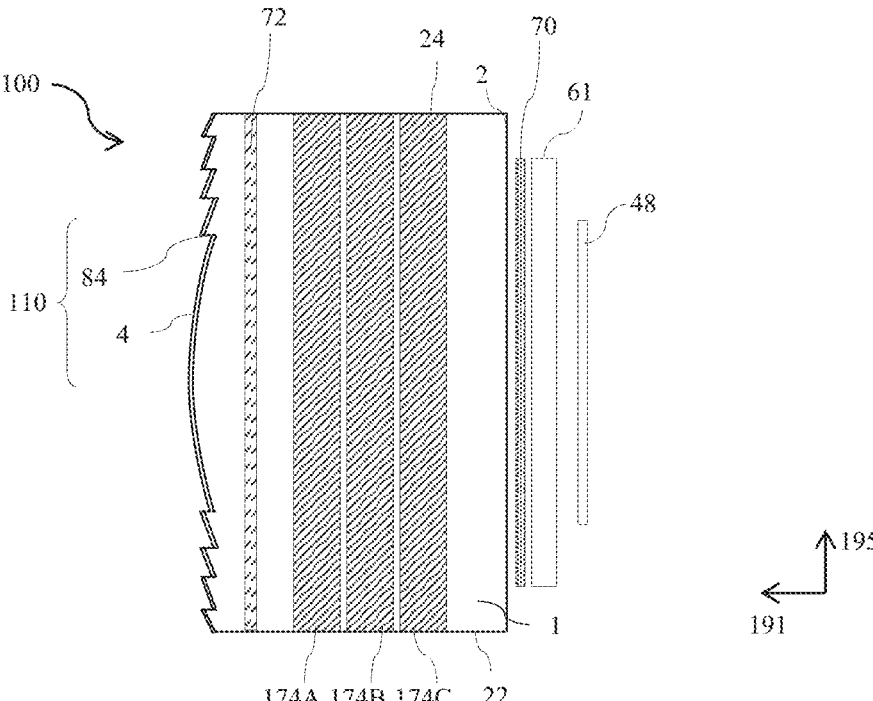
FIG. 25B is a schematic diagram illustrating in front view an anamorphic near-eye display apparatus comprising a lateral anamorphic component that is a reflective end of a waveguide comprising a Fresnel reflector.

In the alternative embodiment of FIGS. 25A, the extraction waveguide 1 is illustrated with stepped extraction reflectors 170, although the embodiments of FIGS. 25A-B are not limited to the stepped extraction reflectors 170 and any other reflective extraction features 169 described hereinbefore may be provided as alternatives.

It may be desirable to reduce the size of the reflective end.

FIG. 25B is a schematic diagram illustrating in front view an anamorphic near-eye display apparatus 100 wherein the lateral anamorphic component 110 comprises the reflective end 4 of the waveguide, which is formed in this example as a Fresnel reflector 97. Features of the embodiment of FIG. 25B not discussed in further detail may be assumed to correspond to the features with equivalent reference numerals as discussed above, including any potential variations in the features.

Fresnel reflector 84 is arranged to advantageously remove the sag of a domed reflective end 4 as illustrated in FIG. 25A.

In the alternative embodiment of FIGS. 25B, the extraction waveguide 1 is illustrated with extraction reflectors 174 arranged between plural plates 180 although the other extraction reflectors described hereinbefore may be provided as alternatives.

Figure 25C:
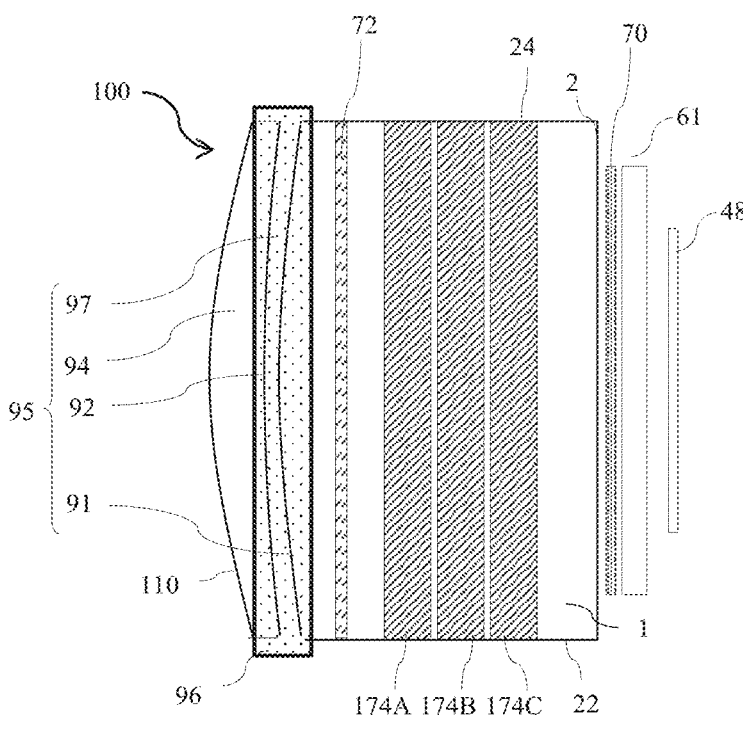
FIG. 25C is a schematic diagram illustrating in front view an anamorphic near-eye display apparatus comprising a lateral anamorphic component that is a refractive component comprising an air gap and air gap mirrors.
Figure 25D:
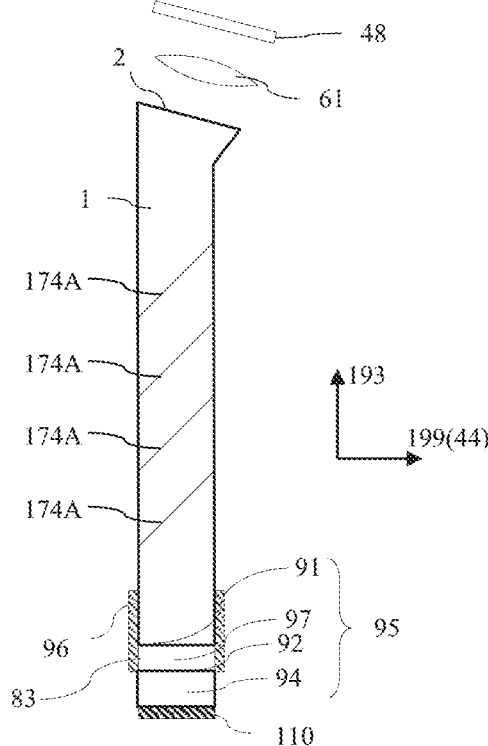
FIG. 25D is a schematic diagram illustrating in side view the anamorphic near-eye display apparatus of FIG. 25D.

FIG. 25C is a schematic diagram illustrating in front view an anamorphic near-eye display apparatus 100 wherein the lateral anamorphic component 110 comprises a refractive component 95 comprising an air gap and air gap mirrors 96; and FIG. 25D is a schematic diagram illustrating in side view the anamorphic near-eye display apparatus 100 of FIG. 25C. Features of the embodiments of FIGS. 25C-D not discussed in further detail may be assumed to correspond to the features with equivalent reference numerals as discussed above, including any potential variations in the features.

By comparison with FIG. 25A, in the alternative embodiment of FIG. 25C, the intermediate material 93 is replaced by an air gap 97 with surfaces 91, 92 facing the air gap 97. The refractive power of the surfaces 91, 92 may be modified, advantageously providing increased control of aberrations in the lateral direction 195. The surfaces 91, 92 may have circular, elliptical or other aspheric top view profiles to advantageously maximise image performance directed to the eye 45.

The air gap 97 has edges 83, and the anamorphic near-eye display apparatus 100 further comprises reflectors that are air gap mirrors 96 extending across the edges 83 of the air gap 97. The air gap mirrors 96 provide trapping of guiding light in the region of the air gap 97. Advantageously efficiency is increased and spatial uniformity improved.

It may be desirable to reduce image blur at higher lateral field angles.

FIG. 26A is a schematic diagram illustrating in front view an anamorphic near-eye display apparatus 100 wherein the input end 2 of the extraction waveguide 1 has curvature in the lateral direction 195. Features of the embodiment of FIG. 26A not discussed in further detail may be assumed to correspond to the features with equivalent reference numerals as discussed above, including any potential variations in the features.

In the illustrative embodiment of FIG. 1A, the input end 2 has no curvature in the lateral direction. In practice, aberrations including those of the lateral anamorphic component 110 may provide Petzval field curvature provides an illustrative curved field surface 98A as marked in FIG. 26A. Image pixels on the field surface 98A provide the largest modulation transfer function (MTF) when seen by the eye 45. Image pixels that are separated in the direction 191 from the field surface 98A have reduced MTF, appearing more blurry. It would be desirable to provide pixels 222 of the spatial light modulator 48 that are on the field surface 98 of the optical system.

In the alternative embodiment of FIG. 26A, the input end 2 of the extraction waveguide 1 has a curvature in the lateral direction 195 that compensates for Petzval field curvature of the lateral anamorphic component 110. Thus the desirable field surface 98B provided by FIG. 26B is more closely aligned to the plane of the spatial light modulator 48. MTF for off-axis field points is increased and advantageously image blur is reduced.

Alternative embodiments to reduce field curvature will now be described.

Figure 26D:
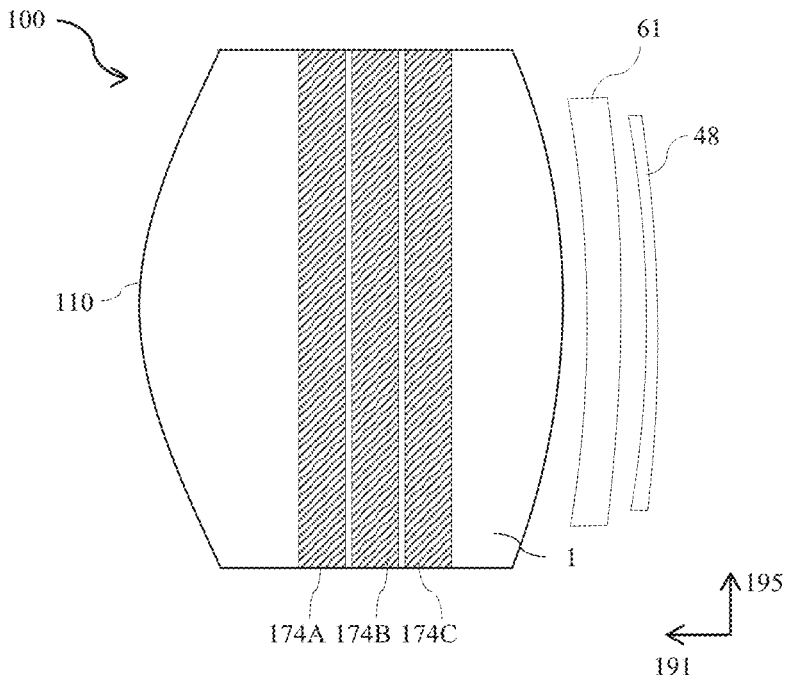
FIG. 26D is a schematic diagram illustrating in front view an anamorphic near-eye display apparatus wherein an input end of the extraction waveguide has curvature in the lateral direction, a transverse anamorphic component has curvature in the lateral direction, and a spatial light modulator has curvature in the lateral direction, where the direction of curvature is in an opposite direction to that of FIG. 26C.
Figure 26E:
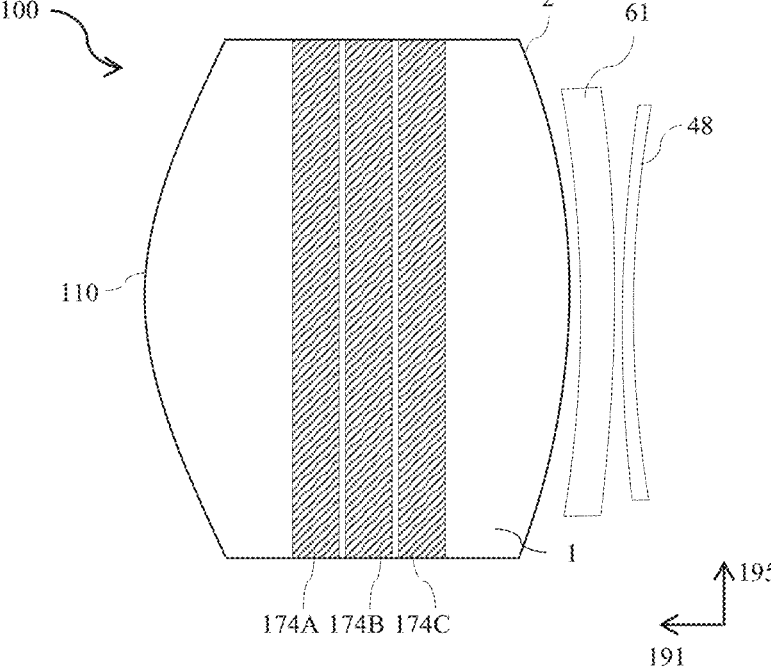
FIG. 26E is a schematic diagram illustrating in front view an anamorphic near-eye display apparatus wherein an input end of the extraction waveguide has curvature in the lateral direction, a transverse anamorphic component has curvature in the lateral direction, and a spatial light modulator has curvature in the lateral direction, where the direction of curvature of these components is different.

FIG. 26B is a schematic diagram illustrating in front view an anamorphic near-eye display apparatus 100 wherein the input end 2 of the extraction waveguide 1 has curvature in the lateral direction 195 and the transverse anamorphic component 60 has curvature in the lateral direction 195; FIG. 26C is a schematic diagram illustrating in front view an anamorphic near-eye display apparatus 100 wherein the input end 2 of the extraction waveguide 1 has curvature in the lateral direction 195, the transverse anamorphic component 60 has curvature in the lateral direction 195, and the spatial light modulator 48 has curvature in the lateral direction 195; FIG. 26D is a schematic diagram illustrating in front view an anamorphic near-eye display apparatus 100 wherein the input end 2 of the extraction waveguide 1 has curvature in the lateral direction 195, the transverse anamorphic component 60 has curvature in the lateral direction 195 and the spatial light modulator 48 has curvature in the lateral direction 195, where the direction of curvature of each of the input end 2, the transverse anamorphic component and the spatial light modulator 48 is opposite to that of FIG. 26C; and FIG. 26E is a schematic diagram illustrating in front view an anamorphic near-eye display apparatus 100 wherein the input end 2 of the extraction waveguide 1 has curvature in the lateral direction 195, the transverse anamorphic component 60 has curvature in the lateral direction 195, and the spatial light modulator 48 has curvature in the lateral direction 195, where the direction of curvature of each of the input end 2 and the transverse anamorphic component is the opposite to that of FIG. 26C, and the direction of curvature of the spatial light modulator 48 is the same as that of FIG. 26C. Features of the embodiments of FIGS. 26B-E not discussed in further detail may be assumed to correspond to the features with equivalent reference numerals as discussed above, including any potential variations in the features.

The alternative embodiments of FIGS. 26B-E are examples illustrating the case that at least one of the input end 2 of the extraction waveguide 1, the transverse anamorphic component 60 and the spatial light modulator 48 has a curvature in the lateral direction 195 in a manner that compensates for Petzval field curvature of the lateral anamorphic component 110. The directions of curvature of respective elements 2, 60, 48 may be modified to achieve optimised image performance so that the MTF for off-axis field points is further increased and advantageously image blur is reduced.

In comparison to non-anamorphic components, the curvature may be arranged about only one axis. In particular, the spatial light modulator 48 may comprise a silicon or glass backplane. Such backplanes are not typically suitable for curvature about two axes. However in the present embodiments, single axis curvature may achieve desirable correction for field curvature. Advantageously the cost of achieving a suitably curved spatial light modulator 48 may be reduced.

It would be desirable to provide further improvement of aberrations from the lateral anamorphic component 110.

Figures 27A, 27B:
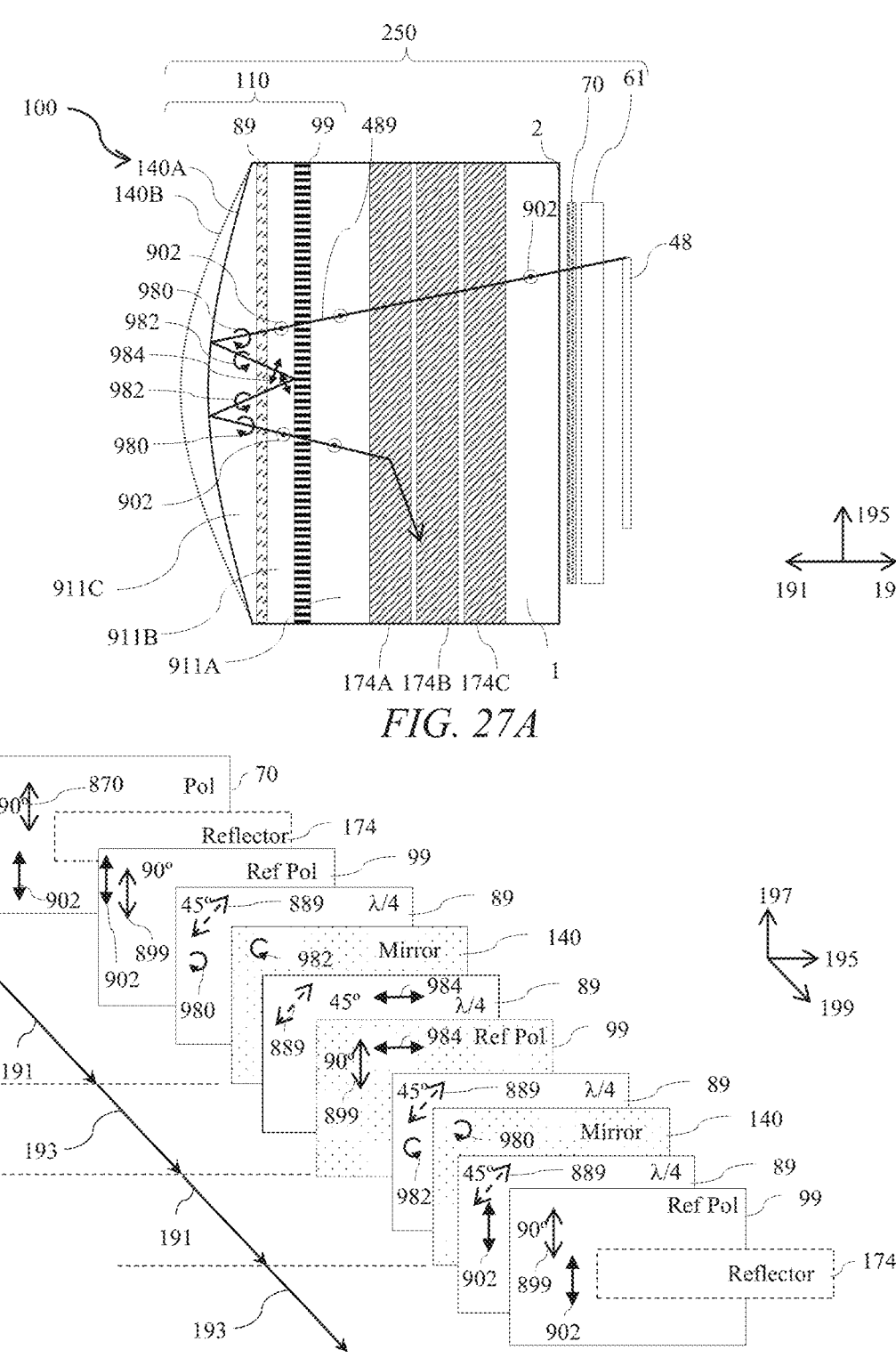
FIG. 27A is a schematic diagram illustrating in front view an anamorphic near-eye display apparatus wherein the lateral anamorphic component further comprises a planar reflective polarizer and a quarter wave retarder arranged between the reflective end and the reflective polarizer.
FIG. 27B is a schematic diagram illustrating optical axis alignment directions through the polarization control components of FIG. 27A.

FIG. 27A is a schematic diagram illustrating in front view an anamorphic near-eye display apparatus 100 wherein the lateral anamorphic component 110 further comprises a planar reflective linear polarizer 99 and a polarization conversion retarder 89 arranged between the light reversing reflector 140 that is the reflective end 4, and the reflective linear polarizer 99; and FIG. 27B is a schematic diagram illustrating optical axis alignment directions through the polarization control components of FIG. 27A. Features of the embodiment of FIGS. 27A-B not discussed in further detail may be assumed to correspond to the features with equivalent reference numerals as discussed above, including any potential variations in the features.

In the alternative embodiment of FIG. 27A, the lateral anamorphic component 110 comprises: a reflective linear polarizer 99 disposed between the light reversing reflector 140 wherein the light reversing reflector 140 is curved in the lateral direction 195 and the array of extraction reflectors 174A-C; and a polarization conversion retarder 89 disposed between the reflective linear polarizer 99 and the light reversing reflector 140, the polarization conversion retarder 89 being arranged to convert a polarization state of light passing therethrough between a linear polarization state and a circular polarization state.

The reflective linear polarizer 99 is arranged between waveguide parts 911A, 911B and the polarization conversion retarder 89 is arranged between waveguide parts 911B, 911C. In alternative embodiments such as illustrated in FIG. 27F hereinbelow, the polarization conversion retarder 89 may be arranged on the reflective linear polarizer 99 or on the light reversing reflector 140A such that the waveguide part 911C is omitted.

In FIG. 27B, illustrative arrangements of optical axis direction 889 of polarization conversion retarder 89 respectively is illustrated; and the linear polarization state transmission axes 870, 899 of polarizers 70, 99 respectively. For illustrative purposes, the geometry is unfolded after reflection at the light reversing reflector 140.

Considering light ray 489, input linear polarizer 70 provides p-polarization state 902 in the waveguide 1. Light ray 489 is transmitted by reflective linear polarizer 99. The polarization conversion retarder 89 has a retardance of a quarter wavelength at a wavelength of visible light; that is the polarization conversion retarder 89 may be a quarter wave retardation at a visible wavelength such as 550 nm and may comprise a stack of composite retarders arranged to achieve the operation of a quarter wave retarder over an increased spectral band, for example comprising a Pancharatnam stack. The retardance of the polarization conversion retarder 89 may be different to a quarter wavelength, but selected to provide the same effect. For example, the polarization conversion retarder 89 may have a retardance of three quarter wavelengths or five quarter wavelengths, for example.

The optical system 250 further comprises an input linear polarizer 70 disposed between the spatial light modulator 48 and the array of extraction reflectors 174A-C, wherein the input linear polarizer 70 and the reflective linear polarizer 99 of the lateral anamorphic component 110 are arranged to pass a common polarization state.

Reflective linear polarizer 99 may be a wire grid polarizer or a multilayer polarizer film such as 3M APF reflective polarizer and may be bonded between parts 911A, 911B of the extraction waveguide 1.

The polarization conversion retarder 89 of FIG. 27A outputs a circular polarization state 980. After reflection at the light reversing reflector 140A, the circular polarization state 982 is provided due to the phase shift at reflection and is converted to s-polarization state 984 that is reflected by reflective linear polarizer 99. Light ray 489 is then reflected a second time by the light reversing reflector 140A to provide polarization state 902 that is transmitted through the reflective linear polarizer 99 and reflected by the extraction reflectors 174A-C. Thus the polarization conversion retarder 89 has a different function to the polarization conversion retarder 72 of FIG. 6A for example.

The light ray 489 is thus incident twice onto the light reversing reflector 140A. Such an arrangement may reduce the sag of the light reversing reflector 140A in comparison to the light reversing reflector 140B that would be used if the reflective linear polarizer 99 and polarization conversion retarder 89 were omitted. Aberrations of the optical system may be reduced and MTF increased. Further the optical power is achromatic, minimizing color blur. Advantageously the eye 45 may see reduced image blur for off-axis viewing directions. Field of view may be increased for high image quality.

In alternative embodiments to those described elsewhere herein, the polarization state 902 may be provided by another polarization state such as a linearly polarised s-polarization state or a circular polarization state for example. Corresponding polarization states that propagate through the system may be provided, to achieve a similar operation. The polarization state 902 may be provided to achieve desirably low glare for light exiting from the waveguide 1 away from the eye 45 of the viewer 47 and efficient reflection from reflective extraction features 169 after reflection from the light reversing reflector 140. Further improvement of aberrations as described hereinbelow may be achieved.

Figures 27C, 27D:
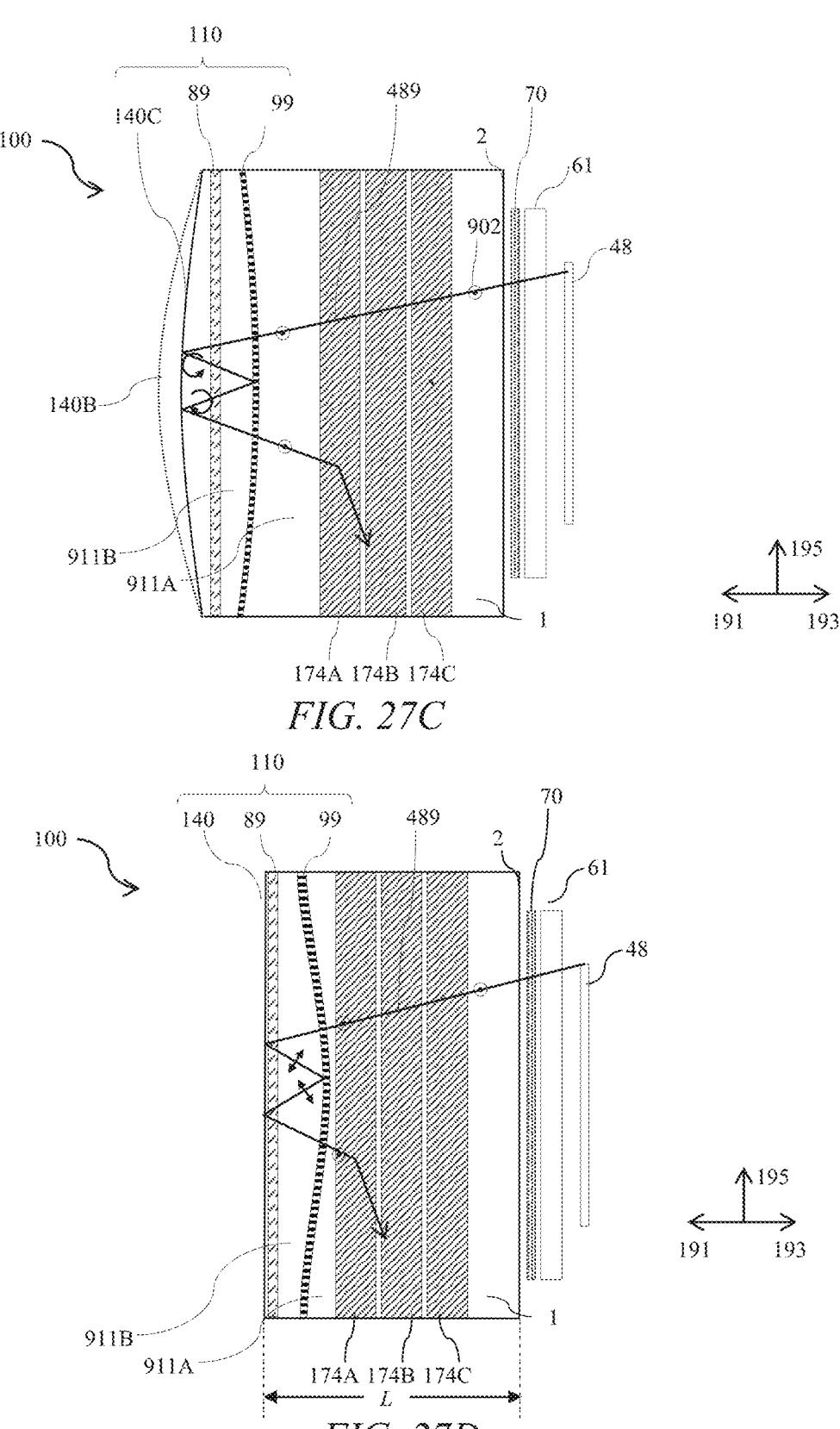
FIG. 27C is a schematic diagram illustrating in front view an anamorphic near-eye display apparatus wherein the lateral anamorphic component further comprises a curved reflective polarizer and a quarter wave retarder arranged between the reflective end and the reflective polarizer.
FIG. 27D is a schematic diagram illustrating in front view an anamorphic near-eye display apparatus wherein the lateral anamorphic component further comprises a planar reflective end, a curved reflective polarizer and a quarter wave retarder arranged between the planar reflective end and the reflective polarizer.
Figures 27E, 27F:
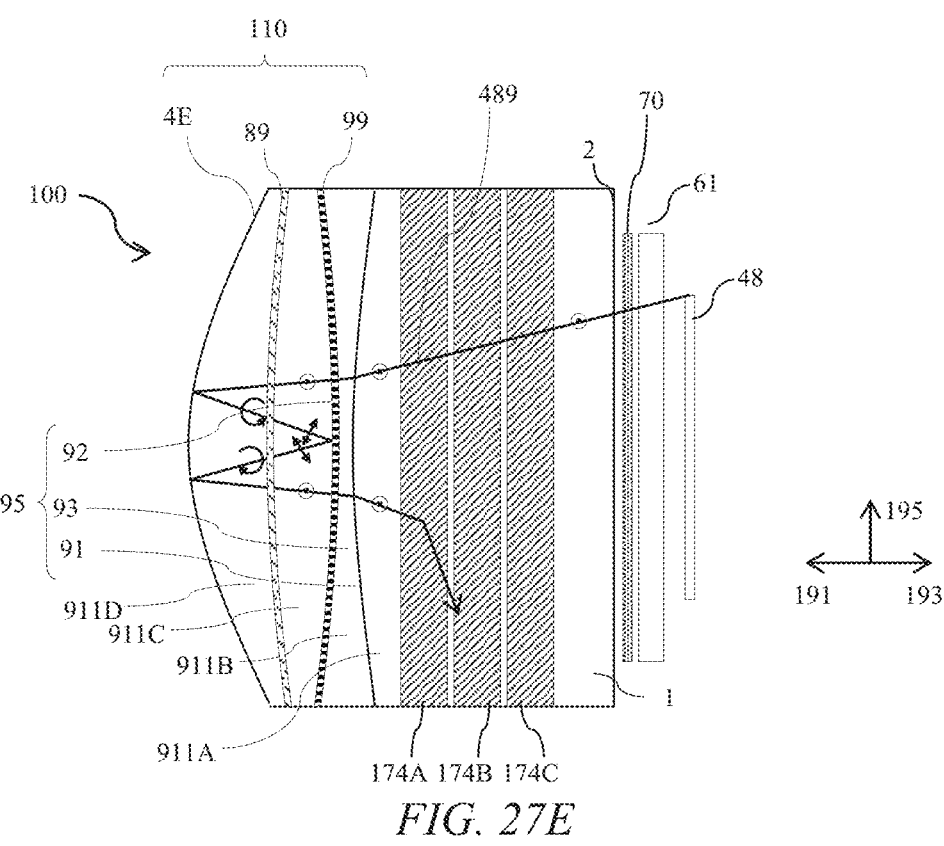
FIG. 27E is a schematic diagram illustrating in front view an anamorphic near-eye display apparatus wherein the lateral anamorphic component comprises a curved reflective end, a curved reflective polarizer; a quarter wave retarder arranged between the planar reflective end and the reflective polarizer and a refractive lens arranged between the input end and the reflective polarizer.
FIG. 27F is a schematic diagram illustrating in front view an anamorphic near-eye display apparatus wherein the lateral anamorphic component further comprises a planar reflective polarizer, a quarter wave retarder arranged between the reflective end and the reflective polarizer and a further quarter wave retarder arranged between the input end and the reflective polarizer wherein the input linear polarizer is incorporated in the extraction waveguide.

FIG. 27C is a schematic diagram illustrating in front view an anamorphic near-eye display apparatus 100 wherein the lateral anamorphic component 110 further comprises a curved reflective linear polarizer 99 and a polarization conversion retarder 89 arranged between the light reversing reflector 140 that is the reflective end 4, and the reflective linear polarizer 99. Features of the embodiment of FIG. 27C not discussed in further detail may be assumed to correspond to the features with equivalent reference numerals as discussed above, including any potential variations in the features.

In comparison to the embodiment of FIG. 27A, in the alternative embodiment of FIG. 27C, the reflective polarizer 99 is curved in the lateral direction 195. Reflections take place in series from surface 140C, then surface 99 and then surface 140C again. Optical power is provided at each reflection so that the curvature of each surface can be reduced to achieve the desired optical power of the lateral anamorphic component 110. Aberrations of the optical system may be further reduced and MTF increased. Further the optical power is achromatic, minimizing color blur. Advantageously the eye 45 may see reduced image blur for off-axis viewing directions. The light reversing reflectors 140 of the present embodiments may be aspheric. Field of view may be further increased for high image quality.

Further, the reflective linear polarizer 99 may be provided in manufacture by means of curving the surface of the reflective linear polarizer 99 about a single axis. Distortions of the reflective linear polarizer 99 may be advantageously reduced.

FIG. 27D is a schematic diagram illustrating in front view an anamorphic near-eye display apparatus 100 wherein the lateral anamorphic component 110 further comprises a planar light reversing reflector 140 that is the reflective end 4, a curved reflective linear polarizer 99 and a polarization conversion retarder 89 arranged between the planar light reversing reflector 140 that is the reflective end 4, and the reflective linear polarizer 99; and FIG. 27E is a schematic diagram illustrating in front view an anamorphic near-eye display apparatus 100 wherein the lateral anamorphic component 110 comprises a curved light reversing reflector 140 that is the reflective end 4, a curved reflective linear polarizer 99; a polarization conversion retarder 89 arranged between the planar light reversing reflector 140 that is the reflective end 4, and the reflective linear polarizer 99 and a refractive lens arranged between the input end 2 and the reflective linear polarizer 99. Features of the embodiments of FIGS. 27D-E not discussed in further detail may be assumed to correspond to the features with equivalent reference numerals as discussed above, including any potential variations in the features.

In the alternative embodiment of FIG. 27D, the light reversing reflector 140 is not curved in the lateral direction 195 and is planar; and the reflective linear polarizer 99 is arranged to provide the optical power of the lateral anamorphic component 110. Advantageously the length L of the extraction waveguide 1 may be reduced for a desirable focal length of the light reversing reflector. Aberrations may advantageously be improved in a smaller package.

Further the reflective linear polarizer 99 may have a profile that has an aspheric shape to advantageously achieve improved aberrations.

In the alternative embodiment of FIG. 27E, the polarization conversion retarder 89 is curved in the lateral direction and is arranged between waveguide parts 911C, 911D that have different refractive indices and/or different dispersions of refractive index with wavelength. Advantageously further correction of aberrations may be achieved.

The alternative embodiment of FIG. 27E further shows refractive lens 95 comprising surface 91 between waveguide parts 911A, 911B, surface 92 of the reflective linear polarizer 99 and material 93 that has a different refractive index to the material of the waveguide part 911A. Such an arrangement may further provide increased control of aberrations. Off-axis field of view for desirable image blur may be further increased.

The embodiments of FIGS. 27A-G show that the same polarization state 902 propagates in the first and second directions 191, 193 in the waveguide 1. It may be desirable to reduce stray light.

Figure 27G:
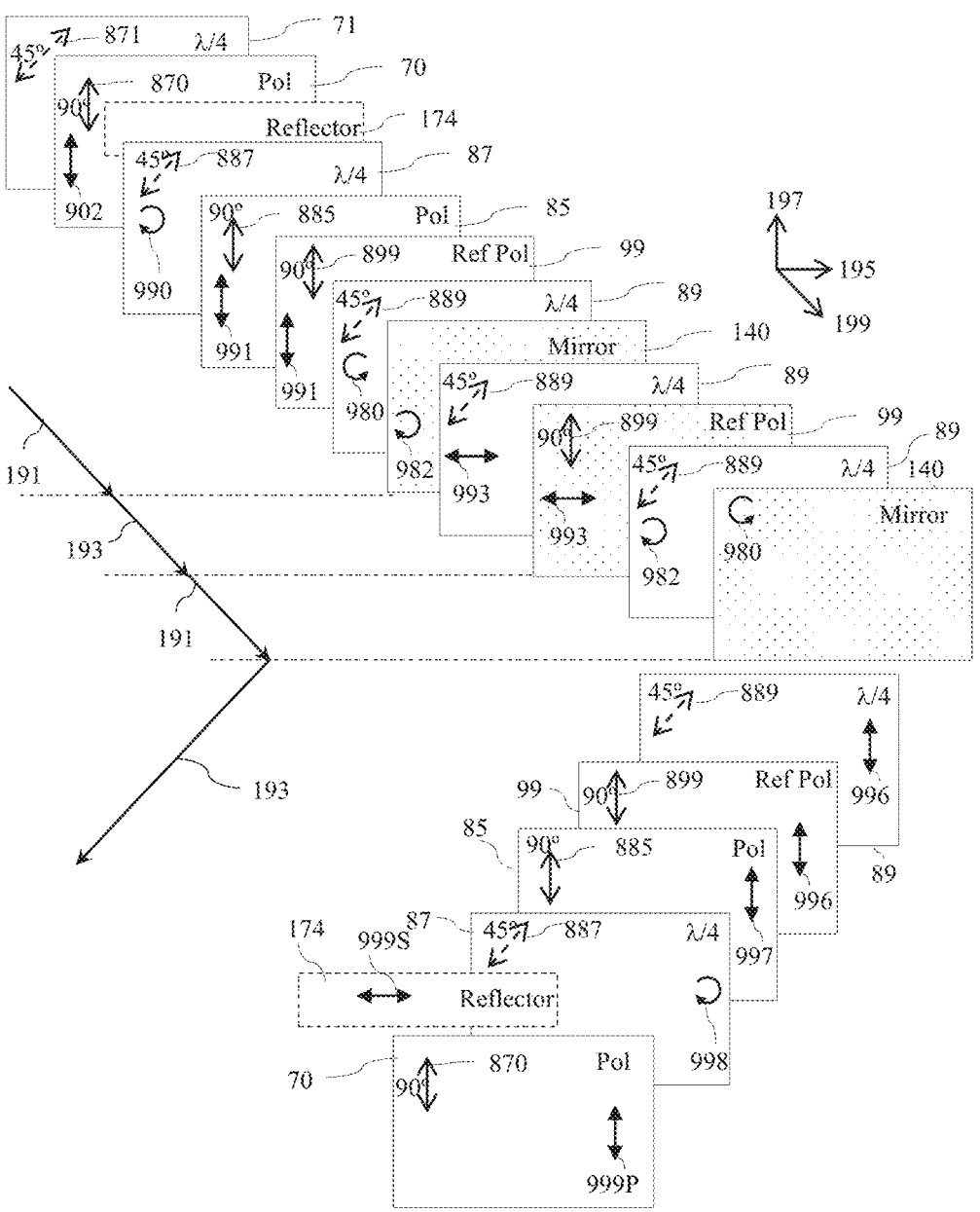
FIG. 27G is a schematic diagram illustrating optical axis alignment directions through the polarization control components of FIG. 27F.

FIG. 27F is a schematic diagram illustrating in front view an anamorphic near-eye display apparatus 100 wherein the lateral anamorphic component 110 further comprises an absorbing polarizer 85; a reflective linear polarizer 99; a polarization conversion retarder 89 arranged between the light reversing reflector 140 that is the reflective end 4, and the reflective linear polarizer 99; a polarization control retarder 87 arranged between the input end 2 and the reflective linear polarizer 99; and FIG. 27G is a schematic diagram illustrating propagation of illustrative polarization states through the polarization control components of FIG. 27F. Features of the embodiments of FIGS. 27F-G not discussed in further detail may be assumed to correspond to the features with equivalent reference numerals as discussed above, including any potential variations in the features.

In the alternative embodiment of FIG. 27F, the optical system 250 comprises an input linear polarizer 70 disposed between the spatial light modulator 48 and the array of extraction reflectors 170 and the lateral anamorphic component 110 further comprises: a polarization control retarder 87 disposed between the reflective linear polarizer 99 and the array of extraction reflectors 170, the polarization control retarder 87 being arranged to change a polarization state of light passing therethrough; and an absorbing linear polarizer 85 disposed between the polarization control retarder 87 and the reflective linear polarizer 99, wherein the absorbing linear polarizer 85 and the reflective linear polarizer 99 are arranged to pass a common linear polarization state that is a component of the polarization state output from the polarization control retarder 87 in the direction along the waveguide 1.

In FIG. 27F the polarization control retarder 87 has a retardance of a quarter wavelength retarder at a wavelength of visible light such as 550 nm and may be a Pancharatnam retarder. Polarization control retarder 87 is arranged to convert a polarization state of light passing therethrough between a linear polarization state 902, 997 and a circular polarization state 990, 998. Polarization control retarder 87 has a retardance and optical axis direction 887 arranged to provide said conversion.

The optical system 250 comprises an input linear polarizer 70 disposed between the spatial light modulator 48 and the array of extraction reflectors 170 and polarization conversion retarder 89 is curved in the lateral direction 195.

In FIG. 27G, illustrative arrangements of optical axis directions 871, 887, 889 of quarter wave retarders 71, 87, 89 respectively are illustrated; and the linear polarization state transmission axes 870, 885, 899 of polarizers 70, 85, 99 respectively. For illustrative purposes, the geometry is unfolded after reflection at the light reversing reflector 140. At least some of the quarter wave retarders 71, 87, 89 may have a quarter wave retardation at a visible wavelength such as 550 nm and may comprise a stack of composite retarders arranged to achieve the operation of a quarter wave retarder over an increased spectral band, for example comprising a Pancharatnam stack.

Considering the propagation of polarization states along the ray 489 in FIG. 27F then the linear polarization state is converted to circular polarization state 990 before the absorbing polarizer 85 that has an electric vector transmission direction parallel to the electric vector transmission direction of the reflective linear polarizer 99.

Half of the light is transmitted through the reflective linear polarizer 99 and polarization states 991, 992, 993, 994, 995, 996, 997 are provided by the various reflections and passes through polarization conversion retarder 89 as described for FIG. 27A hereinabove. The polarization control retarder 87 provides circular polarization state 998, with some light with polarization state 999S reflected by polarization selective extraction reflectors 174A-C, while the light with polarization state 999P is transmitted to the input end 2.

As described elsewhere herein, the polarization conversion retarder 71 may be arranged to reflect the residual transmitted light to be absorbed at input linear polarizer 70. Advantageously visibility of the unextracted light is reduced.

FIG. 27F further illustrates alternative arrangements of polarizer and retarder locations. Such alternative illustrative arrangements of polarizer and retarder locations may be provided together or individually in other embodiments as described elsewhere herein.

In the alternative embodiment of FIG. 27F, the input linear polarizer 70 is not arranged at the input end 2, and a region 178 of extraction waveguide 1 is provided between the input end 2 and the input linear polarizer 70. In operation, the linear polarizer 70 is arranged near to the extraction reflector 174C and provides improved polarization state uniformity for input light ray 489 before incidence onto the extraction reflectors 174C. Further polarizer 85 is arranged close to the extraction reflector 174A.

In the regions 178A, 178B, there may for example be some residual birefringence in the bulk material of the extraction waveguide 1 that may cause some polarization state modification to an input linear polarization state. The arrangement of FIG. 27F achieves a more uniform polarization state 902 for light ray 489 incident onto the extraction reflectors 174A-C. Advantageously uniformity may be increased and light lost as glare to the external environment reduced.

Further the polarization conversion retarder 89 is curved and arranged on the light reversing reflector 140. Advantageously complexity of fabrication is reduced.

Figure 27H:
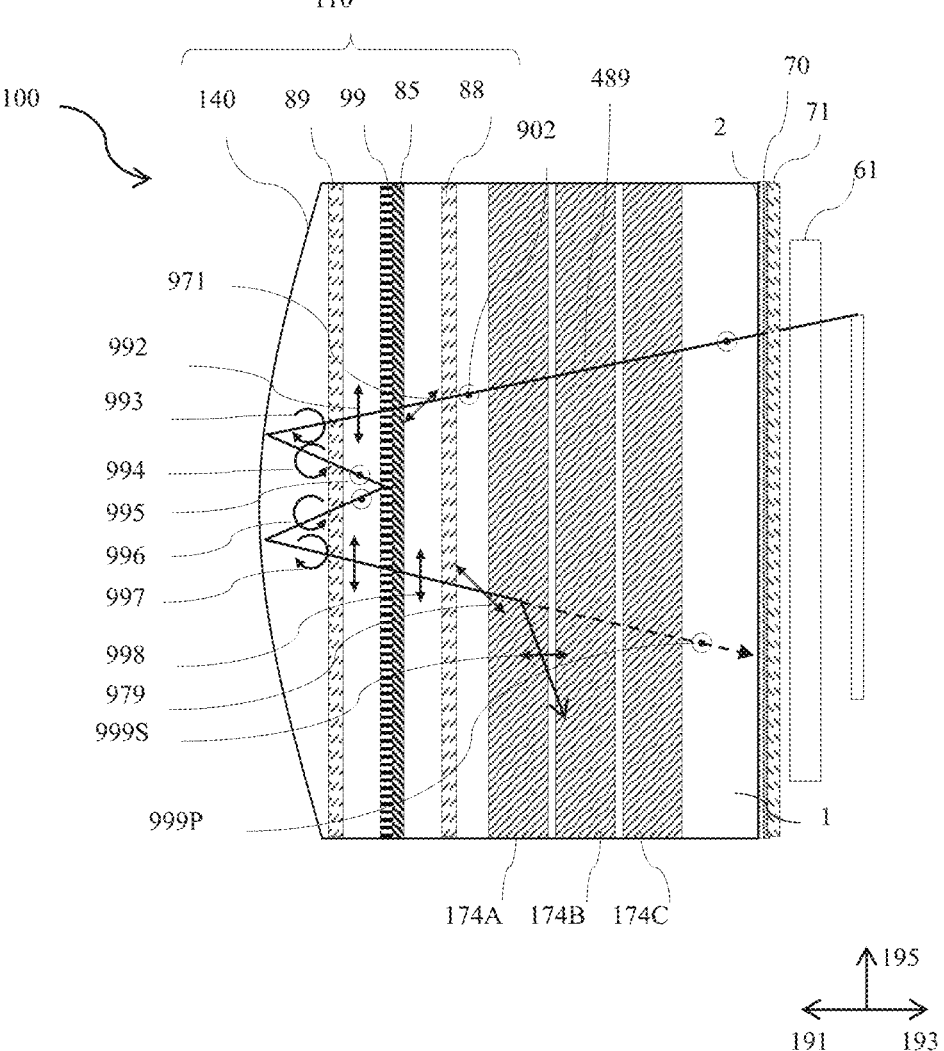
FIG. 27H is a schematic diagram illustrating in front view an anamorphic near-eye display apparatus wherein the lateral anamorphic component further comprises a planar reflective polarizer, a quarter wave retarder arranged between the reflective end and the reflective polarizer and a further half wave retarder arranged between the input end and the reflective polarizer.
Figure 271:
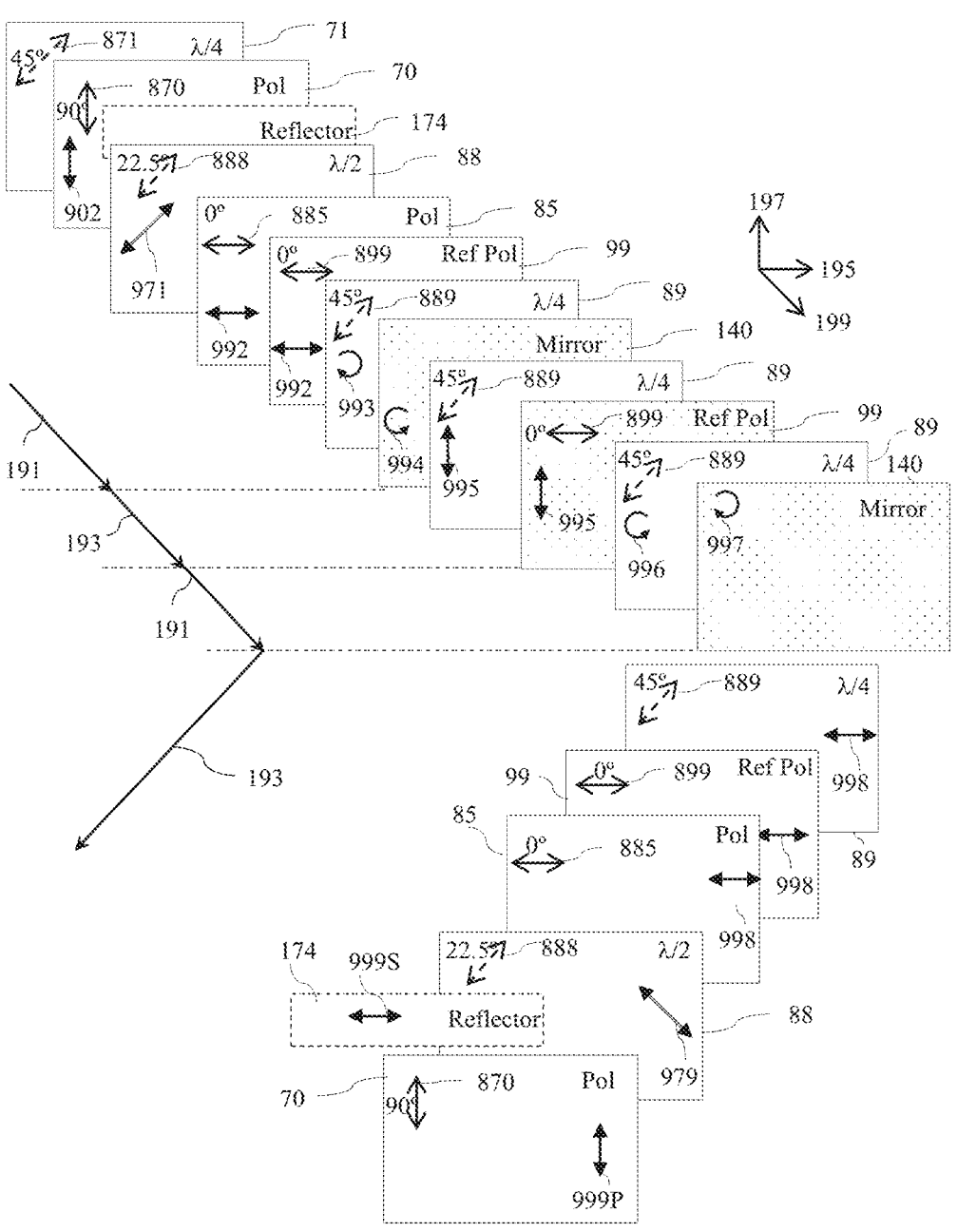

FIG. 27H is a schematic diagram illustrating in front view an anamorphic near-eye display apparatus 100 wherein the lateral anamorphic component 110 further comprises an absorbing polarizer 85; a planar reflective linear polarizer 99; a polarization conversion retarder 89 arranged between the light reversing reflector 140 that is the reflective end 4, and the reflective linear polarizer 99; and a further half wave retarder 88 arranged between the input end 2 and the reflective linear polarizer 99; and FIG. 27I is a schematic diagram illustrating propagation of illustrative polarization states through the polarization control components of FIG. 27H. Features of the embodiments of FIGS. 27H-I not discussed in further detail may be assumed to correspond to the features with equivalent reference numerals as discussed above, including any potential variations in the features.

By way of comparison with FIGS. 27F-G, in the alternative embodiments of FIGS. 27H-I, the polarization control retarder 87 has a retardance of a half wavelength at a wavelength of visible light and is arranged to rotate the linear polarization state, for example between linear polarization state 902 and linear polarization state 971 and between linear polarization state 998 and linear polarization state 979.

Polarization control retarder 87 has a retardance and optical axis direction 887 arranged to provide a linear polarization state 971 inclined at 45 degrees to the electric vector transmission direction of the reflective linear polarizer 99 and absorbing polarizer 85. Half of the light is transmitted as polarization state 992 which as described in FIG. 27F provides a linear polarization state 998 that is transmitted through the reflective linear polarizer 99 and absorbing polarizer 85. Polarization control retarder 87 converts this to 45 degrees linear state 979. Some light with polarization state 999S is reflected by polarization selective extraction reflectors 174A-C, while the light with polarization state 999P is transmitted to the input end 2.

The polarization control retarder 87 may have a half wave retardance at a visible wavelength such as 550 nm and may comprise a stack of composite retarders arranged to achieve the operation of a half wave retarder over an increased spectral band, for example comprising a Pancharatnam stack.

The embodiments of FIG. 27A-F achieve reduced loss of light propagating along the direction 191 through the waveguide. Advantageously glow from the waveguide is reduced.

Alternative arrangements of lateral anamorphic component 110 comprising Pancharatnam-Berry lenses will now be described.

Figures 28A, 28B, 28C:
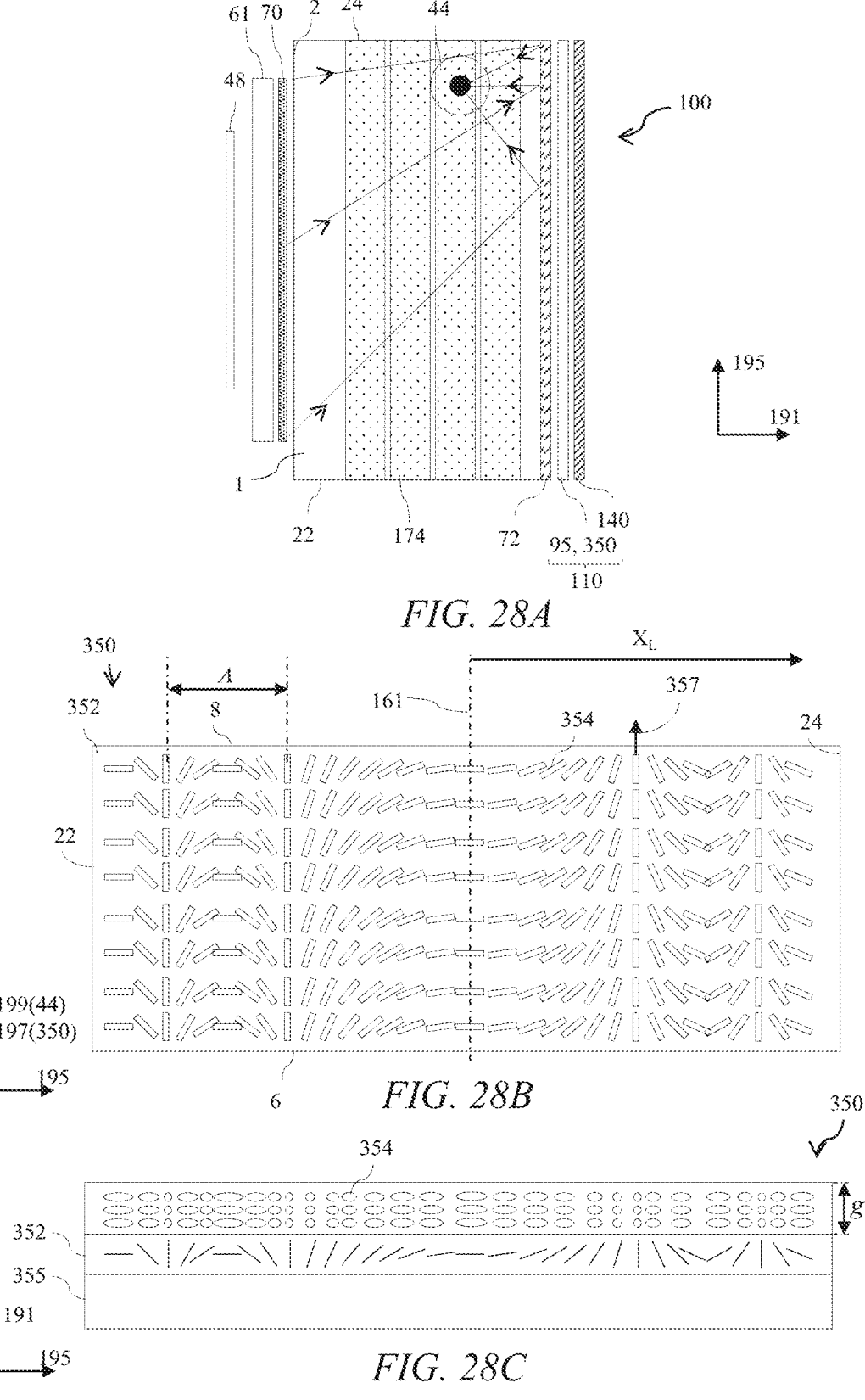
FIG. 28A is a schematic diagram illustrating in front view an anamorphic near-eye display apparatus comprising a reflective end comprising a Pancharatnam-Berry lens.
FIG. 28B is a schematic diagram illustrating in end view the optical structure of a Pancharatnam-Berry lens.
FIG. 28C is a schematic diagram illustrating in front view an optical structure of the Pancharatnam-Berry lens of FIG. 28B.

FIG. 28A is a schematic diagram illustrating in front view an anamorphic near-eye display apparatus 100 comprising a reflective end 4 comprising a Pancharatnam-Berry lens 350. Features of the embodiment of FIG. 28A not discussed in further detail may be assumed to correspond to the features with equivalent reference numerals as discussed above, including any potential variations in the features.

In the alternative embodiment of an anamorphic near-eye display apparatus 100 of FIG. 28A, the lens 95 of the lateral anamorphic component 110 is a Pancharatnam-Berry lens 350 and the light reversing reflector 140 is a planar mirror. Thus the Pancharatnam-Berry lens 350 is arranged between the extraction waveguide 1 and reflective end 4.

In the alternative embodiment of FIG. 28A, the extraction waveguide 1 is illustrated with extraction reflectors 174 arranged between plural plates 180 although the other extraction reflectors described hereinbefore may be provided as alternatives.

In operation, the Pancharatnam-Berry lens 350 provides optical power in the lateral direction 195(350) and no optical power in the transverse direction 197(350). The Pancharatnam-Berry lens 350 thus provides a similar operation to the curved reflective end 4 and curved reflective ends 4 with lens 95 described hereinabove. In alternative embodiments, not shown, the reflective end 4 may comprise a curved mirror and the optical power of the lateral anamorphic component 110 may be shared between the Pancharatnam-Berry lens 350 and the curved reflective end 4. Advantageously aberrations may be improved.

FIG. 28B is a schematic diagram illustrating in end view the optical structure of a Pancharatnam-Berry lens 350; FIG. 28C is a schematic diagram illustrating in front view the optical structure of the Pancharatnam-Berry lens of FIG. 28B. Features of the embodiment of FIGS. 28B-C not discussed in further detail may be assumed to correspond to the features with equivalent reference numerals as discussed above, including any potential variations in the features.

The alternative embodiments of FIG. 28B and FIG. 28C illustrate a Pancharatnam-Berry lens 350 comprising liquid crystal molecules 354 arranged on alignment layer 352 and support substrate 355. The alignment layer 352 provides component 357 of the liquid crystal molecule 354 director direction (typically the direction of the extraordinary index) that varies across the Pancharatnam-Berry lens 350 in the lateral direction 195. In the transverse direction 197(350) there is no variation of the component 357 of the director direction and so no phase modulation is provided by the Pancharatnam-Berry lens 350.

During manufacture, the alignment layer 352 may be formed for example by exposure and curing of a photoalignment layer with circularly polarised light with the desirable phase profile to achieve a variation of the optical axis direction 357. More specifically, an interference pattern is created between two oppositely circularly polarized wavefronts that creates locally linear polarized light whose orientation varies in the plane of the alignment layer to provide the desired alignment profile by the alignment layer 352.

The alignment layer is thus oriented with linear polarized light to provide an optical axis direction 357 in the layer of liquid crystal material 354 that provides desirable optical power profile.

The layer of liquid crystal material 354 may have a thickness g that has a half wave thickness at a desirable wavelength of light, for example 550 nm. The liquid crystal material 354 may be a cured liquid crystal material such as a liquid crystal polymer or may be a nematic phase liquid crystal material arranged between opposing alignment layers.

Figures 29, 30:
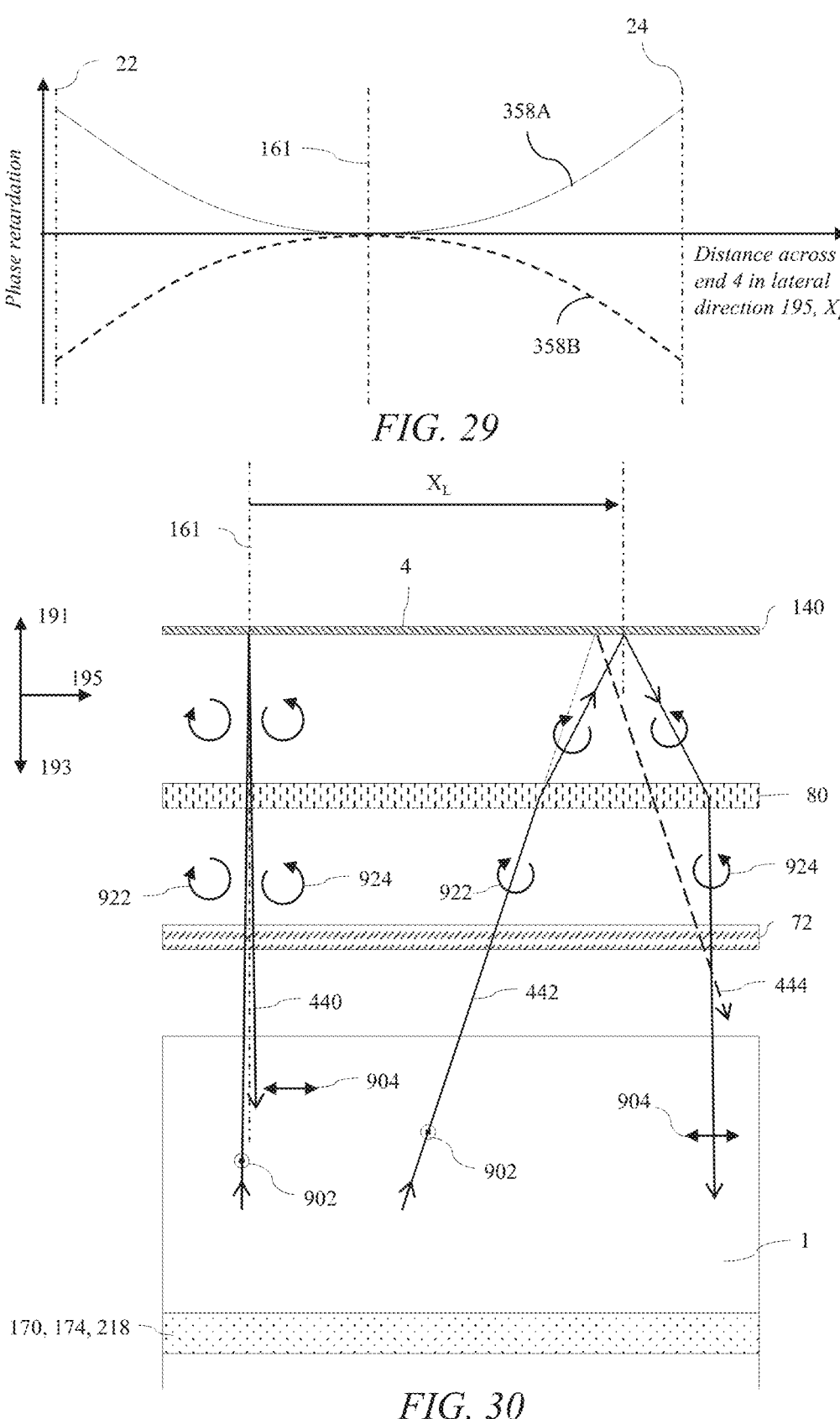
FIG. 29 is a schematic graph illustrating the variation of phase difference with lateral position for an illustrative Pancharatnam-Berry lens of FIG. 28B.
FIG. 30 is a schematic diagram illustrating in side view the operation of the Pancharatnam-Berry lens of FIG. 28A.

FIG. 29 is a schematic graph illustrating the variation of phase difference with lateral position for an illustrative Pancharatnam-Berry lens of FIG. 28B. FIG. 29 illustrates the profile 358A of phase retardation across the Pancharatnam-Berry lens 350 across the end 4 in the lateral direction 195 for a monochromatic circularly polarised planar wave incident onto the Pancharatnam-Berry lens 350. The pitch A of the profile of phase across the Pancharatnam-Berry lens 350 varies across the lateral direction 195 to achieve said profile 358A, with a large pitch at the location 161 which may be the center of the Pancharatnam-Berry lens 350 and reducing pitch A either side. As illustrated in FIG. 28B, the liquid crystal material director rotates across the pitch A, which for the circularly polarised incident light provides the phase difference and hence deflection of the incident wavefront.

At one location 161 of the Pancharatnam-Berry lens 350 that is typically the center of the end 4 of the extraction waveguide 1, the liquid crystal molecules 354 are aligned such that there is no relative phase difference. Profile 358A illustrates the phase modulation for a first circular polarization state (which may be right-handed circular polarization state) and profile 358B illustrates the phase modulation for a second circular polarization state orthogonal to the first polarization state (which may be left-handed circular polarization state).

FIG. 30 illustrates in front view the operation of a portion of a Pancharatnam-Berry lens 350 to provide the lateral anamorphic component 110 across the end 4 of the extraction waveguide 1 in the lateral direction 195. Features of the embodiment of FIG. 30 not discussed in further detail may be assumed to correspond to the features with equivalent reference numerals as discussed above, including any potential variations in the features.

The light rays 440, 442 incident onto the Pancharatnam-Berry lens 350 propagating along the direction 191 of the extraction waveguide 1 are polarised with the linear polarization state 902.

For light ray 440 at the location 161, the incident polarization state 902 is transmitted by the polarization control retarder 72 with phase difference to provide circularly polarised state 922. The Pancharatnam-Berry lens 350 uses the polarization control retarder 72 that is the same as the retarder used to optimise the transmission and reflectivity to polarised light of the dielectric layers of the extraction reflectors 170, 174, advantageously achieving improved efficiency.

The Pancharatnam-Berry lens 350 provides no relative phase modulation at the location 161, so that the reflection of light ray 440 from the light reversing reflector 140 provides the orthogonally circularly polarised state 924 that is transmitted as polarization state 924 along the direction 193 back towards the extraction reflectors 169 that may be reflectors such as extraction reflectors 170, 174, 218 as described hereinabove.

For light ray 442 at the location offset by distance $X_L$ in the lateral direction 195 from the location 161, the incident polarization state 902 is again transmitted by the polarization control retarder 72 with phase difference to provide circularly polarised state 922. The Pancharatnam-Berry lens 350 provides a gradient of phase difference so that the ray 442 representing a planar phase front is deflected in comparison to an illustrative undeflected ray 444. After reflection from the light reversing reflector 140, a further phase shift is provided by the Pancharatnam-Berry lens 350 so that the light ray 442 undergoes a further deflection. The reflected ray 442 propagating in the direction 193 along the extraction waveguide 1 is parallel to the returning ray 440. Thus the Pancharatnam-Berry lens 350, light reversing reflector 140 and polarization control retarder 72, achieve the desirable optical function of the lateral anamorphic component 110.

Advantageously the physical size of the lateral anamorphic component 110 is reduced and a more compact arrangement achieved. The phase profile may further provide correction for aberrations of the lateral anamorphic component 110.

In other embodiments, plural Pancharatnam-Berry lenses 350 or Pancharatnam-Berry lenses 350 in combination with refractive lenses 95 and curved reflective end 4, for example as illustrated in FIG. 25A that may be separated in the direction 191 along the extraction waveguide 1 may be provided. Improved control of aberrations may be achieved and exit pupil 40 expanded in the lateral direction 195. Advantageously the blur ellipses 452 of FIG. 1F may have a reduced width 455.

Lenses for use with the anamorphic near-eye display apparatus 100 will now be described.

Figure 31A:
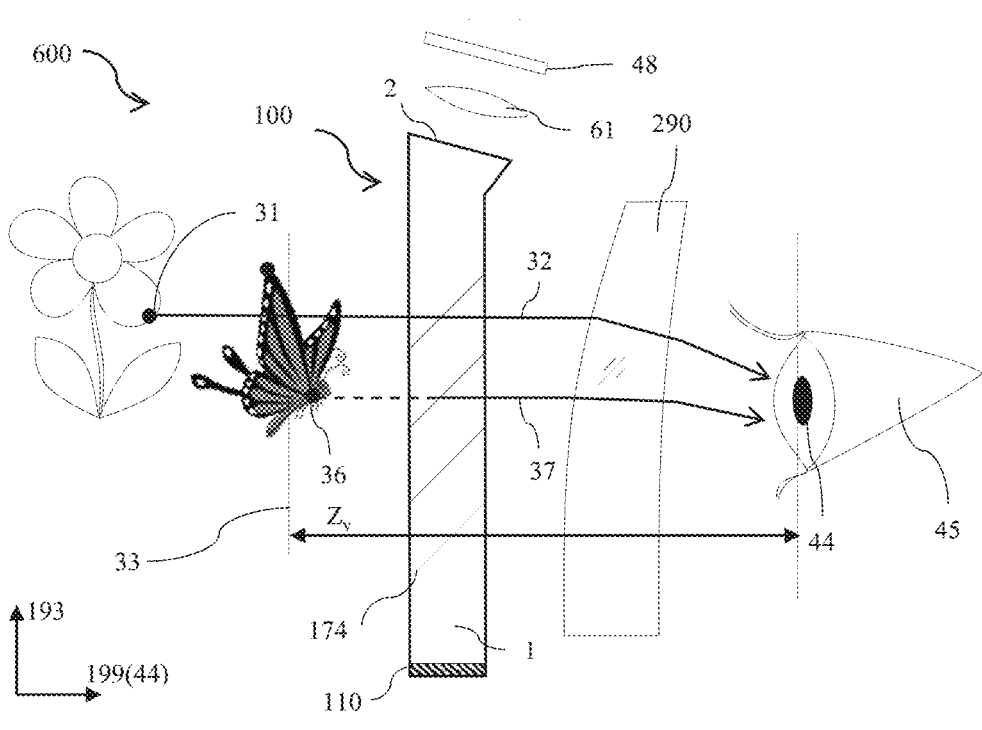
FIG. 31A is a schematic diagram illustrating in side view the operation of an anamorphic near-eye display apparatus further comprising a corrective spectacle lens.

FIG. 31A is a schematic diagram illustrating in side view the operation of an anamorphic near-eye display apparatus 100 of FIG. 1 further comprising a lens 290. Features of the embodiment of FIG. 31A not discussed in further detail may be assumed to correspond to the features with equivalent reference numerals as discussed above, including any potential variations in the features.

The anamorphic near-eye display apparatus 100 described hereinabove provides virtual images 36 that are located in the far field, so that the nominal viewing distance $Z_v$ is infinite. It may be desirable to provide modification of the distance $Z_v$ to the virtual image plane 33 of the virtual image 36 provided by the anamorphic near-eye display apparatus 100.

The head-worn display apparatus 600 further comprises at least one lens 290 that may be a corrective lens having optical power for correcting eyesight. The correction of eyesight may be for example to correct for the eyesight, for example to correct for presbyopia, astigmatism, myopia or hyperopia of the display user 45.

The lens 290 may further or alternatively be a focal plane modifying lens for providing the virtual image 33 such that the distance $Z_v$ is a finite distance. Such an arrangement may provide suitable accommodation cues for the display user 47 such that virtual images that are desirably close to the user 47 are provided at desirable accommodation distances. In stereoscopic display applications, the accommodation correction of the lens 290 may be arranged to approximate the convergence distance of the imagery. Accommodation-convergence mismatch may be reduced and advantageously visual stress reduced, increasing comfort of use.

Such lenses 290 may be used for example in the spectacles head-worn display apparatus 600 of FIG. 14A-B or the virtual reality head-worn display apparatus 600 of FIG. 16A.

It may be desirable to adjust the accommodation distance $Z_v$ of the virtual image.

Figure 31B:
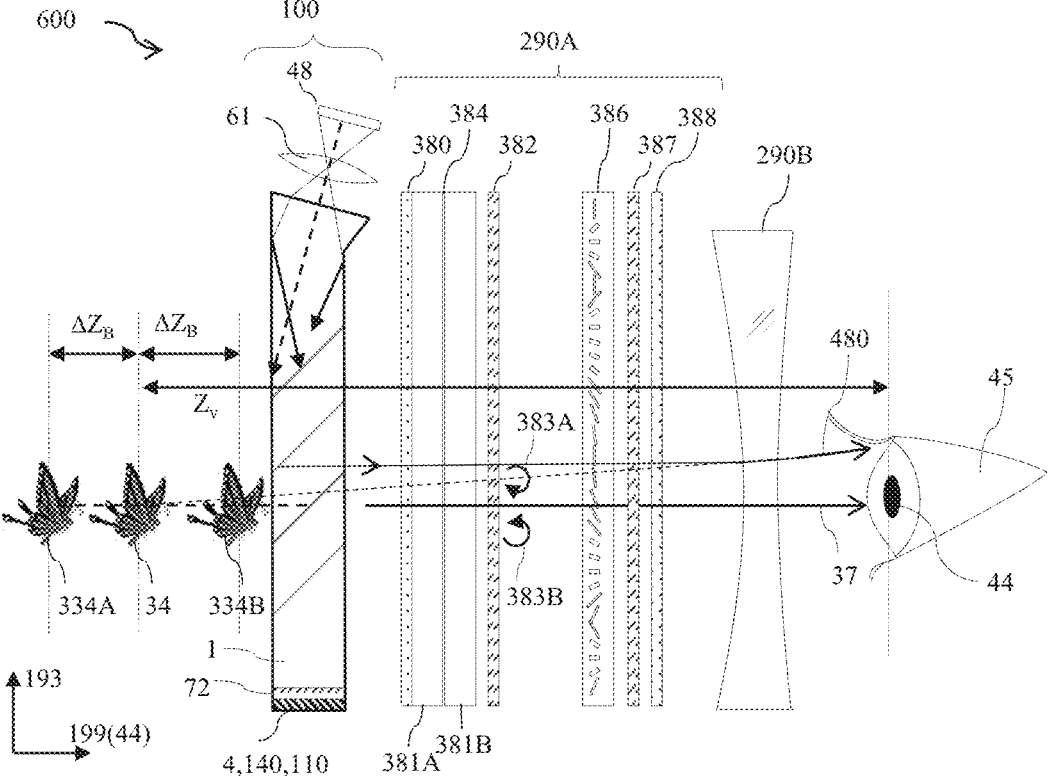
FIG. 31B is a schematic diagram illustrating in side view the operation of an anamorphic near-eye display apparatus further comprising a corrective Pancharatnam-Berry lens and a corrective spectacle lens.

FIG. 31B is a schematic diagram illustrating in side view the operation of an anamorphic near-eye display apparatus 100 of FIG. 1 further comprising a Pancharatnam-Berry lens 386. Features of the embodiment of FIG. 31B not discussed in further detail may be assumed to correspond to the features with equivalent reference numerals as discussed above, including any potential variations in the features.

In the alternative embodiment of FIG. 31B, the anamorphic near-eye display apparatus 100 is arranged to direct output light rays 37 into lens 290 that comprises a switchable optical stack.

The switchable optical stack comprises input polarizer 380, transparent substrates 381A, 381B with an electrically switchable liquid crystal layer 384 provided therebetween and a quarter wave retarder 382. In a first state, the liquid crystal layer 384 is arranged to provide no polarization rotation of the polarised light from the polarizer 380 and the switchable optical stack provides a first circularly polarised output polarization state 383A. In a second state, the liquid crystal layer 384 is arranged to provide a polarization rotation of the polarised light from the polarizer 380 and the switchable optical stack provides a second circularly polarised output polarization state 383B, orthogonal to the polarization state 383A.

The Pancharatnam-Berry lens 386 comprises a circularly symmetric alignment of liquid crystal molecules with similar but different alignment across each radius of the circularly symmetric alignment to that illustrated across the lateral direction 195 in FIG. 28B hereinabove. The Pancharatnam-Berry lens 386 thus provides a circularly symmetric first phase radial profile similar to profile 358A of FIG. 29 for the light with polarization state 383A and a circularly symmetric second phase radial profile similar to profile 358B of FIG. 29 for the light with polarization state 383B. The output polarization state from the Pancharatnam-Berry lens 386 is a by quarter wave retarder 387 and linear polarizer 388.

Output light from the lens 290A with positive or negative power modification of the wavefront from the anamorphic near-eye display apparatus 100 is then incident onto the fixed lens 290B so that the eye 45 observes one of the two power corrections.

Considering the virtual image 34, the absence of the lens 290A would provide a virtual image at distance $Z_v$. In the first state of the liquid crystal layer 384, the virtual image 334A is provided with a separation $\Delta Z_A$ from the distance $Z_v$; and in the second state of the liquid crystal layer 384, the virtual image 334B is provided with a separation $\Delta Z_B$ from the distance $Z_v$.

In alternative embodiments, the lens 290B may be provided by a Pancharatnam-Berry lens. Advantageously thickness may be reduced.

The lenses 290A, 290B thus achieve adjustable accommodation distances for virtual images 334A, 334B. Stacks of lenses 290A with for example a geometric sequence of optical power adjustments may be provided to achieve increased fidelity in location of the virtual image 334. Accommodation conflicts with the provided imagery may advantageously be reduced and image comfort increased. Comfortable usage time for the head-worn display apparatus 600 may be extended.

It may be desirable to provide a virtual image 34 that does not have an infinite conjugate while not modifying the real image 30 magnification or distance $Z_R$.

Figure 32A:
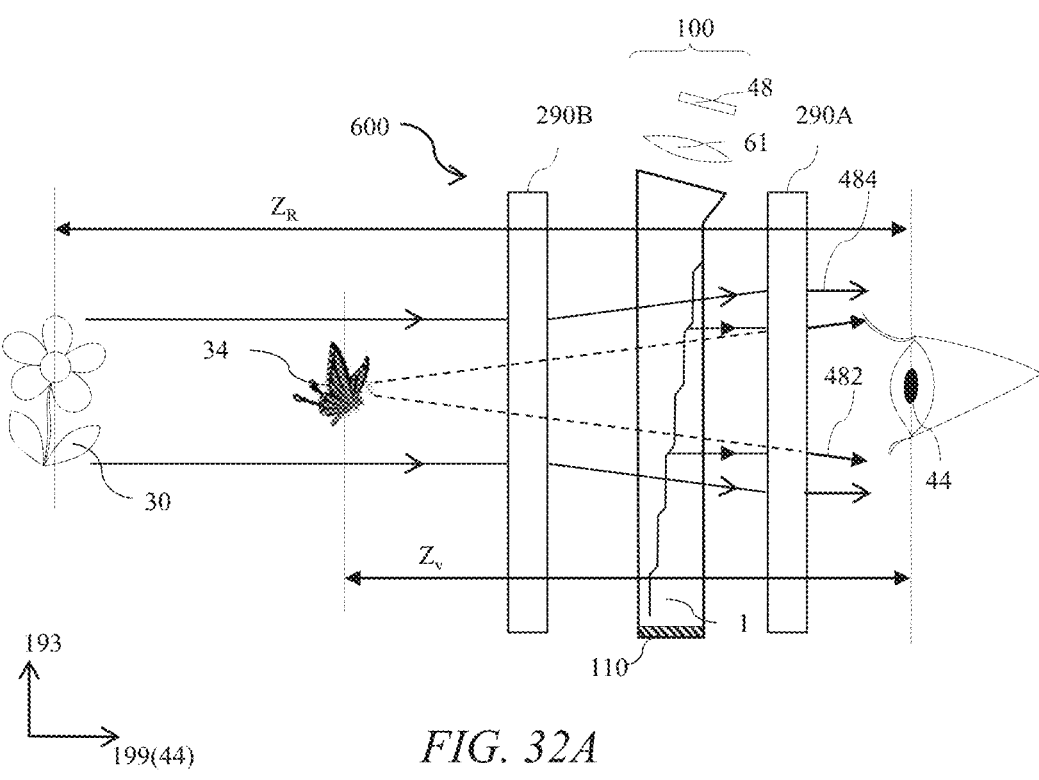
FIG. 32A is a schematic diagram illustrating in side view a head-worn display apparatus comprising first and second focal plane modifying lenses.

FIG. 32A is a schematic diagram illustrating in side view a head-worn display apparatus 600 comprising first and second focal plane modifying lenses 290A, 290B. Features of the embodiment of FIG. 32A not discussed in further detail may be assumed to correspond to the features with equivalent reference numerals as discussed above, including any potential variations in the features.

In the alternative embodiment of FIG. 32A, anamorphic near-eye display apparatus 100 is arranged between the focal plane modifying lenses 290A, 290B. The lens 290A is a focal plane modifying lens that is arranged to modify the distance $Z_v$ to the virtual image 34 by deflection of light rays 482 from the anamorphic near-eye display apparatus 100.

The lens 290B is a correction lens arranged to correct for the optical power of the lens 290A, so that light rays 484 from real images 30 are undeflected by the head-worn display apparatus 600. Advantageously virtual images 34 may be provided near to the eye, for example to provide a user interface and overlayed with real-world images, advantageously reducing the degradation of the real-world images 30.

The lenses 290A, 290B may be Pancharatnam-Berry lenses as described hereinabove, so that the distance Zv may be modified in correspondence to desired image data. The lenses 290A, 290B may have the same optical design and the lens 290B may be driven in the opposite output to the lens 290A to achieve resultant zero power of lenses 290A, 290B. Advantageously cost and complexity may be reduced.

Figure 32B:
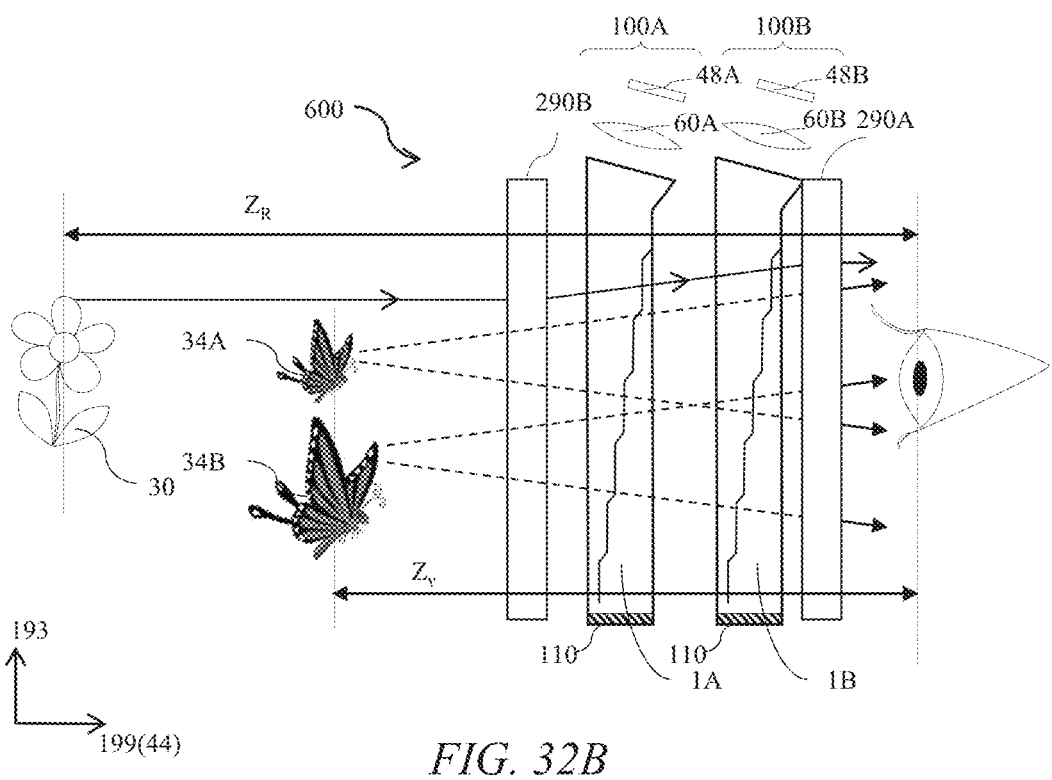
FIG. 32B is a schematic diagram illustrating in side view a head-worn display apparatus comprising plural extraction waveguides and further comprising first and second focal plane modifying lenses.

FIG. 32B is a schematic diagram illustrating in side view a head-worn display apparatus 600 comprising plural extraction waveguides and further comprising first and second focal plane modifying lenses. Features of the embodiment of FIG. 32B not discussed in further detail may be assumed to correspond to the features with equivalent reference numerals as discussed above, including any potential variations in the features.

In the alternative embodiment of FIG. 32B, two anamorphic near-eye display apparatuses 100A, 100B are provided to achieve multiple virtual images 34A, 34B. The performance of the head-worn display apparatus may be increased, for example as described with respect to FIG. 16D hereinabove. Further, focal plane modifying lenses 290A, 290B are provided with operation as described in FIG. 32A. Advantageously real-world images 30 may be provided with reduced degradation.

It may be desirable to provide virtual images 34A, 34B with different focal distances $Z_vA$, $Z_vB$.

Figure 32C:
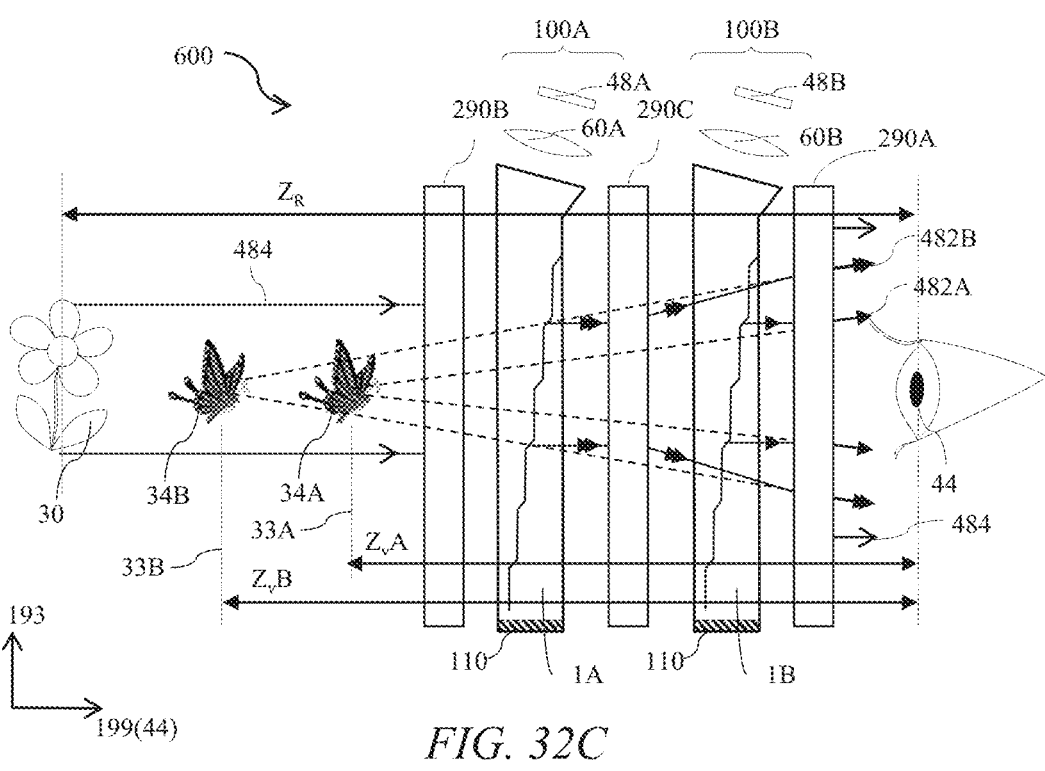
FIG. 32C is a schematic diagram illustrating in side view a head-worn display apparatus comprising plural extraction waveguides and three focal plane modifying lenses.

FIG. 32C is a schematic diagram illustrating in side view a head-worn display apparatus 600 comprising plural extraction waveguides and three focal plane modifying lenses 290A, 290B, 290C. Features of the embodiment of FIG. 32C not discussed in further detail may be assumed to correspond to the features with equivalent reference numerals as discussed above, including any potential variations in the features.

In comparison to the embodiment of FIG. 32B, in the alternative embodiment of FIG. 32C a further focal plane modifying lens 290C is provided to receive light from the anamorphic near-eye display apparatus 100A and to pass light to the further anamorphic near-eye display apparatus 100B. The virtual image distance $Z_vA$ for light from one of the anamorphic near-eye display apparatuses 100A is different to the virtual image distance $Z_vB$ for light from at least one other near-eye display apparatus 100B. The multiple focal planes 33A, 33B may advantageously achieve increased image comfort.

The lens 290C cooperates with the lens 290A to provide the second virtual image 34B, and the lens 290B cooperates with the lenses 290A, 290C to provide zero total optical power. In an alternative embodiment (not shown) the lens 290B may be omitted, for example for virtual reality applications. Advantageously cost and complexity may be reduced.

It may be desirable to increase the performance of a virtual reality head-worn display apparatus by providing increased control of focal planes 33, 633.

Figure 32D:
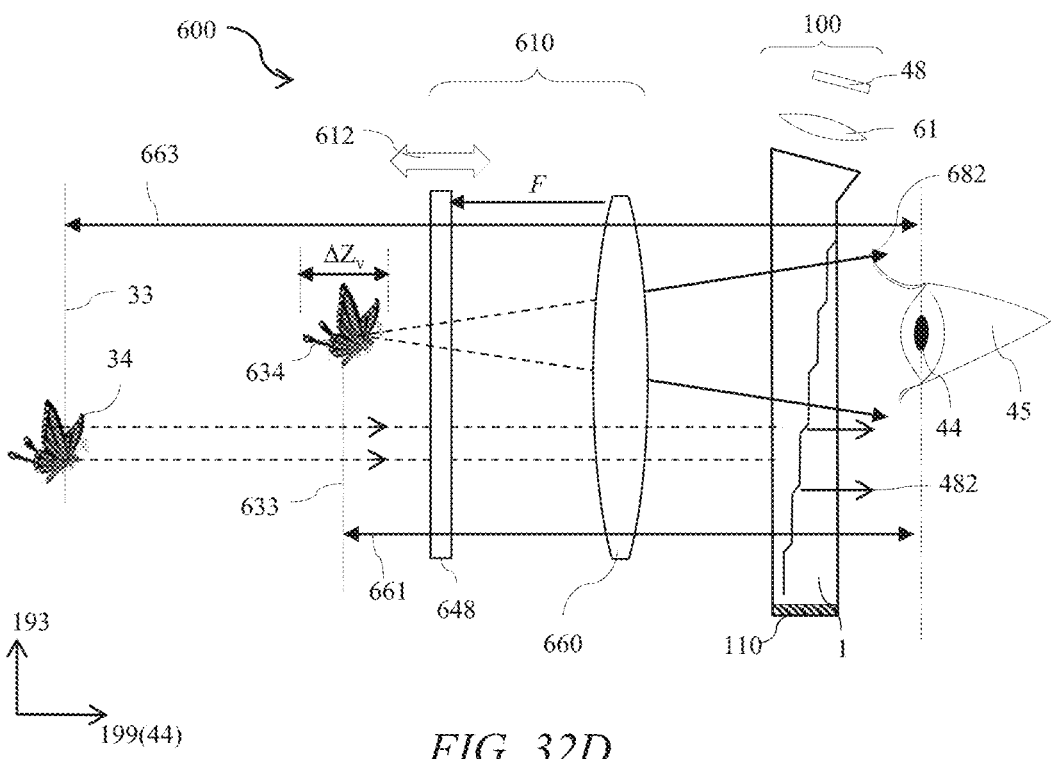
FIG. 32D is a schematic diagram illustrating in side view a head-worn display apparatus comprising a non-anamorphic near-eye display apparatus and an anamorphic extraction waveguide.

FIG. 32D is a schematic diagram illustrating in side view a head-worn display apparatus 600 comprising a non-anamorphic near-eye display apparatus 610 and an anamorphic near-eye display apparatus 100. Features of the embodiment of FIG. 32D not discussed in further detail may be assumed to correspond to the features with equivalent reference numerals as discussed above, including any potential variations in the features.

In comparison to the embodiment of FIG. 16F, in the alternative embodiment of FIG. 32D, the non-anamorphic near-eye display apparatus 610 comprises an actuator 612 arranged to move the further spatial light modulator 648 in relation to the non-anamorphic magnifying optical system 660, adjusting the magnification of the non-anamorphic near-eye display apparatus 100. The virtual image distance 663 for light from the anamorphic near-eye display apparatus 100 provided by rays 482 is different to the virtual image distance 661 for light from the non-anamorphic near-eye display apparatus 610 provided by rays 482. The distance F may be adjusted in correspondence to desired image data that may be in response to measured viewing direction of the eye 45.

Advantageously user comfort may be increased.

Figures 32E, 32F:
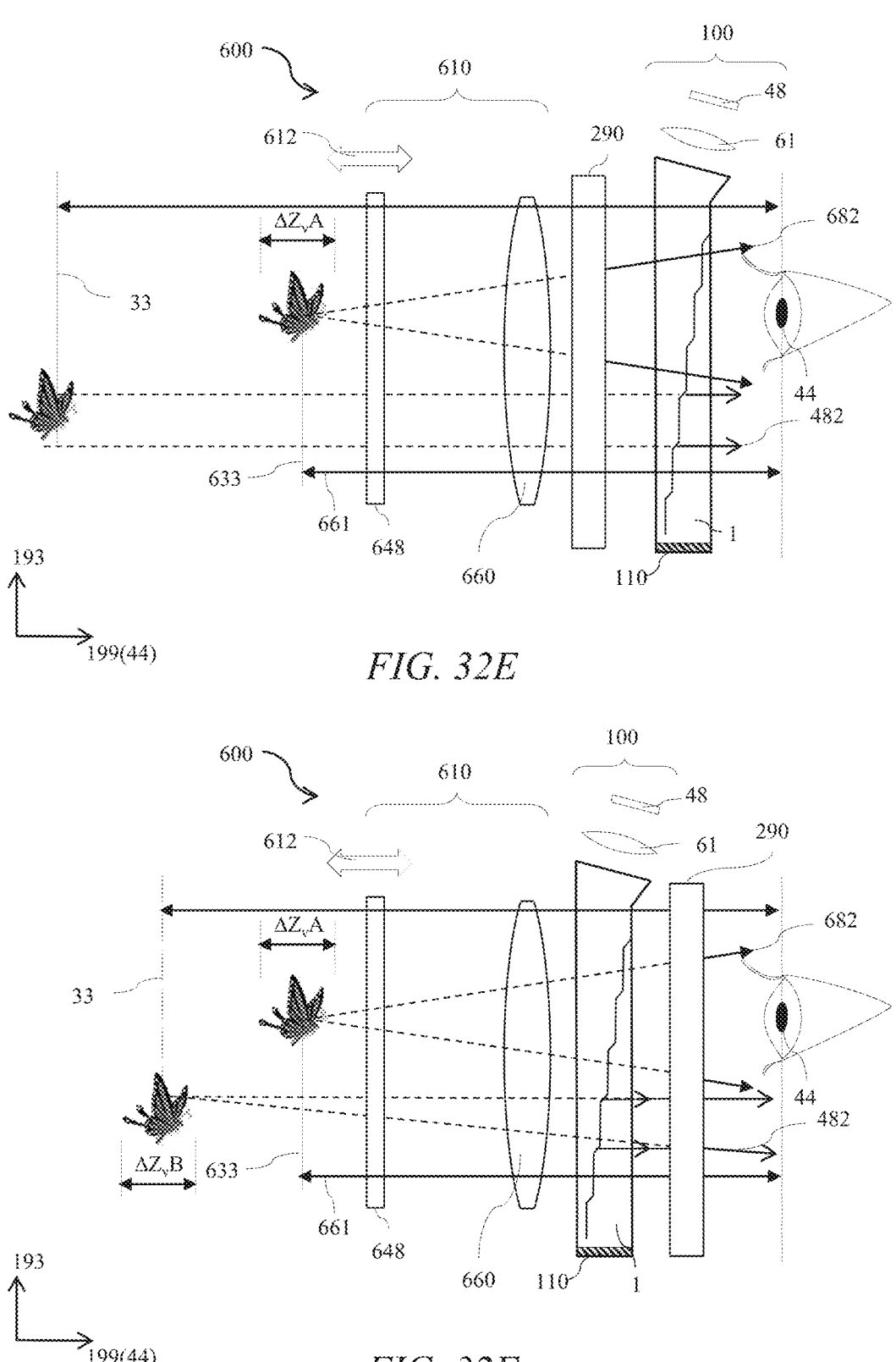
FIG. 32E is a schematic diagram illustrating in side view a head-worn display apparatus comprising a non-anamorphic near-eye display apparatus: an anamorphic extraction waveguide; and a focal plane modifying lens arranged between the non-anamorphic near-eye display apparatus and the anamorphic near-eye display apparatus.
FIG. 32F is a schematic diagram illustrating in side view a head-worn display apparatus comprising a non-anamorphic near-eye display apparatus: an anamorphic extraction waveguide; and a focal plane modifying lens arranged to receive light from the non-anamorphic near-eye display apparatus and the anamorphic near-eye display apparatus.

FIG. 32E is a schematic diagram illustrating in side view a head-worn display apparatus 600 comprising a non-anamorphic near-eye display apparatus 610; an anamorphic near-eye display apparatus 100; and a focal plane modifying lens 290. Features of the embodiment of FIG. 32E not discussed in further detail may be assumed to correspond to the features with equivalent reference numerals as discussed above, including any potential variations in the features.

In the alternative embodiment of FIG. 32D, an additional focal plane modifying lens 290 is provided between the non-anamorphic near-eye display apparatus 610 and the anamorphic near-eye display apparatus 100. The lens 290 may comprise a controllable Pancharatnam-Berry lens. The actuator 612 may optionally be omitted. The range of focal distances AZ A may be increased and the speed of control may be increased. User comfort may advantageously be increased.

FIG. 32F is a schematic diagram illustrating in side view a head-worn display apparatus comprising a non-anamorphic near-eye display apparatus 610; an anamorphic near-eye display apparatus 100; and a focal plane modifying lens 290 arranged to receive light from the non-anamorphic near-eye display apparatus and the anamorphic near-eye display apparatus. Features of the embodiment of FIG. 32F not discussed in further detail may be assumed to correspond to the features with equivalent reference numerals as discussed above, including any potential variations in the features.

In the alternative embodiment of FIG. 32F, the focal plane modifying lens 290 is arranged to provide finite virtual image distances 33, 633. Further, the focal plane modifying lens 290 may be controllable to achieve variable focal plane distances $\Delta Z_vA$, $\Delta Z_vB$ from the displays 610, 100 respectively. User comfort may advantageously be increased.

Figure 32G:
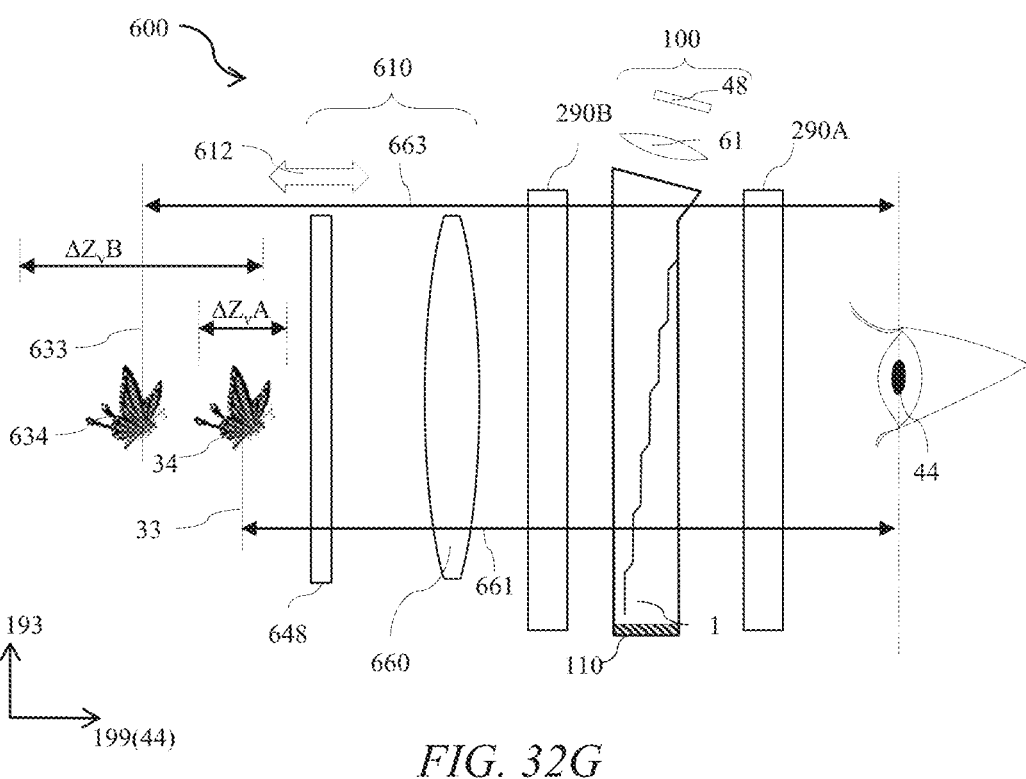
FIG. 32G is a schematic diagram illustrating in side view a head-worn display apparatus comprising a non-anamorphic near-eye display apparatus: an anamorphic extraction waveguide; and two focal plane modifying lenses.

FIG. 32G is a schematic diagram illustrating in side view a head-worn display apparatus 600 comprising a non-anamorphic near-eye display apparatus 610; an anamorphic near-eye display apparatus 100; and two focal plane modifying lenses 290A, 290B. Features of the embodiment of FIG. 32G not discussed in further detail may be assumed to correspond to the features with equivalent reference numerals as discussed above, including any potential variations in the features.

In comparison to the embodiments of FIGS. 32E-32F, in the alternative embodiment of FIG. 32G, focal plane modifying lenses 290A, 290B are arranged with the anamorphic near-eye display apparatus 100 provided therebetween. Focal plane control of both virtual images 33, 633 may be provided. Advantageously user comfort may be further increased.

Figure 32H:
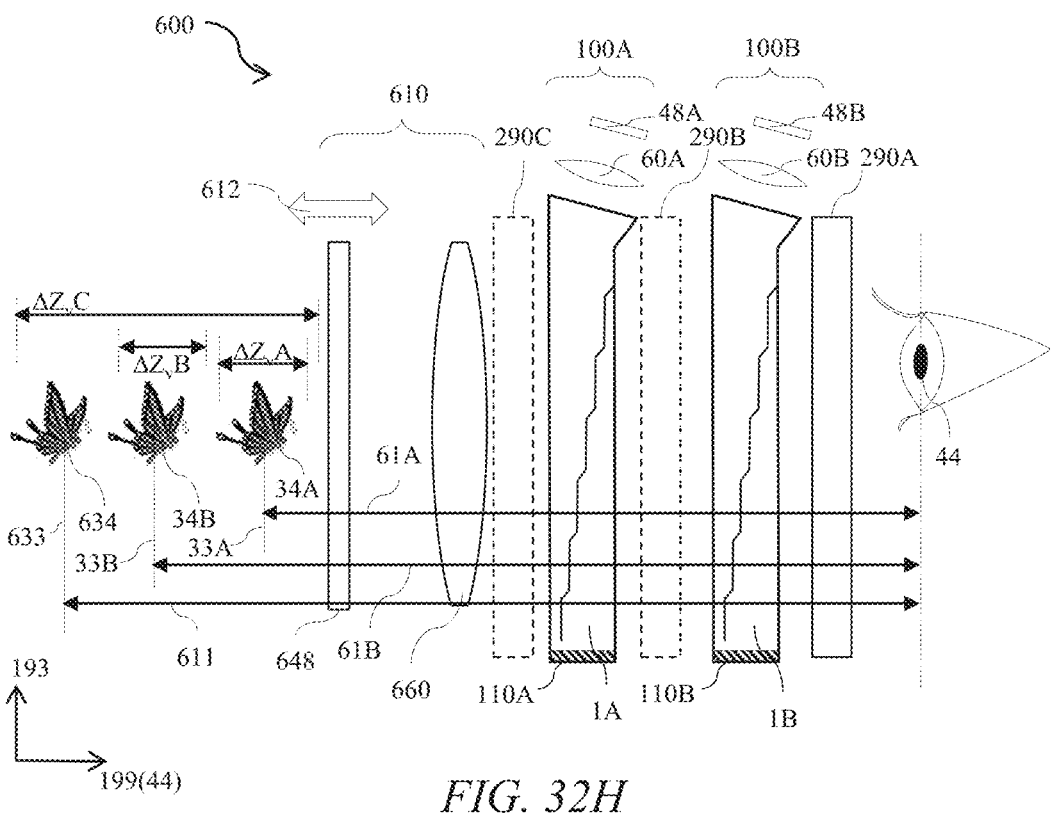
FIG. 32H is a schematic diagram illustrating in side view a head-worn display apparatus comprising a non-anamorphic near-eye display apparatus: two anamorphic extraction waveguides; and focal plane modifying lenses.

FIG. 32H is a schematic diagram illustrating in side view a head-worn display apparatus 600 comprising a non-anamorphic near-eye display apparatus 610; two anamorphic extraction waveguides 1100A, 100B; and focal plane modifying lenses 290A, 290B, 290C. Features of the embodiment of FIG. 32H not discussed in further detail may be assumed to correspond to the features with equivalent reference numerals as discussed above, including any potential variations in the features.

In the alternative embodiment of FIG. 32H, multiple images 33A, 33B, 634 may be provided with multiple focal ranges $\Delta Z_vA$, $\Delta Z_vB$, $\Delta Z_vC$ that may overlap. Focal plane control of virtual images 33A, 33B, 633 may be provided. Advantageously user comfort may be further increased.

Alternative arrangements of illumination systems and transverse anamorphic components 60 will now be described.

Figures 33A, 33B:
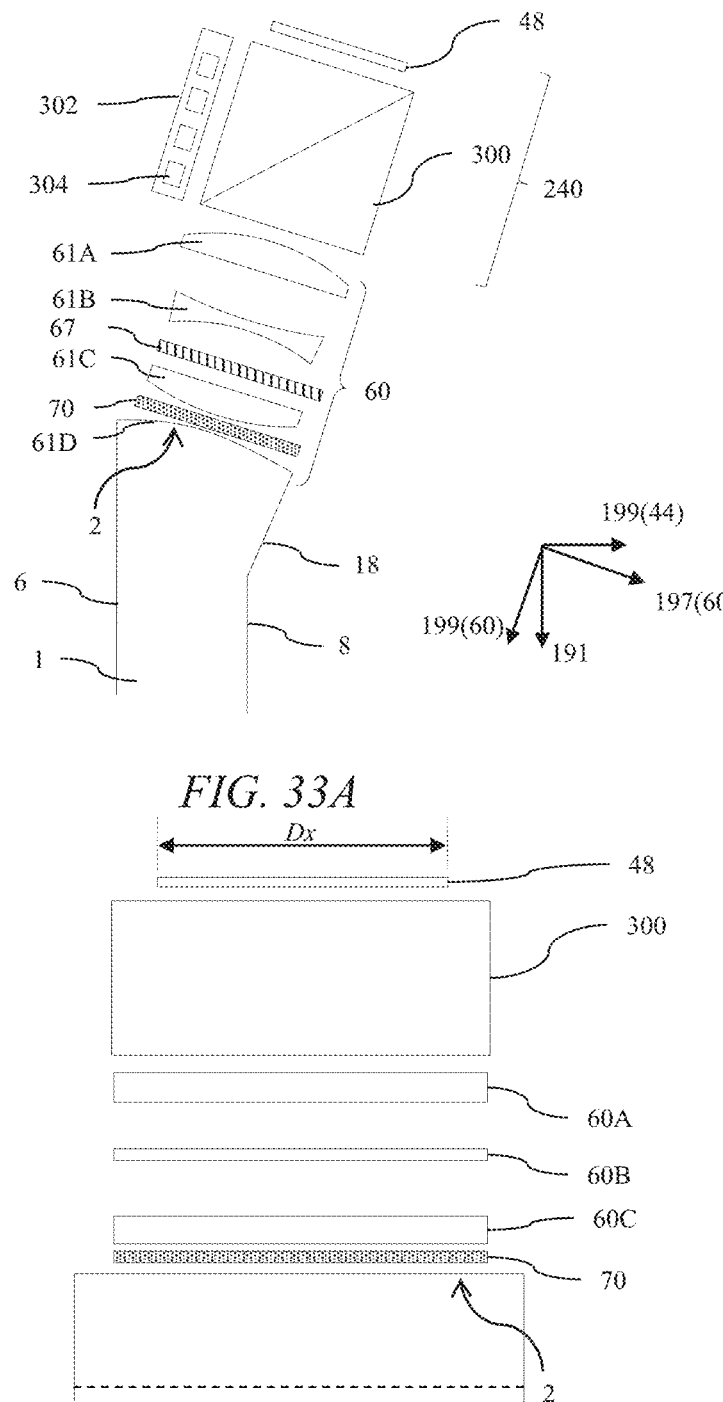
FIG. 33A is a schematic diagram illustrating in side view a detail of an arrangement of an input focusing lens.
FIG. 33B is a schematic diagram illustrating in front view a detail of the arrangement of the input focusing lens of FIG. 33A.

FIG. 33A is a schematic diagram illustrating in side view a detail of an arrangement of a transverse lens 61 that forms a transverse anamorphic component 60; and FIG. 33B is a schematic diagram illustrating in front view a detail of the arrangement of the transverse lens 61 of FIG. 33A. Features of the embodiment of FIGS. 33A-B not discussed in further detail may be assumed to correspond to the features with equivalent reference numerals as discussed above, including any potential variations in the features.

In the alternative embodiment of FIG. 33A, the transverse lens 61 forming the transverse anamorphic component 60 comprises a compound lens 61A-C. Further the compound lens may comprise a lens 61D comprising the curved input end 2 of the extraction waveguide 1. FIG. 33B illustrates that the illumination system 240 and transverse anamorphic component 60 do not provide optical power in the lateral direction 195, that is the compound lenses 61A-D are cylindrical or elongate with a non-spherical surface profile, for example aspheric such as illustrated by the shapes of lenses 61A-B to achieve improved field aberrations and advantageously increased MTF at higher field angles.

Advantageously aberrations in the transverse direction 197(60) may be improved.

Further, the illumination system may comprise a reflective spatial light modulator 48, an illumination array 302 comprising light sources 304 and a beam combiner cube arranged to illuminate the spatial light modulator 48. The illumination array 302 may comprise different colored light sources so that the spatial light modulator 48 may provide time sequential color illumination.

FIG. 33A further illustrates that the transverse anamorphic component 60 may comprise a transverse diffractive component 67 that is provided with optical power in the transverse direction 197. The component 67 may have chromatic aberrations that are angularly varying so as to correct for chromatic aberrations from the refractive components 60A-D in the transverse direction 197. Color blurring in the transverse direction 197 may advantageously be reduced.

Figure 34A:
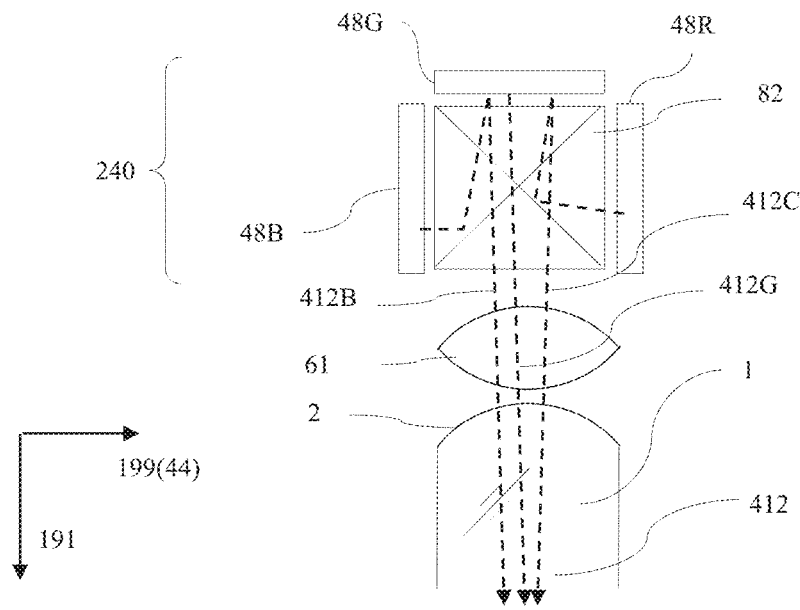
FIG. 34A is a schematic diagram illustrating in side view a spatial light modulator arrangement for use in the anamorphic near-eye display apparatus of FIG. 1 comprising separate red, green and blue spatial light modulators and a beam combining element.

FIG. 34A is a schematic diagram illustrating in side view a spatial light modulator arrangement 50 for use in the anamorphic near-eye display apparatus 100 of FIG. 1 comprising separate red, green and blue spatial light modulators 48R, 48G, 48B and a beam combining element 82. Features of the embodiment of FIG. 34A not discussed in further detail may be assumed to correspond to the features with equivalent reference numerals as discussed above, including any potential variations in the features.

The alternative embodiment of FIG. 34A illustrates that the illumination system 240 may comprise red, green and blue spatial light modulators 48R, 48G, 48B and a color combining prism arrange to direct light rays 412R, 412G, 412B towards the transverse anamorphic component 60. Such an arrangement may be used to provide high resolution color imagery from emissive spatial light modulators 48 for example. Emissive displays may be OLED on silicon or microLED on silicon spatial light modulators 48 for example. Advantageously high resolution color virtual images may be provided.

Figure 34B:
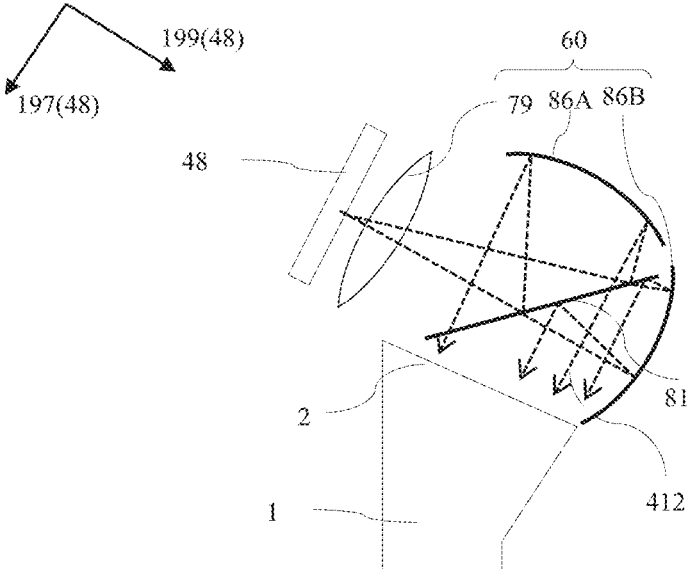
FIG. 34B is a schematic diagram illustrating in side view an illumination system for use in the anamorphic near-eye display apparatus of FIG. 1 comprising a birdbath folded arrangement.

FIG. 34B is a schematic diagram illustrating in side view a illumination system 240 and transverse anamorphic component 60 for use in the anamorphic near-eye display apparatus 100 of FIG. 1A comprising a birdbath folded arrangement. Features of the embodiment of FIG. 34B not discussed in further detail may be assumed to correspond to the features with equivalent reference numerals as discussed above, including any potential variations in the features.

In the alternative embodiment of FIG. 34B, the spatial light modulator 48 illuminates a catadioptric illumination system 240 comprising input lens 79, curved mirror 86A and partially reflective mirror 81 such that rays 412 are directed into the input side 2 of the extraction waveguide 1. Advantageously chromatic aberrations in the transverse direction 197 may be reduced. The partially reflective mirror 81 may be a polarising beam splitter or may be a thin metallised layer for example.

Additionally or alternatively curved mirror 86B may be provided to increase efficiency of operation.

Alternative arrangements of transverse anamorphic component 60 comprising input reflectors 62 will now be described.

Figure 35A:
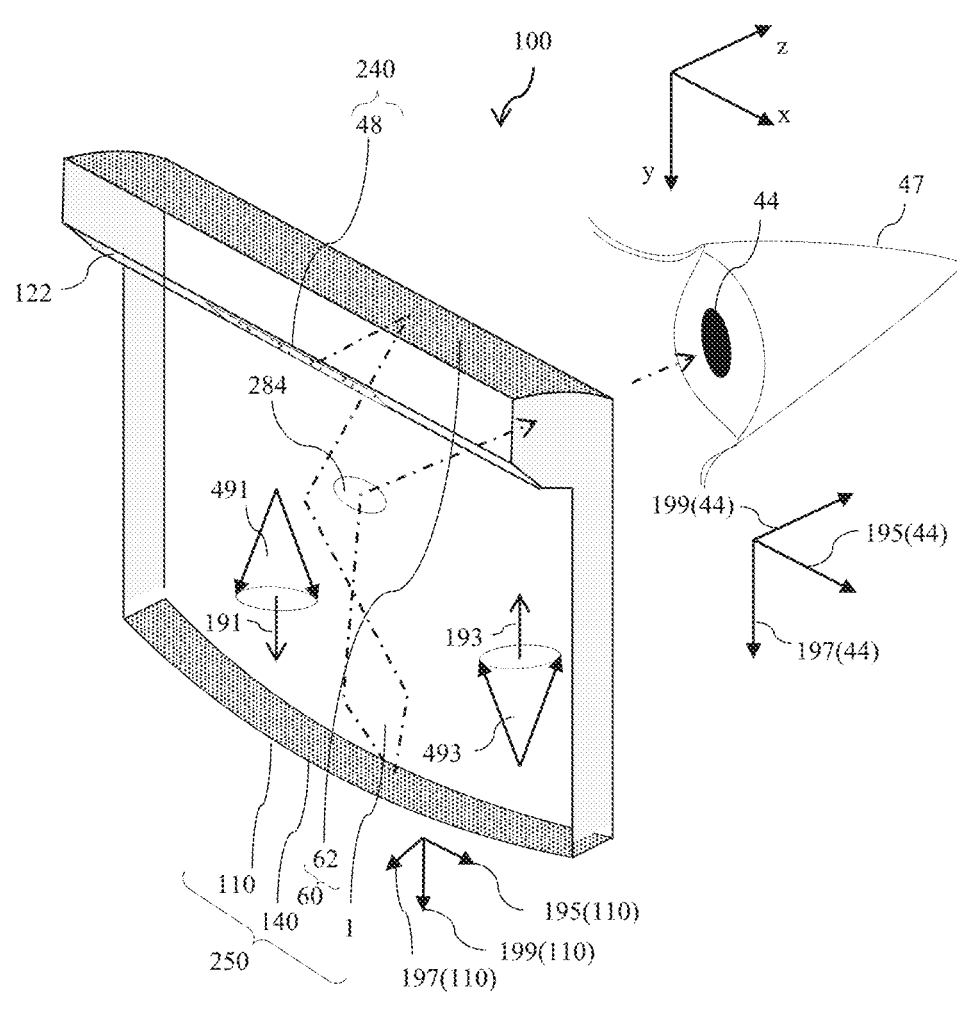
FIG. 35A is a schematic diagram illustrating a front perspective view of an anamorphic near-eye display apparatus comprising an input reflector.
Figure 35B:
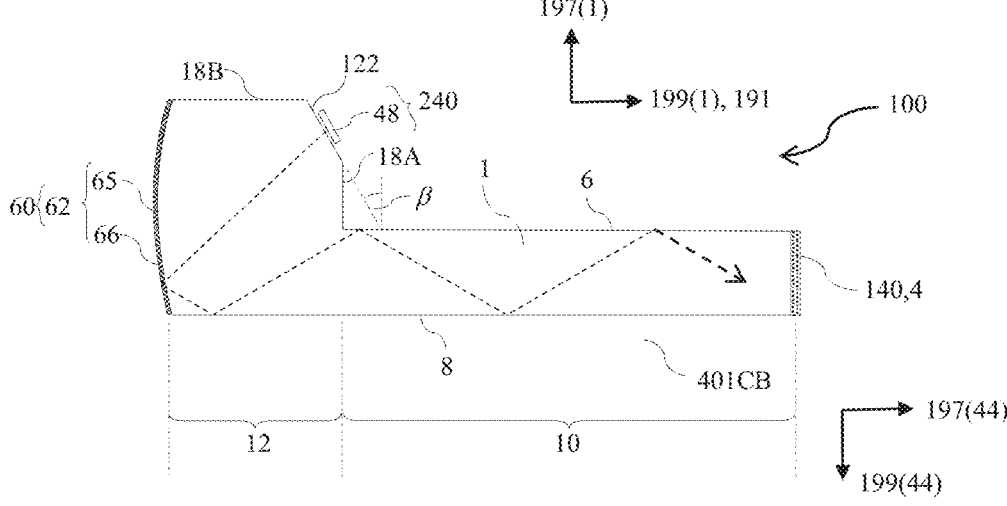
Figures 35C, 35D:
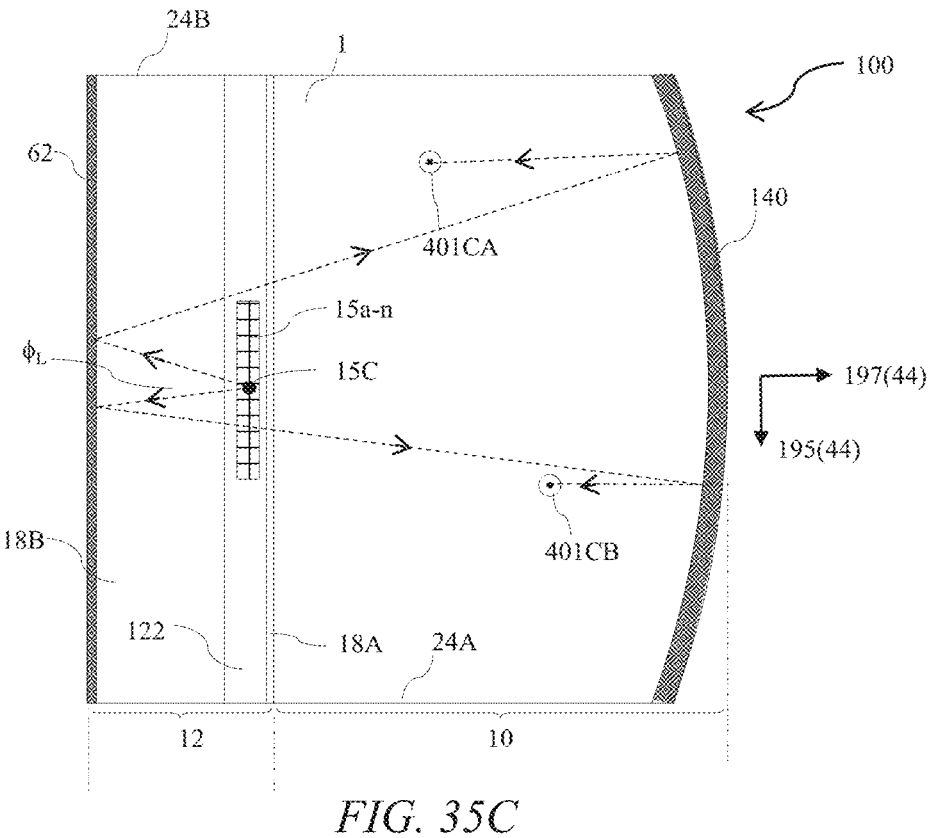

FIG. 35A is a schematic diagram illustrating a front perspective view of an anamorphic near-eye display apparatus 100 comprising an input reflector 62; FIG. 35B is a schematic diagram illustrating a side view of the anamorphic near-eye display apparatus 100 of FIG. 35A; and FIG. 35C is a schematic diagram illustrating a front view of the anamorphic near-eye display apparatus 100 of FIG. 35A. Features of the embodiment of FIGS. 35A-C not discussed in further detail may be assumed to correspond to the features with equivalent reference numerals as discussed above, including any potential variations in the features.

In comparison to FIG. 1, in the alternative embodiment of FIGS. 35A-C, the optical system 250 comprises an input section 12 comprising an input reflector 62 that is the transverse anamorphic component 60 and is arranged to reflect the light from the illumination system 240 and direct it along the waveguide 1. The input section 12 further comprises an input face 122 disposed on a front or rear side 8, 6 of the waveguide 1 and facing the input reflector 62, and the input section 12 is arranged to receive the light from the illumination system 240 through the input face 122 wherein the input face 122 is disposed outwardly of one of the front or rear guide surfaces 8, 6 and the input section 12 is integral with the waveguide 1. The input section 12 further comprises a separation face 28 extending outwardly from the one of the front or rear guide surface 8, 6 to the input face 122. Extraction features in extraction region 284 may be of the types as illustrated elsewhere herein.

The embodiment of FIGS. 35A-G may be fabricated using a moulding process and reflective material 66 formed on curved surface 65 to provide the input reflector, for example by sputtering, evaporation or other known coating methods. Alternatively the reflective material 66 may comprise a reflective film such as ESR™ from 3M Corporation. Advantageously the cost and complexity of fabrication may be reduced.

It may be desirable to provide further control of optical aberrations in the transverse direction 197.

FIG. 35D is a schematic diagram illustrating a side view of an alternative anamorphic near-eye display apparatus 100 comprising alternative input reflector 62 and lens 61. Features of the embodiment of FIG. 35D not discussed in further detail may be assumed to correspond to the features with equivalent reference numerals as discussed above, including any potential variations in the features.

In the alternative embodiment of FIG. 35D, the waveguide 1 has an end 2 that is an input face through which the waveguide 1 is arranged to receive light from the illumination system 240, and the input section 12 is a separate element from the waveguide 1 that further comprises an output face 23 and is arranged to direct light reflected by the input reflector 62 through the output face 23 and into the waveguide 1 through the input face 2 of the waveguide 1.

The transverse anamorphic component 60 further comprises a lens 61 wherein the lens 61 of the transverse anamorphic component 60 is a compound lens 61. Lens 61 may comprise a refractive element 61A. Further, lens 61 may comprise a lens 61B comprising the curved input surface 2 of the waveguide 1. Further, lens 61 may comprise a curved surface 61C and a material 61D that may be air or a material with a different refractive index to the refractive index of the waveguide 1 material. The lenses 61A-D may be arranged to reduce the aberrations of the input reflector 62 of FIGS. 1A-D. The transverse anamorphic component 60 is thus a catadioptric optical element comprising refractive and reflective optical functions. Advantageously the fidelity of the image may be improved in the transverse direction.

FIG. 35D further illustrates an alternative embodiment wherein the input reflector 62 is arranged on the surface of a member 68A. The surface of the input reflector 62 may advantageously be further protected. FIG. 35D further illustrates an alternative embodiment wherein the lateral anamorphic component 110 is a reflector arranged on the surface of a member 68B. The surface of the extraction reflector 140 may advantageously be further protected. The coatings 66, 67 may be formed on the members 68A, 68B respectively. Higher temperature processing conditions may be achieved than for coating of polymer waveguides 1. Advantageously cost may be reduced and efficiency of operation increased. Gap 69D may be provided between the waveguide 1 end 4 and member 68B, wherein the gap 69D may comprise air or a bonding material such as an adhesive.

In the alternative embodiment of FIG. 35D, the input section 12 is not integral with the waveguide 1. The waveguide 1 has an end that is an input face 2 through which the waveguide 1 is arranged to receive light from the illumination system 240, and the input section 12 is a separate element from the waveguide 1 that further comprises an output face 23 and is arranged to direct light reflected by the input reflector 62 through the output face 23 and into the waveguide 1 through the input face 2 of the waveguide 1. Further, the transverse anamorphic component 60 is disposed outside the waveguide 1, and the waveguide 1 is arranged to receive light 400 from the transverse anamorphic component 60 through the input face 2. In other words, FIG. 35D further illustrates an alternative embodiment wherein the input section 12 and the guide section 10 of the waveguide 1 are formed by separate members 69A, 69B respectively and aligned across gap 69C which may comprise air or a bonding material such as an adhesive. The members 69A, 69B may be formed separately during manufacture, reducing complexity of processing of the waveguide 1 surfaces and advantageously increasing yield.

It may be desirable to increase the size of spatial light modulator 48 in the transverse direction.

Figure 35E:
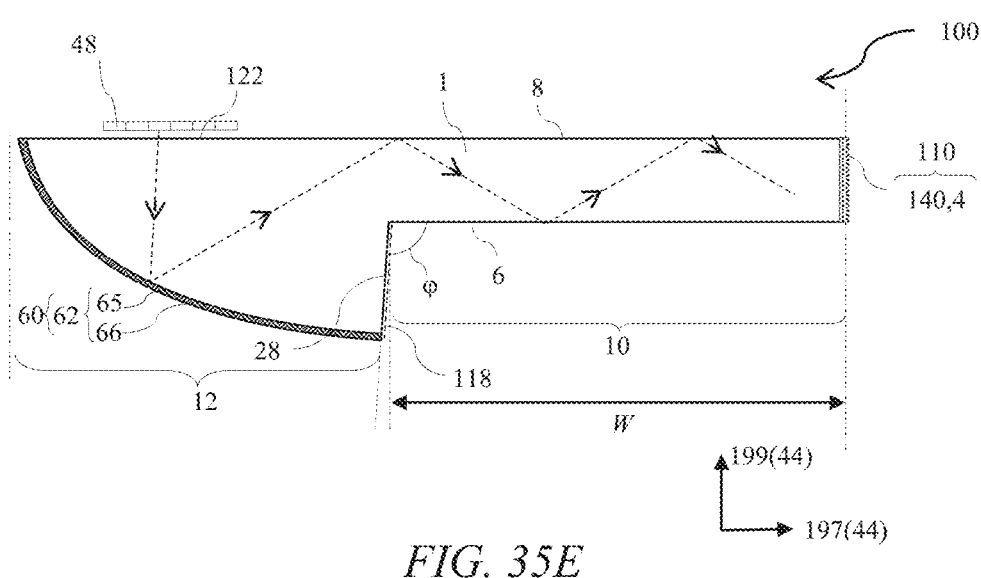
Figure 35F:
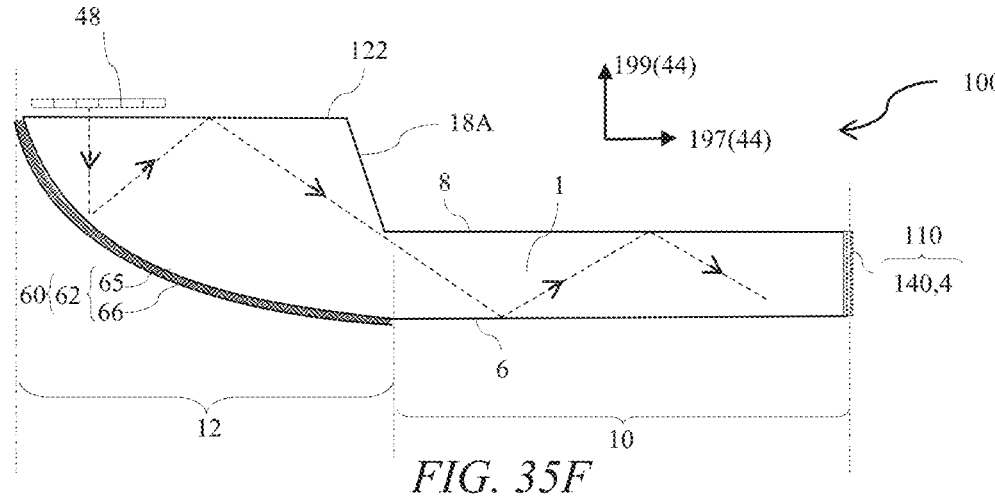
Figure 35G:
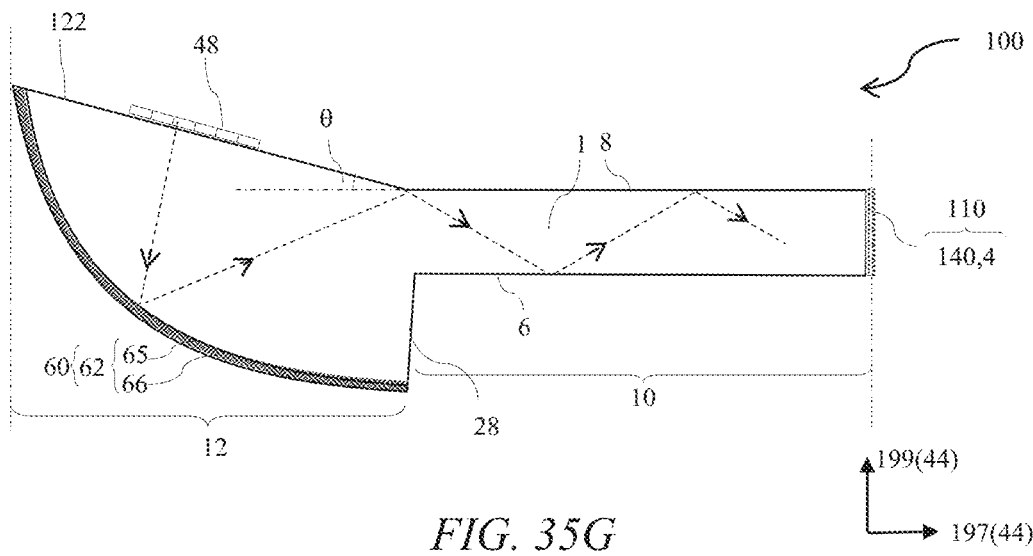

FIGS. 35E-G are schematic diagrams illustrating in side views alternative embodiments of anamorphic near-eye display apparatus 100 comprising an input reflector 62. Features of the embodiments of FIGS. 35E-G not discussed in further detail may be assumed to correspond to the features with equivalent reference numerals as discussed above, including any potential variations in the features.

In the alternative embodiment of FIGS. 35E-F input face 122 extends parallel to the front guide surface 8 in the case that the input face 122 is on the front side of the waveguide 1 or to the rear guide surface 6 in the case that the input face 122 is on the rear side of the waveguide 1. FIG. 35E comprises input face 122 that is coplanar with the front guide surface 8 in the case that the input face 122 is on the front side of the waveguide 1 or with the rear guide surface 6 in the case that the input face 122 is on the rear side of the waveguide 1. Advantageously the spatial light modulator 48 may be provided on a drive board that has a larger size.

In the alternative embodiment of FIG. 35F, input face 122 is offset and parallel with the front guide surface 8 in the case that the input face 122 is on the front side of the waveguide 1 or with the rear guide surface 6 in the case that the input face 122 is on the rear side of the waveguide 1. Advantageously the spatial light modulator 48 may be provided within or near to the arms 604 of the head-wear 600.

In the alternative embodiment of FIG. 35G, the input face 122 extends at an acute angle θ to the front guide surface 8 in the case that the input face 122 is on the front side of the waveguide 1 or to the rear guide surface 6 in the case that the input face 122 is on the rear side of the waveguide 1. Advantageously a more convenient mechanical arrangement may be provided.

In the alternative embodiments of FIGS. 35E-G, the extraction features may be of the types as illustrated elsewhere herein.

Figure 36A:
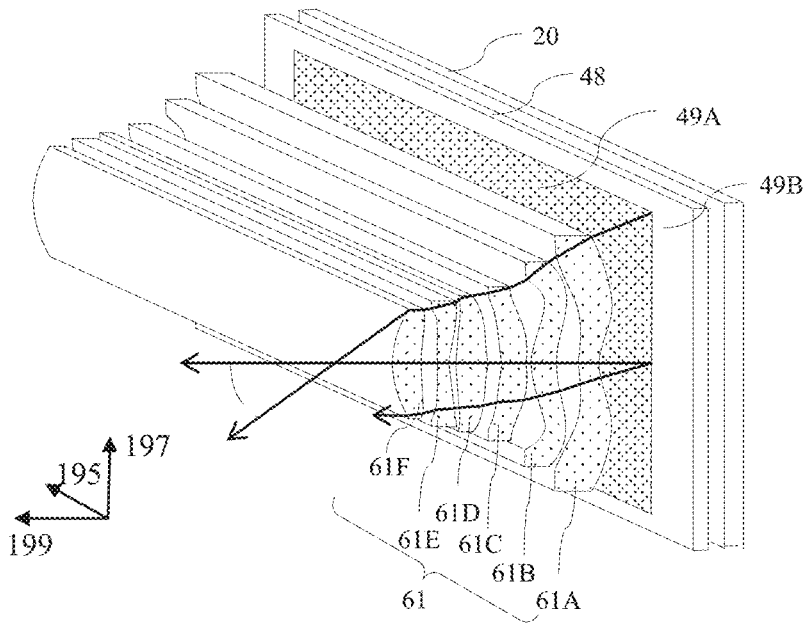

FIG. 36A is a schematic diagram illustrating in perspective front view an alternative arrangement of an input focusing lens 61. Features of the embodiment of FIG. 36A not discussed in further detail may be assumed to correspond to the features with equivalent reference numerals as discussed above, including any potential variations in the features.

Spatial light modulator 48 comprises active area 49A and border 49B and is aligned to the lens of the transverse anamorphic component 60 that is a compound lens comprising lenses 60A-F. Some of the lenses 60A-F may comprise surfaces that have a constant radius and some may comprise variable radius surfaces such that in combination aberration correction is advantageously improved.

Alternative arrangements of spatial light modulator 48, illumination system 240 and optical system 250 will now be described.

Figure 36B:
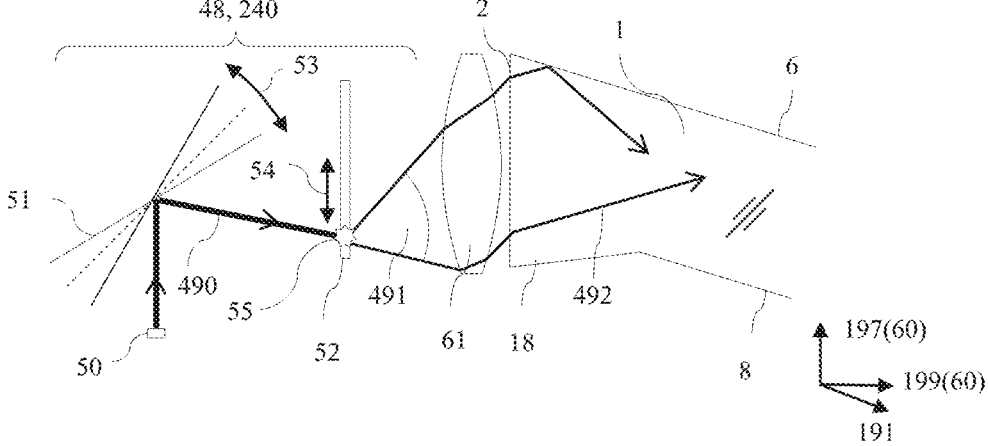

FIG. 36B is a schematic diagram illustrating in side view a spatial light modulator arrangement for use in the anamorphic near-eye display apparatus of FIG. 1 comprising a spatial light modulator 48 comprising a laser 50, a scanning arrangement 51 and a light diffusing screen 52. Features of the embodiment of FIG. 36B not discussed in further detail may be assumed to correspond to the features with equivalent reference numerals as discussed above, including any potential variations in the features.

In the alternative embodiment of FIG. 36B, the spatial light modulator 48 comprises the laser 50 arranged to direct a beam 490 towards scanning arrangement 51 that may be a rotating mirror for example, with oscillation 53 that is synchronised to the image data.

The beam 490 is arranged to illuminate a screen 52 to provide a diffuse light source 55 at the screen. The screen 52 may comprise a diffusing arrangement so that the transmitted light is diffused into light cone 491 arranged to provide input light rays 492 into the transverse anamorphic component 60 and extraction waveguide 1.

The screen 52 may alternatively comprise a photoemission layer such as a phosphor laser at which the laser beam 490 is arranged to produce emission from the photoemission layer. The output color can advantageously be independent of the laser 50 emission wavelength. Further laser speckle may be reduced.

The laser 50 may comprise a one dimensional array of laser emitting pixels 222 across a row 221T and the scanning arrangement 51 may provide one dimensional array of light sources 55 at the screen 52 for each addressable row of the spatial light modulator 48. The scanning speed of the scanning arrangement 51 is reduced, advantageously achieving reduced cost and complexity.

Alternatively the laser 50 may comprise a single laser emitter and the scanning arrangement 51 may provide two dimensional scanning of the beam 490 to achieve a two dimensional pixel array of emitters 55 at the screen 52. Advantageously laser 50 cost may be reduced.

Further arrangements comprising laser sources will now be described.

Figure 37A:
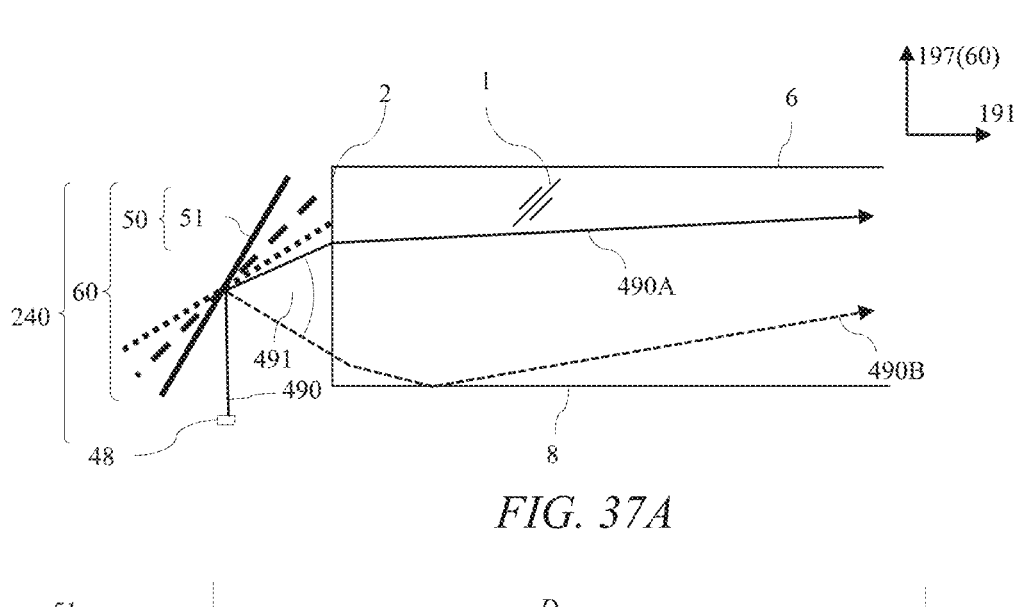
Figure 37B:
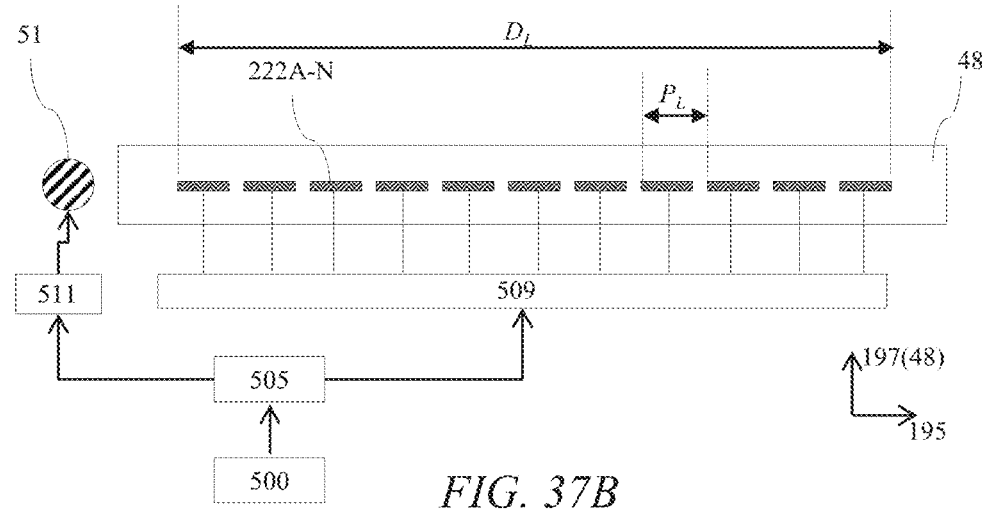
Figure 37C:
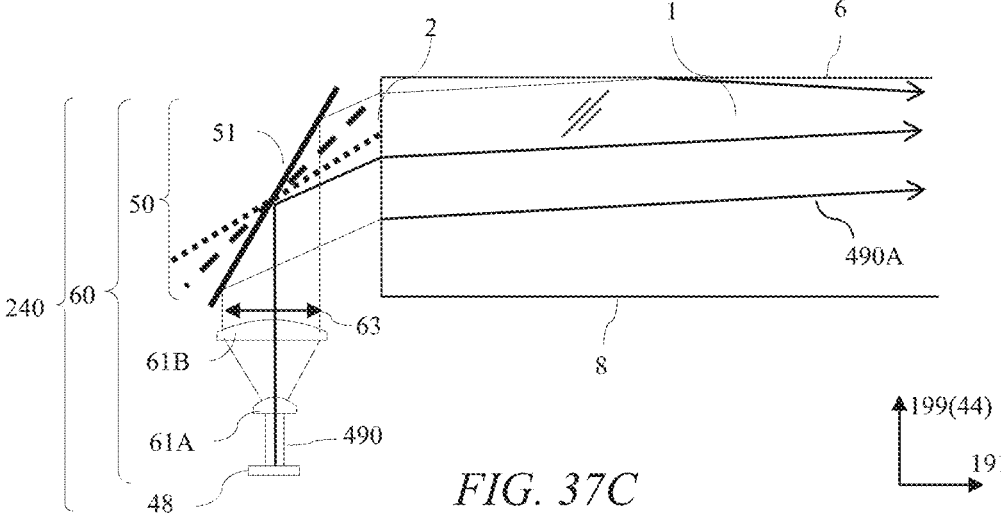

FIG. 37A is a schematic diagram illustrating in side view input to the extraction waveguide 1 comprising a spatial light modulator 48 comprising laser sources and a scanning arrangement 51; FIG. 37B is a schematic diagram illustrating in front view a spatial light modulator 48 comprising a row of laser light sources 172 for use in the arrangement of FIG. 37A; and FIG. 37C is a schematic diagram illustrating an alternative illumination arrangement. Features of the embodiment of FIGS. 37A-C not discussed in further detail may be assumed to correspond to the features with equivalent reference numerals as discussed above, including any potential variations in the features.

The alternative embodiment of FIG. 37A comprises a transverse anamorphic component 60 that is formed by a deflector element 50 that comprises scanning mirror 51.

FIG. 37B illustrates a spatial light modulator 48 suitable for use in the arrangement of FIG. 37A comprising a one dimensional array of pixels 222A-N wherein the pixels 222A-N each comprise a laser source. Control system 500 is arranged to supply line-at-a-time image data to spatial light modulator 48 controller 505 that outputs pixels data to laser pixels 222A-N by means of driver 509; and location data to scanning arrangement 51 by means of scanner driver 511. The laser pixels 222A-N are arranged in a single row with pitch $P_L$ in the lateral direction 195 that is the same as illustrated in FIG. 2D for example.

Returning to the description of FIG. 37A, in operation, image data for a first addressed row of image data are applied to the laser pixels 222A-N and the scanning arrangement 51 adjusted so that the laser light from the spatial light modulator 48 is directed as ray 490A in a first direction across the transverse direction 197. At a different time, image data for a different addressed row of image data are applied to the laser pixels 222A-N and the scanning arrangement 51 adjusted so that the laser light from the spatial light modulator 48 is directed as ray 490B in a different direction across the transverse direction 197. The transverse anamorphic component 60 is thus arranged to receive light from the spatial light modulator 48 and the illumination system 240 is arranged so that light output from the transverse anamorphic component 60 is directed in directions illustrated by rays 490A, 490B that are distributed in the transverse direction with cone 491.

In other words, the scanning arrangement 51 scans about the lateral direction 197(60) and serves to provide illustrative light rays 490A, 490B sequentially. By means of sequential scanning, the scanning arrangement 51 effectively has positive optical power in the transverse direction 197(60) for light from the spatial light modulator 48, achieving output cone 491 in a sequential manner. In this manner, the scanning arrangement 51 directs light in directions that are distributed in the transverse direction, allowing it to serve as a transverse anamorphic component 60. The scanning of the scanning arrangement 51 may be arranged not to direct light near to parallel to the direction 191 along the extraction waveguide 1. Advantageously double imaging is reduced.

Advantageously the cost and complexity of the illumination system 240 and transverse anamorphic component 60 may be reduced.

The alternative embodiment of FIG. 37C provides beam expander 61A, 61B that increases the width 63 of the output beam from the illumination system 240. In FIG. 37C, the illumination system 240 further comprises a deflector element 50 arranged to deflect light output from the transverse anamorphic component 60 by a selectable amount, the deflector element 50 being selectively operable to direct the light output from the transverse anamorphic component 60 in the directions that are distributed in the transverse direction 197. Advantageously uniformity of the output image from across the exit pupil 40 is provided.

It may be desirable to provide a tracking sensor to determine the location of the pupil of an observer.

FIG. 38A is a schematic diagram illustrating in perspective front view an anamorphic near-eye display apparatus 100 comprising an eye tracking arrangement 700; FIG. 38B is a schematic diagram illustrating in side view an anamorphic near-eye display apparatus 100 comprising an eye tracking arrangement 700 with a transmissive hole 702 arranged at the reflective end; and FIG. 38C is a schematic diagram illustrating in side view an anamorphic near-eye display apparatus 100 comprising an eye tracking arrangement 700 with a partially transmissive reflector arranged with the light reversing reflector 140. Features of the embodiments of FIGS. 38A-C not discussed in further detail may be assumed to correspond to the features with equivalent reference numerals as discussed above, including any potential variations in the features.

In the alternative embodiments of FIGS. 38A-C, the extraction waveguide 1 is illustrated with stepped extraction reflectors 170 although other extraction reflectors such as those described hereinbefore may be provided as alternatives.

In the alternative embodiments of FIGS. 38A-B, a hole is provided in the light reversing reflector 140. In operation, some light from the eye 45 may be reflected into the extraction waveguide 1 and directed towards the light reversing reflector 140. Some light rays 710 incident on the hole 702 are directed onto an optional lens 706 and an optical sensor 704 arranged to collect the received image data for the location 745 at the sensor of the image of the eye 45. The image of the eye 45 may be directed to multiple locations 745 from the respective extraction reflectors 170 and from guiding of light in the extraction waveguide 1. A machine learning algorithm may be implemented in the position location estimation unit 545 to determine most likely eye 45 location on the basis of the image from the sensor 704 with locations 745. The eye location data is returned to the control system 500. The control system may be adjusted to optimise the image quality for the measured eye 45 location, advantageously increasing image quality.

In the alternative embodiment of FIG. 38C, the light reversing reflector 140 may be partially transmitting, for example to infra-red illumination of the eye 45 by rays 707 provided by light source 706 arranged at the input end 2 of the extraction waveguide 1. Advantageously improved uniformity of output of image data to the eye 45 may be achieved.

The illumination system 240 and optical system 250 of the embodiments hereinabove may be provided for anamorphic directional illumination devices for illumination of external scenes 479.

FIG. 39A is a schematic diagram illustrating a front perspective view an anamorphic directional illumination device 1000. Features of the embodiment of FIG. 39A not discussed in further detail may be assumed to correspond to the features with equivalent reference numerals as discussed above, including any potential variations in the features.

The alternative embodiment of FIG. 29A illustrates an anamorphic directional illumination device 1000 that comprises an illumination system 240 comprising a light source array 948, the illumination system being arranged to output light. Light source array 948 may for example comprise an array of light emitting diodes, or may be provided by a spatial light modulator 48 as described elsewhere herein.

Optical system 250 is arranged to direct light from the illumination system 240. The light in light cone 499 may be directed towards an externally illuminated scene 479. Illuminated scenes 479 may include but are not limited to roads, rooms, external spaces, processing equipment, metrology environments, theatrical stages, human bodies such as for face illumination for face detection and measurement purposes.

The optical system 250 has an optical axis 199 and has anamorphic properties in a lateral direction 195 and a transverse direction 197 that are perpendicular to each other and perpendicular to the optical axis 199, wherein the light source array 948 comprises light sources 949a-n distributed in the lateral direction 195, and which may further be distributed in the transverse direction 197 as described elsewhere herein.

The optical system 250 further comprises a transverse anamorphic component 60 having positive optical power in the transverse direction 197, wherein the transverse anamorphic component 60 is arranged to receive light from the light source array 948 and the illumination system 250 is arranged so that light output from the transverse anamorphic component 60 is directed in directions that are distributed in the transverse direction 197.

The optical system 250 further comprises an extraction waveguide 1 arranged to receive light from the transverse anamorphic component 60 and a lateral anamorphic component 110 having positive optical power in the lateral direction 195, the extraction waveguide 1 being arranged to guide light in light cone 491 from the transverse anamorphic component 60 to the lateral anamorphic component 110 along the extraction waveguide 1 in a first direction 191.

A light reversing reflector 140 is arranged to reflect light that has been guided along the extraction waveguide 1 in the first direction 191 so that the reflected light in light cone 493 is guided along the extraction waveguide 1 in a second direction 193 opposite to the first direction 191.

The extraction waveguide 1 comprises at least one reflective extraction feature 970 disposed internally within the extraction waveguide 1, the at least one reflective extraction feature 970 being arranged to transmit light guided along the extraction waveguide 1 in the first direction 191 and to extract light guided along the extraction waveguide 1 in the second direction 193 to provide output light cone 499 directed towards the illuminated scene 479.

The anamorphic directional illumination device 1000 of FIG. 39A may comprise various embodiments arranged to improve efficiency and image quality as described elsewhere herein.

By way of comparison with the anamorphic near-eye display apparatuses 100 described hereinabove, the output light from the anamorphic directional illumination device 1000 is provided as illumination cones 951*a-n* for illumination of a scene 479 compared to the angular pixel information for illumination of pupil 44 and retina 46. High resolution imaging of illuminated scenes 479 may be achieved with high efficiency and low cost in a compact package.

The light sources 949 may output light that is visible light or infra-red light. Advantageously directional illumination of scenes 479 may be provided for visible illumination or illumination of scenes for other detectors such as LIDAR detectors. The light sources 949 may have different spectral outputs. The different spectral outputs include: a white light spectrum, plural different white light spectra, red light, orange light, and/or infra-red light. A visible illumination may be provided and a further illumination for detection purposes may also be provided, which may have different illumination structures to achieve improved signal to noise of detection.

In an alternative embodiment, the scene 479 may comprise a projection screen and the anamorphic directional illumination device 1000 may provide projection of images onto the projection screen. Advantageously a lightweight and portable image projector with high efficiency may be provided in a thin package.

The reflective extraction feature 970 of FIG. 39A may alternatively be provided by an array of light extraction features 970*a-n*. Advantageously the aesthetic appearance of the directional illumination appearance may be modified. Alternatively the reflective extraction feature 970 may be provided by at least one of reflective extraction feature 169 as described elsewhere hereinabove and may comprise at least one feature such as, but not limited to, extraction reflectors 170, 172, 174 and diffractive extraction features

112B. Alternative embodiments of light source array 948 may be provided by embodiments of spatial light modulator 48 as described hereinabove, for example in FIGS. 2A-D, FIG. 36B, and FIGS. 37A-C. The transverse anamorphic component 60 may alternatively comprise one or more lenses such as illustrated with reference to FIG. 17D, FIG. 36A, FIG. 33A-B, FIGS. 34A-B and FIGS. 35A-G. The lateral anamorphic component 110 may alternatively comprise the arrangements such as illustrated with reference to FIGS. 25A-D and FIGS. 25A-I. Field curvature may be improved by the arrangements such as FIGS. 26A-E. Aberration control and power of anamorphic components 60, 110 may be further improved by the Pancharatnam-Berry lenses of FIGS. 28A-C, FIG. 29 and FIG. 30 for use in the lateral anamorphic component 110 and/or transverse anamorphic component 60. The features mentioned above may be provided in isolation or in combination.

Further alternative embodiments of waveguide 1 arrangements, transverse anamorphic component 60 arrangements, lateral anamorphic component 110 arrangements and extraction feature 970 arrangements may be provided as described elsewhere hereinabove.

FIG. 39B is a schematic diagram illustrating a side view of a road scene 479 comprising a vehicle 600 comprising a vehicle external light apparatus 106 comprising the anamorphic directional illumination device 1000 of FIG. 39A. Features of the embodiment of FIG. 39B not discussed in further detail may be assumed to correspond to the features with equivalent reference numerals as discussed above, including any potential variations in the features.

The alternative embodiment of FIG. 39B illustrates a vehicle external light apparatus 106 comprising an anamorphic directional illumination device 1000 such as illustrated in FIG. 39A that is a vehicle external light device mounted on a housing 108 for fitting to a vehicle 600. The vehicle external light apparatus 106 is arranged to illuminate an external scene 479 such as a road environment. The vehicle external light apparatus 106 provides output light cone 499 so that the horizon 499 and road surface 494 may be illuminated. In the example of FIG. 39B the cross section of light cone 499 is distributed across the transverse direction 197. In alternative embodiments the cross section of light cone 499 may be distributed across the lateral direction 195.

The light source array 948 may be controlled by controller 500 in response to the location of objects such as other drivers or road hazards in the illuminated scene 479. The light cone 499 may be arranged to illuminate a two dimensional array of light cones 951 corresponding to respective light sources 949. The light sources 949*a-n* may be individually or collectively controllable so that some parts of the scene 479 are illuminated and other parts are not illuminated or illuminated with different illuminance. Advantageously glare to other drivers may be reduced while providing increased levels of illuminance of the road scene 479.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. An anamorphic near-eye display apparatus comprising:
an illumination system comprising a spatial light modulator, the illumination system being arranged to output light; and
an optical system arranged to direct light from the illumination system to a viewer's eye, wherein the optical system has an optical axis and has anamorphic properties in a lateral direction and a transverse direction that are perpendicular to each other and perpendicular to the optical axis, wherein the spatial light modulator comprises pixels distributed in the lateral direction, and the optical system comprises:
a transverse anamorphic component having positive optical power in the transverse direction, wherein the transverse anamorphic component is arranged to receive light from the spatial light modulator and the illumination system is arranged so that light output from the transverse anamorphic component is directed in directions that are distributed in the transverse direction;
an extraction waveguide arranged to receive light from the transverse anamorphic component;
a lateral anamorphic component having positive optical power in the lateral direction, the extraction waveguide being arranged to guide light from the transverse anamorphic component to the lateral anamorphic component along the extraction waveguide in a first direction; and
a light reversing reflector that is arranged to reflect light that has been guided along the extraction waveguide in the first direction so that the reflected light is guided along the extraction waveguide in a second direction opposite to the first direction,
wherein the extraction waveguide comprises an array of reflective extraction features disposed internally within the extraction waveguide, the reflective extraction features being arranged to transmit light guided along the extraction waveguide in the first direction and to extract light guided along the extraction waveguide in the second direction towards an eye of a viewer, the array of reflective extraction features being distributed along the extraction waveguide so as to provide exit pupil expansion.

2. An anamorphic near-eye display apparatus according to claim 1, wherein the reflective extraction features comprise extraction reflectors extending across at least part of the extraction waveguide between front and rear guide surfaces of the extraction waveguide.

3. An anamorphic near-eye display apparatus according to claim 2,
wherein the array of reflective extraction reflectors have reflectivities defined across their overall area that increase with increasing distance along the second direction.

4. An anamorphic near-eye display apparatus according to claim 2, wherein the extraction reflectors comprise extraction surfaces spaced apart by a partially reflective coating.

5. An anamorphic near-eye display apparatus according to claim 4, wherein the partially reflective coating comprises at least one dielectric layer.

6. An anamorphic near-eye display apparatus according to claim 5, wherein the at least one dielectric layer comprises a stack of dielectric layers.

7. An anamorphic near-eye display apparatus according to claim 4, wherein the partially reflective coating is metallic.

8. An anamorphic near-eye display apparatus according to claim 2, wherein the extraction reflectors comprise extraction surfaces spaced apart by a gap.

9. An anamorphic near-eye display apparatus according to claim 8, wherein the extraction surfaces have an anti-reflection coating.

10. An anamorphic near-eye display apparatus according to claim 2, wherein the extraction reflectors extend partially across the extraction waveguide between the front and rear guide surfaces of the extraction waveguide with successively shifted positions.

11. An anamorphic near-eye display apparatus according to claim 10, wherein the extraction reflectors extend to the front and rear guide surfaces of the extraction waveguide.

12. An anamorphic near-eye display apparatus according to claim 11, wherein the extraction reflectors do not extend to the front and rear guide surfaces of the extraction waveguide.

13. An anamorphic near-eye display apparatus according to claim 10, further comprising intermediate reflectors extending along the extraction waveguide between adjacent pairs of extraction reflectors.

14. An anamorphic near-eye display apparatus according to claim 13, wherein the intermediate reflectors comprise intermediate surfaces spaced apart by a partially reflective coating.

15. An anamorphic near-eye display apparatus according to claim 14, wherein the partially reflective coating comprises at least one dielectric layer.

16. An anamorphic near-eye display apparatus according to claim 15, wherein the at least one dielectric layer comprises a stack of dielectric layers.

17. An anamorphic near-eye display apparatus according to claim 14, wherein the partially reflective coating is metallic.

18. An anamorphic near-eye display apparatus according to claim 13, wherein the intermediate reflectors comprise intermediate surfaces spaced apart by a gap.

19. An anamorphic near-eye display apparatus according to claim 18, wherein the intermediate surfaces have an anti-reflection coating.

20. An anamorphic near-eye display apparatus according to claim 10, wherein the extraction waveguide comprises plural constituent parts having facing stepped surfaces attached together, the stepped surfaces being shaped with alternating extraction surfaces extending in the transverse direction and intermediate surfaces extending along the extraction waveguide, wherein the extraction reflectors comprise the facing extraction surfaces.

21. An anamorphic near-eye display apparatus according to claim 20, wherein the intermediate surfaces are optically coupled together.

22. An anamorphic near-eye display apparatus according to claim 10, wherein the extraction reflectors comprise plural sets of extraction reflectors, wherein, within each set of extraction reflectors, in the transverse direction the extraction reflectors extend partially across the extraction waveguide with successively shifted positions, the extraction reflectors of different sets overlapping in extent in the transverse direction.

23. An anamorphic near-eye display apparatus according to claim 2, wherein at least part of the extraction waveguide comprises plural constituent plates optically coupled together, wherein the extraction reflectors are formed between the plural constituent plates.

24. An anamorphic near-eye display apparatus according to claim 2, wherein the extraction reflectors extend between the front and rear guide surfaces of the extraction waveguide.

25. An anamorphic near-eye display apparatus according to claim 2, wherein the extraction reflectors have the same reflective area.

26. An anamorphic near-eye display apparatus according to claim 2, wherein the extraction reflectors are patterned to have different reflective areas providing reflectivities defined across their overall area that increase with increasing distance along the optical axis.

27. An anamorphic near-eye display apparatus according to claim 2, wherein the extraction reflectors have a surface normal direction that is inclined with respect to the direction along the extraction waveguide by an angle in the range of 20 to 40 degrees.

28. An anamorphic near-eye display apparatus according to claim 1, wherein the extraction waveguide comprises a transmissive element and a diffractive optical element optically coupled together, wherein the reflective extraction features comprise portions of the diffractive optical element.

29. An anamorphic near-eye display apparatus according to claim 28, wherein the diffractive optical element is a volume hologram.

30. An anamorphic near-eye display apparatus according to claim 1, wherein front and rear guide surfaces of the extraction waveguide have an anti-reflection coating.

31. An anamorphic near-eye display apparatus according to claim 1, wherein the optical system further comprises:
    an input linear polarizer disposed between the transverse anamorphic component and an input end of the extraction waveguide; and
    a polarization conversion retarder disposed between the transverse anamorphic component and the input linear polarizer, the polarization conversion retarder being arranged to convert a polarization state of light passing therethrough between a linear polarization state and a circular polarization state.

32. An anamorphic near-eye display apparatus according to claim 31, wherein the polarisation polarization conversion retarder has a retardance of a quarter wavelength at a wavelength of visible light.

33. An anamorphic near-eye display apparatus according to claim 1, wherein the light reversing reflector is a reflective end of the extraction waveguide.

34. An anamorphic near-eye display apparatus according to claim 1, wherein the lateral anamorphic component comprises the light reversing reflector.

35. An anamorphic near-eye display apparatus according to claim 1, wherein the optical system comprises an input linear polarizer disposed between the spatial light modulator and the array of extraction reflectors and a polarization conversion retarder disposed between the light reversing reflector and the array of reflective extraction features, the polarization conversion retarder being arranged to convert a polarization state of light passing therethrough between a linear polarization state and a circular polarization state.

36. An anamorphic near-eye display apparatus according to claim 35, wherein the polarization conversion retarder has a retardance of a quarter wavelength at a wavelength of visible light.

37. An anamorphic near-eye display apparatus according to claim 35, wherein the input linear polarizer is arranged to pass light that is in a p-polarization state in the extraction waveguide.

38. An anamorphic near-eye display apparatus according to claim 1, wherein the lateral anamorphic component comprises a lens.

39. An anamorphic near-eye display apparatus according to claim 1, wherein the optical system comprises an input section comprising an input reflector that is the transverse anamorphic component and is arranged to reflect the light from the illumination system and direct it along the extraction waveguide.

40. An anamorphic near-eye display apparatus according to claim 39, wherein the transverse anamorphic component further comprises a lens.

41. An anamorphic near-eye display apparatus according to claim 39, wherein the input section further comprises an input face disposed on a front or rear side of the extraction waveguide and facing the input reflector, and the input section is arranged to receive the light from the illumination system through the input face.

42. An anamorphic near-eye display apparatus according to claim 41, wherein the input face extends at an acute angle to a front guide surface in the case that the input face is on a front side of the extraction waveguide or to a rear guide surface in the case that the input face is on a rear side of the extraction waveguide.

43. An anamorphic near-eye display apparatus according to claim 41, wherein the input face extends parallel to a front guide surface in the case that the input face is on a front side of the extraction waveguide or to a rear guide surface in the case that the input face is on a rear side of the extraction waveguide.

44. An anamorphic near-eye display apparatus according to claim 43, wherein the input face is coplanar with the front guide surface in the case that the input face is on the front side of the extraction waveguide or with the rear guide surface in the case that the input face is on the rear side of the extraction waveguide.

45. An anamorphic near-eye display apparatus according to claim 41, wherein the input face is disposed outwardly of a front or rear guide surface.

46. An anamorphic near-eye display apparatus according to claim 45, wherein the input section further comprises a separation face extending outwardly from the one of the front or rear guide surfaces to the input face.

47. An anamorphic near-eye display apparatus according to claim 39, wherein the input section is integral with the extraction waveguide.

48. An anamorphic near-eye display apparatus according to claim 39, wherein the extraction waveguide has an end that is an input face through which the extraction waveguide is arranged to receive light from the illumination system, and the input section is a separate element from the extraction waveguide that further comprises an output face and is arranged to direct light reflected by the input reflector through the output face and into the extraction waveguide through the input face of the extraction waveguide.

49. An anamorphic near-eye display apparatus according to claim 1, wherein the extraction waveguide is arranged to receive light from the illumination system through an input area of an opposing surface of the extraction waveguide, the extraction waveguide further comprising a diffractive deflector element opposite the input area on another opposing surface of the extraction waveguide, the diffractive deflector element being arranged to deflect the light received through the input area along the extraction waveguide.

50. An anamorphic near-eye display apparatus according to claim 49, wherein the transverse anamorphic component comprises the diffractive deflector element.

51. An anamorphic near-eye display apparatus according to claim 1, wherein the transverse anamorphic component comprises a lens.

52. An anamorphic near-eye display apparatus according to claim 1, wherein the extraction waveguide has an end that is an input face through which the extraction waveguide is arranged to receive light from the illumination system.

53. An anamorphic near-eye display apparatus according to claim 52, wherein the transverse anamorphic component is disposed outside the extraction waveguide, and the extraction waveguide is arranged to receive light from the transverse anamorphic component through the input face.

54. An anamorphic near-eye display apparatus according to claim 52, wherein the direction of the optical axis through the transverse anamorphic component is inclined with respect to front and rear guide surfaces of the extraction waveguide.

55. An anamorphic near-eye display apparatus according to claim 52, wherein the input end is inclined with respect to front and rear guide surfaces of the extraction waveguide.

56. An anamorphic near-eye display apparatus according to claim 1, wherein the pixels of the spatial light modulator are also distributed in the transverse direction so that the light output from the transverse anamorphic component is directed in the directions that are distributed in the transverse direction.

57. An anamorphic near-eye display apparatus according to claim 56, wherein the spatial light modulator comprises pixels having pitches in the lateral and transverse directions with a ratio that is the same as the inverse of the ratio of optical powers of lateral and transverse anamorphic optical elements.

58. An anamorphic near-eye display apparatus according to claim 1, wherein the illumination system further comprises a deflector element arranged to deflect light output from the transverse anamorphic component by a selectable amount, the deflector element being selectively operable to direct the light output from the transverse anamorphic component in the directions that are distributed in the transverse direction.

59. An anamorphic near-eye display apparatus according to claim 1, wherein front and rear guide surfaces of the extraction waveguide are planar and parallel.

60. An anamorphic near-eye display apparatus according to claim 1, wherein the reflective extraction features are inclined with respect to the first and second directions along the optical axis.

61. An anamorphic near-eye display apparatus according to claim 60, wherein the reflective extraction features are inclined at the same angle.

62. An anamorphic near-eye display apparatus according to claim 1, wherein the reflective extraction features have a varying pitch along the extraction waveguide.

63. An anamorphic near-eye display apparatus according to claim 1, wherein the reflective extraction features have a varying extent between front and rear guide surfaces of the extraction waveguide.

64. An anamorphic near-eye display apparatus according to claim 1, further comprising a control system arranged to operate the illumination system to provide light input in accordance with image data representing an image.

65. An anamorphic near-eye display apparatus according to claim 1, wherein the reflective extraction arrangement comprises two separated regions, each region being arranged to extract light guided along the extraction waveguide towards a respective eye of the viewer.

66. A head-worn display apparatus comprising an anamorphic near-eye display apparatus according to claim 1 and a head-mounting arrangement arranged to mount the anamorphic near-eye display apparatus on a head of a wearer with the anamorphic near-eye display apparatus extending across at least one eye of the wearer.

67. A head-worn display apparatus according to claim 66, further comprising lenses having optical power, the anamorphic near-eye display apparatus overlying one or each lens.

68. A head-worn display apparatus according to claim 66, wherein the head-worn display apparatus comprises a pair of spectacles.

69. A head-worn display apparatus according to claim 66, wherein the anamorphic near-eye display apparatus is a first anamorphic near-eye display apparatus and the head-worn display apparatus further comprises a second anamorphic near-eye display apparatus, wherein the second anamorphic near-eye display apparatus is arranged in series with the first anamorphic near-eye display apparatus and wherein the second anamorphic near-eye display apparatus comprises:

an illumination system comprising a spatial light modulator, the illumination system being arranged to output light; and an optical system arranged to direct light from the illumination system to a viewer's eye, wherein the optical system has an optical axis and has anamorphic properties in a lateral direction and a transverse direction that are perpendicular to each other and perpendicular to the optical axis, wherein the spatial light modulator comprises pixels distributed in the lateral direction, and the optical system comprises:

a transverse anamorphic component having positive optical power in the transverse direction, wherein the transverse anamorphic component is arranged to receive light from the spatial light modulator and the illumination system is arranged so that light output from the transverse anamorphic component is directed in directions that are distributed in the transverse direction;

an extraction waveguide arranged to receive light from the transverse anamorphic component;

a lateral anamorphic component having positive optical power in the lateral direction, the extraction waveguide being arranged to guide light from the transverse anamorphic component to the lateral anamorphic component along the extraction waveguide in a first direction; and a light reversing reflector that is arranged to reflect light that has been guided along the extraction waveguide in the first direction so that the reflected light is guided along the extraction waveguide in a second direction opposite to the first direction, wherein the extraction waveguide comprises an array of reflective extraction features disposed internally within the extraction waveguide, the reflective extraction features being arranged to transmit light guided along the extraction waveguide in the first direction and to extract light guided along the extraction waveguide in the second direction towards an eye of a viewer, the array of reflective extraction features being distributed along the extraction waveguide so as to provide exit pupil expansion.

70. A head-worn display apparatus according to claim 69, wherein a virtual image distance for light from the second anamorphic near-eye display apparatus is different to a virtual image distance for light from the first anamorphic near-eye display apparatus.

71. A head-worn display apparatus according to claim 66, further comprising a non-anamorphic near-eye display apparatus, wherein the non-anamorphic near-eye display apparatus comprises a non-anamorphic spatial light modulator and a non-anamorphic magnifying optical system; and wherein the non-anamorphic near-eye display apparatus is arranged in series with the anamorphic near-eye display apparatus.

72. A head-worn display apparatus according to claim 71, wherein a virtual image distance for light from the non-anamorphic near-eye display apparatus is different from a virtual image distance for light from the anamorphic near-eye display apparatus.

73. An anamorphic directional illumination device comprising:

an illumination system comprising a light source array, the illumination system being arranged to output light; and an optical system arranged to direct light from the illumination system, wherein the optical system has an optical axis and has anamorphic properties in a lateral direction and a transverse direction that are perpendicular to each other and perpendicular to the optical axis, wherein the light source array comprises light sources distributed in the lateral direction, and the optical system comprises:

a transverse anamorphic component having positive optical power in the transverse direction, wherein the transverse anamorphic component is arranged to receive light from the light source array and the illumination system is arranged so that light output from the transverse anamorphic component is directed in directions that are distributed in the transverse direction;

an extraction waveguide arranged to receive light from the transverse anamorphic component;

a lateral anamorphic component having positive optical power in the lateral direction, the extraction waveguide being arranged to guide light from the transverse anamorphic component to the lateral anamorphic component along the extraction waveguide in a first direction; and a light reversing reflector that is arranged to reflect light that has been guided along the extraction waveguide in the first direction so that the reflected light is guided along the extraction waveguide in a second direction opposite to the first direction, wherein the extraction waveguide comprises at least one reflective extraction feature disposed internally within the extraction waveguide, the at least one reflective extraction feature being arranged to transmit light guided along the extraction waveguide in the first direction and to extract light guided along the extraction waveguide in the second direction.

74. A vehicle external light device comprising an anamorphic directional illumination device according to claim 73.

75. A vehicle external light apparatus comprising:

a housing for fitting to a vehicle; and a vehicle external light device according to claim 74 mounted on the housing.

* * * * *